(12) United States Patent
Sherman et al.

(10) Patent No.: US 12,496,301 B2
(45) Date of Patent: Dec. 16, 2025

(54) USE OF ANDROGEN RECEPTOR DEGRADER FOR THE TREATMENT OF SPINAL AND BULBAR MUSCULAR ATROPHY

(71) Applicant: Arvinas Operations, Inc., New Haven, CT (US)

(72) Inventors: Dan Sherman, Madison, CT (US); James Alan Gregory, New Haven, CT (US)

(73) Assignee: Arvinas Operations, Inc., New Haven, CT (US)

( * ) Notice: Subject to any disclaimer, the term of this patent is extended or adjusted under 35 U.S.C. 154(b) by 0 days.

(21) Appl. No.: 18/972,606

(22) Filed: Dec. 6, 2024

(65) Prior Publication Data

US 2025/0186440 A1   Jun. 12, 2025

Related U.S. Application Data

(60) Provisional application No. 63/608,071, filed on Dec. 8, 2023.

(51) Int. Cl.
*A61K 31/506* (2006.01)

(52) U.S. Cl.
CPC .................. *A61K 31/506* (2013.01)

(58) Field of Classification Search
CPC .................................................... A61K 31/506
See application file for complete search history.

(56) References Cited

U.S. PATENT DOCUMENTS

| | | |
|---|---|---|
| 6,306,663 B1 | 10/2001 | Kenton et al. |
| 6,670,348 B1 | 12/2003 | Rosen et al. |
| 7,030,141 B2 | 4/2006 | Bigge et al. |
| 7,041,298 B2 | 5/2006 | Deshaies et al. |
| 7,109,219 B2 | 9/2006 | Tsuruoka et al. |
| 7,153,867 B2 | 12/2006 | Shah et al. |
| 7,208,157 B2 | 4/2007 | Sakamoto et al. |
| 7,468,380 B2 | 12/2008 | Tsuruoka et al. |
| 8,012,997 B2 | 9/2011 | Robarge et al. |
| 8,481,568 B2 | 7/2013 | Muller et al. |
| 8,765,176 B2 | 7/2014 | Yamamoto et al. |
| 8,921,378 B2 | 12/2014 | Törmäkangas et al. |
| 9,500,653 B2 | 11/2016 | Crews et al. |
| 9,632,089 B2 | 4/2017 | Crews et al. |
| 9,796,698 B2 | 10/2017 | Muller et al. |
| 9,801,868 B2 | 10/2017 | Muller et al. |
| 10,047,151 B2 | 8/2018 | Lopez-Girona et al. |
| 10,118,933 B2 | 11/2018 | Wohlfahrt et al. |
| 10,584,101 B2 | 3/2020 | Crew |
| 10,844,021 B2 | 11/2020 | Crew et al. |
| 11,149,007 B2 | 10/2021 | Ammirante et al. |
| 11,236,051 B2 | 2/2022 | Crew et al. |
| 11,312,702 B2 | 4/2022 | Fan et al. |
| 11,325,889 B2 | 5/2022 | Ammirante et al. |
| 11,420,956 B2 | 8/2022 | Fan et al. |
| 11,535,606 B2 | 12/2022 | Fan et al. |
| 11,560,371 B2 | 1/2023 | Alexander et al. |
| 11,634,407 B2 | 4/2023 | Alexander et al. |
| 11,660,267 B2 | 5/2023 | Coric et al. |
| 11,739,075 B2 | 8/2023 | Alexander et al. |
| 11,952,347 B2 | 4/2024 | Crew et al. |
| 11,964,945 B2 | 4/2024 | Crew et al. |
| 12,043,612 B2 | 7/2024 | Allan et al. |

(Continued)

FOREIGN PATENT DOCUMENTS

| | | |
|---|---|---|
| CA | 2945975 A1 | 10/2015 |
| CN | 1844118 A | 10/2006 |

(Continued)

OTHER PUBLICATIONS

A. Baniahmad. J Mol Neurosci 58, 343-347 (2016). https://doi.org/10.1007/s12031-015-0681-8. (Year: 2016).*

(Continued)

*Primary Examiner* — James H Alstrum-Acevedo
*Assistant Examiner* — Manahil Mirghani Ali Abdalhameed
(74) *Attorney, Agent, or Firm* — Sheppard Mullin Richter & Hampton LLP

(57) ABSTRACT

This disclosure pertains to methods of treating or preventing spinal and bulbar muscular atrophy (SBMA), or one or more symptoms of SBMA, wherein the method comprises administering to a subject in need thereof an effective amount of Compound A, or a pharmaceutically acceptable salt thereof.

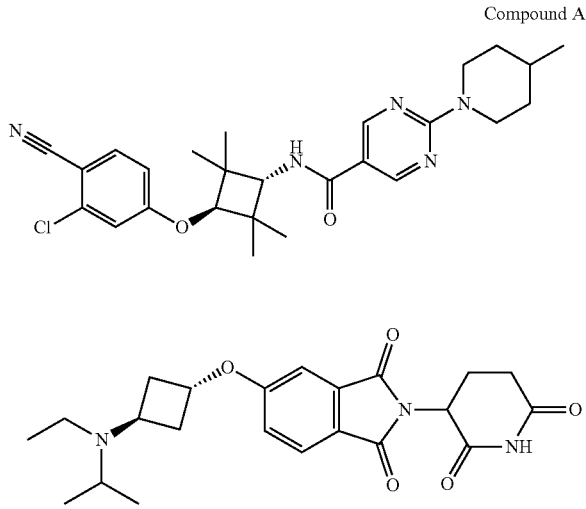

30 Claims, 24 Drawing Sheets
Specification includes a Sequence Listing.

(56) References Cited

U.S. PATENT DOCUMENTS

| | | | |
|---|---|---|---|
| 12,077,509 | B2 | 9/2024 | Berlin et al. |
| 2007/0254933 | A1 | 11/2007 | Jung et al. |
| 2008/0051432 | A1 | 2/2008 | Zhang |
| 2008/0214501 | A1 | 9/2008 | Zhengying et al. |
| 2009/0035362 | A1 | 2/2009 | Shih et al. |
| 2009/0142297 | A1 | 6/2009 | Muller et al. |
| 2010/0048517 | A1 | 2/2010 | Hu et al. |
| 2011/0196150 | A1 | 8/2011 | Man et al. |
| 2012/0270800 | A1 | 10/2012 | Verdine et al. |
| 2014/0079636 | A1 | 3/2014 | Chimmanamada et al. |
| 2014/0302523 | A1 | 10/2014 | Crews et al. |
| 2014/0356322 | A1 | 12/2014 | Crews et al. |
| 2015/0119435 | A1 | 4/2015 | Crews et al. |
| 2015/0291562 | A1 | 10/2015 | Crew et al. |
| 2015/0344473 | A1 | 12/2015 | Du et al. |
| 2016/0022642 | A1 | 1/2016 | Crews et al. |
| 2016/0045607 | A1 | 2/2016 | Crew et al. |
| 2016/0058872 | A1 | 3/2016 | Crew et al. |
| 2016/0136230 | A1 | 5/2016 | Campos et al. |
| 2016/0214972 | A1 | 7/2016 | Jin et al. |
| 2016/0243247 | A1 | 8/2016 | Bradner et al. |
| 2016/0272639 | A1 | 9/2016 | Crew et al. |
| 2016/0304450 | A1 | 10/2016 | Liang et al. |
| 2016/0368911 | A1 | 12/2016 | Campos et al. |
| 2017/0008904 | A1 | 1/2017 | Crew et al. |
| 2017/0037004 | A1 | 2/2017 | Crew et al. |
| 2017/0065719 | A1 | 3/2017 | Qian et al. |
| 2017/0121321 | A1 | 5/2017 | Crews et al. |
| 2017/0281784 | A1 | 10/2017 | Wang et al. |
| 2017/0307614 | A1 | 10/2017 | Crews et al. |
| 2017/0327469 | A1 | 11/2017 | Crew et al. |
| 2018/0015087 | A1 | 1/2018 | Liu et al. |
| 2018/0072711 | A1 | 3/2018 | Crew et al. |
| 2018/0099940 | A1* | 4/2018 | Crew .................. C07D 237/08 |
| 2018/0134684 | A1 | 5/2018 | Bradner et al. |
| 2018/0228907 | A1 | 8/2018 | Crew et al. |
| 2020/0095205 | A1 | 3/2020 | Crew et al. |
| 2020/0155689 | A1 | 5/2020 | Crew et al. |
| 2020/0155690 | A1 | 5/2020 | Crew et al. |
| 2021/0009528 | A1 | 1/2021 | Crew et al. |
| 2021/0040044 | A1 | 2/2021 | Crew et al. |
| 2021/0087170 | A1 | 3/2021 | Fan et al. |
| 2021/0113557 | A1 | 4/2021 | Crew et al. |
| 2021/0171470 | A1 | 6/2021 | Crew et al. |
| 2021/0353621 | A1 | 11/2021 | Peck et al. |
| 2022/0089570 | A1 | 3/2022 | Crew et al. |
| 2022/0144809 | A1 | 5/2022 | Dong et al. |
| 2022/0184078 | A1 | 6/2022 | Chirnomas et al. |
| 2022/0220124 | A1 | 7/2022 | Fan et al. |
| 2022/0227771 | A1 | 7/2022 | Fu et al. |
| 2022/0257774 | A1 | 8/2022 | Du et al. |
| 2022/0259154 | A1 | 8/2022 | Berlin et al. |
| 2022/0313826 | A1 | 10/2022 | Phillips et al. |
| 2022/0372016 | A1 | 11/2022 | Phillips et al. |
| 2022/0380368 | A1 | 12/2022 | Wang et al. |
| 2023/0002321 | A1 | 1/2023 | Ammirante et al. |
| 2023/0012321 | A1 | 1/2023 | Allan et al. |
| 2023/0082997 | A1 | 3/2023 | Berlin et al. |
| 2023/0084249 | A1 | 3/2023 | Berlin et al. |
| 2023/0111119 | A1 | 4/2023 | Lu et al. |
| 2023/0128132 | A1 | 4/2023 | Crew et al. |
| 2023/0241227 | A1 | 8/2023 | Desantis et al. |
| 2023/0242509 | A1 | 8/2023 | Alexander et al. |
| 2023/0302014 | A1 | 9/2023 | Zhou et al. |
| 2023/0331681 | A1 | 10/2023 | Berlin et al. |
| 2024/0002360 | A1 | 1/2024 | Desantis et al. |
| 2024/0066032 | A1 | 2/2024 | Chirnomas |
| 2024/0299366 | A1 | 9/2024 | Crew |
| 2025/0034096 | A1 | 1/2025 | Berlin et al. |

FOREIGN PATENT DOCUMENTS

| | | |
|---|---|---|
| CN | 103688176 A | 3/2014 |
| CN | 110506039 A | 11/2019 |
| CN | 110746399 A | 2/2020 |
| CN | 111825657 A | 4/2020 |
| CN | 113582974 A | 11/2021 |
| CN | 113912589 A | 1/2022 |
| CN | 114133379 A | 3/2022 |
| CN | 114163444 A | 3/2022 |
| CN | 114853846 A | 8/2022 |
| CN | 116891457 A | 10/2023 |
| CN | 117024390 A | 11/2023 |
| CN | 112574278 A | 11/2024 |
| EP | 2985285 | 2/2016 |
| EP | 3660004 A1 | 6/2020 |
| EP | 3971176 | 3/2022 |
| EP | 4023649 | 7/2022 |
| JP | 2004525889 A | 8/2004 |
| JP | 2010502627 A | 1/2010 |
| JP | 2013508447 A | 3/2013 |
| JP | 2014511895 A | 5/2014 |
| JP | 7061135 B2 | 4/2022 |
| KR | 101859074 B1 | 5/2018 |
| KR | 102119465 B1 | 6/2020 |
| RU | 2298554 C2 | 5/2007 |
| RU | 2310651 C2 | 11/2007 |
| RU | 2008112221 A | 10/2009 |
| RU | 2448101 C2 | 4/2012 |
| RU | 2011121567 A | 12/2012 |
| RU | 2012138709 A | 3/2014 |
| WO | WO1998003502 A1 | 1/1998 |
| WO | WO1999031061 A1 | 6/1999 |
| WO | WO2000066119 A1 | 11/2000 |
| WO | WO2002000617 A2 | 1/2002 |
| WO | WO2002066512 A1 | 8/2002 |
| WO | WO2002100845 A1 | 12/2002 |
| WO | WO2006113942 A2 | 10/2006 |
| WO | WO2007106670 A2 | 9/2007 |
| WO | WO2008011392 A2 | 1/2008 |
| WO | WO2009015254 A1 | 1/2009 |
| WO | WO2010053732 A1 | 5/2010 |
| WO | WO2010141805 A1 | 12/2010 |
| WO | WO2011008260 A2 | 1/2011 |
| WO | WO2012003281 A2 | 1/2012 |
| WO | WO2012040527 A2 | 3/2012 |
| WO | WO2012078559 A2 | 6/2012 |
| WO | WO2012090104 A1 | 7/2012 |
| WO | WO2013106643 A2 | 7/2013 |
| WO | WO2013106646 A2 | 7/2013 |
| WO | WO2013170147 A1 | 11/2013 |
| WO | WO2014015157 A2 | 1/2014 |
| WO | WO2014108452 A1 | 7/2014 |
| WO | WO2014123418 A1 | 8/2014 |
| WO | WO2015000868 A1 | 1/2015 |
| WO | WO2015038649 A1 | 3/2015 |
| WO | WO2015114314 A1 | 8/2015 |
| WO | WO2015134464 A2 | 9/2015 |
| WO | WO2015160845 A2 | 10/2015 |
| WO | WO2016105518 A1 | 6/2016 |
| WO | WO2016118666 A1 | 7/2016 |
| WO | WO2016146985 A1 | 9/2016 |
| WO | WO2016169989 A1 | 10/2016 |
| WO | WO2016172134 A2 | 10/2016 |
| WO | WO2016197032 A1 | 12/2016 |
| WO | WO2016197114 A1 | 12/2016 |
| WO | WO2017011590 A1 | 1/2017 |
| WO | WO2017030814 A1 | 2/2017 |
| WO | WO2017079267 A1 | 5/2017 |
| WO | WO2017184995 A1 | 10/2017 |
| WO | WO2017185031 A1 | 10/2017 |
| WO | WO2017185034 A1 | 10/2017 |
| WO | WO2017197051 A1 | 11/2017 |
| WO | WO2017197056 A1 | 11/2017 |
| WO | WO2018071606 A1 | 4/2018 |
| WO | WO2018098280 A1 | 5/2018 |
| WO | WO2018177989 A1 | 10/2018 |
| WO | WO2020047487 A1 | 3/2020 |
| WO | WO2020132014 A1 | 6/2020 |
| WO | WO2020132016 A1 | 6/2020 |
| WO | WO2020198711 A1 | 10/2020 |
| WO | WO2020198712 A1 | 10/2020 |
| WO | WO2020211822 A1 | 10/2020 |
| WO | WO2021081108 A1 | 4/2021 |

(56) References Cited

FOREIGN PATENT DOCUMENTS

| WO | WO2021231174 A1 | 11/2021 |
| --- | --- | --- |
| WO | WO2021231431 A1 | 11/2021 |
| WO | WO2021249534 A1 | 12/2021 |
| WO | WO2022031642 A2 | 2/2022 |
| WO | WO2022048605 A1 | 3/2022 |
| WO | WO2022111526 A1 | 6/2022 |
| WO | WO2022125969 A1 | 6/2022 |
| WO | WO2022187419 A1 | 9/2022 |
| WO | WO2022192481 A1 | 9/2022 |
| WO | WO2023205481 A1 | 10/2023 |
| WO | WO2023222011 A1 | 11/2023 |
| WO | WO2024159052 A1 | 8/2024 |
| WO | WO2024188209 A1 | 9/2024 |
| WO | WO2024197429 A1 | 10/2024 |
| WO | WO2024220926 A1 | 10/2024 |
| WO | WO2024233696 A1 | 11/2024 |
| WO | WO2024245443 A1 | 12/2024 |
| WO | WO2025011623 A1 | 1/2025 |
| WO | WO2025036269 A1 | 2/2025 |
| WO | WO2025036489 A1 | 2/2025 |
| WO | WO2025040147 A1 | 2/2025 |

OTHER PUBLICATIONS

Ahn, D., et al., "HIF-1a Peptide Derivatives with modifications at the hydroxyproline residue as activators of HIF-1a", Bioorganic & Medicinal Chemistry Letters (2009); 19(15): 4403-4405.
Allan, G. F., et al., "Therapeutic androgen receptor ligands", Nuclear Receptor Signaling (2003); 1 (1 ): 1-4.
Antonarakis, E. S., "Current understanding of resistance to abiraterone and enzalutamide in advanced prostate cancer", Clinical Advances in Hematology and Oncology (2016); 14(5): 316-319.
Arvinas, Inc., "Arvinas Presents New Preclinical Data on Oral Androgen Receptor PROTAC at ASCO 2017 Genitourinary Cancers Symposium", Press Release (Feb. 17, 2017); 1 page.
Asangani, I. A., et al., "Therapeutic Targeting of BET Bromodomain Proteins in Castration-Resistant Prostate Cancer", Nature (2014); 510: 278-282.
[Author Unknown] "Abiraterone Mylan (abiraterone acetate)", European Medicines Agency Science Medicines Health (Aug. 1, 2021) [online] https://www.ema.europa.eu/en/documents/overview/abiraterone-mylan-epar-medicineoverview_en.pdf (Access Date: Aug. 21, 2023); 2 pages.
[Author Unknown] "Cancer", Medline Plus Trusted Health Information for You (Apr. 16, 2007) [online] www.nlm.nih.gov/medlineplus/cancer.html (Access Date: Jun. 7, 2007); 10 pages.
[Author Unknown] "VCaP" ATCC [Online] https://www.atcc.org/products/crl-2876 (May 19, 2021); 7 pages.
Azad, A. A., et al., "Androgen receptor gene aberrations in circulating cell-free DNA: biomarkers of therapeutic resistance in castration-resistant prostate cancer", Clinical Cancer Research (2015); 21 (10): 2315-2324.
Bargagna-Mohan, P., et al., "Use of PROTACS as molecular probes of angiogenesis", Bioorganic & Medicinal Chemistry Letters (2005); 15(11 ): 2724-2727.
Beer, T. M., et al., "Enzalutamide in metastatic prostate cancer before chemotherapy", New England Journal of Medicine (2014); 371 (5): 424-433.
Belikov, V.G, "Pharmaceutical Chemistry. Chapter 2.6 Relationship between the chemical structure, properties of substances and their effect on the body", MEDpress-inform (2007); pp. 27-29; 14 pages with English translation.
Berge, S. M., et al., "Pharmaceutical salts", Journal of Pharmaceutical Sciences (1977); 66(1): 1-19.
Bekes, M., et al., "PROTAC targeted protein degraders: the past is prologue", Nature Reviews Drug Discovery (2022); 21 (3): 181-200.
Bondeson, D. P., et al., "Catalytic in vivo protein knockdown by small-molecule PROTACS", Nature Chemical Biology (2015); 11(8): 611-617.
Bondeson, D. P., et al., "Targeted Protein Degradation by Small Molecules", Annual Review of Pharmacology and Toxicology (2017); 57: 107-123.
Bradbury, R. H., et al., "Small-molecule androgen receptor downregulators as an approach to treatment of advanced prostate cancer", Bioorganic & Medicinal Chemistry Letters (2011); 21: 5442-5445.
Brittain, H. G. (Ed.), "Polymorphism in Pharmaceutical Solids Second Edition", Drugs and Pharmaceutical Sciences, CRC Press (2009); vol. 192: 229 pages.
Buckley, D., et al., "Small Molecule Inhibitors of the Interaction Between the E3 Ligase VHL and HIF1a", Angewandte Chemie (International Ed. in English) (Nov. 12, 2012); 51 (46): 11463-11467.
Buckley, D. L., et al., "HaloPROTACS: use of small molecule PROTACS to induce degradation of Halo Tag fusion proteins", ACS Chemical Biology (2015); 10(8): 1831-1837.
Buckley, D. L., et al., "Targeting the von Hippel-Lindau E3 ubiquitin ligase using small molecules to disrupt the VHL/HIF-1 a interaction", Journal of the American Chemical Society (2012); 134(10): 4465-4468.
Burslem, G. M., et al., "Small-Molecule Modulation of Protein Homeostasis", Chemical Reviews (2017); 117(17): 11269-11301.
Caira, M. R., "Crystalline Polymorphism of Organic Compounds", Topics in Current Chemistry (Jan. 1, 1998); 198:163-208.
Capitosti, S. M., et al., "Thalidomide analogues demonstrate dual inhibition of both angiogenesis and prostate cancer", Bioorganic & Medicinal Chemistry (2004); 12(2): 327-336.
Carmony, K. C., et al., "PROTAC-induced proteolytic targeting", Methods in Molecular Biology (2012); 832: 627-638.
Caro-Maldonado, A., et al., "Low-dose statin treatment increases prostate cancer aggressiveness", Oncotarget (2018); 9(2): 1494-1504.
Chevalier-Larsen, E. S., et al., "Castration restores function and neurofilament alterations of aged symptomatic males in a transgenic mouse model of spinal and bulbar muscular atrophy", Journal of Neuroscience (2004); 24(20): 4778-4786.
Chirnomas, D., et al., "Protein degraders enter the clinic-a new approach to cancer therapy", Nature Reviews Clinical Oncology (2023); 20(4): 265-278. DOI: 10.1038/s41571-023-00736-3.
ClinicalTrials.gov Identifier: NCT03888612, "Trial of ARV-110 in Patients with Metastatic Castration Resistant Prostate Cancer (mCRPC)" [online] https://clinicaltrials.gov/ct2/show/NCT03888612 (First Posted—Mar. 25, 2019, Access Date—Aug. 15, 2022); 10 pages.
Contino-Pepin, C., et al., "Preliminary biological evaluations of new thalidomide analogues for multiple sclerosis application", Bioorganic & Medicinal Chemistry Letters (2009); 19(3): 878-881.
Corson, T. W., et al., "Design and applications of bifunctional small molecules: why two heads are betterthan one", ACS Chemical Biology (2008); 3(11): 677-692.
Crews, C. M., "Targeting the undruggable proteome: the small molecules of my dreams", Chemistry & Biology (2010); 17(6): 551-555.
Cromm, P. M., et al., "Targeted protein degradation: from chemical biology to drug discovery", Cell chemical Biology (2017); 24(9): 1181-1190.
Cyrus, K., et al., "Impact of linker length on the activity of PROTACs", Molecular Biosystems (2011 ); 7(2): 359-364.
Cyrus, K., et al., "Jostling for position: Optimizing linker location in the design of estrogen receptor-targeting PROTACs", ChemMedChem (2010); 5(7): 979-985.
Cyrus, K., et al., "Two-Headed PROTAC: An Effective New Tool for Targeted Protein Degradation", Chembiochem (2010); 11(11): 1531-1534.
Database STN, CAS Registry No. 1004933-70-3, "2-Pyrrolidinecarboxamide, N-(4-bromo-2-fluorophenyl)-4-hydroxy-1-(2-naphthalenylsulfonyl)-, (2S,4R)-", Chemical Abstracts Service, American Chemical Society; entered Feb. 21, 2008; 1 page.
Database STN, CAS Registry No. 1226974-40-8, "Urea, N-[[2-(2,6-dioxo-3-pipe rid inyl)-2,3-d ihydro-1-oxo-1 H-isoindol-5-yl]methyl]-N'-(4-phenylcyclohexyl)-", Chemical Abstracts Service, American Chemical Society; entered Jun. 4, 2010; 1 page.
Database STN, CAS Registry No. 1323403-74-2, "2,4'-Bipyridinium, 1'-[[4-[[[2-(2,6-dioxo-3-piperidinyl)-2 ,3-d ihydro-1-

(56) References Cited

OTHER PUBLICATIONS oxo-1 H-isoindol-4-yl]oxy]methyl]phenyl]methyl]-", Chemical Abstracts Service, American Chemical Society; entered Aug. 26, 2011; 1 page.
Database STN, CAS Registry No. 1323488-76-1, "2,6-Piperidinedione, 3-[4-[[4-[[4-(3,5-difluorophenyl)-1-piperidinyl]methyl]phenyl]methoxy]-1,3-dihydro-1-oxo-2H-isoindol-2-yl]-", Chemical Abstracts Service, American Chemical Society; entered Aug. 26, 2011; 1 page.
Database STN, CAS Registry No. 1323488-78-3, "2,6-Piperidinedione, 3-[4-[[4-[[4-(2,4-difluorophenyl)-1-piperidinyl]methyl]phenyl]methoxy]-1,3-dihydro-1-oxo-2H-isoindol-2-yl]-, (3S)-", Chemical Abstracts Service, American Chemical Society; entered Aug. 26, 2011; 1 page.
Database STN, CAS Registry No. 155180-53-3, "Benzonitrile, 4-[3-(4-hydroxybutyl)-4,4-dimethyl-5-oxo-2-thioxo-1-imidazolidinyl]-2-(trifluoromethyl)-", Chemical Abstracts Service, American Chemical Society; entered May 19, 1994; 1 page.
Database STN, CAS Registry No. 155255-73-5, "Benzonitrile, 4-[4,4-dimethyl-2,5-dioxo-3-[4-(triphenylmethoxy)butyl]-1-imidazolidinyl]-2-(trifluoromethyl)-", Chemical Abstracts Service, American Chemical Society; entered May 24, 1995; 1 page.
Database STN, CAS Registry No. 1818885-25-4, "Benzamide, N-[trans-3-(3-chloro-4-cyanophenoxy)-2,2,4,4-tetramethylcyclobutyl]-4-[[5-[3-[[2-(2,6-dioxo-3-piperidinyl)-2,3-dihydro-1,3-dioxo-1H-isoindol-4-yl]amino]propoxy]pentyl]oxy]-", Chemical Abstracts Service, American Chemical Society; entered Nov. 1, 2015 0; 1 page.
Database STN, CAS Registry No. 186040-53-9, "Benzenepropanoic acid, 13-(benzoylamino)-a-hydroxy-,(2aR,4S,4aS,6R,9S, 11 S, 12S, 12aR, 12bS)-6, 12bbis(acetyloxy)-12-(benzoyloxy)-4-[[[[2-[3-[4-cyano-3-(trifluoromethyl)phenyl]-5,5-dimethyl-4-oxo-2-thioxo-1-imidazolidinyl]ethyl]amino]carbonyl]oxy]-2a,3,4,4a,5,6,9,10,11,12,12a,12b-dodecahydro-11-hydroxy-4a,8, 13, 13-tetramethyl-5-oxo-7, 11-methano-1 H-cyclodeca[3,4]benz[1,2-b]oxet-9-ylester, (aR, I3S)-", Chemical Abstracts Service, American Chemical Society; entered Feb. 13, 1997; 2 pages.
Database STN, CAS Registry No. 186798-71-0, "Glycinamide, N-[[(triphenylmethyl) thio]acetyl]glycyl-N-[2-[3-[4-cyano-3-(trifluoromethyl)phenyl]-5,5-dimethyl-4-oxo-2-thioxo-1-imidazolidinyl]ethyl]-", Chemical Abstracts Service, American Chemical Society; entered Mar. 7, 1997; 1 page.
Database STN, CAS Registry No. 155255-73-5, "Benzonitrile, 4-[4,4-dimethyl-2,5-dioxo-3-[4-(triphenylmethoxy)butyl]-1-imidazolidinyl]-2-(trifluoromethyl)-", Chemical Abstracts Service, American Chemical Society; entered May 24, 1994; 1 page.
Database STN, CAS Registry No. 186798-85-6, "Benzenepropanamide, N-[2-[3-[4-cyano-3-(trifluoromethyl)phenyl]-5,5-dimethyl-4-oxo-2-thioxo-1-imidazolidinyl]ethyl]-4-hydroxy-3,5-diiodo-", Chemical Abstracts Service, American Chemical Society; entered Mar. 7, 1997; 1 page.
Database STN, CAS Registry No. 534612-78-7, "Benzonitrile, 4-[3-[5-[4-[[2-[2-(2-methoxyethoxy)ethoxy]ethyl]sulfonyl]-1-piperazinyl]pentyl]-4,4-dimethyl-5-oxo-2-thioxo-1-imidazolidinyl]-2-(trifluoromethyl)-", Chemical Abstracts Service, American Chemical Society; entered Jun. 20, 2003; 1 page.
Database STN, CAS Registry No. 871986-52-6, "2-Pyrrolidinecarboxamide, N-[(1 S)-3-[(3aR, 6aS)-5-(2, 6-dimethylbenzoyl) hexahydropyrrolo [3,4-c] pyrrol-2(1 H)-yl]-1-phenylpropyl]-1-(2-furanylcarbonyl)-4-hydroxy-", Chemical Abstracts Service, American Chemical Society; entered Jan. 16, 2006; 1 page.
Dyson, G., et al., "Chemistry of Synthetic Drugs", Moscow, MIR, 1964, pp. 12-19; 25 pages with English machine translation.
Ferraldeschi, R., et al., "Targeting the androgen receptor pathway in castrationresistant prostate cancer: progresses and prospects", Oncogene (2015); 34(14): 1745-1757.
Fischer, E. S., et al., "Structure of the DDB1-CRBN E3 Ubiquitin ligase in complex with thalidomide", Nature (2014); 512(7512): 49-53.

Fizazi, K., et al., "Activity and safety of ODM-201 in patients with progressive metastatic castration-resistant prostate cancer (ARADES): an open-label phase 1 dose-escalation and randomised phase 2 dose expansion trial", The Lancet Oncology (2014); 15(9): 975-985.
Fleisher, D., et al., "Improved oral drug delivery: solubility limitations overcome by the use of prodrugs", Advanced Drugs Delivery Reviews (May 1996); 19(2): 115-130.
Gadd, M. S., et al., "Structural basis of PROTAC cooperative recognition for selective protein degradation", Nature Chemical Biology (2017); 13(5): 514-521.
Galdeano, C., et al., "Structure-guided design and optimization of small molecules targeting the protein-protein interaction between the von Hippel-Lindau (VHL) E3 ubiquitin ligase and the hypoxia inducible factor (HIF) alpha subunit with in vitro nanomolar affinities", Journal of Medicinal Chemistry (2014); 57(20): 8657-8663.
Gao, X., et al., "Phase 1/2 study of ARV-110, an androgen receptor (AR) PROTAC degrader, in metastatic castration-resistant prostate cancer (mCRPC)", Journal Of Clinical Oncology 2022 American Society Of Clinical Oncology Nld (2022); 40(6); 1 page.
Golub, T. R., et al., "Molecular classification of cancer: class discovery and class prediction by gene expression monitoring", Science (1999); 286: 531-537.
Gosink, M., et al., "Redirecting the specificity of ubiquitination by modifying ubiquitinconjugating enzymes", Proceedings of the National Academy of Sciences (1995); 92(20): 9117-9121.
Guimaraes, T. F., et al., "A multivariate approach applied to quality on particle engineering of spray-dried mannitol", Advanced Powder Technology (2015); 26(4): 1094-1101.
Guo, C., et al., "Design of oxobenzimidazoles and oxindoles as novel androgen receptor antagonists", Bioorganic & Medicinal Chemistry Letters (2012); 22: 2572-2578.
Guo, C., et al., "Discovery of aryloxy tetramethylcyclobutanes as novel androgen receptor antagonists", Journal of Medicinal Chemistry (2011); 54(21): 7693-7704.
Gustafson, J. L., et al., "Small-molecule-mediated degradation of the androgen receptor through hydrophobic tagging", Angewandte Chemie (2015); 54: 9659-9662.
Ha, S., et al., "A comprehensive overview of small-molecule androgen receptor degraders: Recent progress and future perspectives", Journal of Medicinal Chemistry (2022); 65(24): 16128-16154.
Han, X., et al., "Discovery of ARD-69 as a highly potent proteolysis targeting chimera (PROTAC) degrader of androgen receptor (AR) for the treatment of prostate cancer", Journal of Medicinal Chemistry (2019); 62(2): 941-964.
Heinlein, C. A., et al., "Androgen receptor in prostate cancer", Endocrine Reviews (2004); 25(2): 276-308.
Herberts, C., et al., "Deep whole-genome ctDNA chronology of treatment-resistant prostate cancer," Nature (2022); 608(7921): 199-208.
Hines, J., et al., "Posttranslational protein knockdown coupled to receptor tyrosine kinase activation with phosphoPROTACs", Proceedings of the National Academy of Sciences (2013); 110(22): 8942-8947.
Hon, W., et al., "Structural basis for the recognition of hydroxyproline in HIF-1 a by pVHL", Nature (2002); 417(6892): 975-978.
Huang, X., et al., "Drugging the undruggables: exploring the ubiquitin system for drug development", Cell Research (2016); 26(4): 484-498.
Hughes, S. J., et al., "Molecular recognition of ternary complexes: a new dimension in the structure-guided design of chemical degraders", Essays in Biochemistry (2017); 61(5): 505-516.
Inacio, P., et al., "FDA Clears Phase 1 Trial of ARV-110 for Advanced Prostate Cancer", Prostate Cancer News Today (Jan. 30, 2019) [online] https://prostatecancernewstoday.com/2019/01/30/fda-clears-phase-1-trial-arv-110-advanced-prostate-cancer/ (Access Date: Aug. 15, 2022); 5 pages.
Ivan, M., et al., "HI Fa targeted for VHL-mediated destruction by praline hydroxylation: implications for 02 sensing", Science (2001); 292(5516): 464-468.
Jang, E. R., et al., "Targeted Degradation of Proteins by PROTACs", Current Protocols in Chemical Biology (2010); 2(2): 71-87.

(56) References Cited

OTHER PUBLICATIONS

Jernberg, E., et al., "Clinical relevance of androgen receptor alterations in prostate cancer," Endocrine Connections (2017); 6: R146-R161.
Jung, J., "Human tumor xenograft models for preclinical assessment of anticancer drug development", Toxicological Research (2014); 30: 1-5.
Jung, M. E., et al., "Structure-activity relationship for thiohydantoin androgen receptor antagonists for castration-resistant prostate cancer (CRPC)", Journal of Medicinal Chemistry (201 O); 53(7): 2779-2796.
Khadka, P., et al., "Pharmaceutical particle technologies: An approach to improve drug solubility, dissolution and bioavailability", Asian Journal of Pharmaceutical Sciences (2014); 9: 304-316.
Kharkevich D.A., "Pharmacology/Textbook", 10th edition, (2010); pp. 72-82; 14 pages with English Summary.
Kummerer, K., "Pharmaceuticals in the Environment", Annual Review of Environment and Resources (2010); 35: 57-75.
Knott, E. B., "Compounds containing sulphur chromophores. Part I. The action of bases on heterocyclic sulphide quarternary salts", Journal of the Chemical Society (Resumed) (1955); 916-927.
Knott, E. B., et al., Accession No. 1957:56724, "Compounds containing sulfur chromophores. V. Complex cyanines", STN (Nov. 24, 2017); 1 page.
Knuuttila, M., et al., "Castration induces up-regulation of intratumoral androgen biosynthesis and androgen receptor expression in an orthotopic VCaP human prostate cancer xenograft model", The American Journal of Pathology (2014); 184(8): 2163-2173.
Kronke, J., et al., "Lenalidomide causes selective degradation of IKZF1 and IKZF3 in multiple myeloma cells", Science (2014); 343(6168): 301-305.
Lai, A. C., et al., "Induced protein degradation: an emerging drug discovery paradigm", Nature Reviews Drug Discovery (2017); 16(2): 101-114.
Lai, A. C., et al., "Modular PROTAC design for the degradation of oncogenic BCR-ABL", Angewandte Chemie International Edition (2016); 55(2): 807-810.
Lala, P. K., et al., "Role of nitric oxide in tumor progression: lessons from experimental tumors", Cancer and Metastasis Reviews (1998); 17: 91-106.
Lallous, N., et al., "Functional analysis of androgen receptor mutations that confer anti-androgen resistance identified in circulating cell-free DNA from prostate cancer patients," Genome Biology, 2016, 17(10):1-15.
Lebraud, H., et al., "Protein degradation by in-cell self-assembly of proteolysis targeting chimeras", ACS Central Science (2016); 2(12): 927-934.
Ledet, E. M., et al., "Comprehensive analysis of AR alterations in circulating tumor DNA from patients with advanced prostate cancer", The Oncologist (2020); 25(4): 327-333.
Lee, B. Y., et al., "FAK signaling in human cancer as a target for therapeutics", Pharmacology & Therapeutics (2015); 146: 132-149.
Lee, H., et al., "Targeted degradation of the aryl hydrocarbon receptor by the PROTAC approach: a useful chemical genetic tool", Chembiochem (2007); 8(17): 2058-2062.
Lelais, G., et al., "Discovery of (R, E)-N-(7-Chloro-1-(1-[4-(dimethylamino) but-2-enoyl] azepan-3-yl)-1 H-benzo [d] imidazol-2-yl)-2-methylisonicotinamide (EGF816), a Novel, Potent, and WT Sparing Covalent Inhibitor of Oncogenic (L858R, ex19del) and Resistant (T790M) EGFR Mutants for the Treatment of EGFR Mutant Non-Small-Cell Lung Cancers", Journal of Medicinal Chemistry (2016); 59(14): 6671-6689.
Lemmon, M., et al., "Cell signaling by receptor tyrosine kinases", Cell (2010); 141(7): 1117-1134.
Levine, P. M., et al., "Targeting the androgen receptor with steroid conjugates: miniperspective", Journal of Medicinal Chemistry (2014); 57(20): 8224-8237.
Li, S., et al., "IMiD immunomodulatory compounds block C/EBPβ translation through eIF4E down-regulation resulting in inhibition of MM", Blood (2011); 117(19): 5157-5165.
Li, Y., et al., "Single polymer-drug conjugate carrying two drugs for fixed-dose codelivery", Medicinal Chemistry (2014); 4(10): 676-683.
Liu, K., et al., "Design and biological characterization of hybrid compounds of curcumin and thalidomide for multiple myeloma", Organic & Biomolecular Chemistry (2013); 11(29): 4757-4763.
Lopez-Girona, A. E. A., et al., "Cereblon is a direct protein target for immunomodulatory and antiproliferative activities of lenalidomide and pomalidomide", Leukemia (2012); 26(11): 2326-2335.
Lu, G., et al., "The myeloma drug lenalidomide promotes the cereblon-dependent destruction of Ikaros proteins", Science (2014); 343(6168): 305-309.
Lu, J., et al., "Hijacking the E3 ubiquitin ligase cereblon to efficiently target BRD4", Chemistry & Biology (2015); 22(6): 755-763.
Lu, N. Z., et al., "International Union of Pharmacology. LXV. The pharmacology and classification of the nuclear receptor superfamily: glucocorticoid, mineralocorticoid, progesterone, and androgen receptors", Pharmacological Reviews (2006); 58(4): 782-797.
Makkonen, H., et al., "Androgen receptor amplification is reflected in the transcriptional responses of Vertebral-Cancer of the Prostate cells", Molecular and Cellular Endocrinology (2011); 331 (1): 57-65.
Maniaci, C., et al., "Homo-PROTACs: bivalent small-molecule dimerizers of the VHL E3 ubiquitin ligase to induce self-degradation", Nature Communications (2017); 8(1): 1-14.
Mashkovskiy, M. D., "Medicinal Drugs (Handbook for doctors)", Moscow "Meditsina" (1993), pp. 5; 4 pages with English translation.
Mashkovsky M. D. "Medicaments, Doctor's Manual." vol. 1, 14th Edition. OOO Novaya Volna, Publisher S.B. Divov. Moscow. (2001), 6 pages with English 181 translation.
Min, J., et al., "Structure of an HIF-1 a-pVHL complex: hydroxyproline recognition in signaling", Science (2002); 296(5574): 1886-1889.
Mironov, A. N., editor, "Guidelines for conducting preclinical studies of drugs, Part One", Moscow: Grif i K (2012); Chapter 39: 640-654; 19 pages with English summary.
Mohler, M. L., et al., "Androgen receptor antagonists: a patent review (2008-2011)", Expert Opinion on Therapeutic Patents (2012); 22(5): 541-565.
Morissette, S. L., et al., "High-throughput crystallization: polymorphs, salts, cocrystals and solvates of pharmaceutical solids", Advanced Drug Delivery Reviews (2004); 56(3): 275-300.
Mullard, A., "First targeted protein degrader hits the clinic", Nature Reviews, Drug Discovery (Apr. 2019); 18: 237-239.
Muller, G. W., et al., "Amino-substituted thalidomide analogs: potent inhibitors of TNF-α production", Bioorganic & Medicinal Chemistry Letters (1999); 9(11): 1625-1630.
Navone, N. M., et al., "Establishment of two human prostate cancer cell lines derived from a single bone metastasis", Clinical Cancer Research: an Official Journal of the American Association for Cancer Research (1997); 3(12): 2493-2500.
Neklesa, T. K. et al., "An oral androgen receptor PROTAC® degrader for prostate cancer", ASCO Genitourinary Cancers Symposium (2018) [online] https://s3.us-east-1.amazonaws.com/arvinas-assets.investeddigital.com/scientific-publications/ARGUASCO2018-final.pdf; 1 page.
Neklesa, T. K. et al., "ARV-110: An oral androgen receptor PROTAC degrader for prostate cancer", ASCO Genitourinary Cancers Symposium (2019) [online] https://s3.us-east-1.amazonaws.com/arvinas-assets.investeddigital.com/scientificpublications/AR-GUASCO-2-11-2019.pdf; 1 page.
Neklesa, T. K., et al., "Greasy tags for protein removal", Nature (2012); 487(7407): 308-309.
Neklesa, T. K., et al., "Targeted protein degradation by PROTACs", Pharmacology & Therapeutics (2017); 174: 138-144.
Ohoka, N., et al., "SNIPER (TACC3) induces cytoplasmic vacuolization and sensitizes cancer cells to Bortezomib", Cancer Science (2017); 108(5): 1032-1041.
Ottis, P., et al., "Assessing different E3 ligases for small molecule induced protein ubiquitination and degradation", ACS Chemical Biology (2017); 12(10): 2570-2578.

(56) References Cited

OTHER PUBLICATIONS

Ottis, P., et al., "Proteolysis-targeting chimeras: induced protein degradation as a therapeutic strategy", ACS Chemical Biology (2017); 12(4): 892-898.
Pepe, A., et al., "Synthesis and structure-activity relationship studies of novel dihydropyridones as androgen receptor modulators", Journal of Medicinal Chemistry (2013); 56(21): 8280-8297.
Polski, A., et al., "The excipients used in the non-coated tablets-a review", Medicina Internacia Revuo (2014); 102: 10-18.
Poon, D. M. C., et al.," The survival outcome, prostate-specific antigen (PSA) response and risk of fatigue of enzalutamide as first- and later-line treatment options in patients with metastatic castration-resistant prostate cancer (mCRPC): The real-world experience", Meeting Abstract: 2018 Genitourinary Cancers Symposium (2018); 36(6 suppl): Abstract 330; 2 pages.
Poutiainen, P. K., et al., "Design, synthesis, and biological evaluation of nonsteroidal cycloalkane [d] isoxazole-containing androgen receptor modulators", Journal of Medicinal Chemistry (2012); 55(14): 6316-6327.
Prabu, S. L., et al., "Impurities and its importance in pharmacy", International Journal of Pharmaceutical Sciences Review and Research (201 O); 3(2): 66-71.
PubChem CID 118435243, "4-{[5-(3-{[2-(2,6-dioxopiperidin-3-yl)-1,3-dioxo-2,3-dihydro-1 H-isoindol-4-yl]amino}propoxy)pentyl]oxy}-N-[trans-3-(3-chloro-4-cyanophenoxy)-2,2,4,4-tetramethylcyclobutyl]benzamide", National Center for Biotechnology Information [online] https://pubchem.ncbi.nlm.nih.gov/compound/118435243; Create date Feb. 23, 2016; 11 pages.
PubChem CID No. 134414307, "Bavdegalutamide" National Center for Biotechnology Information [online] https://pubchem.ncbi.nlm.nih.gov/compound/134414307; Create date Jun. 23, 2018, 15 pages.
Puppala, D., et al., "Development of an aryl hydrocarbon receptor antagonist using the proteolysis-targeting chimeric molecules approach: a potential tool for chemoprevention", Molecular Pharmacology (2008); 73(4): 1064-1071.
Quigley, D. A., et al., "Genomic hallmarks and structural variation in metastatic prostate cancer", Cell (2018); 174(3): 758-769.
Raina, K., et al., "PROTAC-induced BET protein degradation as a therapy for castration-resistant prostate cancer", Proceedings of the National Academy of Sciences (2016); 113(26): 7124-7129.
Raina, K., et al., "Targeted protein knockdown using small molecule degraders", Current Opinion in Chemical Biology (2017); 39: 46-53.
Remillard, D., et al., "Degradation of the BAF complex factor BRD9 by heterobifunctional ligands", Angewandte Chemie International Edition (2017); 56(21): 5738-5743.
Robinson, D., et al., "Integrative clinical genomics of advanced prostate cancer", Cell (2015); 161 (5): 1215-1228; Erratum in: Cell (2015); 162(2): 452-454.
Robinson, R. P., et al., "Discovery of the Hemifumarate and (a-L-Alanyloxy) methyl Ether as Prod rugs of an Antirheumatic Oxindole: Prod rugs for the Enolic OH Group", Journal of Medicinal Chemistry (1996); 39(1): 10-18.
Rodriguez-Gonzalez, A., et al., "Targeting steroid hormone receptors for ubiquitination and degradation in breast and prostate cancer", Oncogene (2008); 27(57): 7201-7211.
Romanel, A., et al., "Plasma AR and abiraterone-resistant prostate cancer", Science Translational Medicine (2015); 7(312): 312re10; 9 pages.
Rotili, D., et al., "Photoactivable peptides for identifying enzyme-substrate and protein-protein interactions", Chemical Communications (2011); 47(5): 1488-1490.
Rowe, R. C., et al. (Ed.)., "Handbook of Pharmaceutical Excipients Fifth Edition", Pharmaceutical Press [online] http://www.gmpua.corn/RD/RD/HandbookPharmaceutical%20Excipients.pdf (2006); 945 pages.
Ruchelman, A., et al., "Isosteric analogs of lenalidomide and pomalidomide: Synthesis and biological activity", Bioorganic & Medicinal Chemistry Letters (2013); 23(1): 360-365.

Sakamoto, K. M., et al., "Development of Protacs to target cancer-promoting proteins for ubiquitination and degradation", Molecular & Cellular Proteomics (2003); 2(12): 1350-1358.
Sakamoto, K. M., et al., "Protacs: Chimeric molecules that target proteins to the Skp1-Cullin-F box complex for ubiquitination and degradation", Proceedings of the National Academy of Sciences (Jul. 2001); 98(15): 8554-8559.
Salami, J., et al., "Androgen receptor degradation by the proteolysis-targeting chimera ARCC-4 outperforms enzalutamide in cellular models of prostate cancer drug resistance", Communications Biology (2018); 1 (100): 1-9.
Salami, J., et al., "Waste disposal-An attractive strategy for cancer therapy", Science (2017); 355(6330): 1163-1167.
Sayegh, N., et al., "Recent advances in the management of metastatic prostate cancer", JCO Oncology Practice (2022); 18(1): 45-55.
Schiedel, M., et al., "Chemically induced degradation of sirtuin 2 (Sirt2) by a proteolysis targeting chimera (PROTAC) based on sirtuin rearranging ligands (SirReals)", Journal of Medicinal Chemistry (2018); 61 (2): 482-491.
Schneekloth Jr, J. S., et al., "Chemical genetic control of protein levels: selective in vivo targeted degradation", Journal of the American Chemical Society (2004); 126(12): 3748-3754.
Scudellari, M., "The protein slayers", Nature (Mar. 21, 2019); 567: 298-300.
Shore, N. D., et al., "Phase 1b study of bavdegalutamide, an androgen receptor PROTAC degrader, combined with abiraterone in patients with metastatic prostate cancer", Journal of Clinical Oncology, American Society of Clinical Oncology NLD (2022); 40(16); Supplement 1; Presented at the American Society for Clinical Oncology (ASCO) Annual Meeting, Chicago, IL (Jun. 2-7, 2022); 1 page.
Siegel, R. L., et al., "Cancer statistics, 2023", CA: A Cancer Journal for Clinicians (2023); 73(1): 17-48.
Smirnova, I. G., et al., "Optical Isomerism and Biological Activity of Medicines", Moscow University Gazette, Series 2, Chemistry (2012); 53(3): 147-156; 11 pages with English Summary.
Smith, A. R., et al., "Targeted Intracellular Protein Degradation Induced by a Small Molecule: En Route to Chemical Proteomics", Bioorganic & Medicinal Chemistry Letters (2008); 18(22): 5904-5908.
Snaterse, G., et al., "Androgen receptor mutations modulate activation by 11-oxygenated androgens and glucocorticoids", Prostate Cancer and Prostatic Diseases (2023); 26(2): 293-301.
Stewart, S. G., et al., "Efforts toward elucidating Thalidomide's molecular target: an expedient synthesis of the first Thalidomide biotin analogue", Organic & Biomolecular Chemistry (2010); 8(18): 4059-4062.
Stewart, T. F., et al. "Real-world outcomes in patients with metastatic castration resistant prostate cancer (mCRPC) and tumors with androgen receptor (AR) 878/875 mutations", Presented at the European Society for Medical Oncology (ESMO) Annual Congress, Paris, France (Sep. 9-13, 2022); Poster 1407P; 1 page.
Stoppler, M. C., "What about surgery for Endometriosis?", MedicineNet.com [online] http://www.medicinenet.com/endometriosis/article.htm (Retrieved on Apr. 5, 2017); 7 pages.
Szajewska, H., "Evidence-based medicine and clinical research: both are needed, neither is perfect", Annals of Nutrition and Metabolism (2018); 72(3): 13-23.
Takeda, D. Y., et al., "A somatically acquired enhancer of the androgen receptor is a noncoding driver in advanced prostate cancer", Cell (2018); 174(2): 422-432, including pp. e1-e6 and Supplemental Figures, 25 total pages.
Toure, M., et al., "Small-molecule PROTACS: new approaches to protein degradation", Angewandte Chemie International Edition (2016); 55(6): 1966-1973.
Trewartha, D., et al., "Advances in prostate cancer treatment", Nature Reviews, Drug Discovery (2013); 12(11 ): 823-824.
Turk, B. E., et al., "Binding of thalidomide to alpha1-acid glycoprotein may be involved in its inhibition of tumor necrosis factor alpha production", Proceedings of the National Academy of Sciences (1996); 93(15): 7552-7556.

(56) References Cited

OTHER PUBLICATIONS

Van Molle, I., et al., "Dissecting fragment-based lead discovery at the von Hippel-Lindau protein: hypoxia inducible factor 1a protein-protein interface", Chemistry & Biology (2012); 19(10): 1300-1312.
Wesserling, M., et al., "Will In Vitro Tests Replace Animal Models in Experimental Oncology?", Journal of Tissue Science & Engineering (2011); 2(1): 1-4.
Westaby, D., et al., "A new old target: androgen receptor signaling and advanced prostate cancer", Annual Review of Pharmacology and Toxicology (2022); 62(1): 131-153.
Winter, G. E., et al., "Phthalimide conjugation as a strategy for in vivo target protein degradation", Science (2015); 348(6241): 1376-1381.
Wyatt, A. W., et al., "Genomic alterations in cell-free DNA and enzalutamide resistance in castration-resistant prostate cancer", JAMA Oncology (2016); 2(12): 1598-1606.
Xi, J-Y., et al., "Advances and perspectives of proteolysis targeting chimeras (PROTACs) in drug discovery", Bioorganic Chemistry, Academic Press Inc. (2022); 125(105848); 18 pages. DOI: 10.1016/J.BIOORG.2022.105848.
Xiang, W., et al., "Discovery of ARD-2585 as an exceptionally potent and orally active PROTAC degrader of androgen receptor for the treatment of advanced prostate cancer", Journal of Medicinal Chemistry (2021); 64(18): 13487-13509.
Zava, D. T., et al., "Androgen receptor assay with [3H] methyltrienolone (R1881) in the presence of progesterone receptors", Endocrinology (1979); 104(4): 1007-1012.
Zengerle, M., et al., "Selective small molecule induced degradation of the BET bromodomain protein BRD4", ACS Chemical Biology (2015); 10(8): 1770-1777.
Zhang, D., et al., "Targeted Degradation of Proteins by Small Molecules: A Novel Tool for Functional Proteomics", Combinatorial Chemistry & High Throughput Screening (2004); 7(7): 689-697.
Zhao, X-Y., et al., "Glucocorticoids can promote androgen-independent growth of prostate cancer cells through a mutated androgen receptor", Nature Medicine (2000); 6(6): 703-706.
Zhulenko, V. N., et al., "Pharmacology", Moscow, "KolosS" Publishing House (2008); pp. 34-35; 4 pages with English summary.

\* cited by examiner

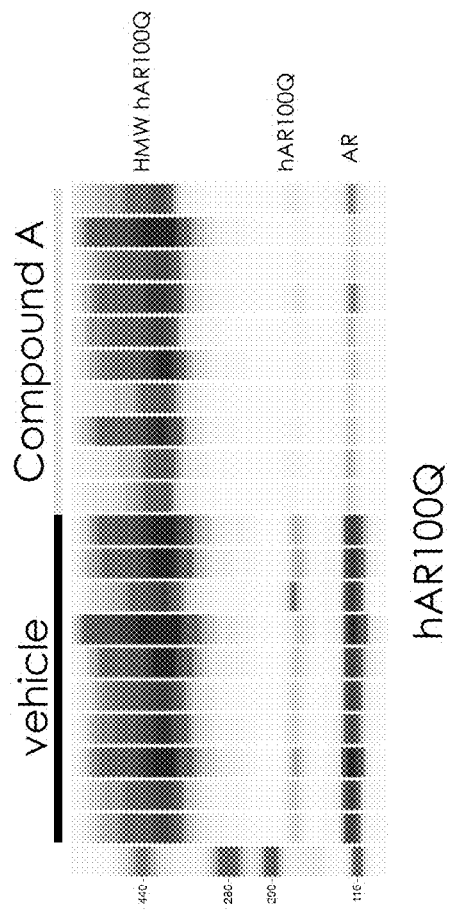

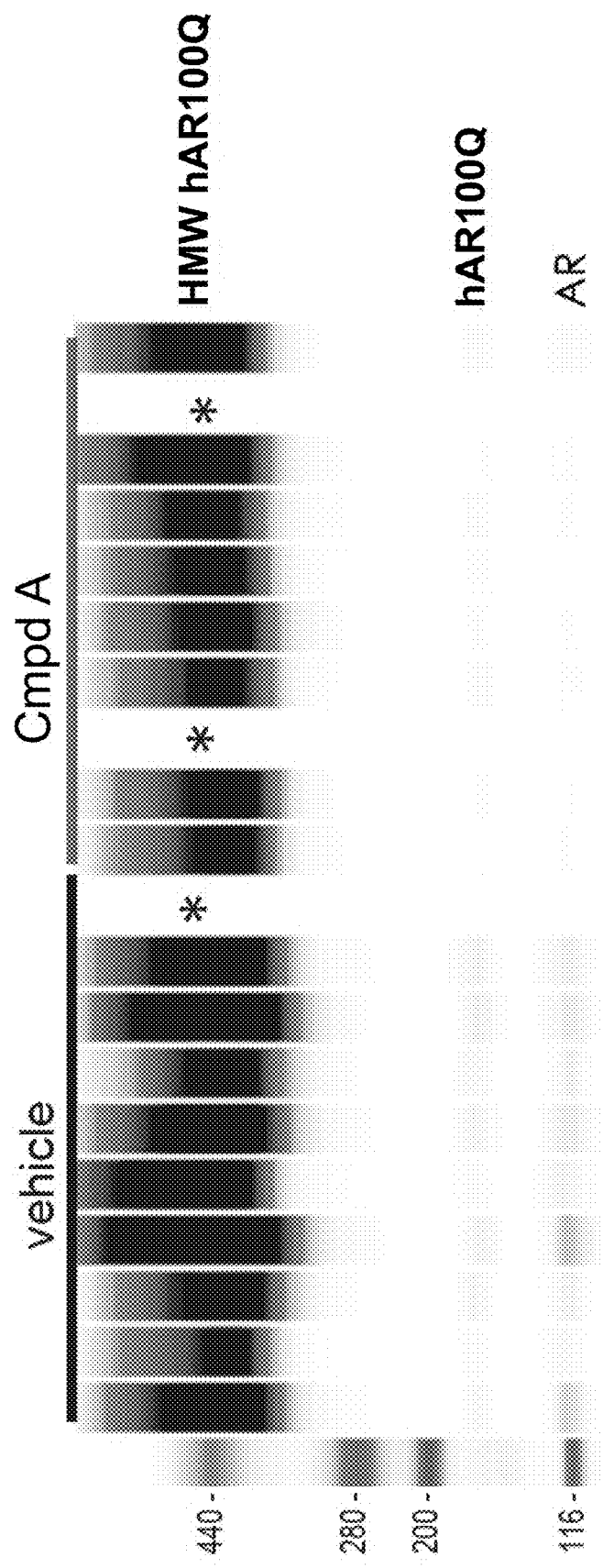

hAR100Q Tissue Cohort
Week 11
Quadriceps AR
65% reduction hAR100Q Tissue Cohort
Week 11
Quadriceps hAR100Q
43% reduction hAR100Q Tissue Cohort
Week 11
Quadriceps HMW hAR100Q

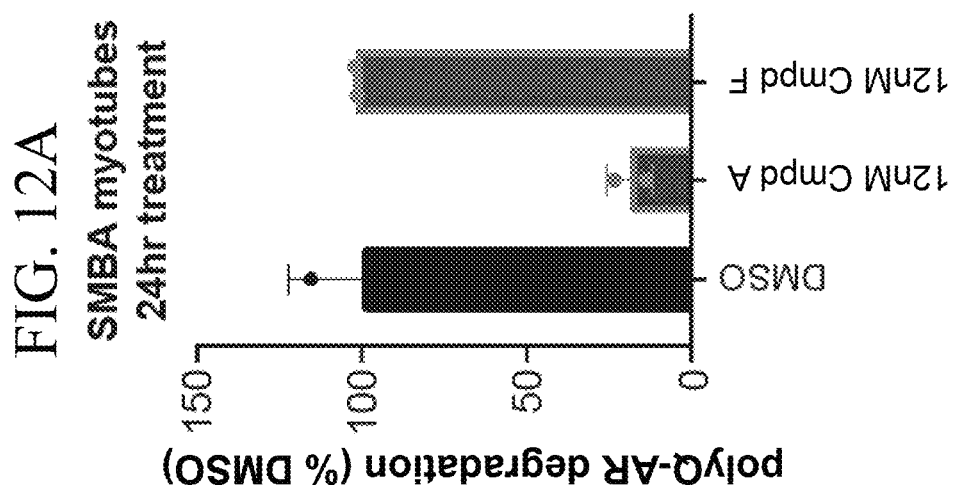

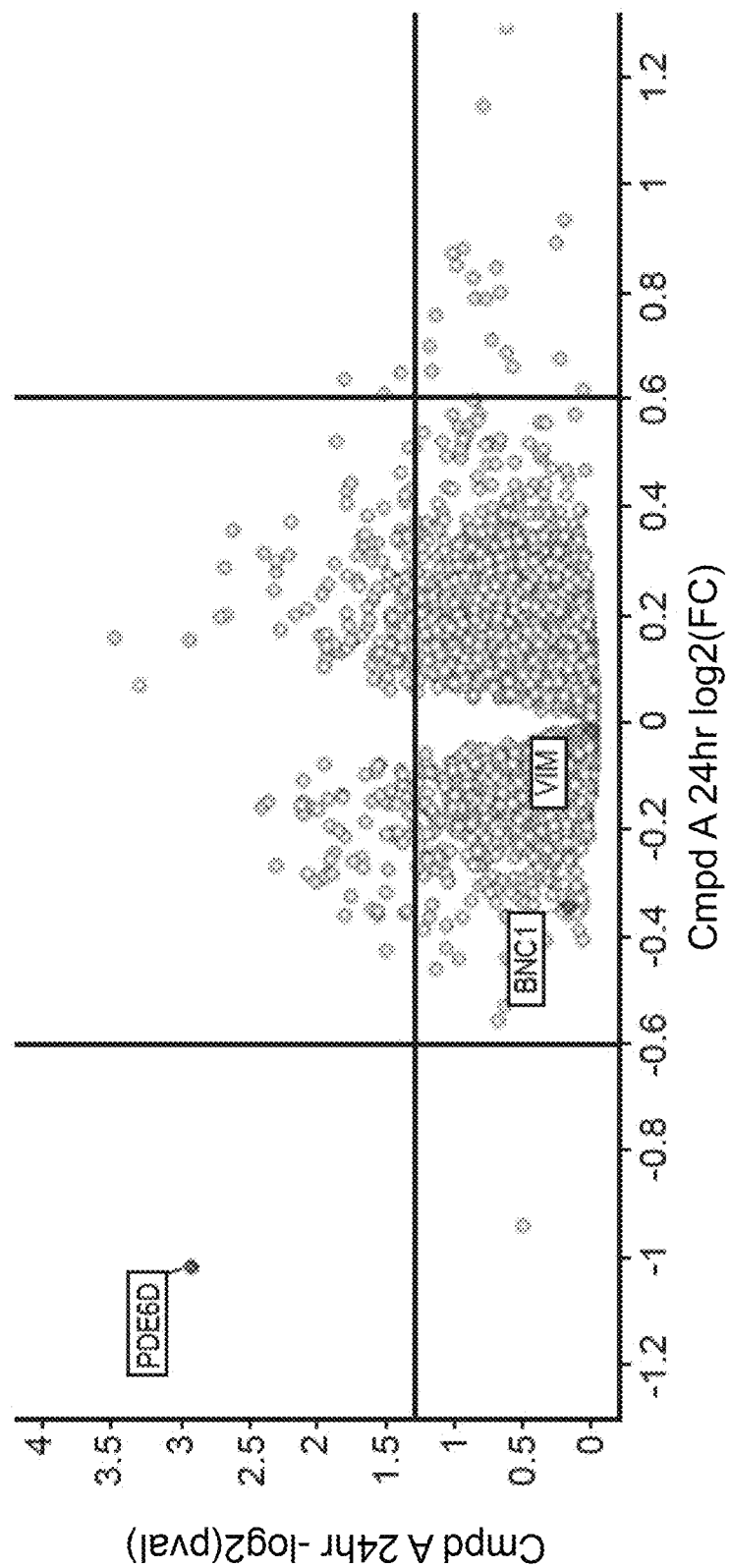

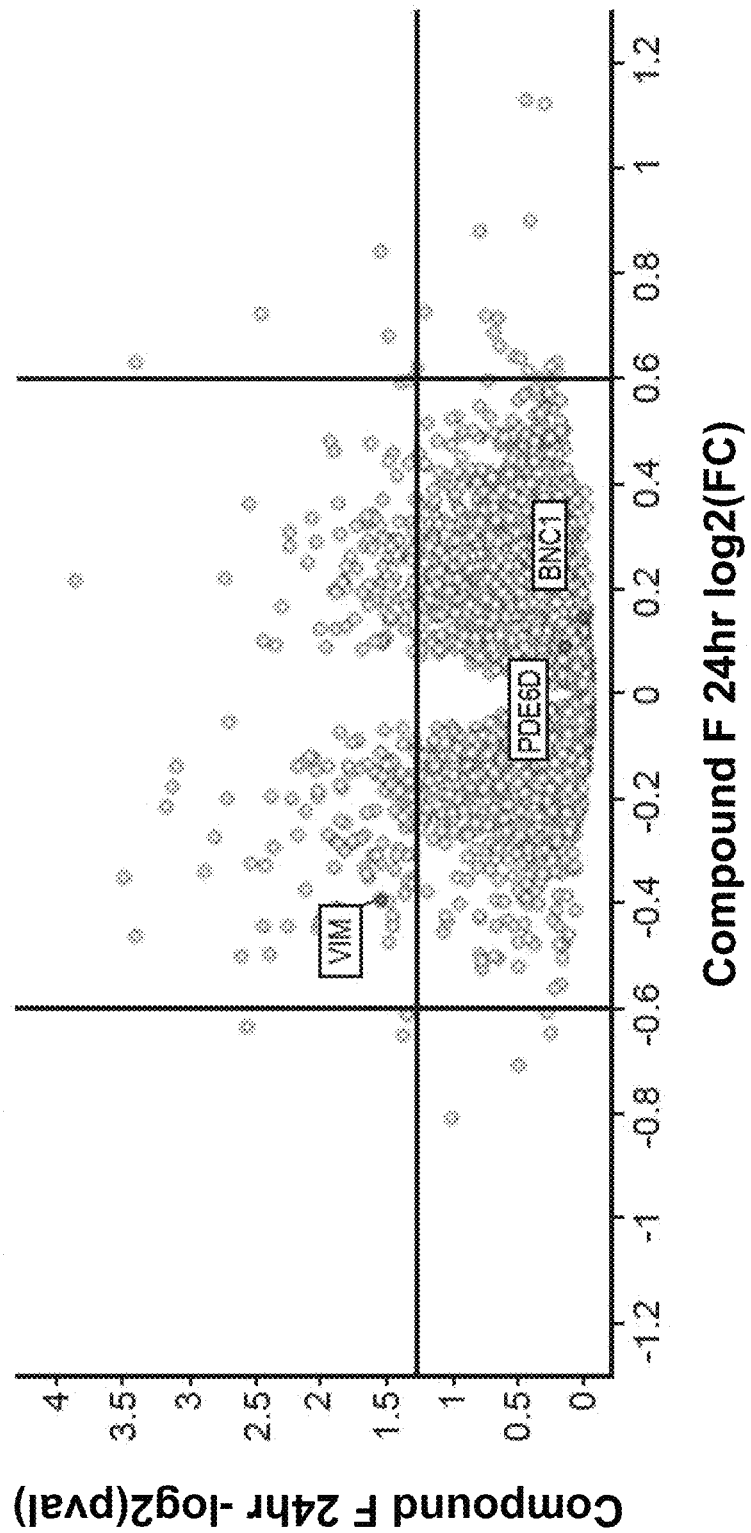

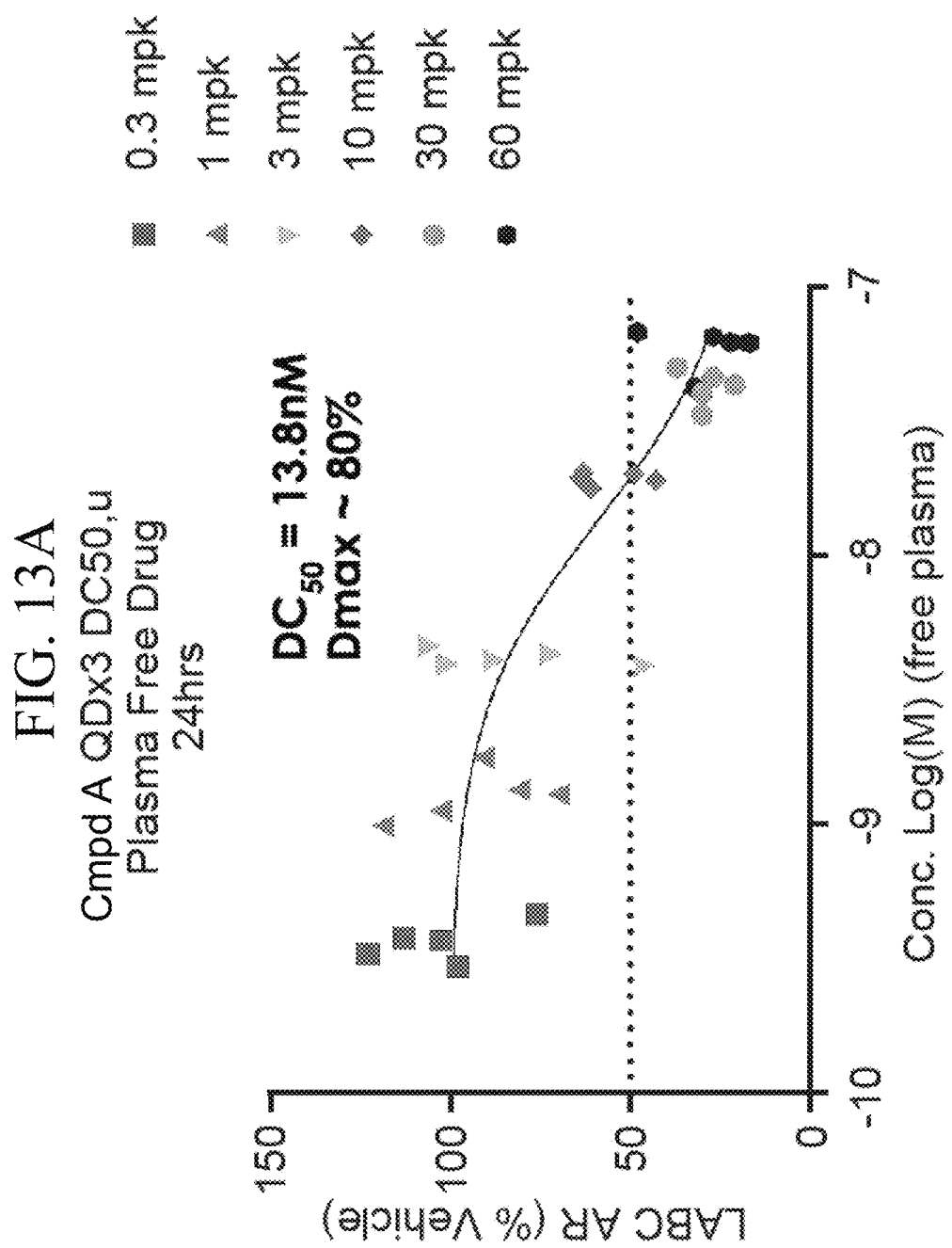

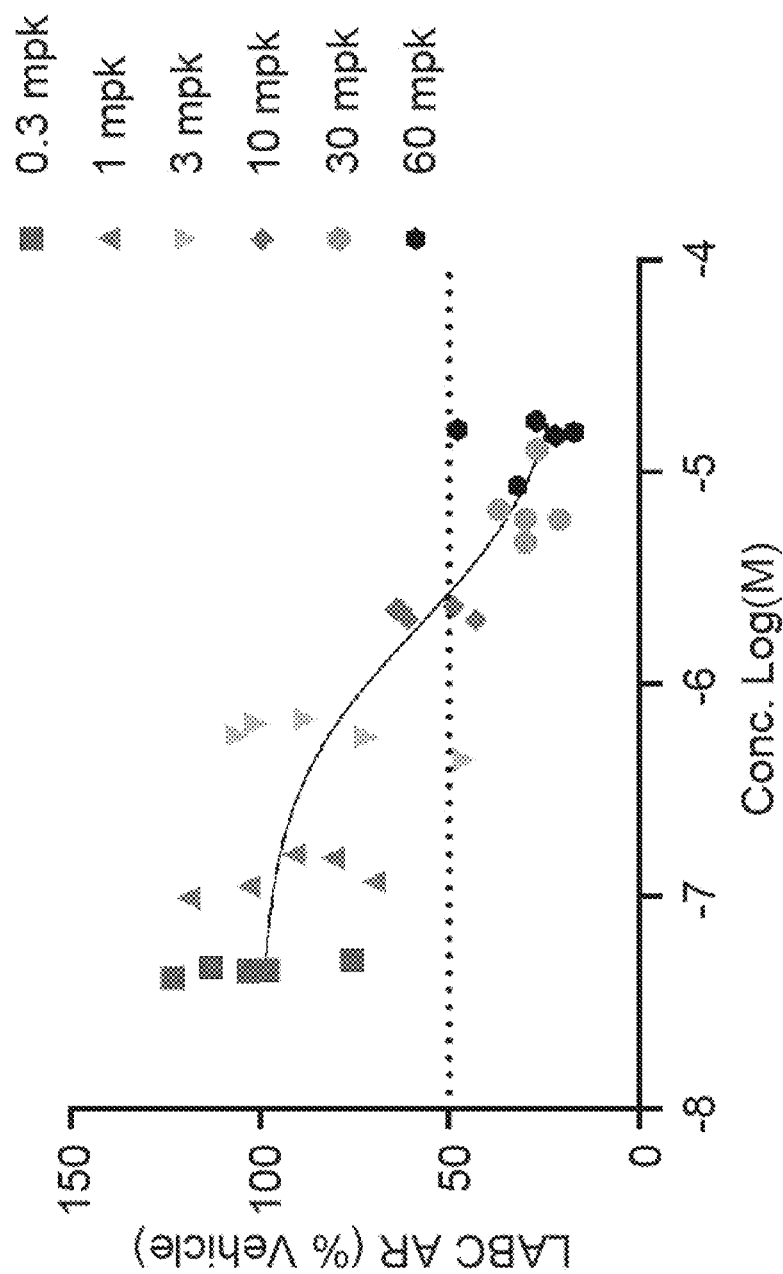

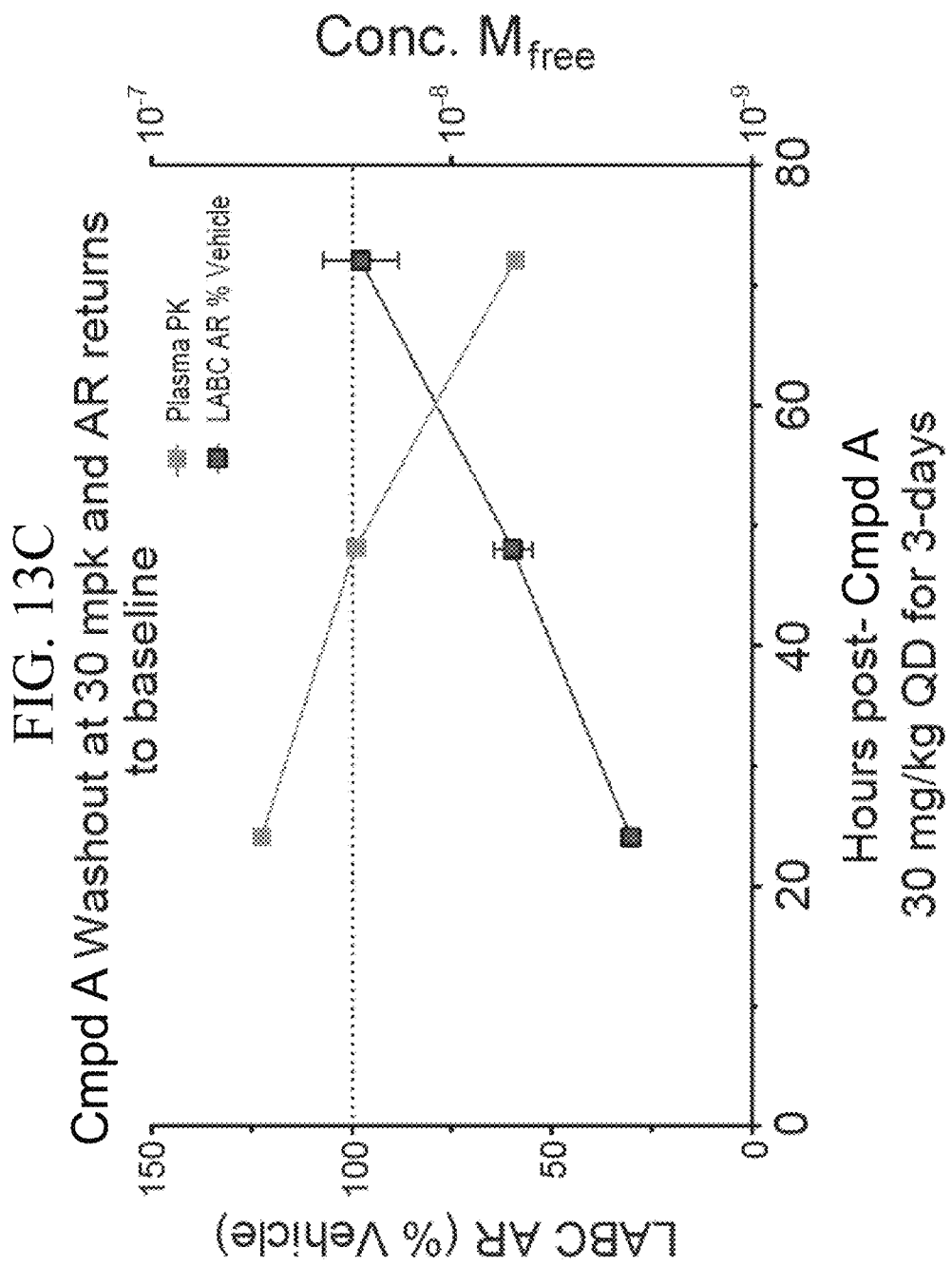

SEQUENCE LISTING

```
Sequence total quantity: 5
SEQ ID NO: 1            moltype = AA   length = 920
FEATURE                 Location/Qualifiers
source                  1..920
                        mol_type = protein
                        organism = Homo sapiens
SEQUENCE: 1
MEVQLGLGRV YPRPPSKTYR GAFQNLFQSV REVIQNPGPR HPEAASAAPP GASLLLLQQQ   60
QQQQQQQQQQ QQQQQQQQQQ ETSPRQQQQQ QGEDGSPQAH RRGPTGYLVL DEEQQPSQPQ  120
SALECHPERG CVPEPGAAVA ASKGLPQQLP APPDEDDSAA PSTLSLLGPT FPGLSSCSAD  180
LKDILSEAST MQLLQQQQQE AVSEGSSSGR AREASGAPTS SKDNYLGGTS TISDNAKELC  240
KAVSVSMGLG VEALEHLSPG EQLRGDCMYA PLLGVPPAVR PTPCAPLAEC KGSLLDDSAG  300
KSTEDTAEYS PFKGGYTKGL EGESLGCSGS AAAGSSGTLE LPSTLSLYKS GALDEAAAYQ  360
SRDYYNFPLA LAGPPPPPPP PHPHARIKLE NPLDYGSAWA AAAAQCRYGD LASLHGAGAA  420
GPGSGSPSAA ASSSWHTLFT AEEGQLYGPC GGGGGGGGGG GGGGGGGGGG GGEAGAVAP   480
YGYTRPPQGL AGQESDFTAP DVWYPGGMVS RVPYPSPTCV KSEMGPWMDS YSGPYGDMRL  540
ETARDHVLPI DYYFPPQKTC LICGDEASGC HYGALTCGSC KVFFKRAAEG KQKYLCASRN  600
DCTIDKFRRK NCPSCRLRKC YEAGMTLGAR KLKKLGNLKL QEEGEASSTT SPTEETTQKL  660
TVSHIEGYEC QPIFLNVLEA IEPGVVCAGH DNNQPDSFAA LLSSLNELGE RQLVHVVKWA  720
KALPGFRNLH VDDQMAVIQY SWMGLMVFAM GWRSFTNVNS RMLYFAPDLV FNEYRMHKSR  780
MYSQCVRMRH LSQEFGWLQI TPQEFLCMKA LLLFSIIPVD GLKNQKFFDE LRMNYIKELD  840
RIIACKRKNP TSCSRRFYQL TKLLDSVQPI ARELHQFTFD LLIKSHMVSV DFPEMMAEII  900
SVQVPKILSG KVKPIYFHTQ                                              920
```

```
SEQ ID NO: 2            moltype = RNA  length = 20
FEATURE                 Location/Qualifiers
source                  1..20
                        mol_type = other RNA
                        organism = synthetic construct
SEQUENCE: 2
cttctggcgt gtgaccggcg                                                        20

SEQ ID NO: 3            moltype = RNA  length = 20
FEATURE                 Location/Qualifiers
source                  1..20
                        mol_type = other RNA
                        organism = synthetic construct
SEQUENCE: 3
tgagcttggc tgaatcttcc                                                        20

SEQ ID NO: 4            moltype = RNA  length = 21
FEATURE                 Location/Qualifiers
source                  1..21
                        mol_type = other RNA
                        organism = synthetic construct
SEQUENCE: 4
atggcgcaag ccgggagaac a                                                      21

SEQ ID NO: 5            moltype = RNA  length = 21
FEATURE                 Location/Qualifiers
source                  1..21
                        mol_type = other RNA
                        organism = synthetic construct
SEQUENCE: 5
ccggttcagg tactcagtca t                                                      21
```

USE OF ANDROGEN RECEPTOR DEGRADER FOR THE TREATMENT OF SPINAL AND BULBAR MUSCULAR ATROPHY

RELATED APPLICATIONS

This application claims priority to, and the benefit of, U.S. Application No. 63/608,071, filed Dec. 8, 2023, which is hereby incorporated by reference in its entirety.

SEQUENCE LISTING

The Sequence Listing XML associated with this application is provided electronically in XML format and is hereby incorporated by reference into the specification. The name of the XML file containing the Sequence Listing XML is "ARVN-057_ST26_SeqListing.xml". The XML file is 6,458 bytes, created on Dec. 3, 2024 and is being submitted electronically via USPTO Patent Center.

TECHNICAL FIELD

The disclosure provides methods for treating or preventing spinal and bulbar muscular atrophy (SBMA), or one or more symptoms of SBMA.

BACKGROUND OF THE DISCLOSURE

SBMA is a rare inherited X-linked neuromuscular disease caused by a CAG-repeat expansion at q11-12 in the AR gene (Arnold, F. J. et al. 2019, The Journal of the American Society for Experimental NeuroTherapeutics 16, 928-947; Spada, A. R. L. et al. 1991, Nature 352, 77-79). Typically, an individual unaffected by SBMA (i.e., a healthy individual) can be expected to have between 5 and 36 CAG-repeats in the AR gene, whereas 38 or more CAG-repeats causes SBMA (Chivet, Mathilde et al. "Polyglutamine-Expanded Androgen Receptor Alteration of Skeletal Muscle Homeostasis and Myonuclear Aggregation Are Affected by Sex, Age and Muscle Metabolism." Cells vol. 9,2 325. 30 Jan. 2020). The aggregation prone polyQ containing AR protein (polyQ-AR) drives the chronic and progressive neuromuscular symptoms of SBMA through toxic gain-of-function mechanisms that are androgen dependent (Yu, Z. et al. 2006, The Journal of Clinical Investigation 116, 2663-2672; Katsuno, M. et al. 2002, Neuron 35, 843-854). Indeed, female carriers only have mild symptoms (Rhodes, L. E. et al. 2009, A Journal of Neurology 132, 3242-3251). The carrier frequency in males with a $(CAG)_n \geq 38$ is estimated at 27 per 100,000, and a more recent study estimated that the disease prevalence is 1 per 6,887 males (Laskaratos et al. 2021, Méd. Genet. 58, 385-391; Zanovello, M. et al. Brain. 2023 Jul. 3; 146(7):2723-2729. doi: 10.1093/brain/awad050. PMID: 36797998; PMCID: PMC10316764.) SBMA patients typically become symptomatic between the ages of 30 and 50 and experience slow and progressive degeneration of muscle and lower motor neurons, which manifests in muscle weakness, atrophy, fasciculations, difficulty walking, and dysphagia (Breza, M. et al. 2019, Journal of Neurology 266, 565-573). Most patients have difficulty climbing stairs within one to two decades of diagnosis; nearly one third of patients require a wheelchair twenty years after symptom onset. Severely affected individuals (many of whom are nonambulatory) are at risk for aspiration pneumonia and ventilatory failure because of weakness of the bulbar and respiratory musculature (Atsuta, N. et al. 2006, Brain 129, 1446-1455).

Nonclinical models of SBMA demonstrate that muscle cells are heavily impacted by the disease and a primary driver of motor dysfunction (Cortes, C. J. et al. 2014, Neuron 82, 295-307). Several rodent models recapitulate the muscle weakness observed in SBMA patients (Yu, Z. et al. 2006, The Journal of Clinical Investigation 116, 2663-2672; Cortes, C. J. et al. 2014, Neuron 82, 295-307; Chivet, M. et al. 2020, Cells 9, 325; Badders, N. M. et al. 2018, Nature Medicine 24, 427-437). PolyQ-AR disrupts Akt and mTOR signaling (Rocci A. et al. Acta Neuropathologica 132, 127-144), metabolic dysfunction (Giorgetti, E. et al. 2016, Cell Rep. 17, 125-136), and the ubiquitin proteosome system (Nath, S. R. et al. 2018, The Journal of Clinical Investigation 128, 3630-3641). Reduction of polyQ-AR is a promising therapeutic intervention targeting the root cause of disease (Grunseich, C. et al. 2020, Current Opinion in Neurology 33, 629-634). SBMA-like symptoms in a BAC transgenic mouse model of SBMA are abrogated when polyQ-AR is conditionally knocked out using a muscle-specific Cre recombinase (Cortes, C. J. et al. 2014, Neuron 82, 295-307). Moreover, peripheral antisense oligonucleotide (ASO)-mediated knockdown of polyQ-AR message improves motor function in a knock-in rodent model (Lieberman, A. P. et al. 2014, Cell reports 7, 774-784). These studies demonstrate that removing polyQ-AR specifically in muscle is a potential disease modifying therapy. Conversely, conditional KO of polyQ-AR in motor neurons did not impact disease progression in the BAC transgenic model (Gromova, A. et al. 2023, Acta Neuropathol. Commun. 11, 90).

SUMMARY

In one aspect, this application pertains to a method of treating spinal and bulbar muscular atrophy (SBMA) in a subject in need thereof, comprising administering to the subject an effective amount of Compound A:

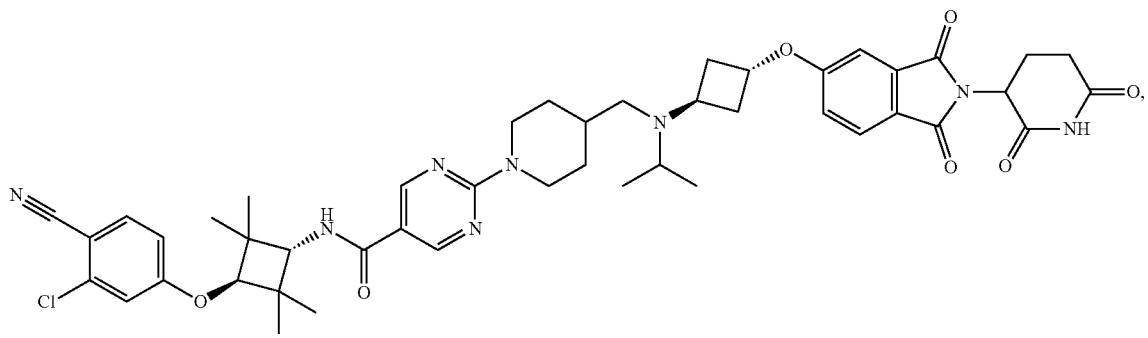 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

In one aspect, this application pertains to a method of treating spinal and bulbar muscular atrophy (SBMA) in a subject in need thereof, comprising administering to the subject an effective amount of Compound A:

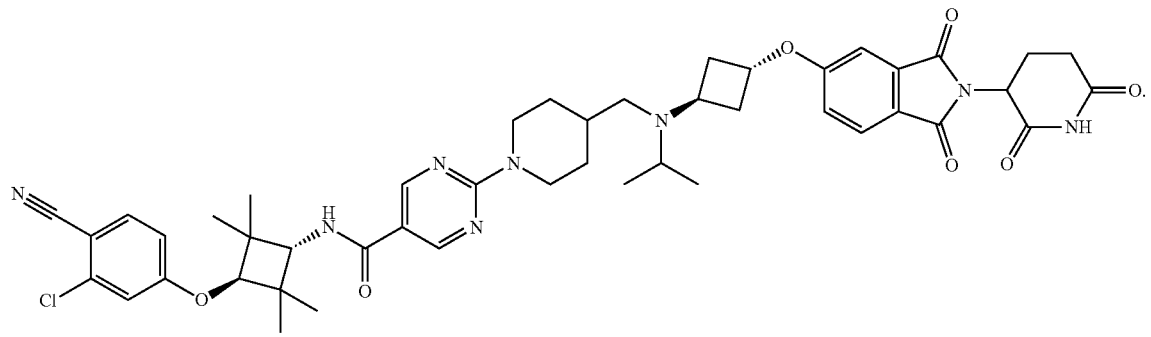 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

In one aspect, this application pertains to Compound A,

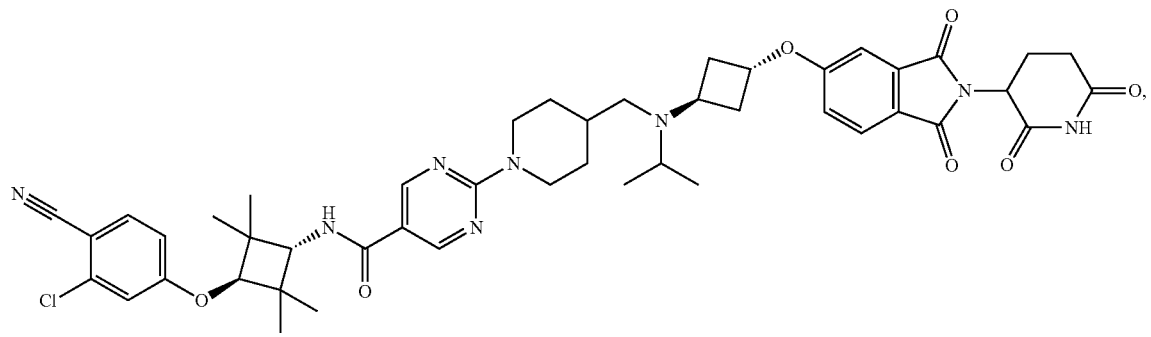 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for use in a method of treating spinal and bulbar muscular atrophy (SBMA) in a subject in need thereof, wherein the method comprises administering to the subject an effective amount of Compound A, or a pharmaceutically acceptable salt thereof.

In one aspect, this application pertains to Compound A,

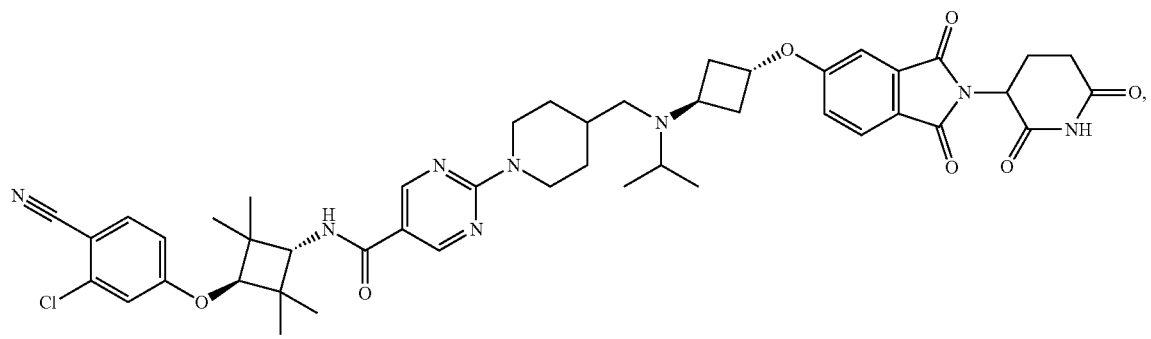 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

for use in a method of treating spinal and bulbar muscular atrophy (SBMA) in a subject in need thereof, wherein the method comprises administering to the subject an effective amount of Compound A.

In one aspect, this application pertains to a use of Compound A,

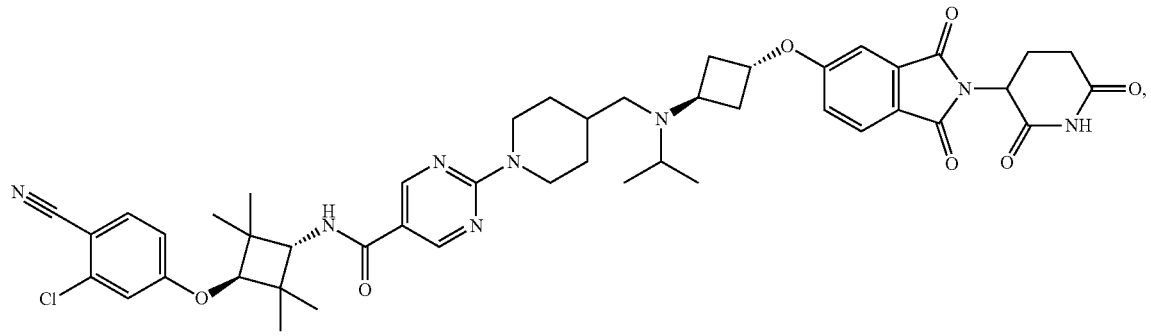 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating spinal and bulbar muscular atrophy (SBMA), wherein the medicament comprises an effective amount of Compound A, or a pharmaceutically acceptable salt thereof, and the medicament is administered to a subject in need thereof.

In one aspect, this application pertains to a use of Compound A,

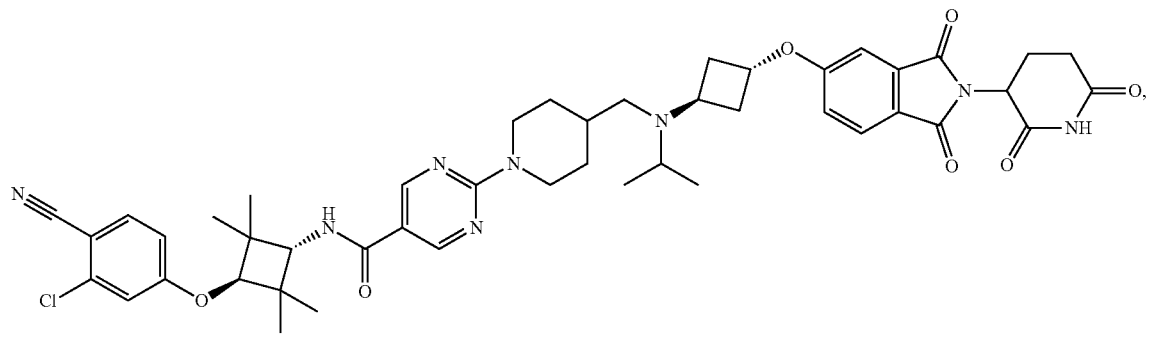 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

for the preparation of a medicament for treating spinal and bulbar muscular atrophy (SBMA), wherein the medicament comprises an effective amount of Compound A and the medicament is administered to a subject in need thereof.

In one aspect, this application pertains to a method of treating spinal and bulbar muscular atrophy (SBMA) in a subject in need thereof, comprising administering to the subject about 1 mg to about 500 mg of Compound A:

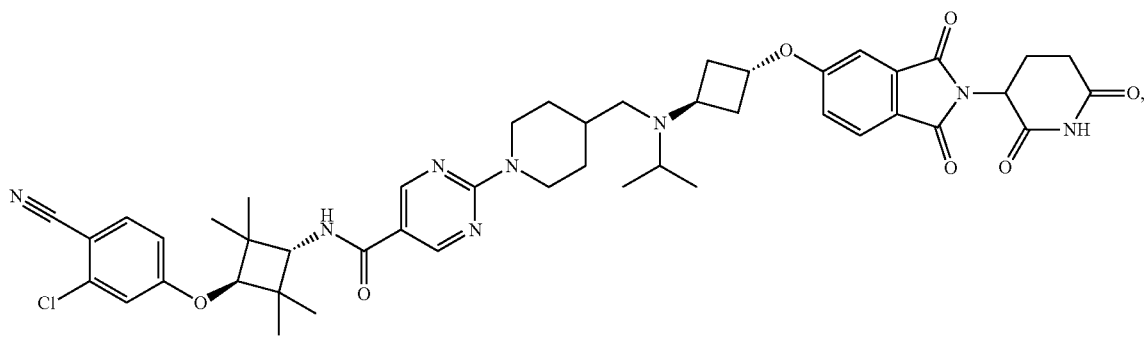 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

In one aspect, this application pertains to a method of treating spinal and bulbar muscular atrophy (SBMA) in a subject in need thereof, comprising administering to the subject about 1 mg to about 500 mg of Compound A:

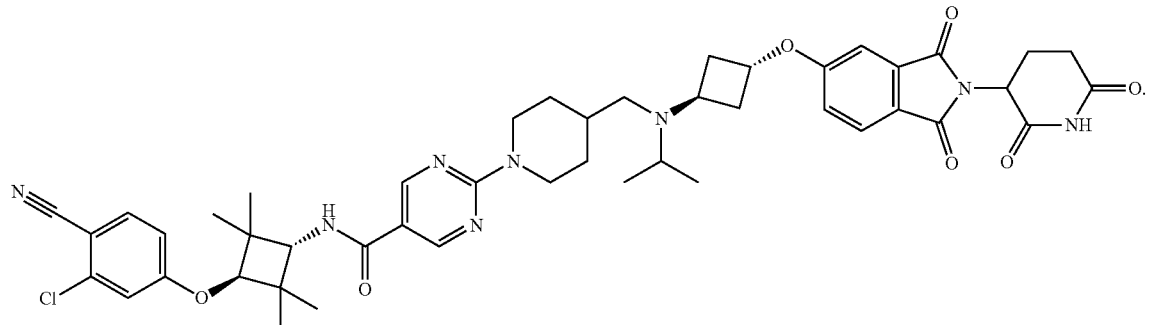

In one aspect, this application pertains to Compound A,

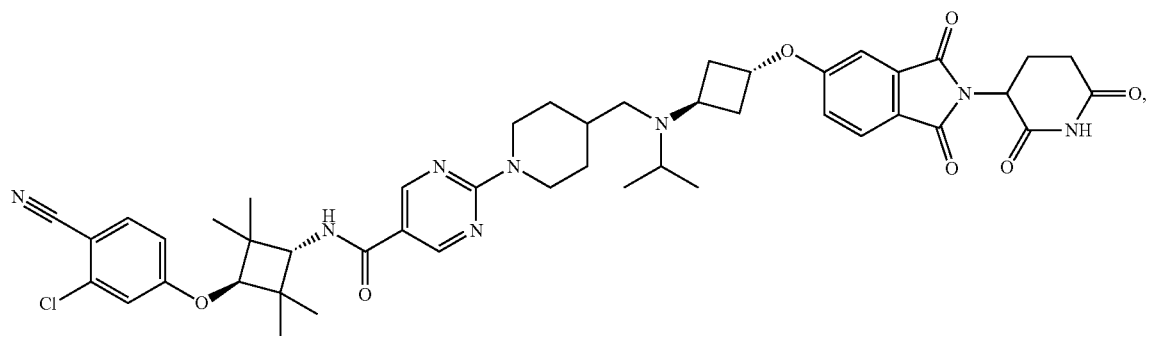 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for use in a method of treating spinal and bulbar muscular atrophy (SBMA) in a subject in need thereof, wherein the method comprises administering to the subject about 1 mg to about 500 mg of Compound A, or a pharmaceutically acceptable salt thereof.

In one aspect, this application pertains to Compound A,

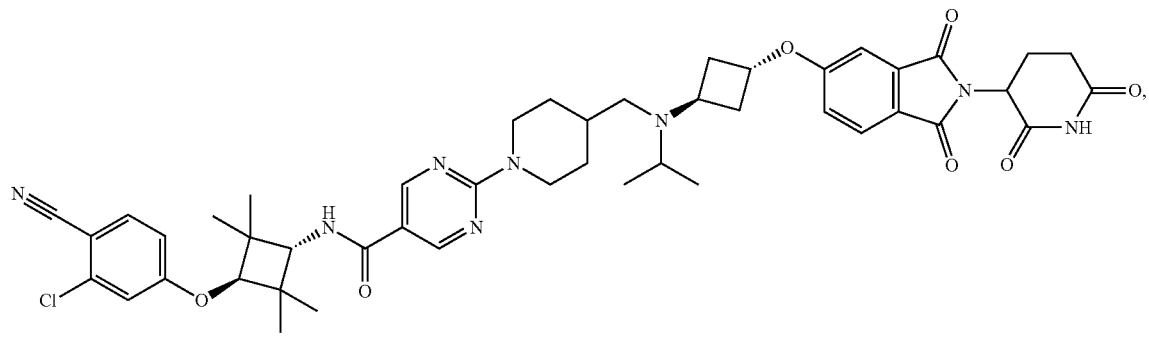 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

for use in a method of treating spinal and bulbar muscular atrophy (SBMA) in a subject in need thereof, wherein the method comprises administering to the subject about 1 mg to about 500 mg of Compound A.

In one aspect, this application pertains to a use of Compound A,

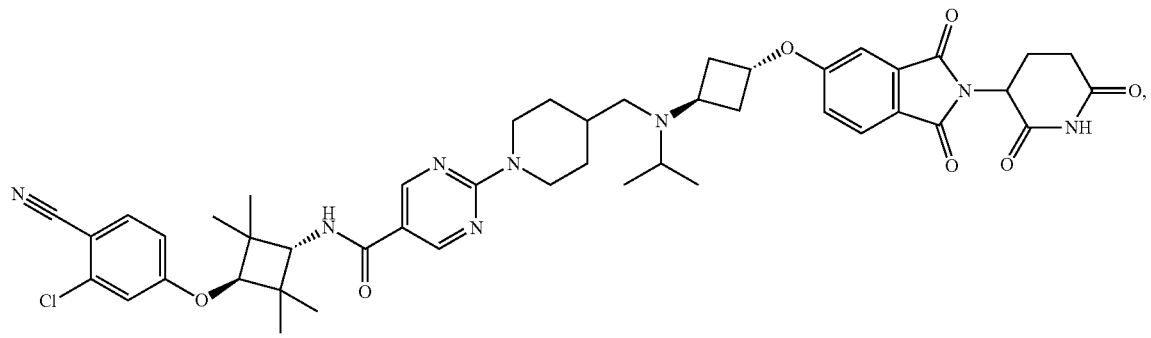 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating spinal and bulbar muscular atrophy (SBMA), wherein the medicament comprises about 1 mg to about 500 mg of Compound A, or a pharmaceutically acceptable salt thereof, and the medicament is administered to a subject in need thereof.

In one aspect, this application pertains to a use of Compound A,

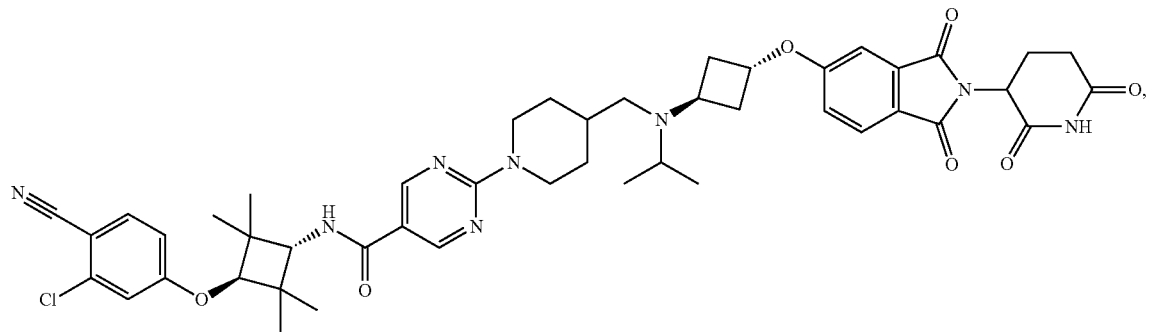 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

for the preparation of a medicament for treating spinal and bulbar muscular atrophy (SBMA), wherein the medicament comprises about 1 mg to about 500 mg of Compound A, and the medicament is administered to a subject in need thereof.

In one aspect, this application pertains to a method of treating a symptom of spinal and bulbar muscular atrophy (SBMA) in a subject in need thereof, comprising administering to the subject an effective amount of Compound A:

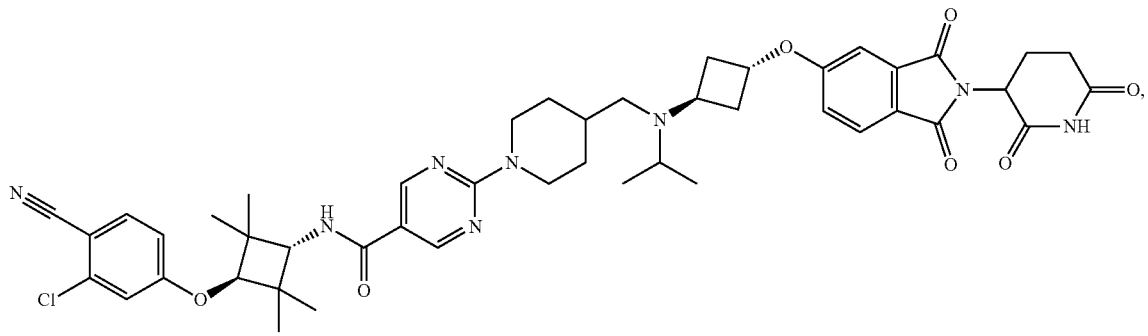 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

In one aspect, this application pertains to a method of treating a symptom of spinal and bulbar muscular atrophy (SBMA) in a subject in need thereof, comprising administering to the subject an effective amount of Compound A:

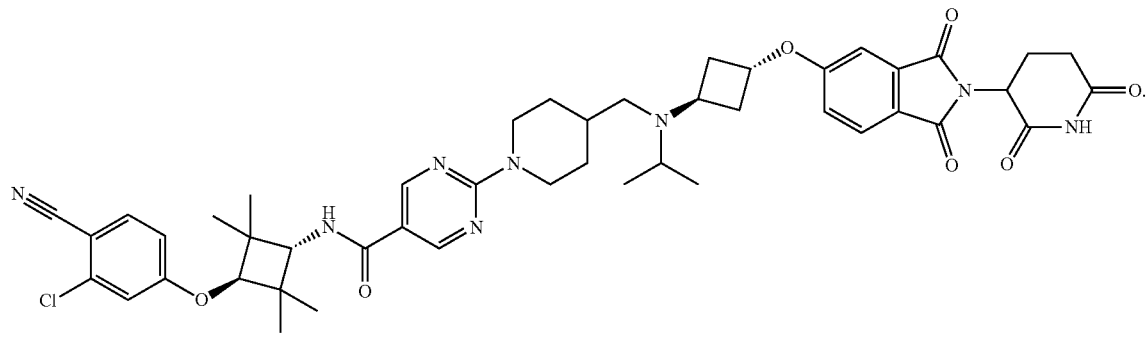 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

In one aspect, this application pertains to Compound A,

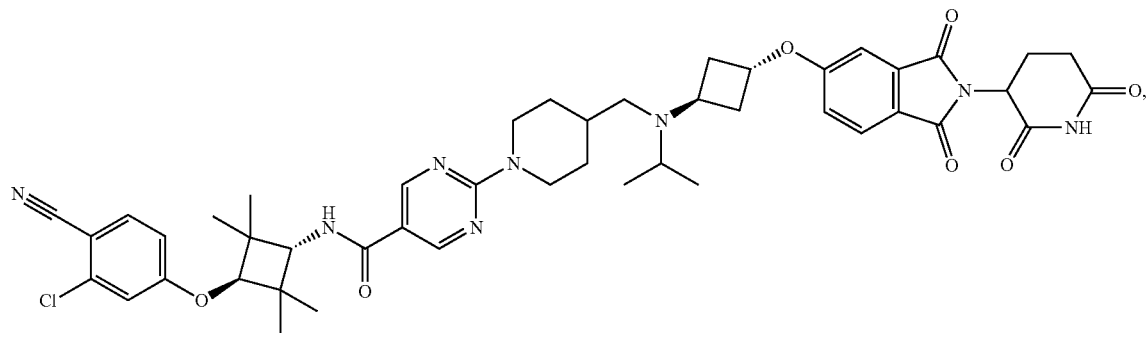 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for use in a method of treating a symptom of spinal and bulbar muscular atrophy (SBMA) in a subject in need thereof, wherein the method comprises administering to the subject an effective amount of Compound A, or a pharmaceutically acceptable salt thereof.

In one aspect, this application pertains to Compound A,

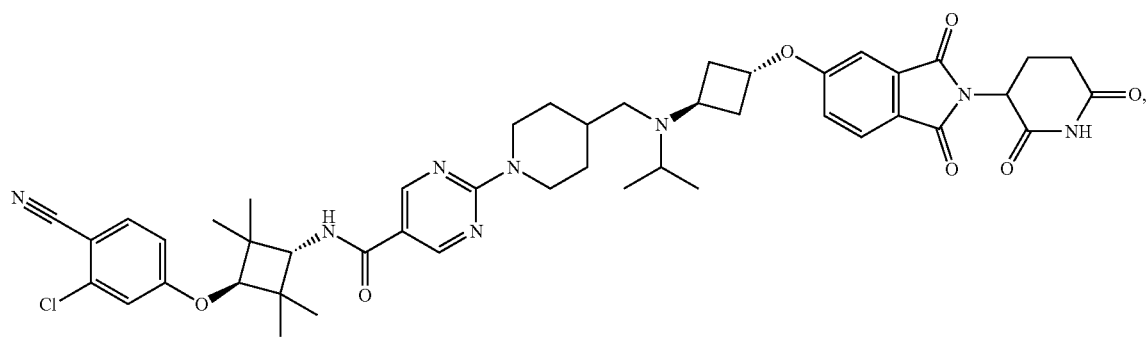 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

for use in a method of treating a symptom of spinal and bulbar muscular atrophy (SBMA) in a subject in need thereof, wherein the method comprises administering to the subject an effective amount of Compound A.

In one aspect, this application pertains to a use of Compound A,

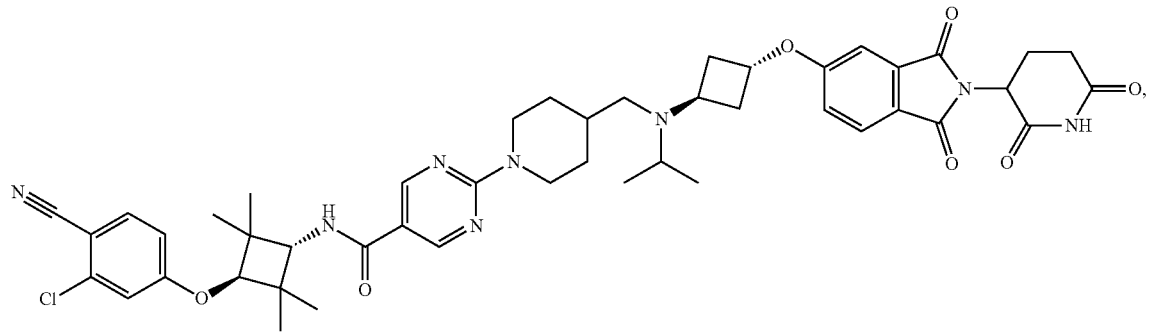 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating a symptom of spinal and bulbar muscular atrophy (SBMA), wherein the medicament comprises an effective amount of Compound A, or a pharmaceutically acceptable salt thereof, and the medicament is administered to a subject in need thereof.

In one aspect, this application pertains to a use of Compound A,

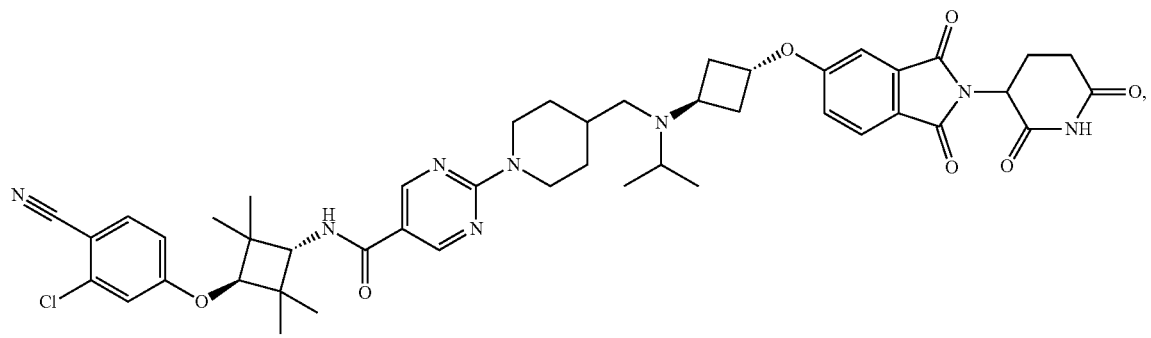 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

for the preparation of a medicament for treating a symptom of spinal and bulbar muscular atrophy (SBMA), wherein the medicament comprises an effective amount of Compound A, and the medicament is administered to a subject in need thereof.

In one aspect, this application pertains to a method of treating a symptom of spinal and bulbar muscular atrophy (SBMA) in a subject in need thereof, comprising administering to the subject about 1 mg to about 500 mg of Compound A:

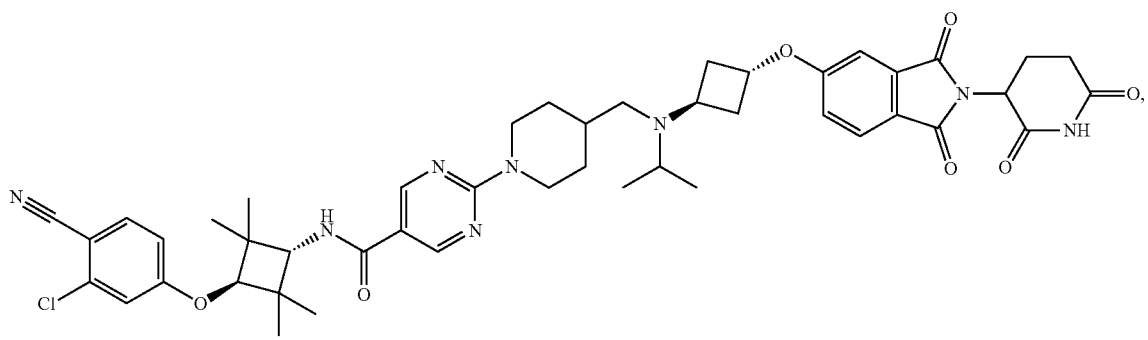 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

In one aspect, this application pertains to a method of treating a symptom of spinal and bulbar muscular atrophy (SBMA) in a subject in need thereof, comprising administering to the subject about 1 mg to about 500 mg of Compound A:

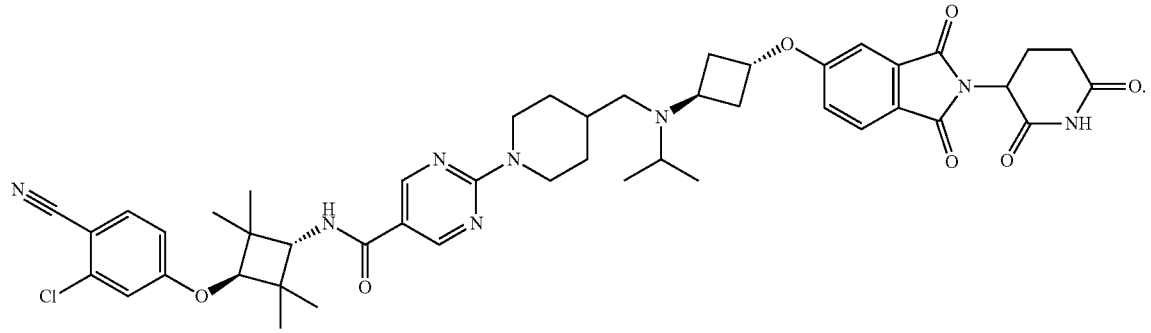 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

In one aspect, this application pertains to Compound A,

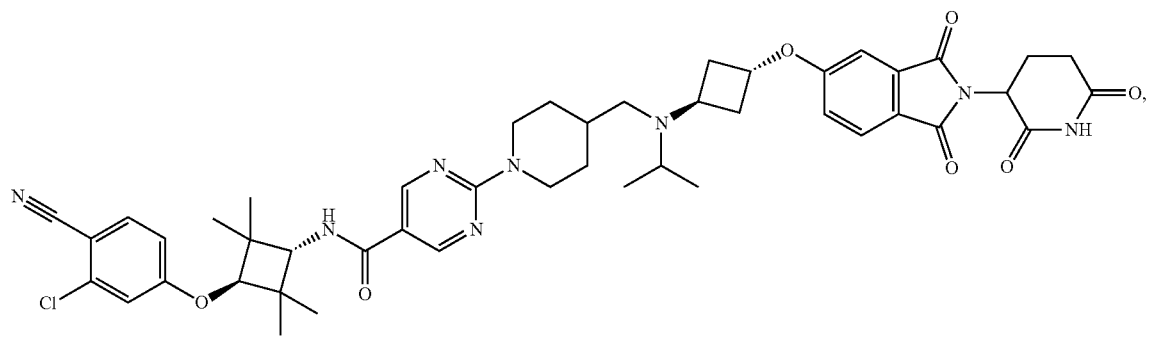 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for use in a method of treating a symptom of spinal and bulbar muscular atrophy (SBMA) in a subject in need thereof, wherein the method comprises administering to the subject about 1 mg to about 500 mg of Compound A, or a pharmaceutically acceptable salt thereof.

In one aspect, this application pertains to Compound A,

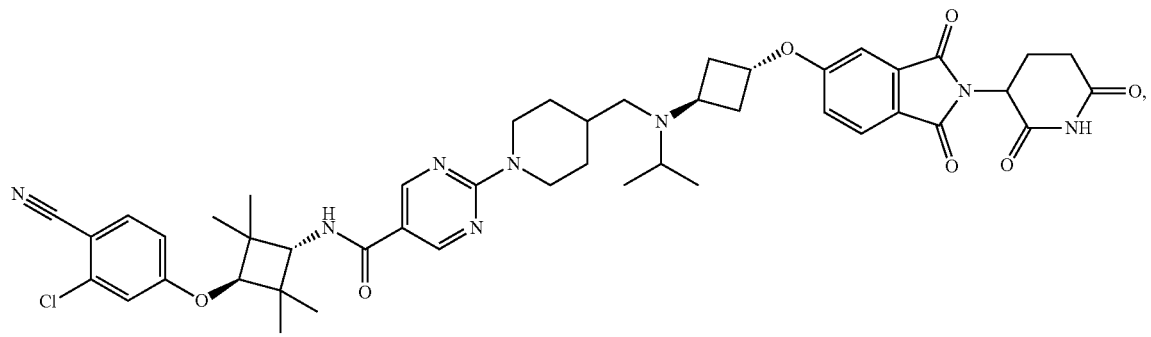 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

for use in a method of treating a symptom of spinal and bulbar muscular atrophy (SBMA) in a subject in need thereof, wherein the method comprises administering to the subject about 1 mg to about 500 mg of Compound A.

In one aspect, this application pertains to a use of Compound A,

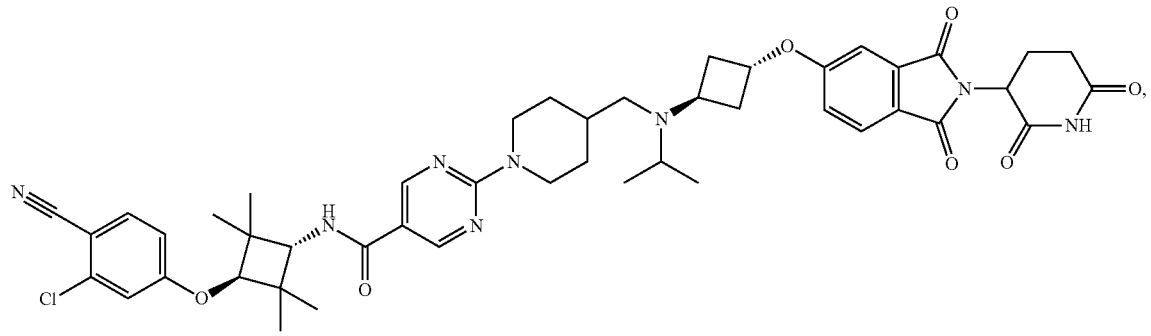 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating a symptom of spinal and bulbar muscular atrophy (SBMA), wherein the medicament comprises about 1 mg to about 500 mg of Compound A, or a pharmaceutically acceptable salt thereof, and the medicament is administered to a subject in need thereof.

In one aspect, this application pertains to a use of Compound A,

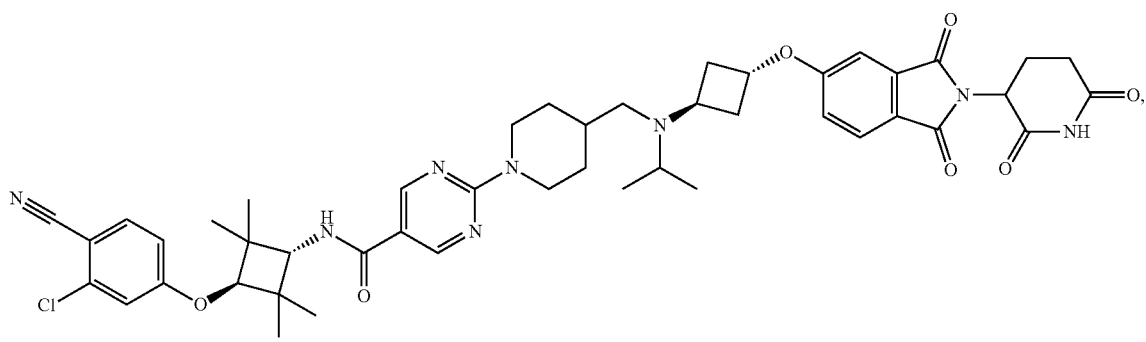 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

for the preparation of a medicament for treating a symptom of spinal and bulbar muscular atrophy (SBMA), wherein the medicament comprises about 1 mg to about 500 mg of Compound A, and the medicament is administered to a subject in need thereof.

In one aspect, this application pertains to a method of treating or preventing spinal and bulbar muscular atrophy (SBMA) in a subject in need thereof, comprising administering to the subject an effective amount of Compound A:

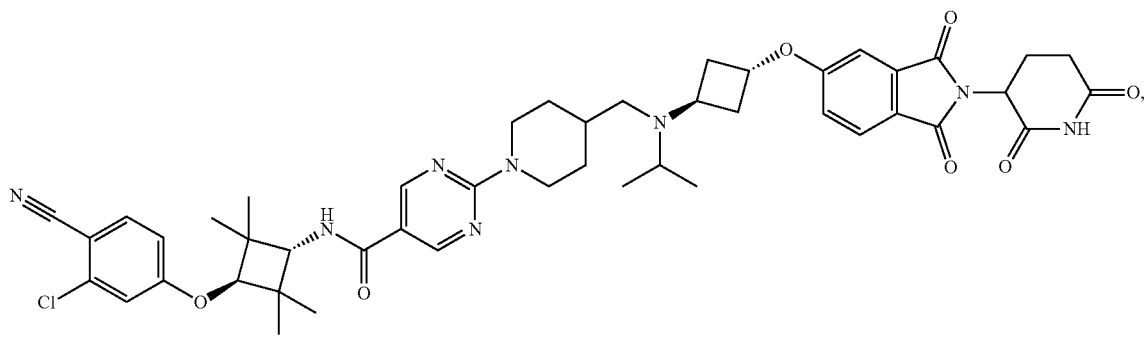 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

In one aspect, this application pertains to a method of treating or preventing spinal and bulbar muscular atrophy (SBMA) in a subject in need thereof, comprising administering to the subject an effective amount of Compound A:

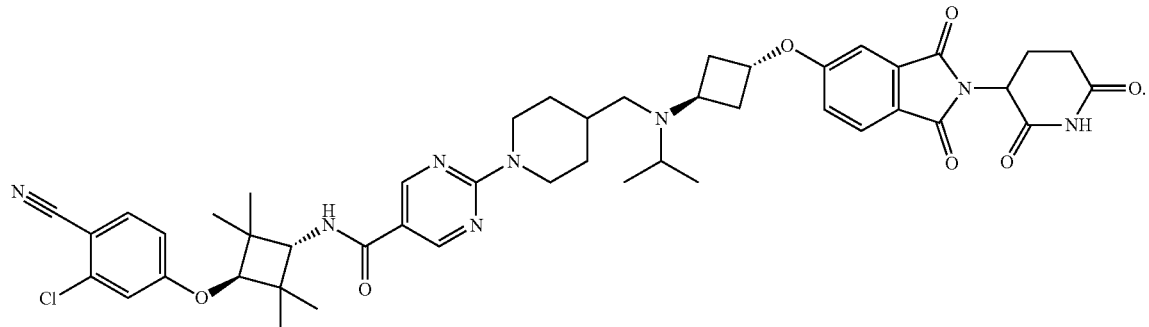

In one aspect, this application pertains to Compound A,

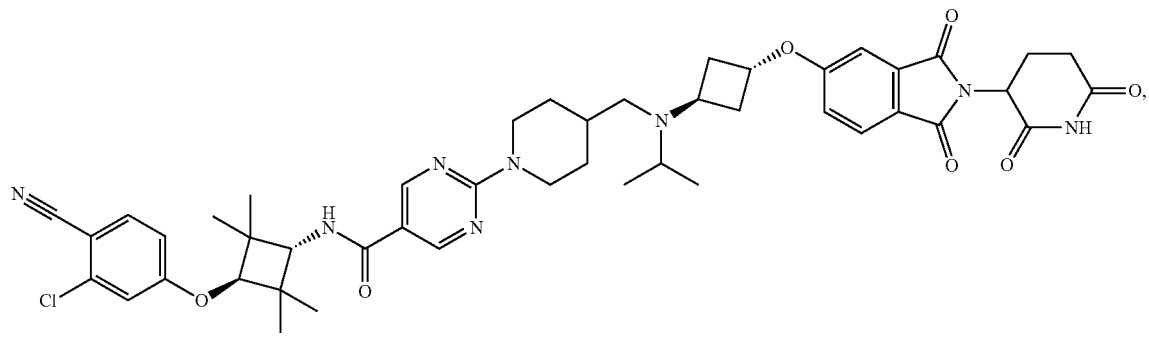 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for use in a method of treating or preventing spinal and bulbar muscular atrophy (SBMA) in a subject in need thereof, wherein the method comprises administering to the subject an effective amount of Compound A, or a pharmaceutically acceptable salt thereof.

In one aspect, this application pertains to Compound A,

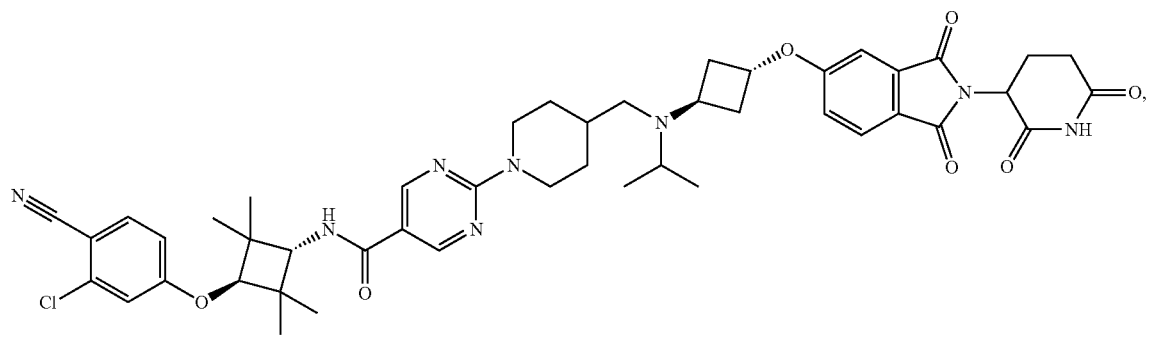 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

for use in a method of treating or preventing spinal and bulbar muscular atrophy (SBMA) in a subject in need thereof, wherein the method comprises administering to the subject an effective amount of Compound A.

In one aspect, this application pertains to a use of Compound A,

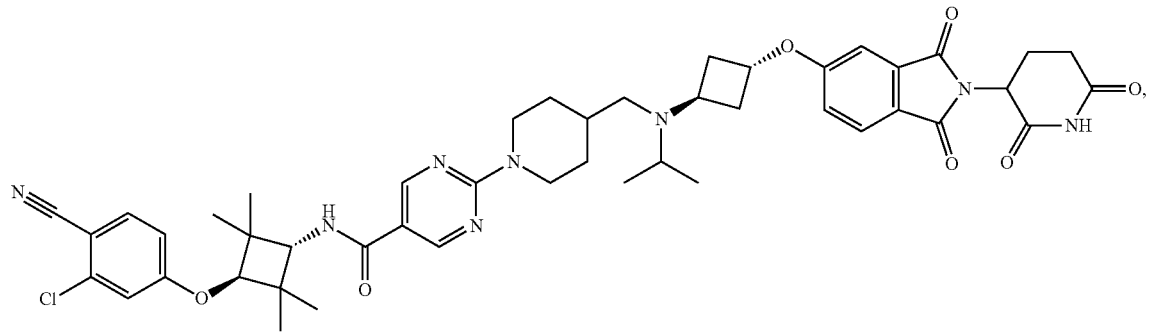 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating or preventing spinal and bulbar muscular atrophy (SBMA), wherein the medicament comprises an effective amount of Compound A, or a pharmaceutically acceptable salt thereof, and the medicament is administered to a subject in need thereof.

In one aspect, this application pertains to a use of Compound A,

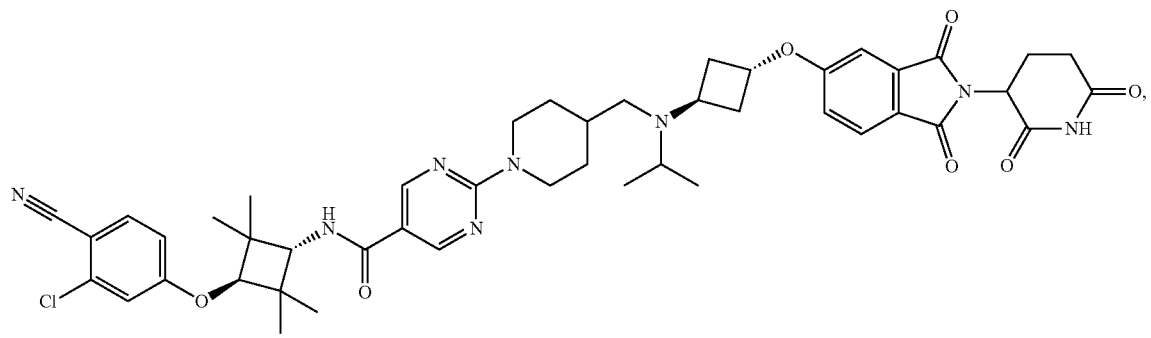 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

for the preparation of a medicament for treating or preventing spinal and bulbar muscular atrophy (SBMA), wherein the medicament comprises an effective amount of Compound A, and the medicament is administered to a subject in need thereof.

In one aspect, this application pertains to a method of treating or preventing a symptom of spinal and bulbar muscular atrophy (SBMA) in a subject in need thereof, comprising administering to the subject an effective amount of Compound A:

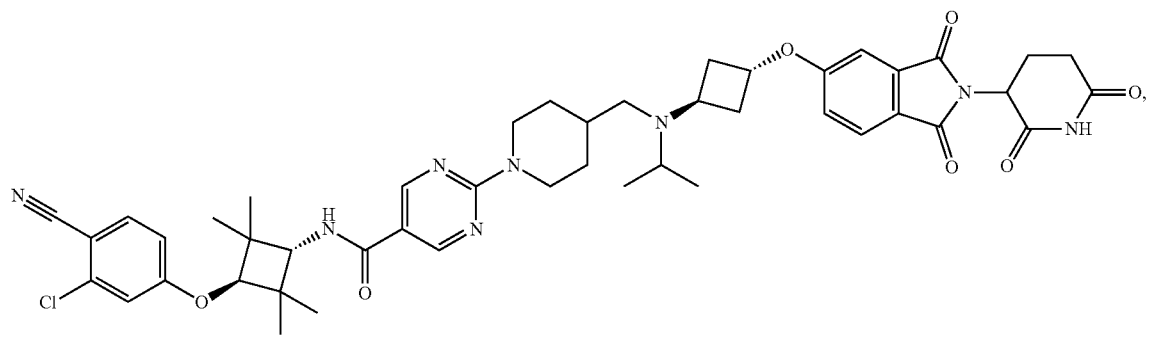 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

In one aspect, this application pertains to a method of treating or preventing a symptom of spinal and bulbar muscular atrophy (SBMA) in a subject in need thereof, comprising administering to the subject an effective amount of Compound A:

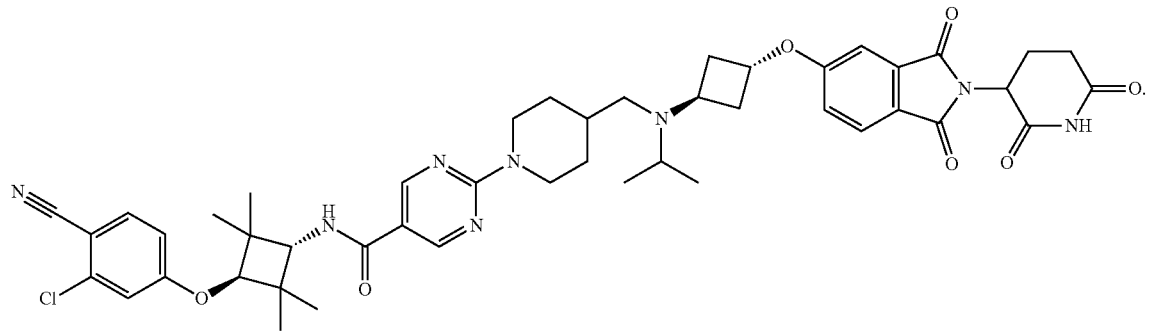 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

In one aspect, this application pertains to Compound A,

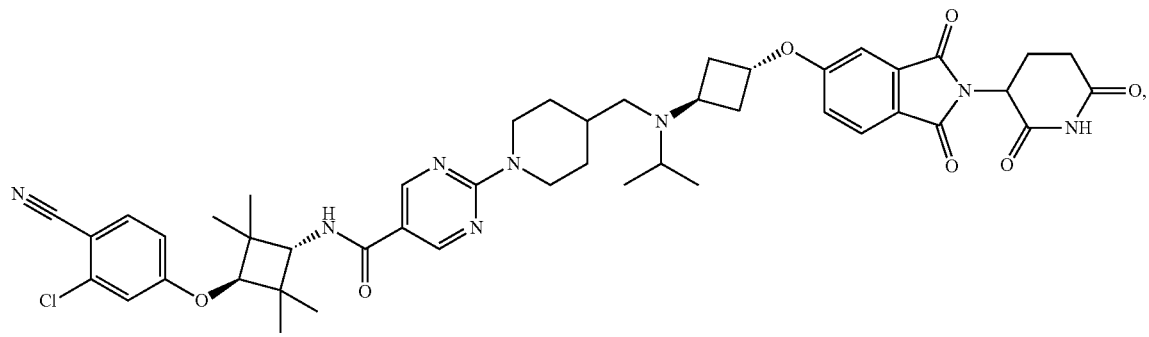 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for use in a method of treating or preventing a symptom of spinal and bulbar muscular atrophy (SBMA) in a subject in need thereof, wherein the method comprises administering to the subject an effective amount of Compound A, or a pharmaceutically acceptable salt thereof.

In one aspect, this application pertains to Compound A,

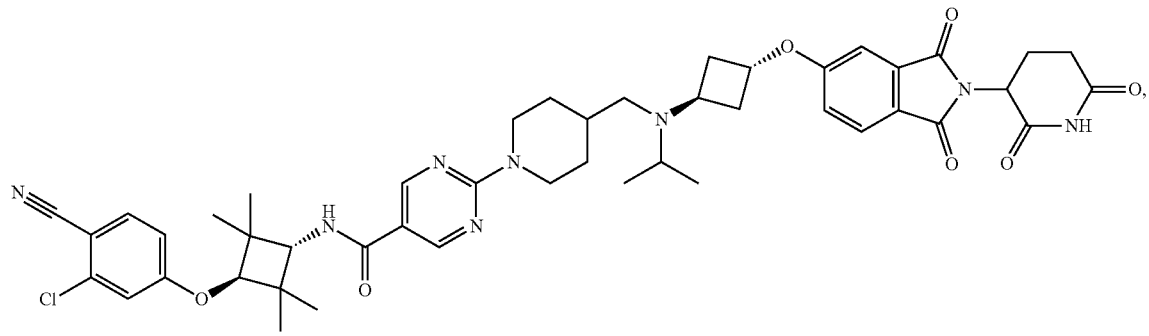 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

for use in a method of treating or preventing a symptom of spinal and bulbar muscular atrophy (SBMA) in a subject in need thereof, wherein the method comprises administering to the subject an effective amount of Compound A.

In one aspect, this application pertains to a use of Compound A,

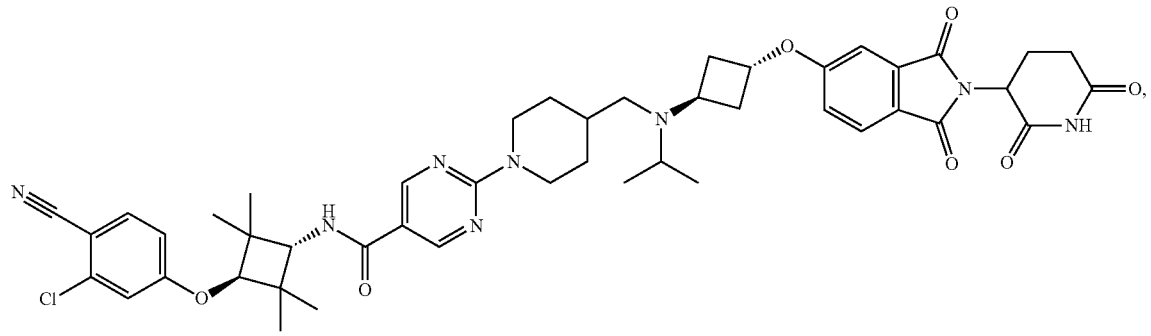 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating or preventing a symptom of spinal and bulbar muscular atrophy (SBMA), wherein the medicament comprises an effective amount of Compound A, or a pharmaceutically acceptable salt thereof, and the medicament is administered to a subject in need thereof.

In one aspect, this application pertains to a use of Compound A,

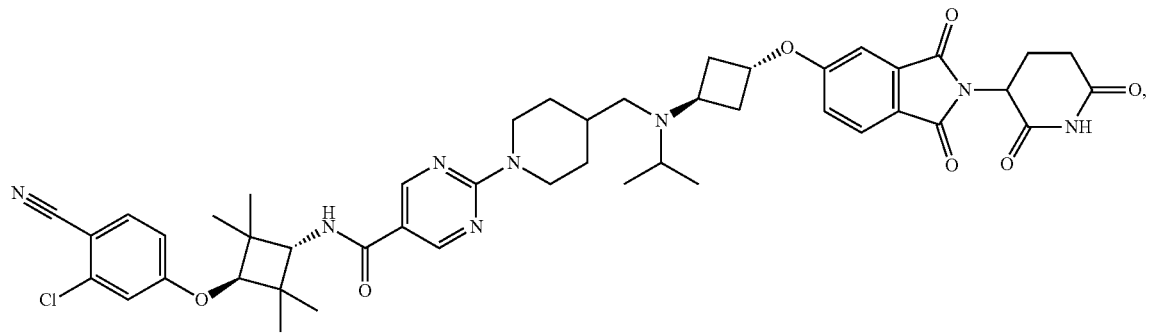 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

for the preparation of a medicament for treating or preventing a symptom of spinal and bulbar muscular atrophy (SBMA), wherein the medicament comprises an effective amount of Compound A, and the medicament is administered to a subject in need thereof.

In one aspect, this application pertains to a method of treating or preventing spinal and bulbar muscular atrophy (SBMA) in a subject in need thereof, comprising administering to the subject about 1 mg to about 500 mg of Compound A:

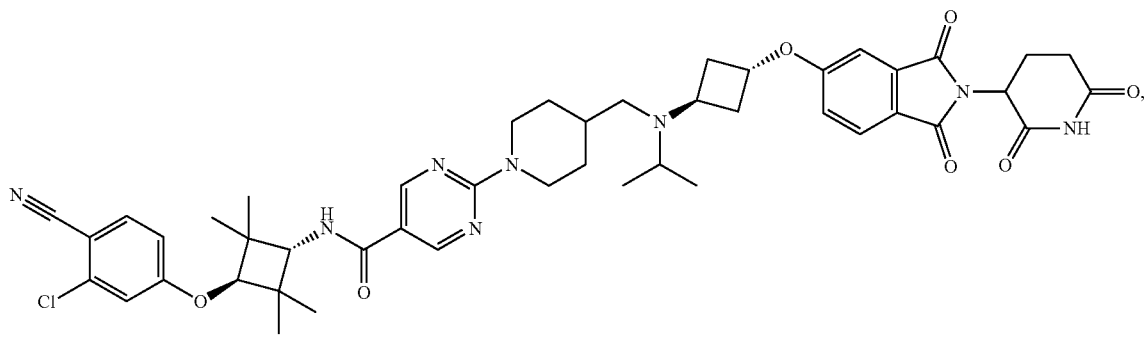 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

In one aspect, this application pertains to Compound A,

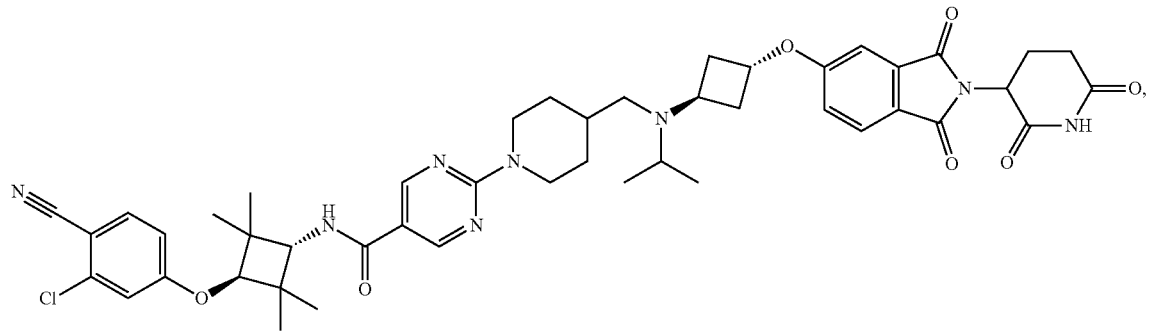 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for use in a method of treating or preventing spinal and bulbar muscular atrophy (SBMA) in a subject in need thereof, wherein the method comprises administering to the subject about 1 mg to about 500 mg of Compound A, or a pharmaceutically acceptable salt thereof.

In one aspect, this application pertains to a use of Compound A,

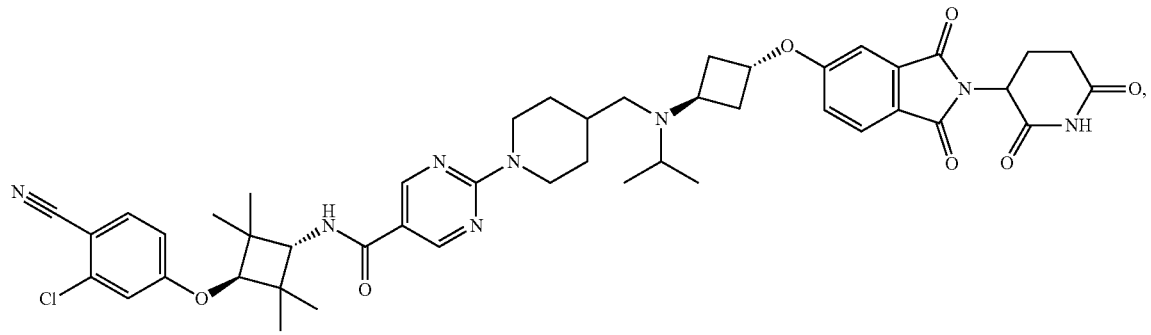 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating or preventing spinal and bulbar muscular atrophy (SBMA), wherein the medicament comprises about 1 mg to about 500 mg of Compound A, or a pharmaceutically acceptable salt thereof, and the medicament is administered to a subject in need thereof.

In one aspect, this application pertains to a method of treating or preventing a symptom of spinal and bulbar muscular atrophy (SBMA) in a subject in need thereof, comprising administering to the subject about 1 mg to about 500 mg of Compound A:

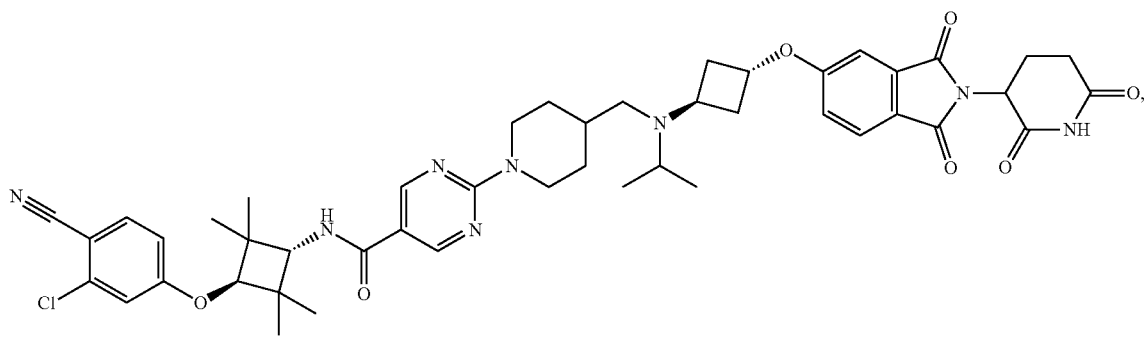 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

In one aspect, this application pertains to Compound A,

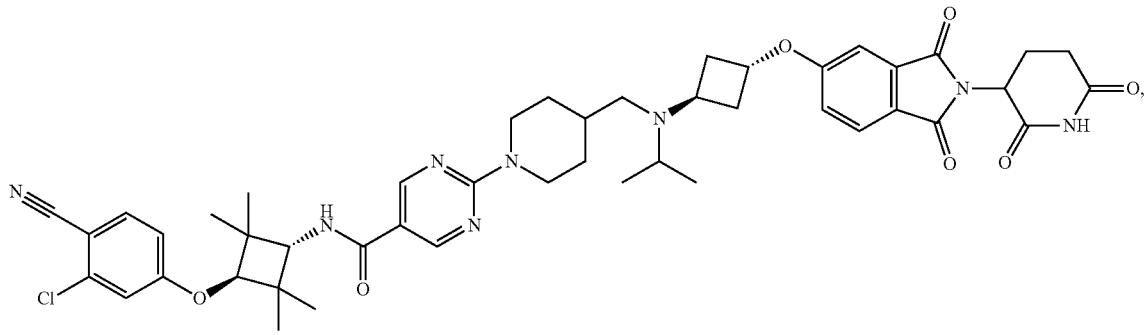 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for use in a method of treating or preventing a symptom of spinal and bulbar muscular atrophy (SBMA) in a subject in need thereof, wherein the method comprises administering to the subject about 1 mg to about 500 mg of Compound A, or a pharmaceutically acceptable salt thereof.

In one aspect, this application pertains to a use of Compound A,

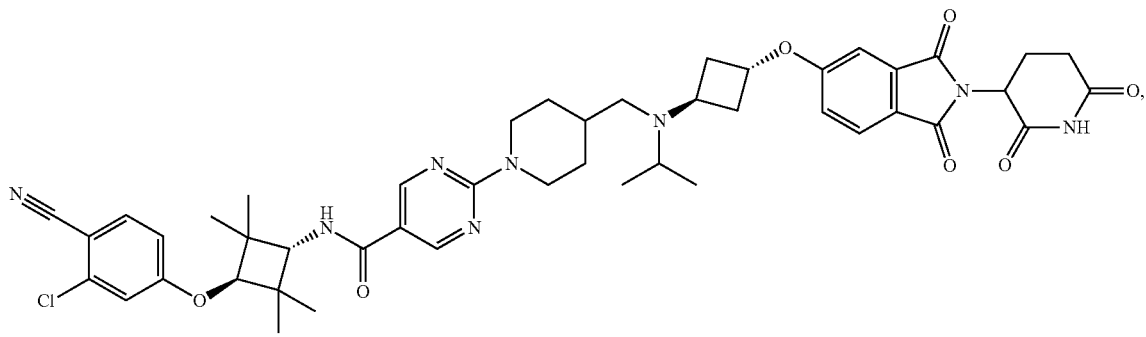 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating or preventing a symptom of spinal and bulbar muscular atrophy (SBMA), wherein the medicament comprises about 1 mg to about 500 mg of Compound A, or a pharmaceutically acceptable salt thereof, and the medicament is administered to a subject in need thereof.

In some embodiments, the symptom of SBMA is fatigue, muscle cramps, weakness in the limbs, difficulty in chewing, difficulty in swallowing, difficulty speaking, diminished deep tendon reflexes, lack of pathological reflexes, diminished vibration sensation in legs, erectile dysfunction, reduced fertility, gynecomastia, testicular atrophy, glucose resistance, hyperlipidemia, fatty liver disease, or a combination thereof.

In some embodiments, Compound A, or a pharmaceutically acceptable salt thereof, is administered to the subject orally.

In some embodiments, Compound A, or a pharmaceutically acceptable salt thereof, is administered to the subject orally in the form a tablet.

In some embodiments, Compound A, or a pharmaceutically acceptable salt thereof, is administered to the subject orally as a solution.

In some embodiments, about 5 mg to about 500 mg of Compound A, or a pharmaceutically acceptable salt thereof, is administered to the subject.

In some embodiments, about 50 mg to about 500 mg of Compound A, or a pharmaceutically acceptable salt thereof, is administered to the subject.

In some embodiments, about 5 mg to about 400 mg of Compound A, or a pharmaceutically acceptable salt thereof, is administered to the subject.

In some embodiments, about 10 mg to about 350 mg of Compound A, or a pharmaceutically acceptable salt thereof, is administered to the subject.

In some embodiments, about 15 mg to about 300 mg of Compound A, or a pharmaceutically acceptable salt thereof, is administered to the subject.

In some embodiments, about 20 mg to about 250 mg of Compound A, or a pharmaceutically acceptable salt thereof, is administered to the subject.

In some embodiments, about 25 mg to about 200 mg of Compound A, or a pharmaceutically acceptable salt thereof, is administered to the subject.

In some embodiments, about 30 mg to about 150 mg of Compound A, or a pharmaceutically acceptable salt thereof, is administered to the subject.

In some embodiments, about 25 mg of Compound A, or a pharmaceutically acceptable salt thereof, is administered to the subject.

In some embodiments, about 50 mg of Compound A, or a pharmaceutically acceptable salt thereof, is administered to the subject.

In some embodiments, 75 mg of Compound A, or a pharmaceutically acceptable salt thereof, is administered to the subject.

In some embodiments, about 100 mg of Compound A, or a pharmaceutically acceptable salt thereof, is administered to the subject.

In some embodiments, about 125 mg of Compound A, or a pharmaceutically acceptable salt thereof, is administered to the subject.

In some embodiments, about 150 mg of Compound A, or a pharmaceutically acceptable salt thereof, is administered to the subject.

In some embodiments, about 175 mg of Compound A, or a pharmaceutically acceptable salt thereof, is administered to the subject.

In some embodiments, about 200 mg of Compound A, or a pharmaceutically acceptable salt thereof, is administered to the subject.

In some embodiments, Compound A, or a pharmaceutically acceptable salt thereof, is administered to the subject in one of the following amounts: about 25 mg to about 75 mg, about 30 mg to about 80 mg, about 35 mg to about 85 mg, about 40 mg to about 90 mg, about 45 mg to about 95 mg, about 50 mg to about 100 mg, about 55 mg to about 105 mg, about 60 mg to about 110 mg, about 65 mg to about 115 mg, about 70 mg to about 120 mg, or about 75 mg to about 125 mg.

In some embodiments, Compound A, or a pharmaceutically acceptable salt thereof, is administered to the subject in one of the following amounts: about 30 mg to about 75 mg, about 35 mg to about 80 mg, about 40 mg to about 85 mg, about 45 mg to about 90 mg, about 50 mg to about 95 mg, about 55 mg to about 100 mg, about 60 mg to about 105 mg, about 65 mg to about 110 mg, about 70 mg to about 115 mg, or about 75 mg to about 120 mg.

In some embodiments, Compound A, or a pharmaceutically acceptable salt thereof, is administered to the subject in one of the following amounts: about 35 mg to about 75 mg, about 40 mg to about 80 mg, about 45 mg to about 85 mg, about 50 mg to about 90 mg, about 55 mg to about 95 mg, about 60 mg to about 100 mg, about 65 mg to about 105 mg, about 70 mg to about 110 mg, or about 75 mg to about 110 mg.

In some embodiments, Compound A, or a pharmaceutically acceptable salt thereof, is administered to the subject in one of the following amounts: about 40 mg to about 75 mg, about 45 mg to about 80 mg, about 50 mg to about 85 mg, about 55 mg to about 90 mg, about 60 mg to about 95 mg, about 65 mg to about 100 mg, about 70 mg to about 105 mg, or about 75 mg to about 110 mg.

In some embodiments, Compound A, or a pharmaceutically acceptable salt thereof, is administered to the subject in one of the following amounts: about 45 mg to about 75 mg, about 50 mg to about 80 mg, about 55 mg to about 85 mg, about 60 mg to about 90 mg, about 65 mg to about 95 mg, about 70 mg to about 100 mg, or about 75 mg to about 105 mg.

In some embodiments, Compound A, or a pharmaceutically acceptable salt thereof, is administered to the subject in one of the following amounts: about 50 mg to about 75 mg, about 55 mg to about 80 mg, about 60 mg to about 85 mg, about 65 mg to about 90 mg, about 70 mg to about 95 mg, or about 75 mg to about 100 mg.

In some embodiments, Compound A, or a pharmaceutically acceptable salt thereof, is administered to the subject in one of the following amounts: about 50 mg to about 75 mg, about 55 mg to about 80 mg, about 60 mg to about 85 mg, about 65 mg to about 90 mg, about 70 mg to about 95 mg, or about 75 mg to about 100 mg.

In some embodiments, Compound A, or a pharmaceutically acceptable salt thereof, is administered to the subject in one of the following amounts: about 55 mg to about 75 mg, about 60 mg to about 80 mg, about 65 mg to about 85 mg, about 70 mg to about 90 mg, or about 75 mg to about 95 mg.

In some embodiments, Compound A, or a pharmaceutically acceptable salt thereof, is administered to the subject in one of the following amounts: about 60 mg to about 75 mg, about 65 mg to about 80 mg, about 70 mg to about 85 mg, or about 75 mg to about 90 mg.

In some embodiments, Compound A, or a pharmaceutically acceptable salt thereof, is administered to the subject in one of the following amounts: about 65 mg to about 75 mg, about 70 mg to about 80 mg, or about 75 mg to about 85 mg.

In some embodiments, Compound A, or a pharmaceutically acceptable salt thereof, is administered to the subject in one of the following amounts: about 200 mg to about 500 mg, about 200 mg to about 450 mg, about 200 mg to about 400 mg, about 200 mg to about 350 mg, about 200 mg to about 300 mg, or about 200 mg to about 250 mg.

In some embodiments, Compound A, or a pharmaceutically acceptable salt thereof, is administered to the subject in one of the following amounts: about 250 mg to about 500 mg, about 250 mg to about 450 mg, about 250 mg to about 400 mg, about 250 mg to about 350 mg, or about 250 mg to about 300 mg.

In some embodiments, Compound A, or a pharmaceutically acceptable salt thereof, is administered to the subject in one of the following amounts: about 300 mg to about 500 mg, about 300 mg to about 450 mg, about 300 mg to about 400 mg, or 300 mg to about 350 mg.

In some embodiments, Compound A, or a pharmaceutically acceptable salt thereof, is administered to the subject in one of the following amounts: about 350 mg to about 500 mg, about 350 mg to about 450 mg, about 350 mg to about 400 mg, about 400 mg to about 500 mg, about 400 mg to about 450 mg, or about 450 mg to about 500 mg.

In some embodiments, Compound A, or a pharmaceutically acceptable salt thereof, is administered to the subject once a day, once every two days, once every three days, or once every four days.

In some embodiments, Compound A, or a pharmaceutically acceptable salt thereof, is administered to the subject once a day.

In some embodiments, the subject is in a fed state at the time of administration.

In some embodiments, the subject is in a fasted state at the time of administration.

BRIEF DESCRIPTION OF THE DRAWINGS

The accompanying drawings, which are incorporated into and form a part of the specification, illustrate several embodiments of the present disclosure and, together with the description, serve to explain the principles of the disclosure. The drawings are only for the purpose of illustrating an embodiment of the disclosure and are not to be construed as limiting the disclosure. Further objects, features and advantages of the disclosure will become apparent from the following detailed description taken in conjunction with the accompanying figures showing illustrative embodiments of the disclosure, in which:

FIG. 12A shows that Compound A (12 nM) induces degradation of polyQ-AR whereas Compound F (12 nM) does not induce degradation compared to control.

FIG. 12B demonstrates the specificity of Compound A for polyQ-AR degradation in SBMA hiPSC-myotubes. There is a single neosubtrate: PDE6D with Compound A. PDE6D is not a neosubstrate for an E3-inactive version of Compound A, i.e.: Compound F (FIG. 12C).

FIGS. 13A and 13B provide dose response curves for Compound A in plasma and LABC muscle, respectively. FIG. 13C demonstrates that AR levels in the LABC muscle return to normal in about 3 days post administration of Compound A (30 mg/kg, once per day (QD) for 3 days).

Figure 1:
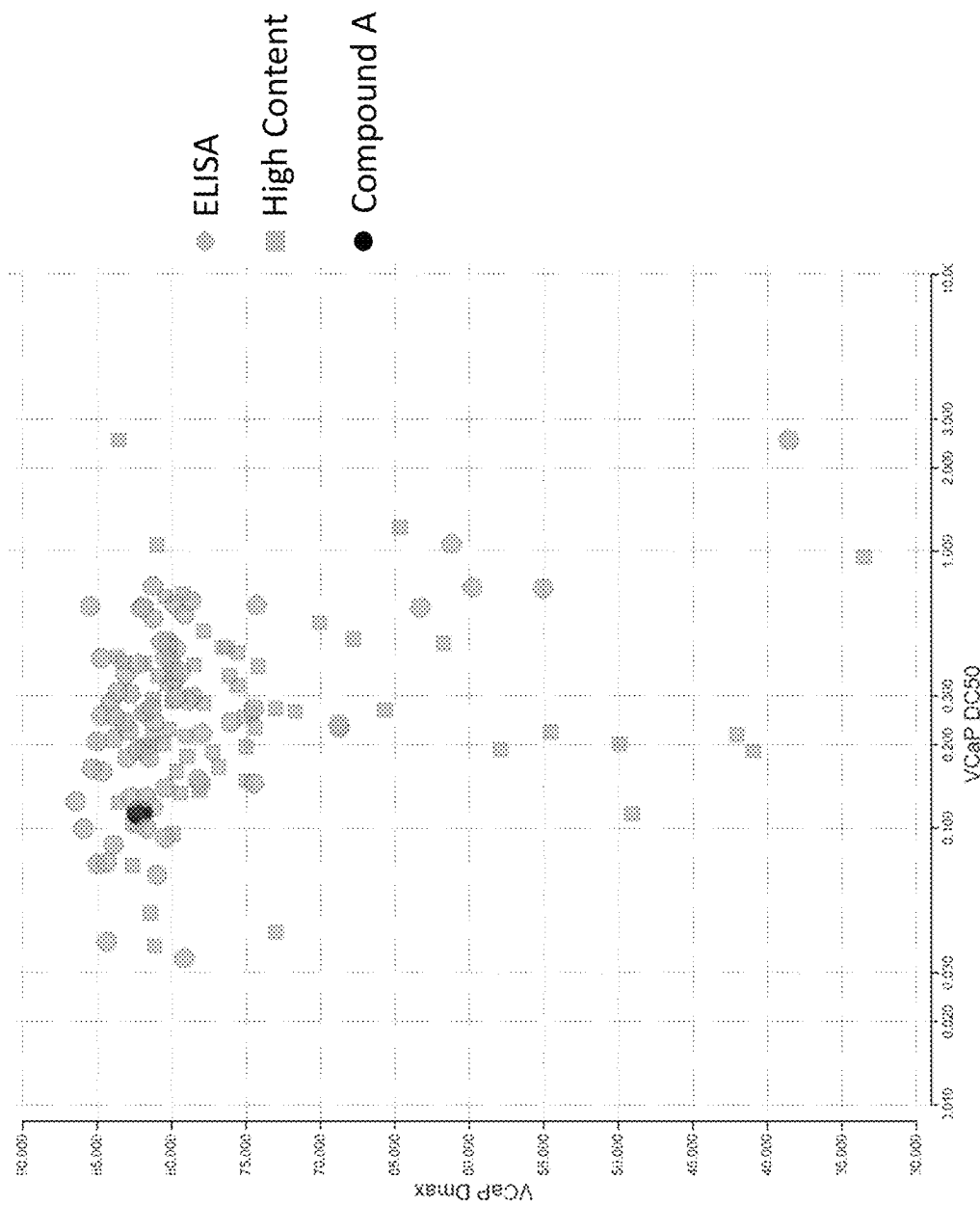
FIG. 1 is a scatterplot showing the AR degradation ($DC_{50}$ vs. $D_{max}$) mediated by various compounds measured in VCaP cells by ELISA (circles) or high content imaging (squares). Each dot represents a compound. Compound A is indicated for reference.

```
SEQUENCE LISTING
All references to amino acid mutations in
the Androgen Receptor are numbered relative
to SEQ ID NO: 1, which is provided below:
  1 MEVQLGLGRV YPRPPSKTYR GAFQNLFQSV

REVIQNPGPR HPEAASAAPP GASLLLLQQQ

61 QQQQQQQQQQ QQQQQQQQQQ ETSPRQQQQQ

QGEDGSPQAH RRGPTGYLVL DEEQQPSQPQ

121 SALECHPERG CVPEPGAAVA ASKGLPQQLP

APPDEDDSAA PSILSLLGPT FPGLSSCSAD

181 LKDILSEAST MQLLQQQQQE AVSEGSSSGR

AREASGAPTS SKDNYLGGTS TISDNAKELC

241 KAVSVSMGLG VEALEHLSPG EQLRGDCMYA

PLLGVPPAVR PTPCAPLAEC KGSLLDDSAG

301 KSTEDTAEYS PFKGGYTKGL EGESLGCSGS

AAAGSSGTLE LPSTLSLYKS GALDEAAAYQ

361 SRDYYNFPLA LAGPPPPPPP PHPHARIKLE

NPLDYGSAWA AAAAQCRYGD LASLHGAGAA

421 GPGSGSPSAA ASSSWHILFT AEEGQLYGPC

GGGGGGGGGG GGGGGGGGGG GGGEAGAVAP

481 YGYTRPPQGL AGQESDFTAP DVWYPGGMVS

RVPYPSPTCV KSEMGPWMDS YSGPYGDMRL

541 ETARDHVLPI DYYFPPQKTC LICGDEASGC

HYGALTCGSC KVFFKRAAEG KQKYLCASRN

601 DCTIDKFRRK NCPSCRLRKC YEAGMTLGAR

KLKKLGNLKL QEEGEASSTT SPTEETTQKL

661 TVSHIEGYEC QPIFLNVLEA IEPGVVCAGH

DNNQPDSFAA LLSSLNELGE RQLVHVVKWA

721 KALPGFRNLH VDDQMAVIQY SWMGLMVFAM

GWRSFTNVNS RMLYFAPDLV FNEYRMHKSR

781 MYSQCVRMRH LSQEFGWLQI TPQEFLCMKA

LLLFSIIPVD GLKNQKFFDE LRMNYIKELD

841 RIIACKRKNP ISCSRRFYQL TKLLDSVQPI

ARELHQFTED LLIKSHMVSV DFPEMMAEII

901 SVQVPKILSG KVKPIYFHTQ
```

| ABBREVIATIONS | |
|---|---|
| ANOVA | analysis of variance |
| AR | Androgen Receptor |
| ASO | antisense oligonucleotide |
| BAC | bacterial artificial chromosome |
| BSA | bovine serum albumin |
| CRBN | cereblon |
| DC | detergent compatible |
| DMEM | Dulbecco's modified eagle medium |
| DMSO | dimethyl sulfoxide |
| ELISA | enzyme linked immunosorbent assay |
| ELN | electronic lab notebook |
| FBS | fetal bovine serum |
| HEK PQ | HEK 293 polyQ androgen receptor |
| hiSPC | human induced pluripotent stem cells |
| HRP | horse radish peroxidase |
| IACUC | Institutional Animal Care and Use Committee |
| KO | Knockout |
| LABC | levator ani/bulbocavernosus |
| LBD | Ligand binding domain |
| MyHC | Myosin heavy chain |
| NIR | near infrared |
| PCR | polymerase chain reaction |
| PDL | poly-d-lysine |
| PEG | polyethylene glycol |
| PFA | paraformaldehyde |
| PO | Oral administration |
| RIPA | radioimmunoprecipitation assay |
| RPMI | Roswell Park Memorial Institute |
| SBMA | spinal and bulbar muscular atrophy |
| SDS | sodium dodecyl sulfate |
| TBS | tris-buffered saline |
| WT | wild-type |

DETAILED DESCRIPTION

Definitions

In one aspect, this application relates to the use of a compound for inducing degradation of polyQ-AR proteins. Potent, selective, orally bioavailable compounds that induce the degradation of the AR have been developed for the treatment of metastatic castration resistant prostate cancer (See, for example, U.S. Pat. No. 10,584,101).

These compounds, also referred to as PROTACs (Proteolysis-Targeting Chimera), are chimeric small molecules that bind to both an E3 ligase and a target to facilitate protein degradation by presenting that E3 ligase complex to a target protein, causing the target protein to become ubiquitinylated and subsequently degraded via the cell's natural and selective ubiquitin-proteasome system. Without wishing to be bound by theory, a compound may be effective in inducing degradation of polyQ-AR proteins because the polyQ expansion in exon 1 of AR is unlikely to disrupt LBD binding site near the C-terminus. As described herein, the pharmacology of degrading the polyQ expanded AR was unexpectedly different than wild type AR (<38Q), which results in enhanced activity toward polyQ AR in myocytes and pharmacodynamic effect in muscle.

In one aspect, this application relates to a method of treating or preventing spinal and bulbar muscular atrophy (SBMA) in a subject comprising administering to a subject in need thereof an effective amount of Compound A,

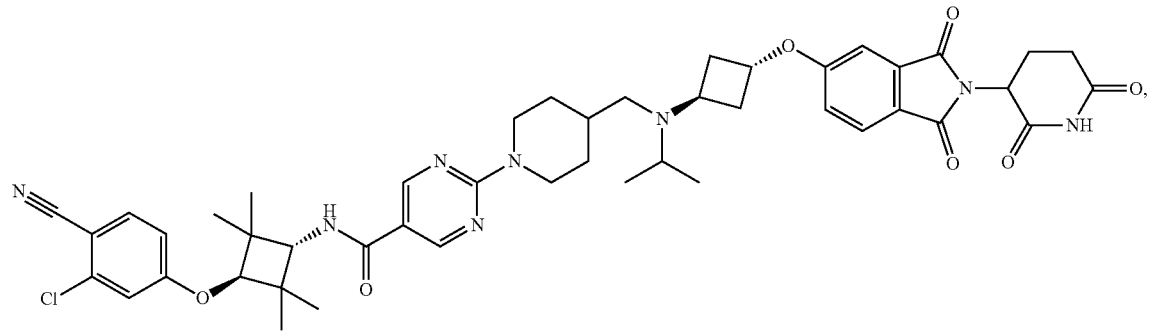 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

In one aspect, this application relates to a method of treating or preventing SBMA in a subject in need thereof, comprising administering to the subject an effective amount of Compound A.

In one aspect, this application relates to a method of treating or preventing a symptom of SBMA in a subject in need thereof, comprising administering to the subject an effective amount of Compound A, or a pharmaceutically acceptable salt thereof.

In one aspect, this application relates to a method of treating or preventing a symptom of SBMA in a subject in need thereof, comprising administering to the subject an effective amount of Compound A.

In some embodiments, the symptom of SBMA is fatigue, muscle cramps, weakness in the limbs, difficulty in chewing, difficulty in swallowing, difficulty speaking, diminished deep tendon reflexes, lack of pathological reflexes, diminished vibration sensation in legs, erectile dysfunction, reduced fertility, gynecomastia, testicular atrophy, glucose resistance, hyperlipidemia, fatty liver disease, or a combination thereof.

In some embodiments, the effective amount of Compound A, or a pharmaceutically acceptable salt thereof, is administered to the subject orally.

In some embodiments, the effective amount of Compound A, or a pharmaceutically acceptable salt thereof, is administered to the subject once a day, twice a day, three times a day, or four times a day.

In some embodiments, the effective amount of Compound A, or a pharmaceutically acceptable salt thereof, is administered to the subject once a day, once every two days, once every three days, or once every four days.

In some embodiments, the effective amount of Compound A, or a pharmaceutically acceptable salt thereof, is administered to the subject once a day.

In some embodiments, the effective amount of Compound A, or a pharmaceutically acceptable salt thereof, is administered to the subject once every two days.

In some embodiments, the effective amount of Compound A, or a pharmaceutically acceptable salt thereof, is administered to the subject once every three days.

In some embodiments, the effective amount of Compound A, or a pharmaceutically acceptable salt thereof, is administered to the subject once every four days.

In some embodiments, the subject is in a fed state at the time of administration.

In some embodiments, the subject is in a fasted state at the time of administration.

All references to amino acid mutations in the Androgen Receptor are numbered relative to SEQ ID NO: 1, which is provided herewith.

The term "Ubiquitin Ligase" refers to a family of proteins that facilitate the transfer of ubiquitin to a specific substrate protein, targeting the substrate protein for degradation. For example, cereblon (CRBN) is an E3 Ubiquitin Ligase protein that alone or in combination with an E2 ubiquitin-conjugating enzyme causes the attachment of ubiquitin to a lysine on a target protein, and subsequently targets the specific protein substrates for degradation by the proteasome. Thus, E3 ubiquitin ligase alone or in complex with an E2 ubiquitin conjugating enzyme is responsible for the transfer of ubiquitin to targeted proteins. In general, the ubiquitin ligase is involved in polyubiquitination such that a second ubiquitin is attached to the first; a third is attached to the second, and so forth. Polyubiquitination marks proteins for degradation by the proteasome. However, there are some ubiquitination events that are limited to mono-ubiquitination, in which only a single ubiquitin is added by the ubiquitin ligase to a substrate molecule. Mono-ubiquitinated proteins are not targeted to the proteasome for degradation but may instead be altered in their cellular location or function, for example, via binding other proteins that have domains capable of binding ubiquitin. Further complicating matters, different lysines on ubiquitin can be targeted by an E3 to make chains. The most common lysine is Lys48 on the ubiquitin chain. This is the lysine used to make polyubiquitin, which is recognized by the proteasome.

"Pharmaceutically acceptable salt", as used herein refers to a salt form of Compound A as well as hydrates of the salt form with one or more water molecules present. Such salt and hydrated forms retain the biological activity of the compound of the disclosure and are not biologically or otherwise undesirable, i.e., exhibit minimal, if any, toxicological effects. Representative "pharmaceutically acceptable salts" include, e.g., water-soluble and water-insoluble salts, such as the acetate, amsonate (4,4-diaminostilbene-2,2-disulfonate), benzenesulfonate, benzonate, bicarbonate, bisulfate, bitartrate, borate, bromide, butyrate, calcium, calcium edetate, camsylate, carbonate, chloride, citrate, clavulariate, dihydrochloride, edetate, edisylate, estolate, esylate, fumarate, gluceptate, gluconate, glutamate, glycollylarsanilate, hexafluorophosphate, hexylresorcinate, hydrabamine, hydrobromide, hydrochloride, hydroxynaphthoate, iodide, isothionate, lactate, lactobionate, laurate, magnesium, malate, maleate, mandelate, mesylate, methylbromide, methylnitrate, methylsulfate, mucate, napsylate, nitrate, N-methylglucamine ammonium salt, 3-hydroxy-2-naphthoate, oleate, oxalate, palmitate, pamoate (1,1-methene-bis-2-hydroxy-3-naphthoate, einbonate), pantothenate, phosphate/diphosphate, picrate, polygalacturonate, propionate, p-toluenesulfonate, salicylate, stearate, subacetate, succinate, sulfate, sulfosalicylate, suramate, tannate, tartrate, teoclate, tosylate, triethiodide, and valerate salts.

"Solvate" as used herein refers to a solvent addition form of Compound A that contains either a stoichiometric or non-stoichiometric amounts of solvent. Non-limiting examples of suitable solvates include ethanolate, methanolate, and the like. Some compounds tend to trap a fixed molar ratio of solvent molecules in the crystalline solid state, thus forming a solvate. If the solvent is water, the solvate formed is a hydrate, when the solvent is alcohol, the solvate formed is an alcoholate. Hydrates are formed by the combination of one or more molecules of water with one of the substances in which the water retains its molecular state as $H_2O$, such combination being able to form one or more hydrate. In the hydrates, the water molecules are attached through secondary valencies by intermolecular forces, in particular hydrogen bridges. Solid hydrates contain water as so-called crystal water in stoichiometric ratios, where the water molecules do not have to be equivalent with respect to their binding state. Examples of hydrates are sesquihydrates, monohydrates, dihydrates or trihydrates. Equally suitable are the hydrates of salts of the compounds of the disclosure.

As used herein, "treating" describes the management and care of a subject for the purpose of combating a disease, condition, or disorder, or reversing, alleviating, or inhibiting the progress of the disease, condition, or disorder, and further includes decreasing or alleviating the symptoms or complications, or eliminating the disease, condition, or disorder.

The term "treatment", as used herein, unless otherwise indicated, refers to the act of "treating" as defined immediately above. For example, the terms "treat", "treating" and "treatment" can refer to a method of alleviating or abrogating a particular disorder and/or one or more of its attendant symptoms.

As used herein, "subject" means a human or animal (in the case of an animal, the subject can be a mammal). In one aspect, the subject is a human. In one aspect, the subject is a male.

As used herein, "preventing" describes stopping the onset of the symptoms or complications of the disease, condition or disorder.

"Administration" refers to introducing an agent, such as Compound A into a subject. The related terms "administering" and "administration of" (and grammatical equivalents) refer both to direct administration, which may be administration to a subject by a medical professional or by self-administration by the subject, and/or to indirect administration, which may be the act of prescribing a drug. For example, a physician who instructs a patient to self-administer a drug and/or provides a patient with a prescription for a drug is administering the drug to the patient.

The terms "co-administration" and "co-administering" or "combination therapy" refer to both concurrent administration (administration of two or more therapeutic agents at the same time) and time varied administration (administration of one or more therapeutic agents at a time different from that of the administration of an additional therapeutic agent or agents), as long as the therapeutic agents are present in the patient to some extent, preferably at effective amounts, at the same time. In certain preferred aspects, one or more of the present compounds described herein, are co-administered in combination with at least one additional bioactive agent.

"Effective amount", as used herein means an amount of the free base of Compound A, or the equivalent amount of a pharmaceutically acceptable salt of Compound A, that is sufficient to treat, ameliorate, or prevent SBMA or a symptom of SMBA, or to exhibit a detectable therapeutic or inhibitory effect. The effect can be detected by any assay method known in the art. The effective amount for a particular subject may depend upon the subject's body weight, size, and health; the nature and extent of the condition; and whether additional therapeutics are to be administered to the subject. Effective amounts for a given situation can be determined by routine experimentation that is within the skill and judgment of the clinician.

In some embodiments, an effective amount of Compound A, or a pharmaceutically acceptable salt of Compound A, refers to the amount of Compound A, or the equivalent amount of a pharmaceutically acceptable salt of Compound A, that when administered to a subject suffering from SBMA or a symptom of SBMA results in AR degradation of 50% or more in the affected muscle of a subject compared to the affected muscle in a subject not administered Compound A.

"$C_{max}$", as used herein, refers to the observed maximum (peak) plasma concentration of a specified compound in the subject after administration of a dose of that compound to the subject.

The term "about" as part of a quantitative expression such as "about X", includes any value that is 10% higher or lower than X, and also includes any numerical value that falls between X−10% and X+10%. Thus, for example, a weight of about 40 g includes a weight of between 36 to 44 g. When used herein to denote amino acid residues in the AR, the term "about" means any amino acid residue that is within 5 amino acid residues of what is specified. For example, when referring to a contiguous stretch of amino acid residues extending from about amino acid residue 560 to about amino acid residue 624 of the AR, this refers to a contiguous stretch of amino acid residues extending from amino acid residue 555, 556, 557, 558, 559, 560, 561, 562, 563, 564, or 565, to amino acid residue 619, 620, 621, 622, 623, 624, 625, 626, 627, 628, or 629 of the AR of SEQ ID NO: 1. In some embodiments, the term "about" means any amino acid residue that is within 3 amino acid residues of what is specified. In some embodiments, the term "about" means any amino acid residue that is within 1 amino acid residue of what is specified.

Compound A of the present disclosure refers to N-((1r,3r)-3-(3-chloro-4-cyanophenoxy)-2,2,4,4-tetramethylcyclobutyl)-2-(4-((((1r,3r)-3-((2-(2,6-dioxopiperidin-3-yl)-1,3-dioxoisoindolin-5-yl)oxy)cyclobutyl)(isopropyl)amino)methyl)piperidin-1-yl)pyrimidine-5-carboxamide, which has the following structure:

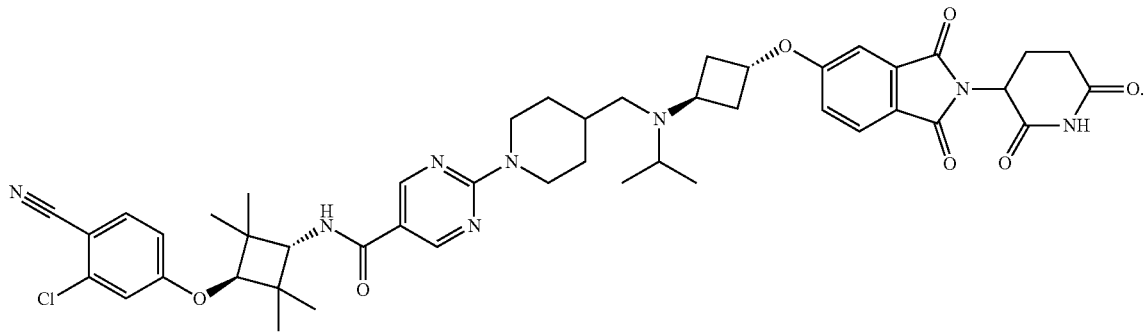 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

(Compound A)

Compound A may be synthesized using standard synthetic methods and procedures for the preparation of organic molecules and functional group transformations and manipulations, including the use of protective groups, as can be obtained from the relevant scientific literature or from standard reference textbooks in the field in view of this disclosure. Although not limited to any one or several sources, recognized reference textbooks of organic synthesis include: Smith, M. B.; March, J. March's Advanced Organic Chemistry: Reactions, Mechanisms, and Structure, $5^{th}$ ed.; John Wiley & Sons: New York, 2001; and Greene, T. W.; Wuts, P. G. M. Protective Groups in Organic Synthesis, $3^{rd}$; John Wiley & Sons: New York, 1999. The synthetic methods described in U.S. Patent Application Publication No. 2023/0331681 and International Publication No. 2018/144649 are incorporated herein by reference in their entireties.

As used herein, "Compound B", refers to a compound with the following structure:

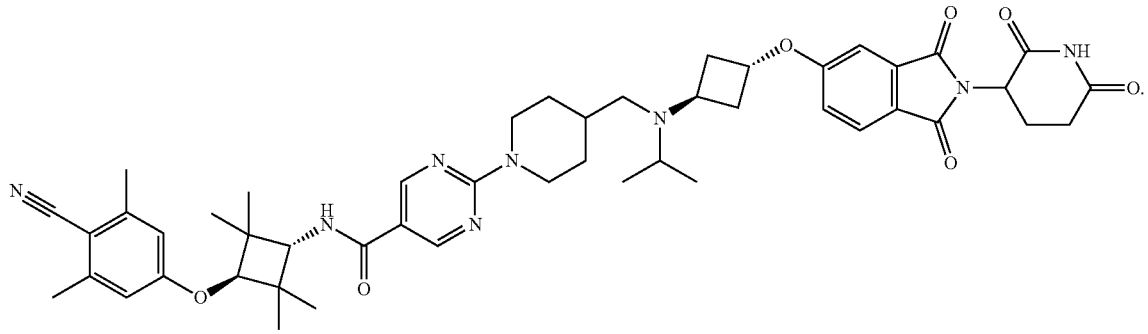 [SMILES: Cc1cc(O[C@H]2C(C)(C)[C@H](NC(=O)c3cnc(N4CCC(CN(C(C)C)[C@H]5C[C@H](Oc6ccc7c(c6)C(=O)N(C6CCC(=O)NC6=O)C7=O)C5)CC4)nc3)C2(C)C)cc(C)c1C#N]

As used herein, "Compound C", refers to a compound with the following structure:

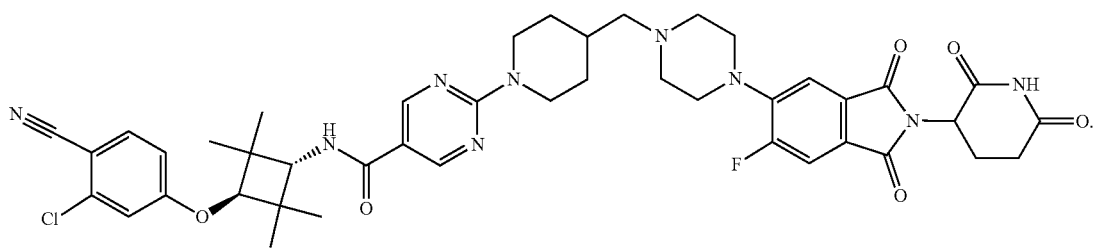 [SMILES: CC1(C)[C@H](NC(=O)c2cnc(N3CCC(CN4CCN(c5cc6c(cc5F)C(=O)N(C5CCC(=O)NC5=O)C6=O)CC4)CC3)nc2)C(C)(C)[C@H]1Oc1ccc(C#N)c(Cl)c1]

As used herein, "Compound D", refers to a compound with the following structure:

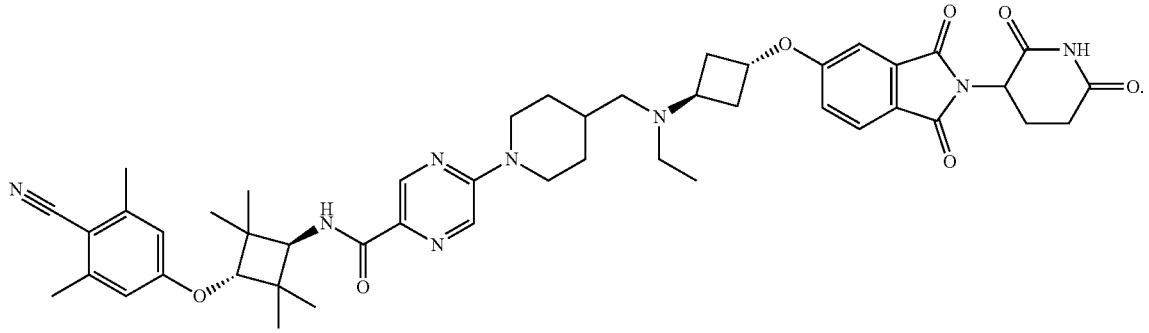 [SMILES: CCN(CC1CCN(c2cnc(C(=O)N[C@H]3C(C)(C)[C@H](Oc4cc(C)c(C#N)c(C)c4)C3(C)C)cn2)CC1)[C@H]1C[C@H](Oc2ccc3c(c2)C(=O)N(C2CCC(=O)NC2=O)C3=O)C1]

As used herein, "Compound E", refers to a compound with the following structure:

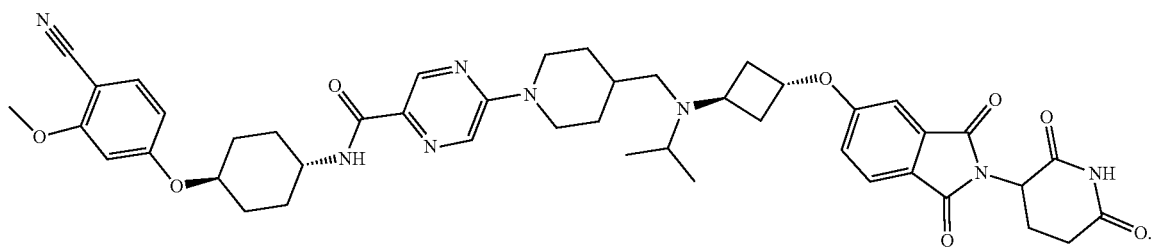 [SMILES: COc1cc(O[C@H]2CC[C@H](NC(=O)c3cnc(N4CCC(CN(C(C)C)[C@H]5C[C@H](Oc6ccc7c(c6)C(=O)N(C6CCC(=O)NC6=O)C7=O)C5)CC4)cn3)CC2)ccc1C#N]

As used herein, "Compound F", refers to a compound with the following structure:

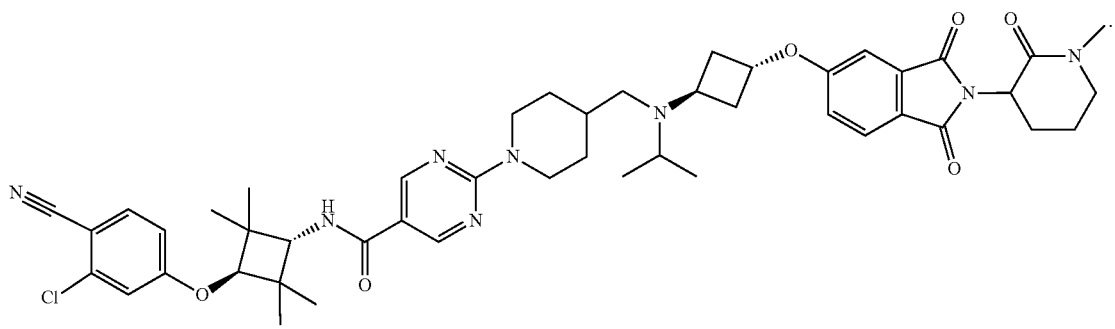 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCCN(C)C2=O)C3=O)C1]

Compound F is a modified version of Compound A that does not bind the cereblon (CRBN) E3 Ubiquitin Ligase.

As used herein, "R1881", i.e.: (8S,13S,14S,17S)-17-hydroxy-13,17-dimethyl-1,2,6,7,8,14,15,16-octahydrocyclopenta[a]phenanthren-3-one, is a synthetic AR agonist that is also known as metribolone or methyltrienolone. The structure of R1881 is:

"Comprising" or "comprises" as applied to a particular dosage form, composition, use, method or process described or claimed herein means that the dosage form, composition, use, method, or process includes all of the recited elements in a specific description or claim but does not exclude other elements. "Consists essentially of" and "consisting essentially of" means that the described or claimed composition, dosage form, method, use, or process does not exclude other materials or steps that do not materially affect the recited physical, pharmacological, pharmacokinetic properties or therapeutic effects of the composition, dosage form, method, use, or process. "Consists of" and "consisting of" means the exclusion of more than trace elements of other ingredients and substantial method or process steps.

"Fasted condition" or "fasted state" as used to describe a subject means the subject has not eaten for at least 4 hours before a time point of interest, such as the time of administering a compound of the disclosure (preferably Compound A or a pharmaceutically acceptable salt thereof). In an embodiment, a subject in the fasted state has not eaten for at least any of 6, 8, 10 or 12 hours prior to administration of a compound of the disclosure (preferably Compound A or a pharmaceutically acceptable salt thereof).

"Fed condition" or "fed state" as used to describe a subject herein means the subject has eaten less than 4 hours before a time point of interest, such as the time of administering a compound of the disclosure (preferably Compound A or a pharmaceutically acceptable salt thereof). In an embodiment, a subject in the fed state has eaten within at least any of 3, 2, 1 or 0.5 hours prior to administration of a compound of the disclosure (preferably Compound A or a pharmaceutically acceptable salt thereof).

The articles "a" and "an" are used in this disclosure to refer to one or more than one (i.e., to at least one) of the grammatical object of the article. By way of example, "an element" means one element or more than one element.

The term "and/or" is used in this disclosure to mean either "and" or "or" unless indicated otherwise.

The terms "patient" and "subject" are used interchangeably herein, and refer to a mammal, e.g., a human, mouse, rat, guinea pig, dog, cat, horse, cow, pig, or non-human primate, such as a monkey, chimpanzee, baboon or rhesus.

The term "bioactive agent", as used herein, refers to a compound or agent other than Compound A that treats or prevents SBMA and/or a symptom of SBMA.

In some embodiments, the subject is a human. In some embodiments, the subject is male.

In some embodiments, the subject is a human who has been diagnosed with spinal and bulbar muscular atrophy (SBMA).

Methods of Ubiquitinating/Degrading a Target Protein in a Cell

The present disclosure provides a method of ubiquitinating/degrading a target protein in a cell. The method comprises administering a Compound A, or a pharmaceutically acceptable salt thereof, which comprises an E3 ubiquitin ligase binding moiety and a protein targeting moiety, linked through a linker moiety, as otherwise described herein, wherein the E3 ubiquitin ligase binding moiety is coupled to the protein targeting moiety and wherein the E3 ubiquitin ligase binding moiety recognizes a ubiquitin pathway protein (e.g., an ubiquitin ligase, preferably an E3 ubiquitin ligase) and the protein targeting moiety recognizes the target protein such that degradation of the target protein will occur when the target protein is placed in proximity to the ubiquitin ligase, thus resulting in degradation/inhibition of the effects of the target protein and the control of protein levels. The control of protein levels afforded by the present disclosure provides treatment of a disease state or condition, which is modulated through the target protein by lowering the level of that protein in the cells of a patient.

As understood by the skilled artisan, AR has a modular structure comprising three functional domains: the N-terminal transcriptional regulation domain, the DNA-binding domain, and the ligand binding domain (MacLean H E, et al J. Steroid Biochem Mol Biol. (1997) 62:233-42). The DNA-binding domain is linked to the ligand-binding domain via a hinge. The AR ligand binding domain refers to the functional domain of human AR that folds to form a hydrophobic pocket that binds to the AR cognate hormone ligand (e.g., androgen).

Moreover, it is understood in the art that AR is 920 amino acid residues in length, wherein the N-terminal transcriptional regulation domain extends from amino acid residue 1 to about amino acid residue 559, the DNA-binding domain extends from about amino acid residue 560 to about amino acid residue 624, the hinge extends from about amino acid residue 625 to about amino acid residue 676, and the ligand binding domain extends from about amino acid residue 677 to about amino acid residue 920. A suitable AR reference sequence is set forth by SEQ ID NO: 1 and identified in the UniProt database as P10275 (ANDR_HUMAN). The gene encoding AR ("the AR gene") is approximately 90 kb and has chromosomal coordinates 67544021-67730619 according to human reference genome GRCh38.p13. The AR gene contains 8 exons, with exon 1 encoding the N-terminal transcriptional regulation domain; exon 2-3 encoding the DNA-binding domain; and exons 4-8 encoding the hinge and ligand binding domain (Jenster, et al (1992) J. Steroid Biochem. Mol. Biol. 41:671-75).

In one aspect, this application provides Compound A, or a pharmaceutically acceptable salt thereof, that degrades the androgen receptor (AR) protein. In some embodiments, the AR that is degraded by Compound A, or a pharmaceutically acceptable salt thereof, is wild type AR. In some embodiments, the AR that is degraded by Compound A, or a pharmaceutically acceptable salt thereof, is a mutant form of AR. In some embodiments, the AR mutation comprises >36 consecutive base pairs cytosine, adenine, guanine (CAG) repeated in the gene coding for AR resulting in a polyglutamine (polyQ) expansion.

In some embodiments, the present disclosure is directed to a method of treating a patient in need for a disease state or condition modulated through a protein where the degradation of that protein will produce a therapeutic effect in that patient, the method comprising administering to a patient in need an effective amount of Compound A or a pharmaceutically acceptable salt thereof, optionally in combination with an additional bioactive agent. The disease state or condition may be a disease caused by a microbial agent or other exogenous agent such as a virus, bacteria, fungus, protozoa, or other microbe or may be a disease state caused by overexpression of a protein, which leads to a disease state and/or condition.

Methods of Treatment

In one aspect, the present application relates to a method of treating spinal and bulbar muscular atrophy (SBMA) comprising administering to a subject in need thereof an effective amount of Compound A, or a pharmaceutically acceptable salt or solvate thereof.

In one aspect, the present application relates to a method of preventing SBMA comprising administering to a subject in need thereof an effective amount of Compound A, or a pharmaceutically acceptable salt or solvate thereof.

In one aspect, the present application relates to a method of treating and/or preventing SBMA comprising administering to a subject in need thereof an effective amount of Compound A, or a pharmaceutically acceptable salt thereof.

In one aspect, the present application relates to a method of treating and/or preventing SBMA comprising administering to a subject in need thereof an effective amount of Compound A or a pharmaceutically acceptable salt or solvate, thereof, in combination with one or more additional bioactive agents.

In one aspect, the present application relates to a method of treating and/or preventing SBMA comprising administering to a subject in need thereof an effective amount of Compound A.

The present disclosure relates to a method of treating spinal and bulbar muscular atrophy (SBMA) in a subject in need thereof, comprising administering to the subject an effective amount of Compound A:

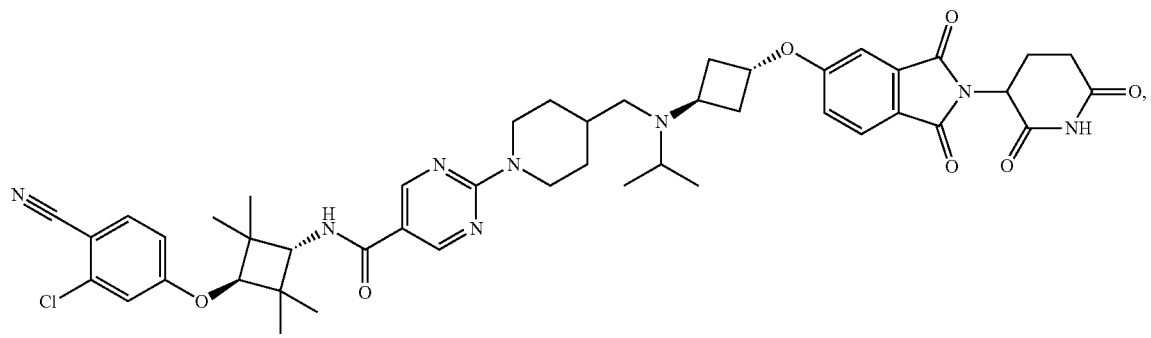 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

The present disclosure relates to a method of treating spinal and bulbar muscular atrophy (SBMA) in a subject in need thereof, comprising administering to the subject an effective amount of Compound A:

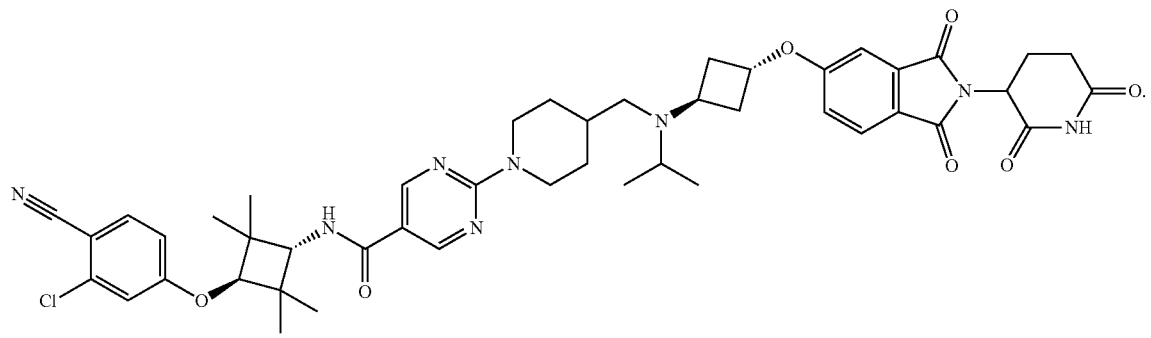 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

The present disclosure relates to Compound A,

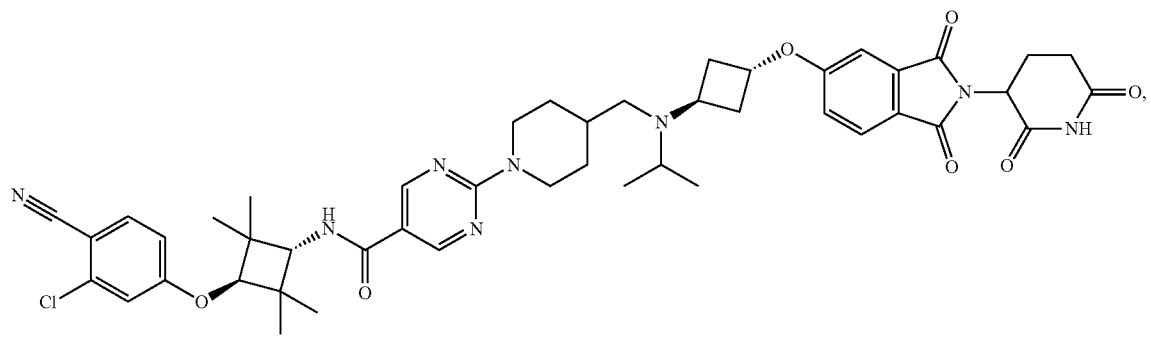 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for use in a method of treating spinal and bulbar muscular atrophy (SBMA) in a subject in need thereof, wherein the method comprises administering to the subject an effective amount of Compound A, or a pharmaceutically acceptable salt thereof.

The present disclosure relates to Compound A,

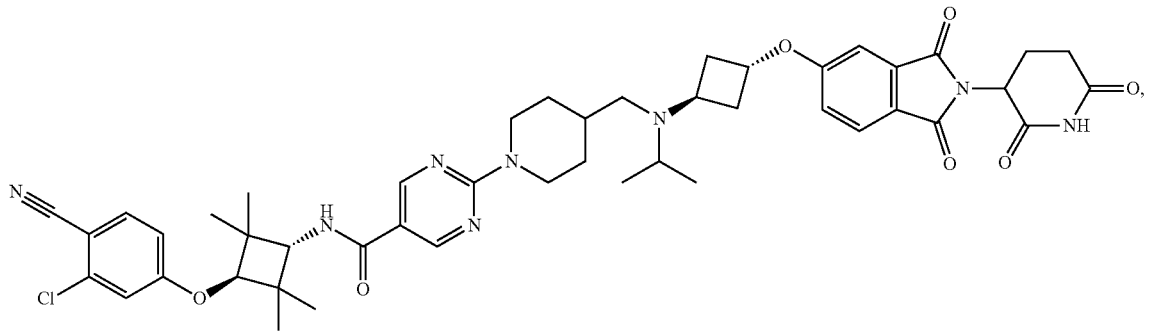 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

for use in a method of treating spinal and bulbar muscular atrophy (SBMA) in a subject in need thereof, wherein the method comprises administering to the subject an effective amount of Compound A.

The present disclosure relates to a use of Compound A,

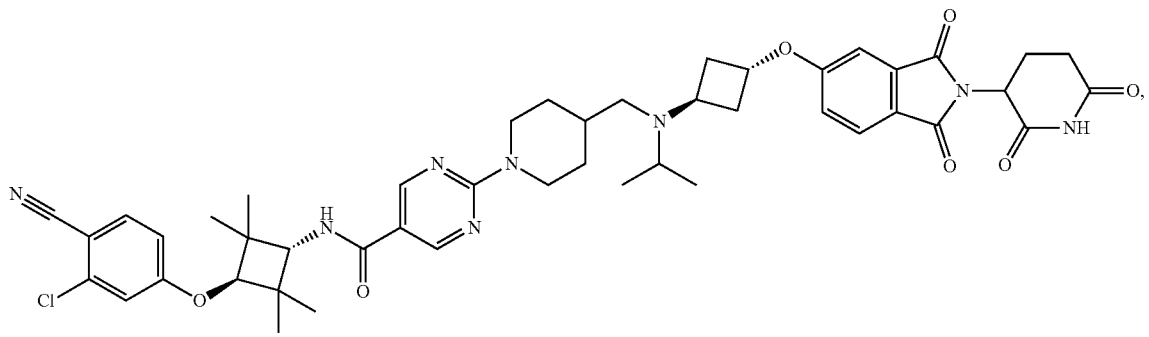 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating spinal and bulbar muscular atrophy (SBMA), wherein the medicament comprises an effective amount of Compound A, or a pharmaceutically acceptable salt thereof, and the medicament is administered to a subject in need thereof.

The present disclosure relates to a use of Compound A,

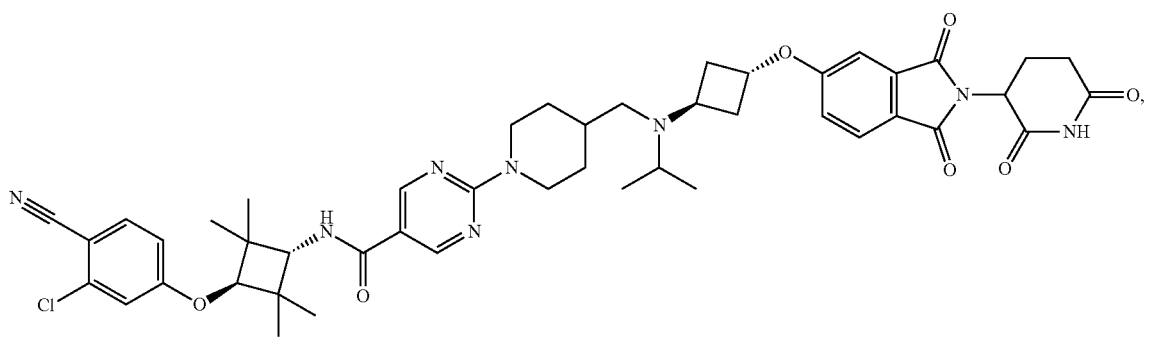 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

for the preparation of a medicament for treating spinal and bulbar muscular atrophy (SBMA), wherein the medicament comprises an effective amount of Compound A and the medicament is administered to a subject in need thereof.

The present disclosure relates to a method of treating spinal and bulbar muscular atrophy (SBMA) in a subject in need thereof, comprising administering to the subject about 1 mg to about 500 mg of Compound A:

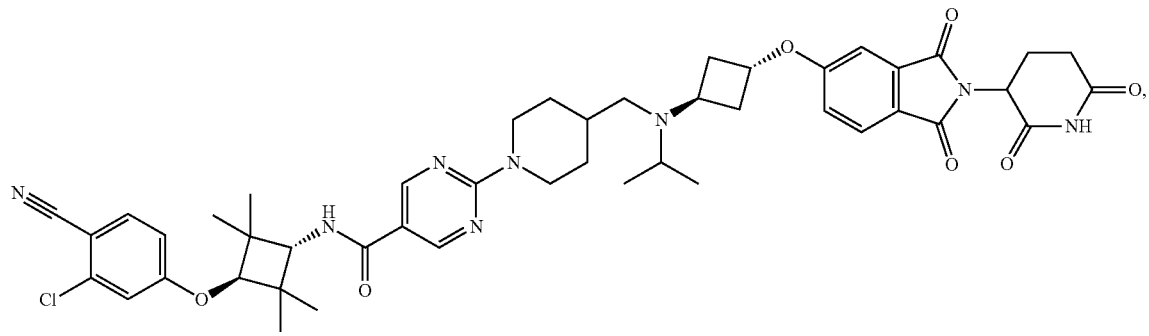 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

The present disclosure relates to a method of treating spinal and bulbar muscular atrophy (SBMA) in a subject in need thereof, comprising administering to the subject about 1 mg to about 500 mg of Compound A:

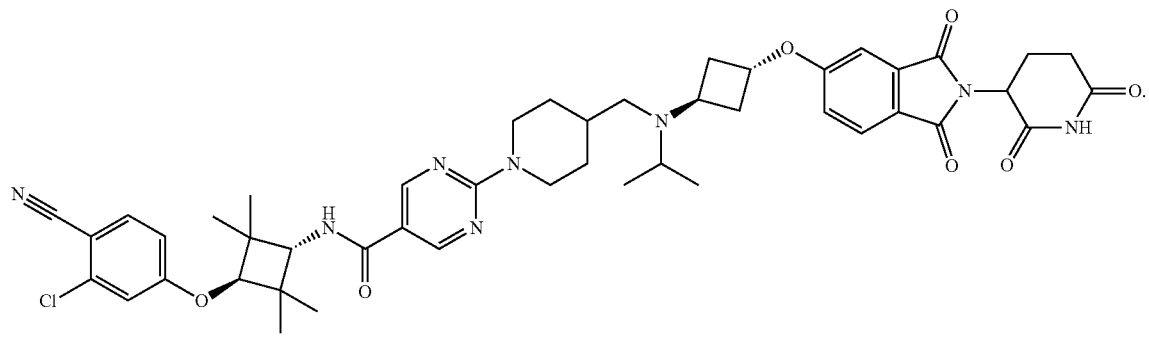 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

The present disclosure relates to Compound A,

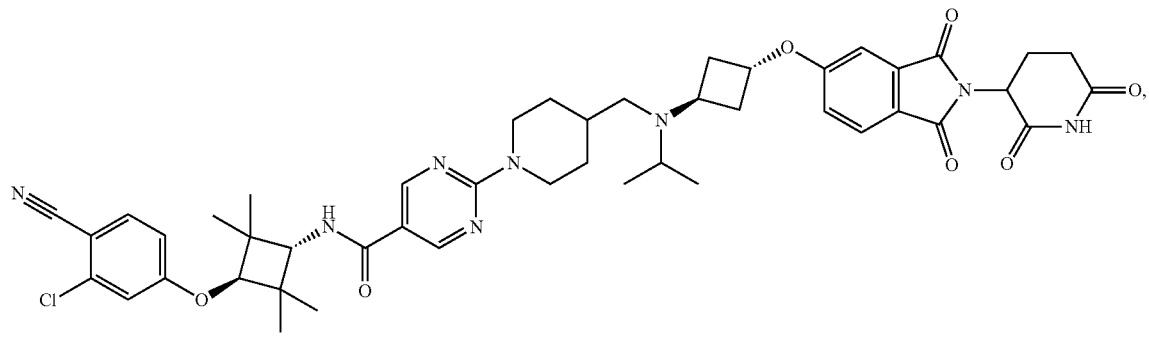 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for use in a method of treating spinal and bulbar muscular atrophy (SBMA) in a subject in need thereof, wherein the method comprises administering to the subject about 1 mg to about 500 mg of Compound A, or a pharmaceutically acceptable salt thereof.

The present disclosure relates to Compound A,

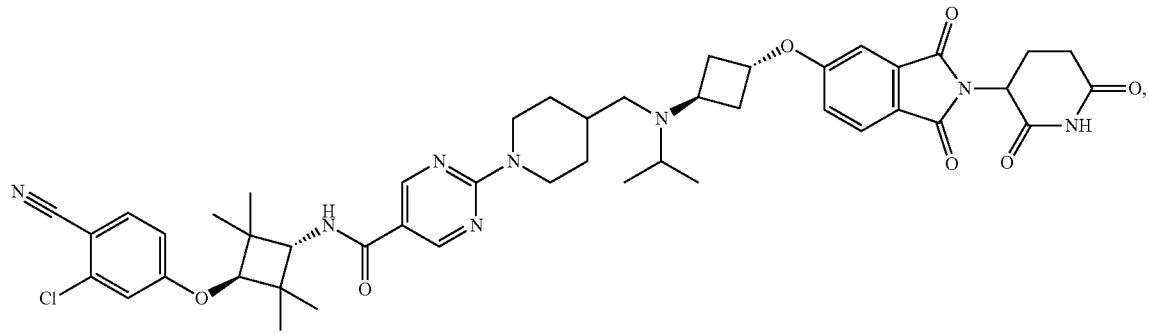 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

for use in a method of treating spinal and bulbar muscular atrophy (SBMA) in a subject in need thereof, wherein the method comprises administering to the subject about 1 mg to about 500 mg of Compound A.

The present disclosure relates to a use of Compound A,

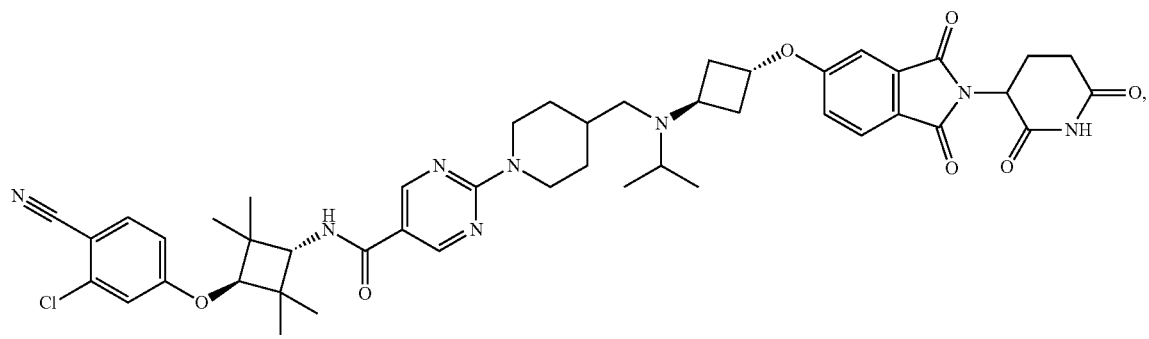 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating spinal and bulbar muscular atrophy (SBMA), wherein the medicament comprises about 1 mg to about 500 mg of Compound A, or a pharmaceutically acceptable salt thereof, and the medicament is administered to a subject in need thereof.

The present disclosure relates to a use of Compound A,

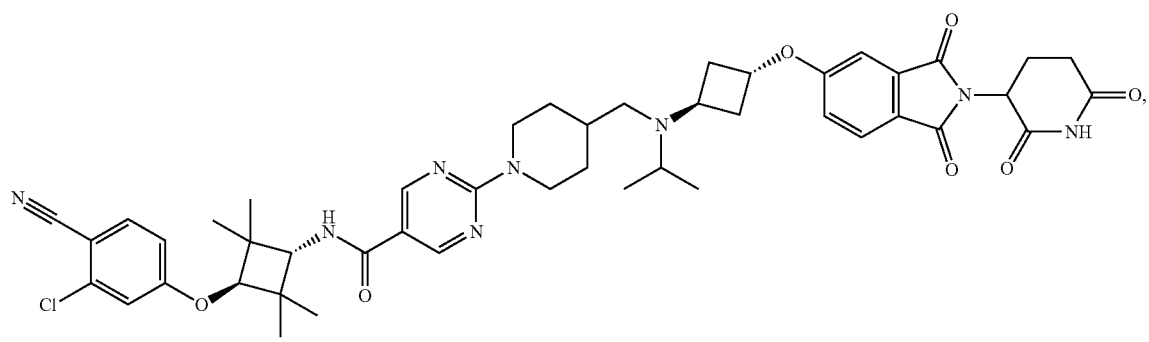 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

for the preparation of a medicament for treating spinal and bulbar muscular atrophy (SBMA), wherein the medicament comprises about 1 mg to about 500 mg of Compound A, and the medicament is administered to a subject in need thereof.

The present disclosure relates to a method of treating a symptom of spinal and bulbar muscular atrophy (SBMA) in a subject in need thereof, comprising administering to the subject an effective amount of Compound A:

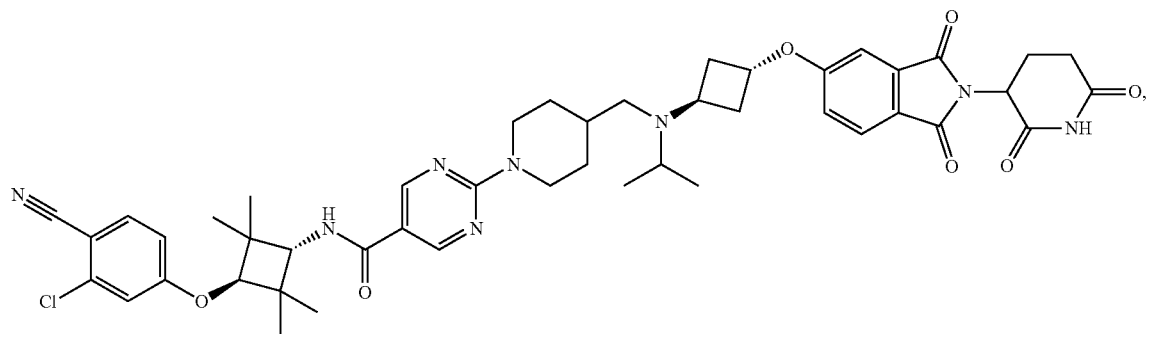 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

The present disclosure relates to a method of treating a symptom of spinal and bulbar muscular atrophy (SBMA) in a subject in need thereof, comprising administering to the subject an effective amount of Compound A:

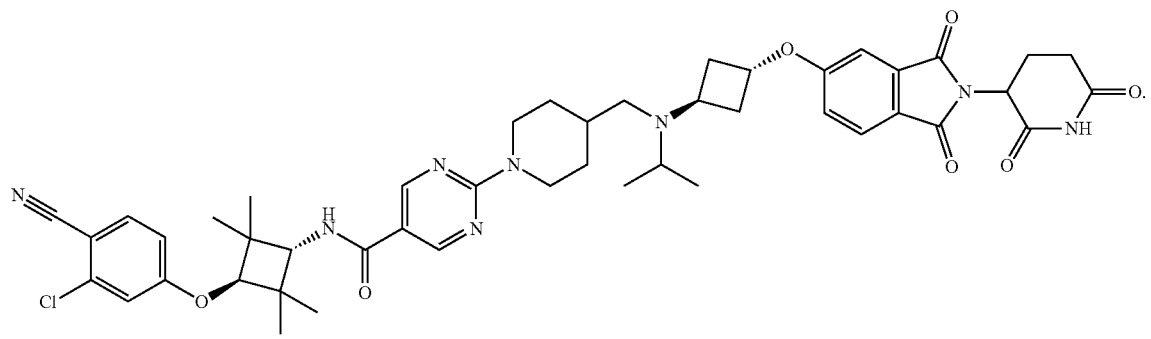 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

The present disclosure relates to Compound A,

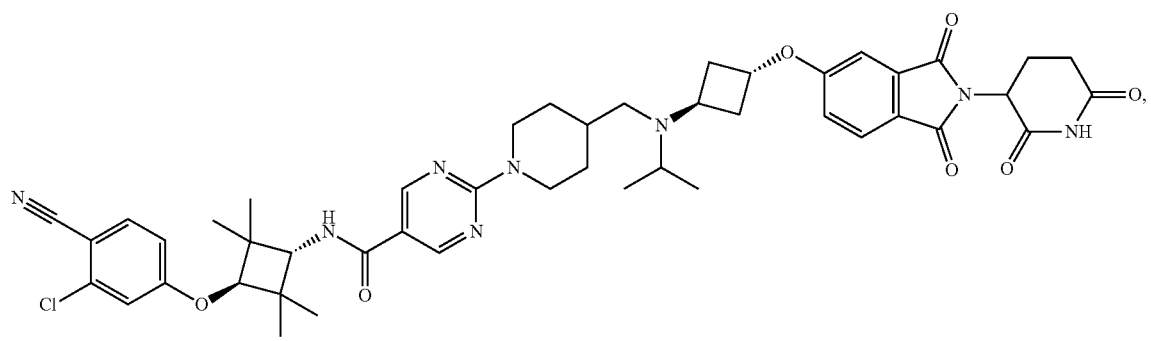 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for use in a method of treating a symptom of spinal and bulbar muscular atrophy (SBMA) in a subject in need thereof, wherein the method comprises administering to the subject an effective amount of Compound A, or a pharmaceutically acceptable salt thereof.

The present disclosure relates to Compound A,

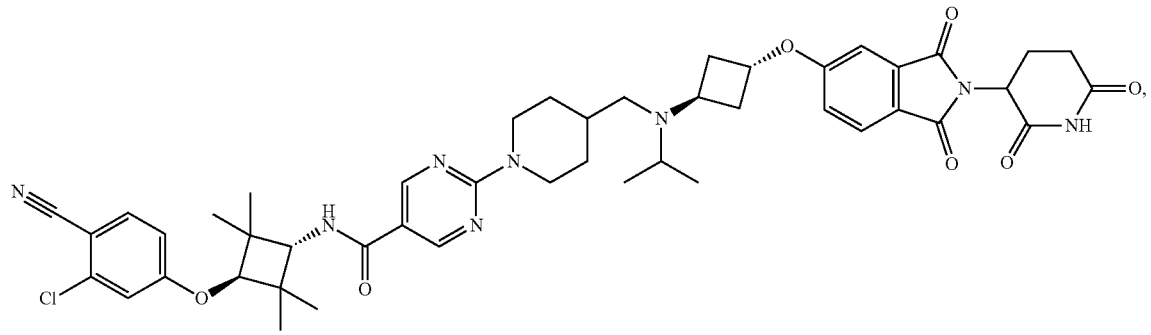 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

for use in a method of treating a symptom of spinal and bulbar muscular atrophy (SBMA) in a subject in need thereof, wherein the method comprises administering to the subject an effective amount of Compound A.

The present disclosure relates to a use of Compound A,

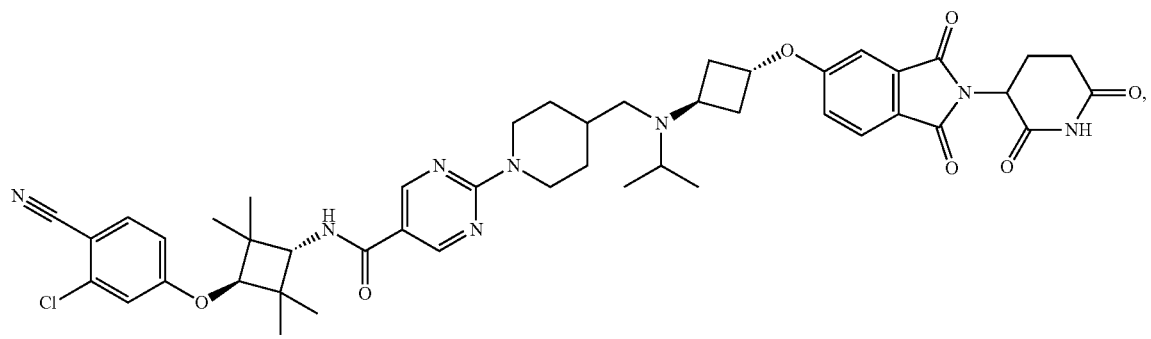 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating a symptom of spinal and bulbar muscular atrophy (SBMA), wherein the medicament comprises an effective amount of Compound A, or a pharmaceutically acceptable salt thereof, and the medicament is administered to a subject in need thereof.

The present disclosure relates to a use of Compound A,

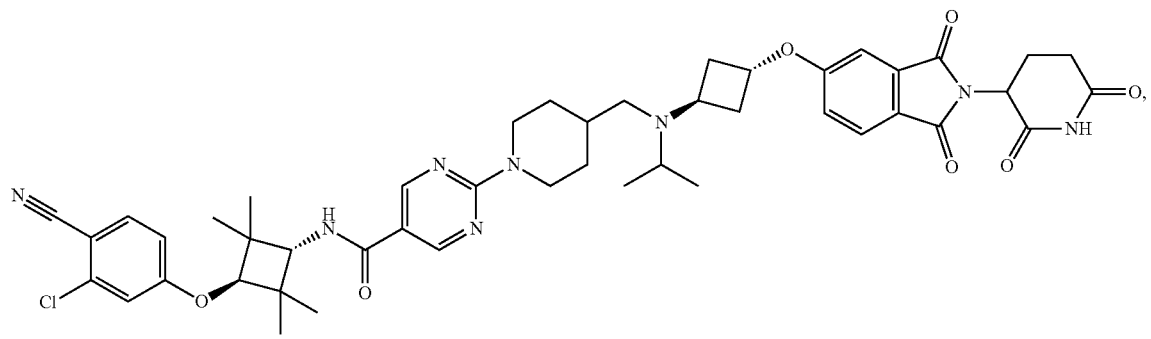 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

for the preparation of a medicament for treating a symptom of spinal and bulbar muscular atrophy (SBMA), wherein the medicament comprises an effective amount of Compound A, and the medicament is administered to a subject in need thereof.

The present disclosure relates to a method of treating a symptom of spinal and bulbar muscular atrophy (SBMA) in a subject in need thereof, comprising administering to the subject about 1 mg to about 500 mg of Compound A:

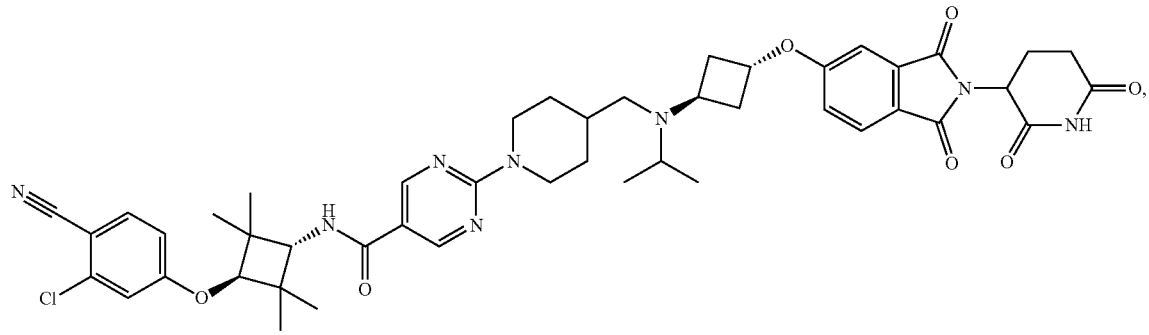 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

The present disclosure relates to a method of treating a symptom of spinal and bulbar muscular atrophy (SBMA) in a subject in need thereof, comprising administering to the subject about 1 mg to about 500 mg of Compound A:

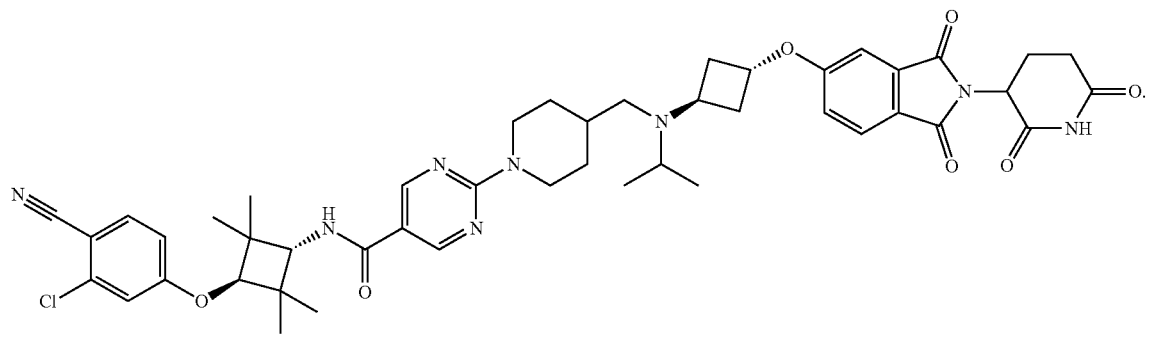 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

The present disclosure relates to Compound A,

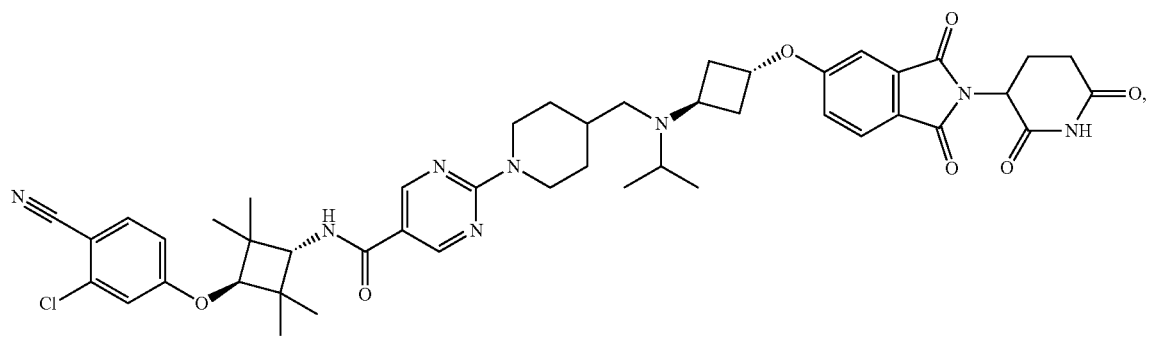 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for use in a method of treating a symptom of spinal and bulbar muscular atrophy (SBMA) in a subject in need thereof, wherein the method comprises administering to the subject about 1 mg to about 500 mg of Compound A, or a pharmaceutically acceptable salt thereof.

The present disclosure relates to Compound A,

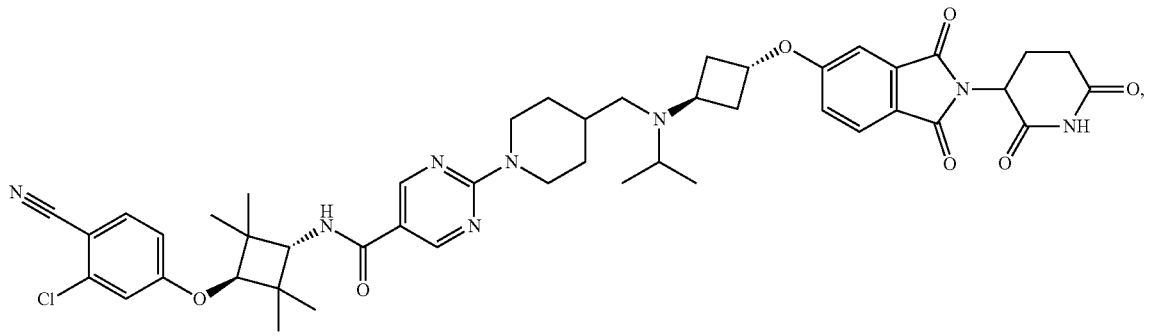 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

for use in a method of treating a symptom of spinal and bulbar muscular atrophy (SBMA) in a subject in need thereof, wherein the method comprises administering to the subject about 1 mg to about 500 mg of Compound A.

The present disclosure relates to a use of Compound A,

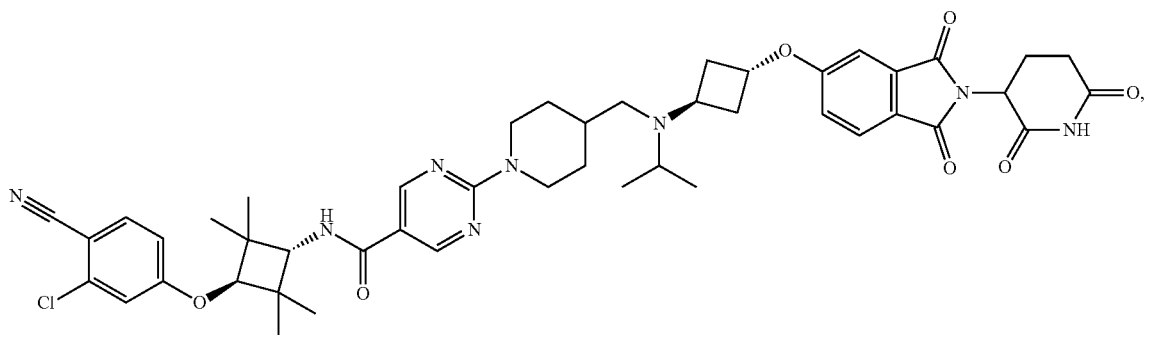 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating a symptom of spinal and bulbar muscular atrophy (SBMA), wherein the medicament comprises about 1 mg to about 500 mg of Compound A, or a pharmaceutically acceptable salt thereof, and the medicament is administered to a subject in need thereof.

The present disclosure relates to a use of Compound A,

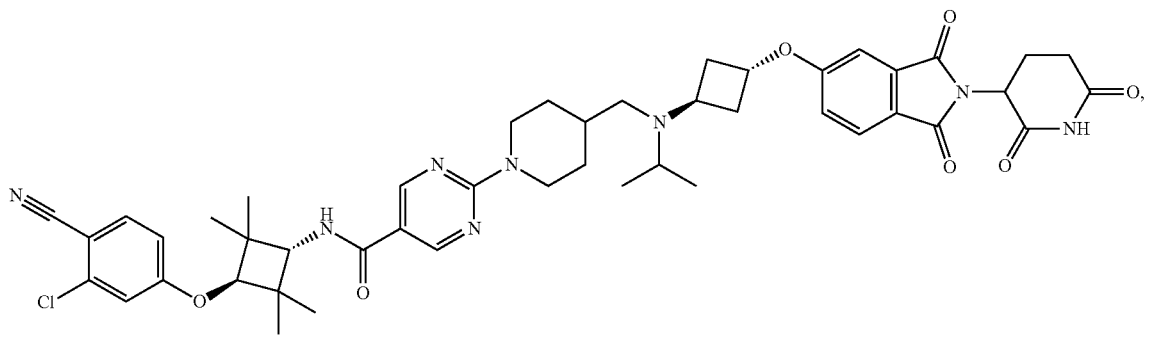 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

for the preparation of a medicament for treating a symptom of spinal and bulbar muscular atrophy (SBMA), wherein the medicament comprises about 1 mg to about 500 mg of Compound A, and the medicament is administered to a subject in need thereof.

The present disclosure relates to a method of treating or preventing spinal and bulbar muscular atrophy (SBMA) in a subject in need thereof, comprising administering to the subject an effective amount of Compound A

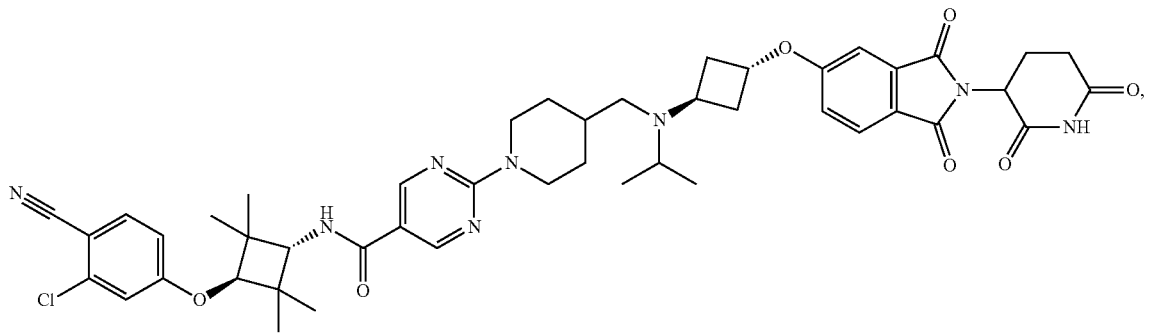 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

The present disclosure relates to Compound A,

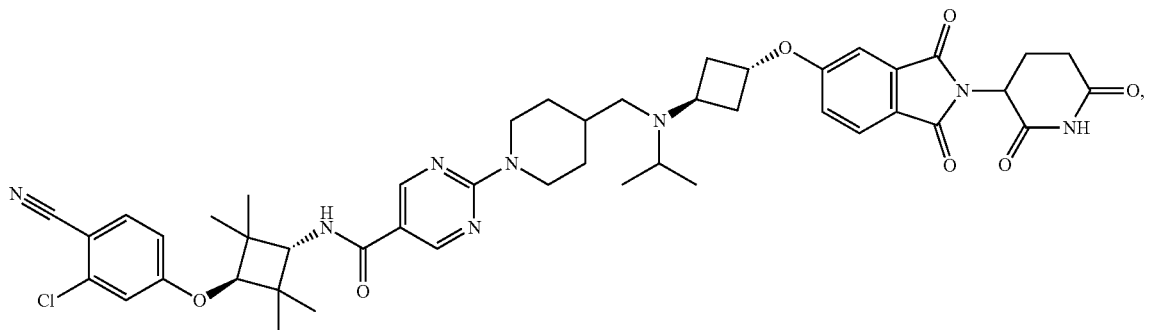

or a pharmaceutically acceptable salt thereof, for use in a method of treating or preventing spinal and bulbar muscular atrophy (SBMA) in a subject in need thereof, wherein the method comprises administering to the subject an effective amount of Compound A, or a pharmaceutically acceptable salt thereof.

The present disclosure relates to a use of Compound A,

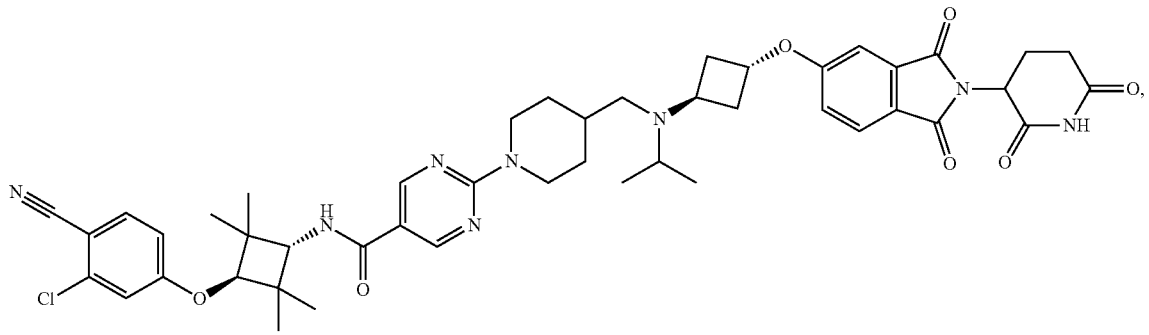 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating or preventing spinal and bulbar muscular atrophy (SBMA), wherein the medicament comprises an effective amount of Compound A, or a pharmaceutically acceptable salt thereof, and the medicament is administered to a subject in need thereof.

The present disclosure relates to a method of treating or preventing a symptom of spinal and bulbar muscular atrophy (SBMA) in a subject in need thereof, comprising administering to the subject an effective amount of Compound A:

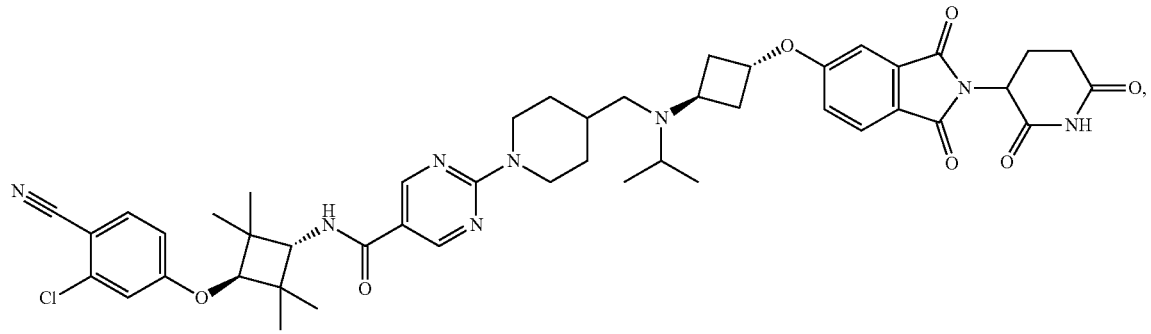 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

The present disclosure relates to Compound A,

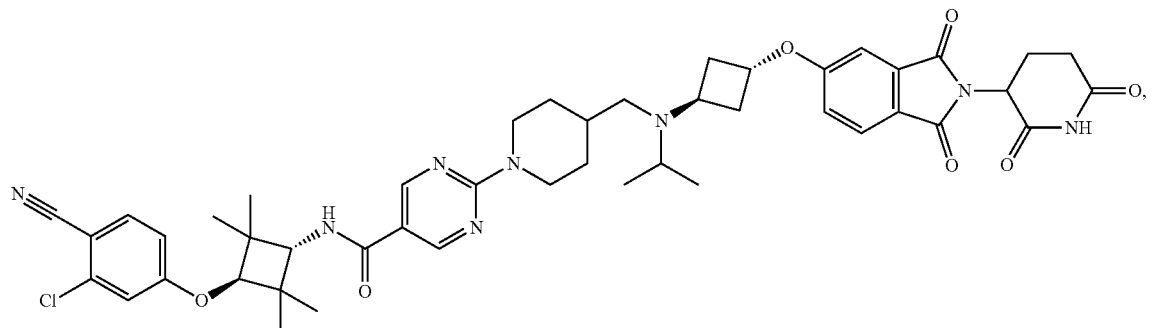

or a pharmaceutically acceptable salt thereof, for use in a method of treating or preventing a symptom of spinal and bulbar muscular atrophy (SBMA) in a subject in need thereof, wherein the method comprises administering to the subject an effective amount of Compound A, or a pharmaceutically acceptable salt thereof.

The present disclosure relates to a use of Compound A,

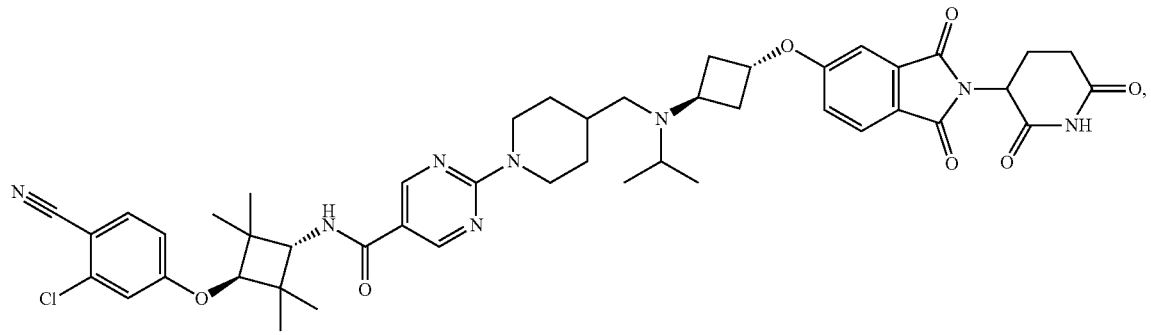 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating or preventing a symptom of spinal and bulbar muscular atrophy (SBMA), wherein the medicament comprises an effective amount of Compound A, or a pharmaceutically acceptable salt thereof, and the medicament is administered to a subject in need thereof.

In some embodiments, the symptom of SBMA is fatigue, muscle cramps, weakness in the limbs, difficulty in chewing, difficulty in swallowing, difficulty speaking, diminished deep tendon reflexes, lack of pathological reflexes, diminished vibration sensation in legs, erectile dysfunction, reduced fertility, gynecomastia, testicular atrophy, glucose resistance, hyperlipidemia, fatty liver disease, or a combination thereof. In some embodiments, two or more of symptoms are treated or prevented. In some embodiments, three or more of symptoms are treated or prevented.

In some embodiments, the symptom of SBMA is fatigue.

In some embodiments, the symptom of SBMA is muscle cramps.

In some embodiments, the symptom of SBMA is weakness in the limbs.

In some embodiments, the symptom of SBMA is difficulty in chewing.

In some embodiments, the symptom of SBMA is difficulty in swallowing.

In some embodiments, the symptom of SBMA is difficulty speaking.

In some embodiments, the symptom of SBMA is diminished deep tendon reflexes.

In some embodiments, the symptom of SBMA is lack of pathological reflexes.

In some embodiments, the symptom of SBMA is lack of diminished vibration sensation in legs.

In some embodiments, the symptom of SBMA is erectile dysfunction.

In some embodiments, the symptom of SBMA is reduced fertility.

In some embodiments, the symptom of SBMA is gynecomastia.

In some embodiments, the symptom of SBMA is testicular atrophy.

In some embodiments, the symptom of SBMA is glucose resistance.

In some embodiments, the symptom of SBMA is lack of hyperlipidemia.

In some embodiments, the symptom of SBMA is fatty liver disease.

Compound A, or a pharmaceutically acceptable salt thereof, may be administered in single or divided doses orally, parenterally, topically, intramuscularly, intravenously, subcutaneously, transdermally, buccally, sublingually, or by suppository.

In some embodiments, Compound A, or a pharmaceutically acceptable salt thereof, is administered orally. In some embodiments, Compound A is administered to the subject orally.

In some embodiments, Compound A, or a pharmaceutically acceptable salt thereof, is administered to the subject orally in the form of a tablet.

In some embodiments, Compound A, or a pharmaceutically acceptable salt thereof, is administered to the subject orally as a solution.

The effective amount of Compound A, or a pharmaceutically acceptable salt thereof, may be administered one or more times over a day for up to 30 or more days, followed by 1 or more days of non-administration of the compound. This type of treatment schedule, i.e., administration of Compound A on consecutive days followed by non-administration of Compound A on consecutive days may be referred to as a treatment cycle. A treatment cycle may be repeated as many times as necessary to achieve the intended affect.

In some embodiments, the effective amount of Compound A, or a pharmaceutically acceptable salt thereof, is between 1 mg and about 1,000 mg administered to the subject once, twice, three times, four times, or more daily for one, two, three, four, five, six, seven, eight, nine, ten, eleven, twelve, thirteen, fourteen, fifteen, twenty, twenty-five, thirty consecutive days, or, once, twice, three times, four times, or more daily, in single or divided doses, for 2 months, 3 months, 4 months, 5 months, 6 months, or longer.

In some embodiments, the effective amount of Compound A, or a pharmaceutically acceptable salt thereof, is between 1 mg and about 1,000 mg administered to the subject once every two days, once every three days, once every four days, once every five days, once every six days, once every seven days, or less frequently, in single or divided doses, for 2 months, 3 months, 4 months, 5 months, 6 months, or longer.

In some embodiments, the effective amount of Compound A, or a pharmaceutically acceptable salt thereof, is administered orally.

In some embodiments, the effective amount of Compound A, or a pharmaceutically acceptable salt thereof, is administered once every four days.

In some embodiments, the effective amount of Compound A, or a pharmaceutically acceptable salt thereof, is administered once every three days.

In some embodiments, the effective amount of Compound A, or a pharmaceutically acceptable salt thereof, is administered once every two days.

In some embodiments, the effective amount of Compound A, or a pharmaceutically acceptable salt thereof, is administered once daily.

In some embodiments, the effective amount of Compound A, or a pharmaceutically acceptable salt thereof, is administered twice daily.

In some embodiments, the effective amount of Compound A, or a pharmaceutically acceptable salt thereof, is administered three times daily.

In some embodiments, the effective amount of Compound A, or a pharmaceutically acceptable salt thereof, is administered orally and once every four days.

In some embodiments, the effective amount of Compound A, or a pharmaceutically acceptable salt thereof, is administered orally and once every three days.

In some embodiments, the effective amount of Compound A, or a pharmaceutically acceptable salt thereof, is administered orally and once every two days.

In some embodiments, the effective amount of Compound A, or a pharmaceutically acceptable salt thereof, is administered orally and once daily.

In some embodiments, the effective amount of Compound A, or a pharmaceutically acceptable salt thereof, is administered orally and twice daily.

In some embodiments, the effective amount of Compound A, or a pharmaceutically acceptable salt thereof, is administered orally and three times daily.

In some embodiments, the effective amount of Compound A, or a pharmaceutically acceptable salt thereof, is administered to the subject all at once. In some embodiments, the effective amount of Compound A, or a pharmaceutically acceptable salt thereof, is administered to the subject in two portions (i.e., a divided dose). In some embodiments, the effective amount of Compound A, or a pharmaceutically acceptable salt thereof, is administered to the subject in three divided doses. In some embodiments, the effective amount of Compound A, or a pharmaceutically acceptable salt thereof, is administered to the subject in four divided doses. In some embodiments, the effective amount of Compound A, or a pharmaceutically acceptable salt thereof, is administered to the subject in five or more divided doses. In some embodiments, the portions of Compound A, or a pharmaceutically acceptable salt thereof, are administered to the subject at regular intervals throughout the day, for example, every 12 hours, every 8 hours, every 6 hours, every 5 hours, every 4 hours, etc.

The present disclosure relates to a method of treating or preventing spinal and bulbar muscular atrophy (SBMA) in a subject in need thereof, comprising administering to the subject about 1 mg to about 500 mg of Compound A:

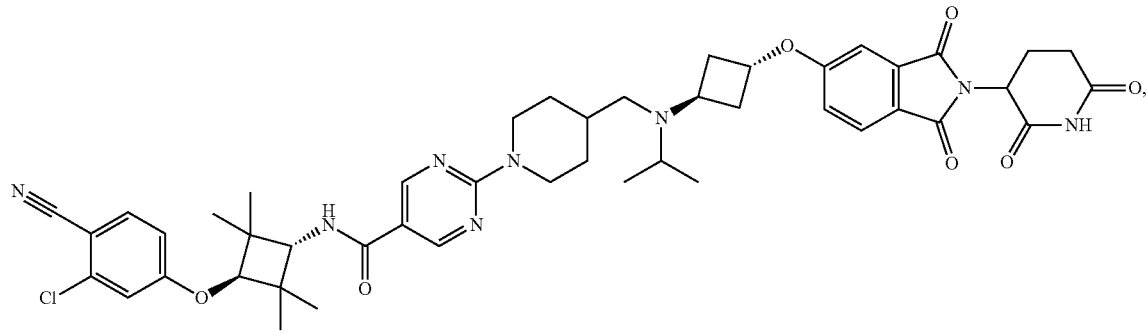 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

The present disclosure relates to Compound A,

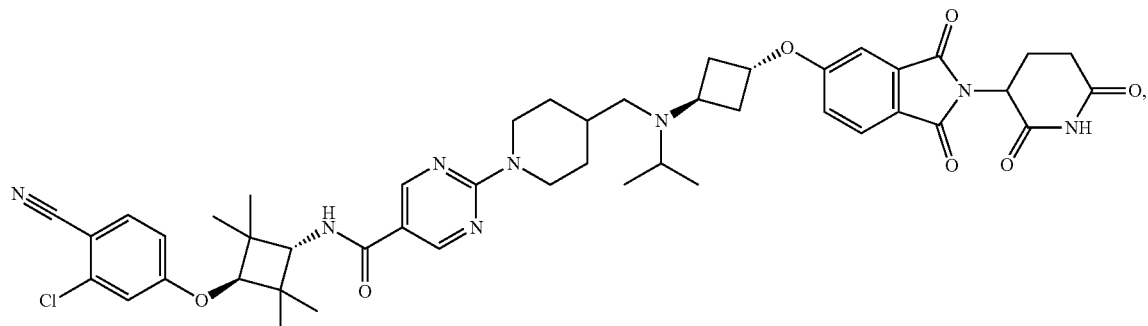

or a pharmaceutically acceptable salt thereof, for use in a method of treating or preventing spinal and bulbar muscular atrophy (SBMA) in a subject in need thereof, wherein the method comprises administering to the subject about 1 mg to about 500 mg of Compound A, or a pharmaceutically acceptable salt thereof.

The present disclosure relates to a use of Compound A,

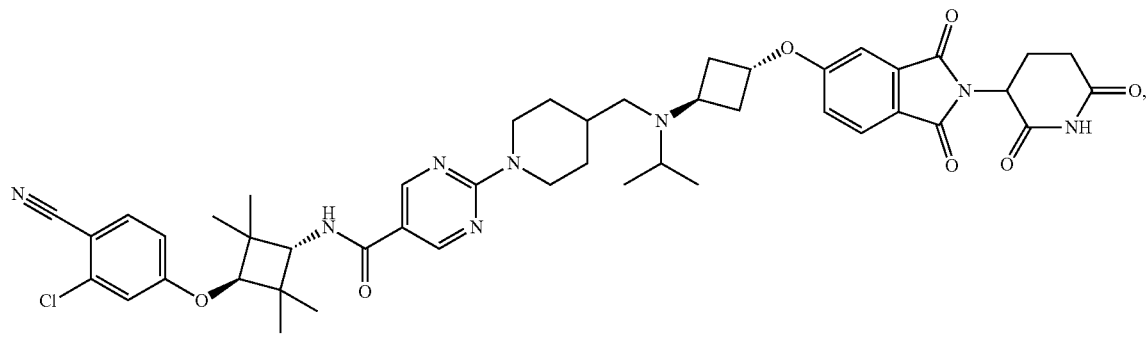 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating or preventing spinal and bulbar muscular atrophy (SBMA), wherein the medicament comprises about 1 mg to about 500 mg of Compound A, or a pharmaceutically acceptable salt thereof, and the medicament is administered to a subject in need thereof.

The present disclosure relates to a method of treating or preventing a symptom of spinal and bulbar muscular atrophy (SBMA) in a subject in need thereof, comprising administering to the subject about 1 mg to about 500 mg of Compound A:

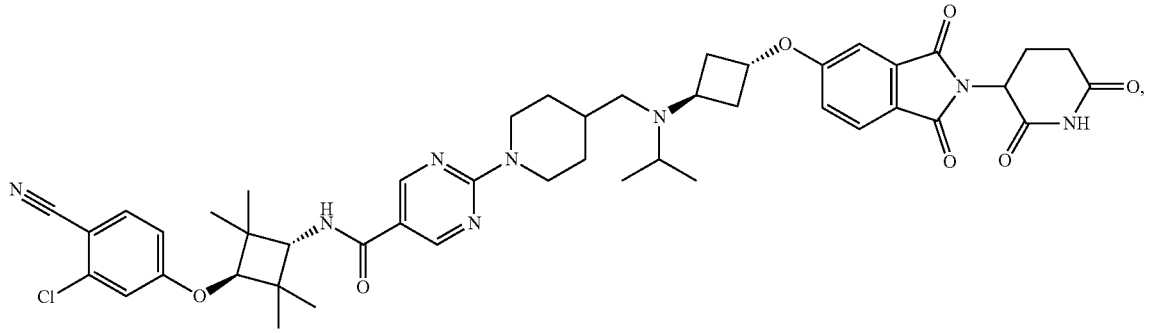 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

The present disclosure relates to Compound A,

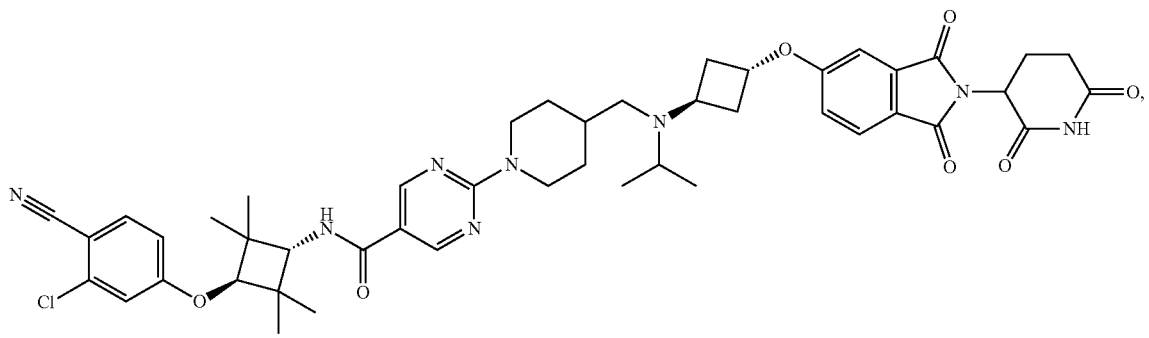 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for use in a method of treating or preventing a symptom of spinal and bulbar muscular atrophy (SBMA) in a subject in need thereof, wherein the method comprises administering to the subject about 1 mg to about 500 mg of Compound A, or a pharmaceutically acceptable salt thereof.

The present disclosure relates to a use of Compound A,

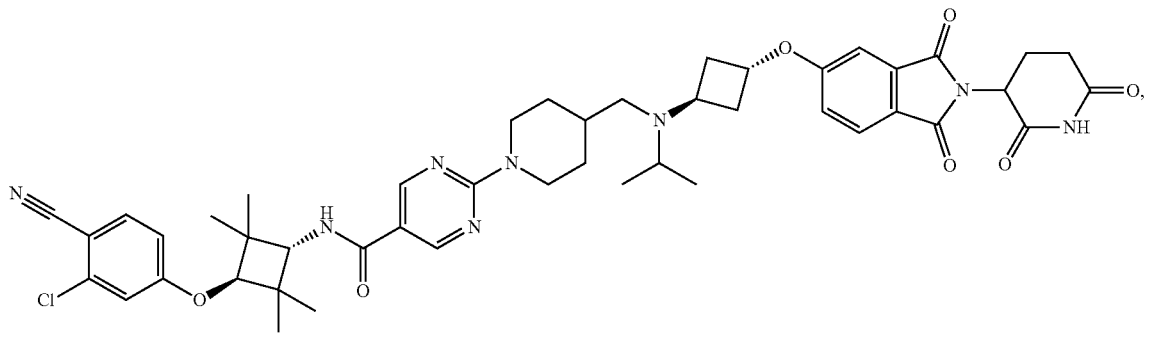 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating or preventing a symptom of spinal and bulbar muscular atrophy (SBMA), wherein the medicament comprises about 1 mg to about 500 mg of Compound A, or a pharmaceutically acceptable salt thereof, and the medicament is administered to a subject in need thereof.

The present disclosure relates to a method of treating or preventing spinal and bulbar muscular atrophy (SBMA) in a subject in need thereof, comprising administering to the subject about 30 mg to about 150 mg of Compound A:

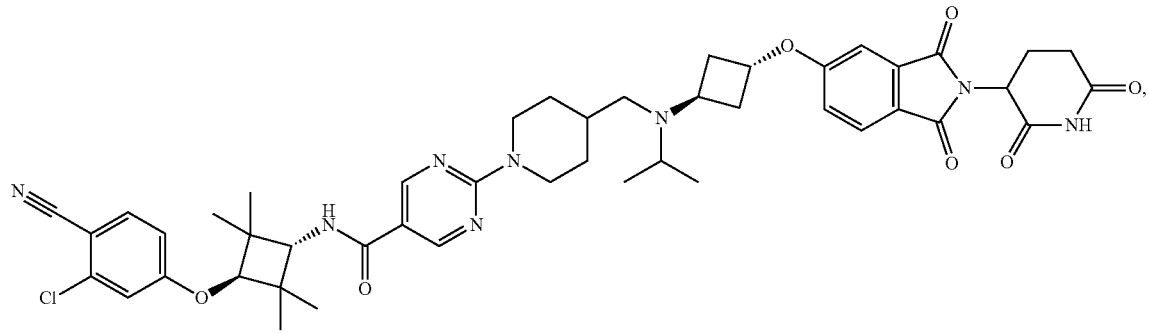 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

The present disclosure relates to Compound A,

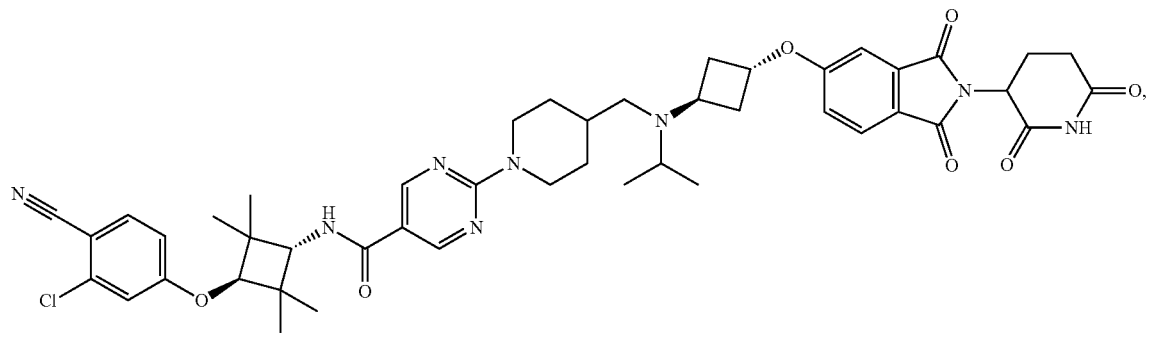 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for use in a method of treating or preventing spinal and bulbar muscular atrophy (SBMA) in a subject in need thereof, wherein the method comprises administering to the subject about 30 mg to about 150 mg of Compound A, or a pharmaceutically acceptable salt thereof.

The present disclosure relates to a use of Compound A,

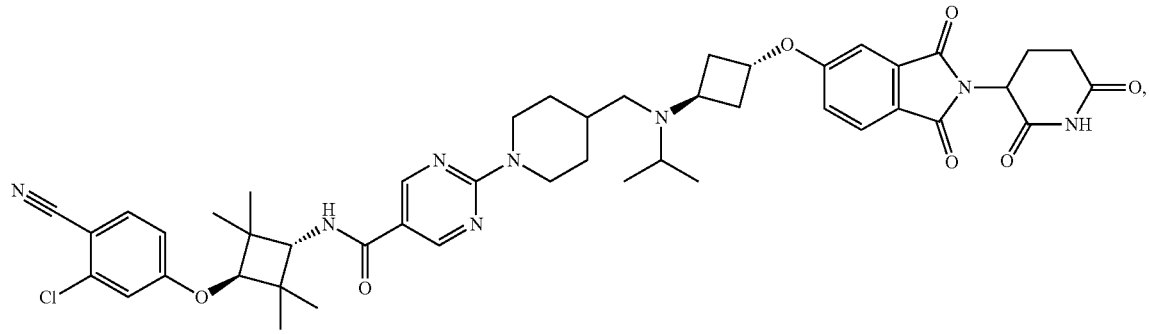 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating or preventing spinal and bulbar muscular atrophy (SBMA), wherein the medicament comprises about 30 mg to about 150 mg of Compound A, or a pharmaceutically acceptable salt thereof, and the medicament is administered to a subject in need thereof.

The present disclosure relates to a method of treating or preventing a symptom of spinal and bulbar muscular atrophy (SBMA) in a subject in need thereof, comprising administering to the subject about 30 mg to about 150 mg of Compound A:

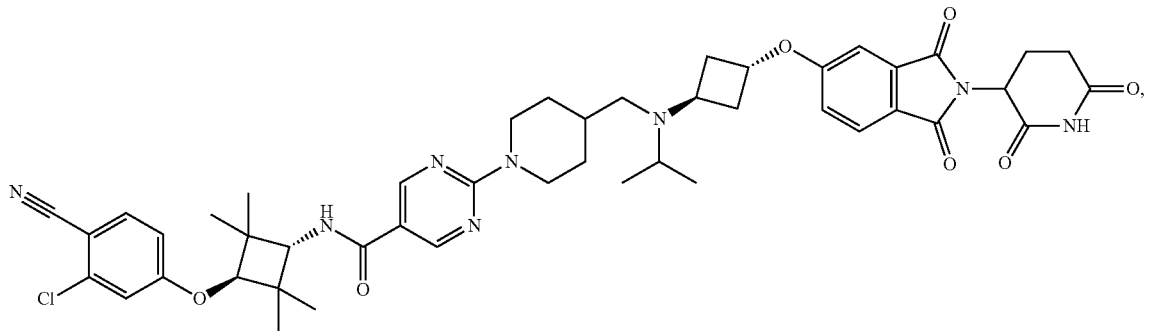 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

The present disclosure relates to Compound A,

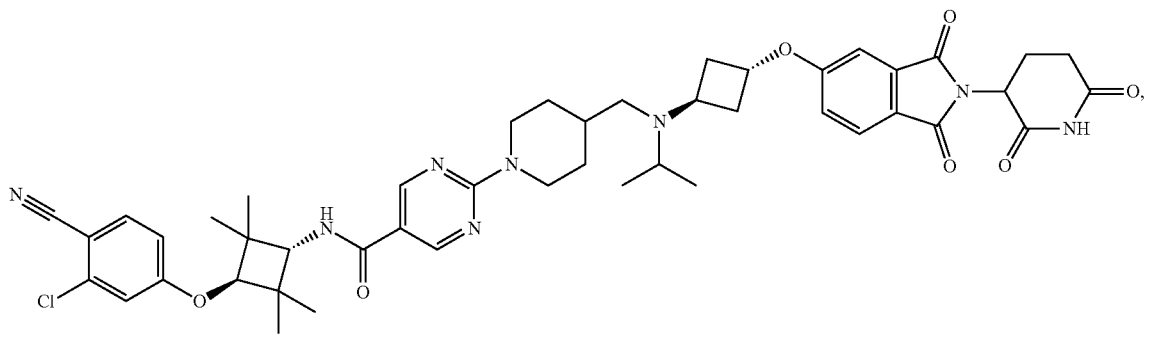 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for use in a method of treating or preventing a symptom of spinal and bulbar muscular atrophy (SBMA) in a subject in need thereof, wherein the method comprises administering to the subject about 30 mg to about 150 mg of Compound A, or a pharmaceutically acceptable salt thereof.

The present disclosure relates to a use of Compound A,

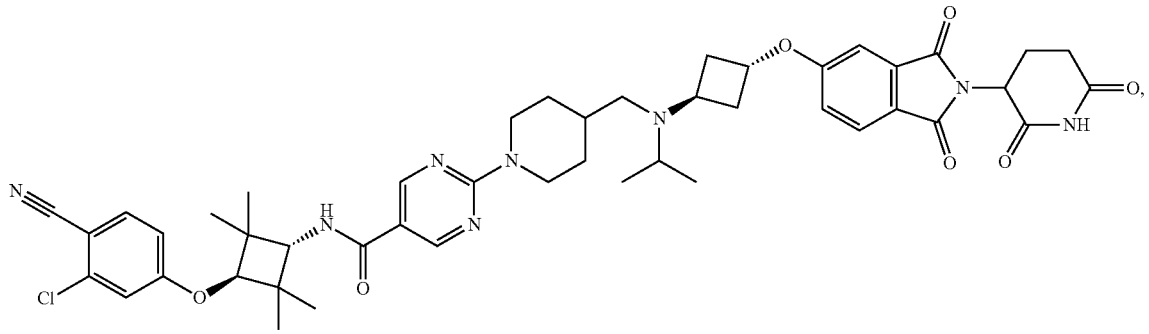 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating or preventing a symptom of spinal and bulbar muscular atrophy (SBMA), wherein the medicament comprises about 30 mg to about 150 mg of Compound A, or a pharmaceutically acceptable salt thereof, and the medicament is administered to a subject in need thereof.

The present disclosure relates to a method of treating or preventing spinal and bulbar muscular atrophy (SBMA) in a subject in need thereof, comprising administering to the subject about 50 mg to about 100 mg of Compound A:

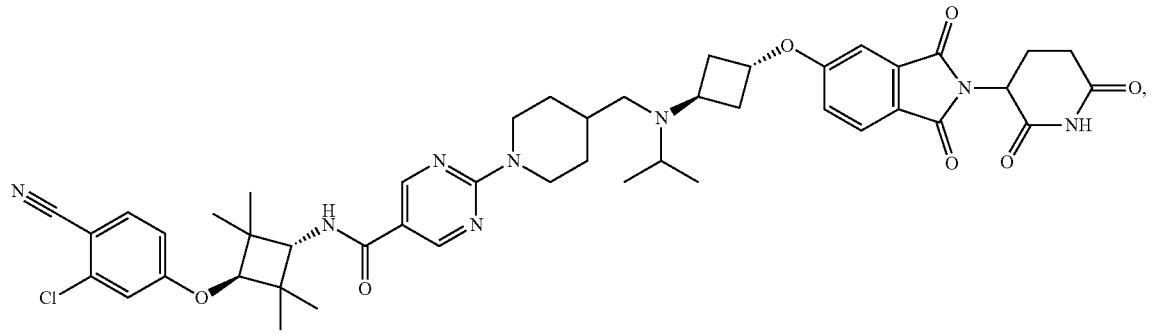 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

The present disclosure relates to Compound A,

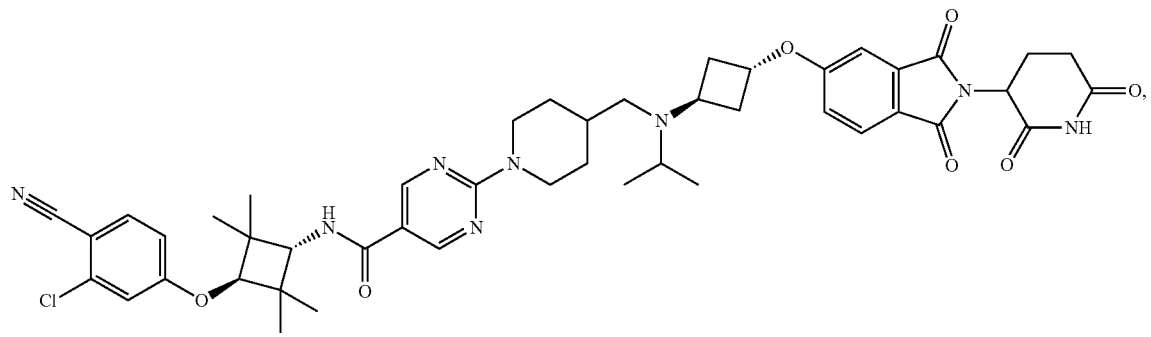 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for use in a method of treating or preventing spinal and bulbar muscular atrophy (SBMA) in a subject in need thereof, wherein the method comprises administering to the subject about 50 mg to about 100 mg of Compound A, or a pharmaceutically acceptable salt thereof.

The present disclosure relates to a use of Compound A,

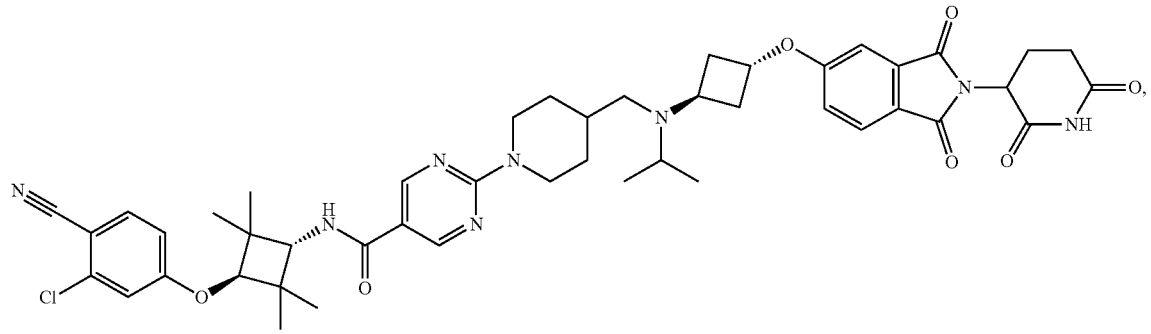 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating or preventing spinal and bulbar muscular atrophy (SBMA), wherein the medicament comprises about 50 mg to about 100 mg of Compound A, or a pharmaceutically acceptable salt thereof, and the medicament is administered to a subject in need thereof.

The present disclosure relates to a method of treating or preventing a symptom of spinal and bulbar muscular atrophy (SBMA) in a subject in need thereof, comprising administering to the subject about 50 mg to about 100 mg of Compound A:

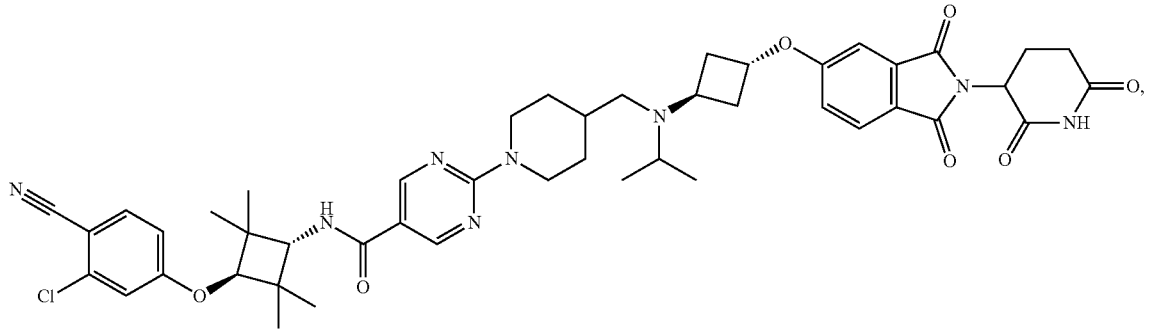 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

The present disclosure relates to Compound A,

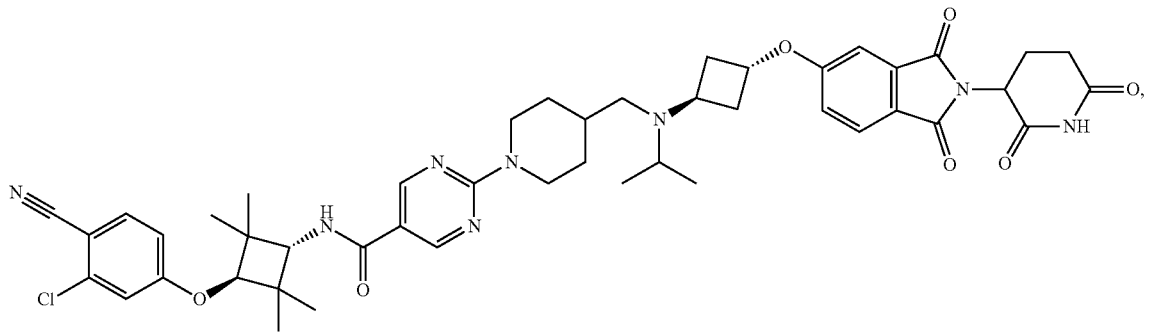 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for use in a method of treating or preventing a symptom of spinal and bulbar muscular atrophy (SBMA) in a subject in need thereof, wherein the method comprises administering to the subject about 50 mg to about 100 mg of Compound A, or a pharmaceutically acceptable salt thereof.

The present disclosure relates to a use of Compound A,

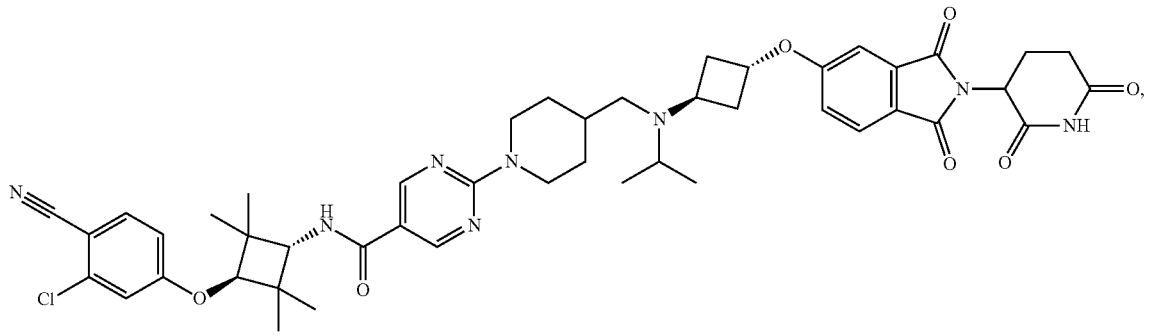 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating or preventing a symptom of spinal and bulbar muscular atrophy (SBMA), wherein the medicament comprises about 50 mg to about 100 mg of Compound A, or a pharmaceutically acceptable salt thereof, and the medicament is administered to a subject in need thereof.

The present disclosure relates to a method of treating or preventing spinal and bulbar muscular atrophy (SBMA) in a subject in need thereof, comprising administering to the subject about 70 mg to about 100 mg of Compound A:

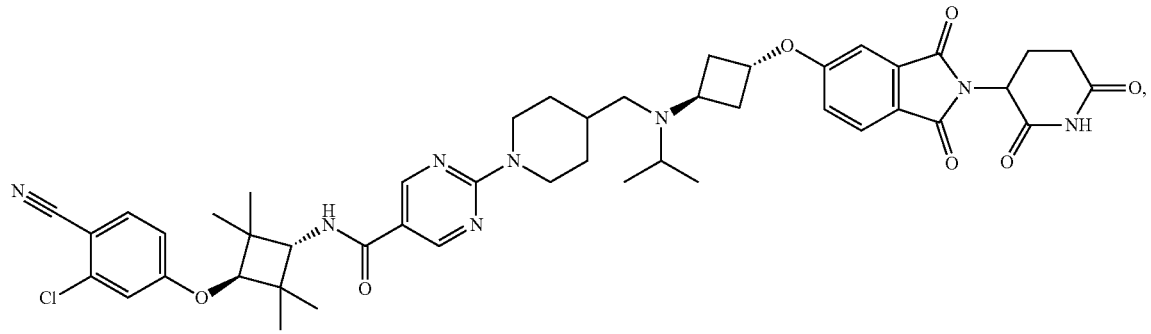 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

The present disclosure relates to Compound A,

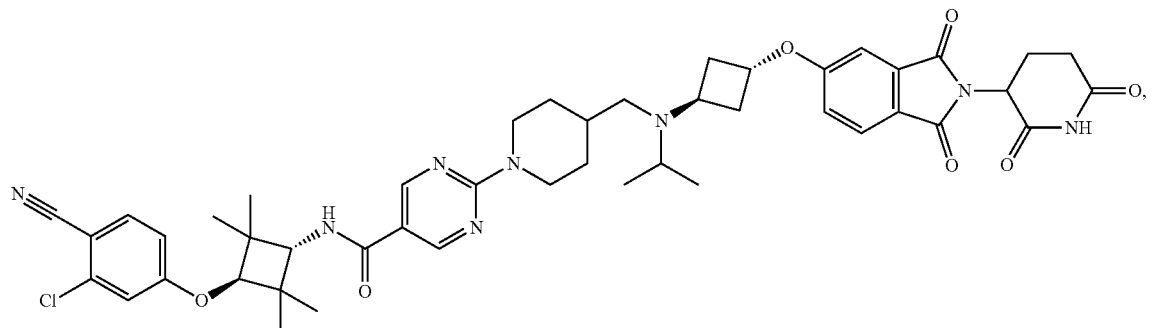

or a pharmaceutically acceptable salt thereof, for use in a method of treating or preventing spinal and bulbar muscular atrophy (SBMA) in a subject in need thereof, wherein the method comprises administering to the subject about 70 mg to about 100 mg of Compound A, or a pharmaceutically acceptable salt thereof.

The present disclosure relates to a use of Compound A,

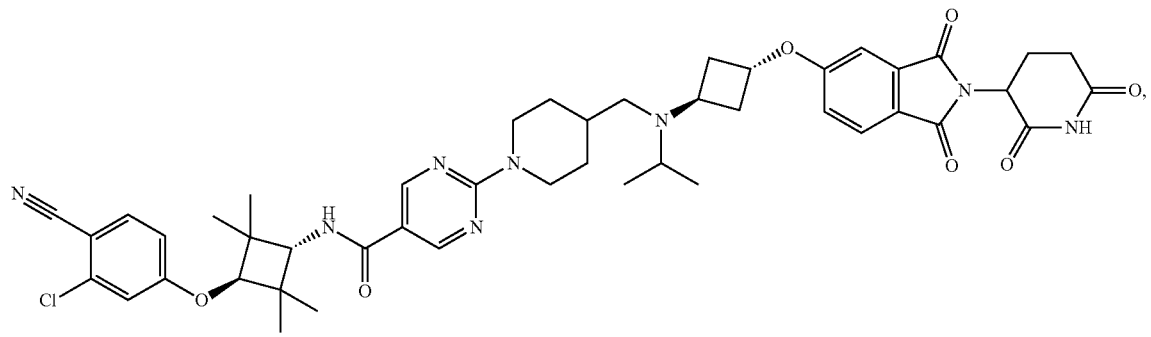 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating or preventing spinal and bulbar muscular atrophy (SBMA), wherein the medicament comprises about 70 mg to about 100 mg of Compound A, or a pharmaceutically acceptable salt thereof, and the medicament is administered to a subject in need thereof.

The present disclosure relates to a method of treating or preventing a symptom of spinal and bulbar muscular atrophy (SBMA) in a subject in need thereof, comprising administering to the subject about 70 mg to about 100 mg of Compound A:

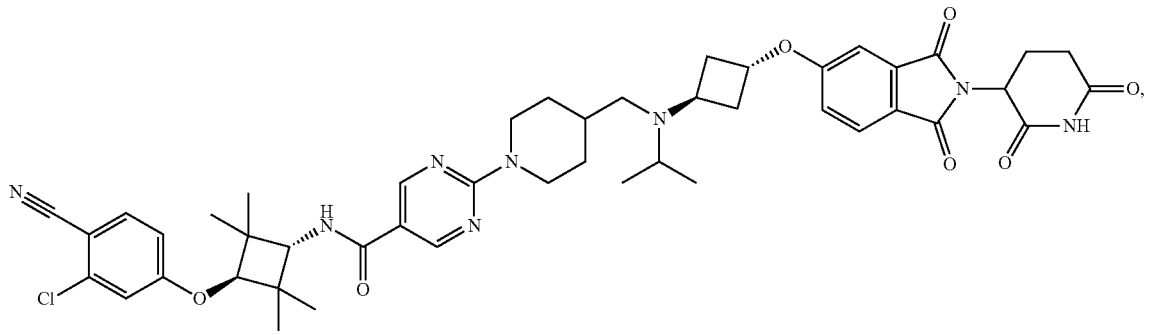 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

The present disclosure relates to Compound A,

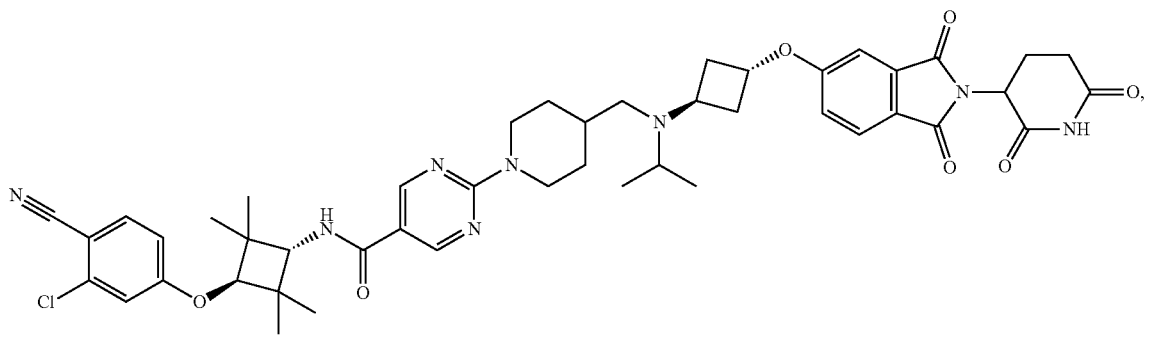 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for use in a method of treating or preventing a symptom of spinal and bulbar muscular atrophy (SBMA) in a subject in need thereof, wherein the method comprises administering to the subject about 70 mg to about 100 mg of Compound A, or a pharmaceutically acceptable salt thereof.

The present disclosure relates to a use of Compound A,

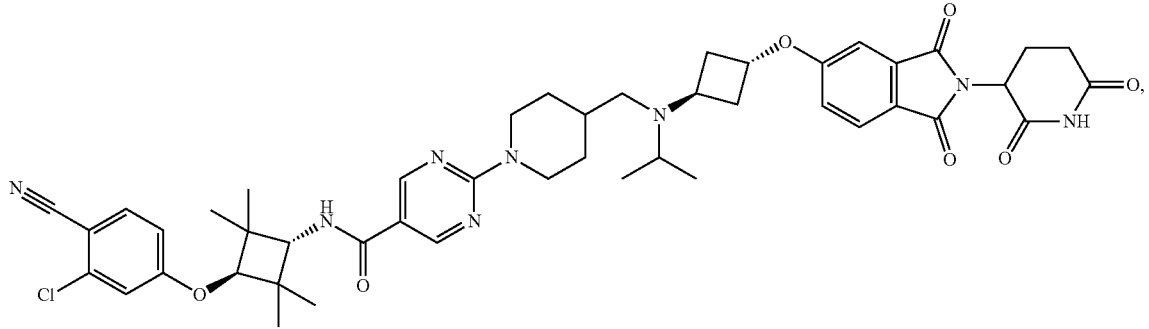 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating or preventing a symptom of spinal and bulbar muscular atrophy (SBMA), wherein the medicament comprises about 70 mg to about 100 mg of Compound A, or a pharmaceutically acceptable salt thereof, and the medicament is administered to a subject in need thereof.

The present disclosure relates to a method of treating or preventing spinal and bulbar muscular atrophy (SBMA) in a subject in need thereof, comprising administering to the subject about 100 mg to about 200 mg of Compound A:

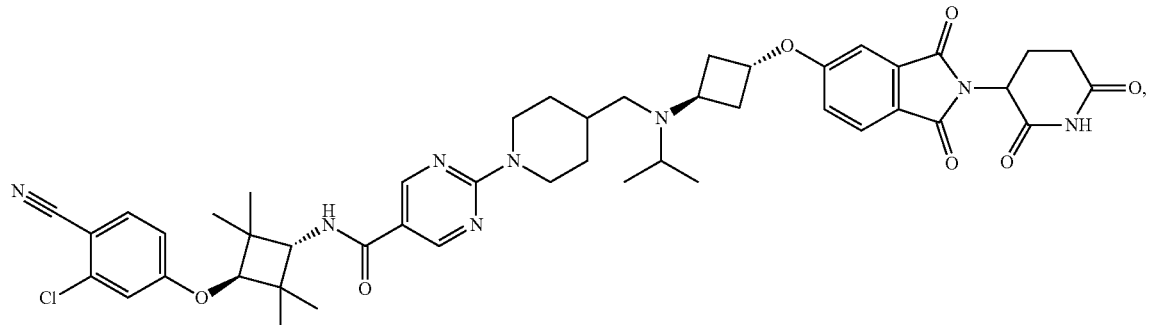

or a pharmaceutically acceptable salt thereof.

The present disclosure relates to Compound A,

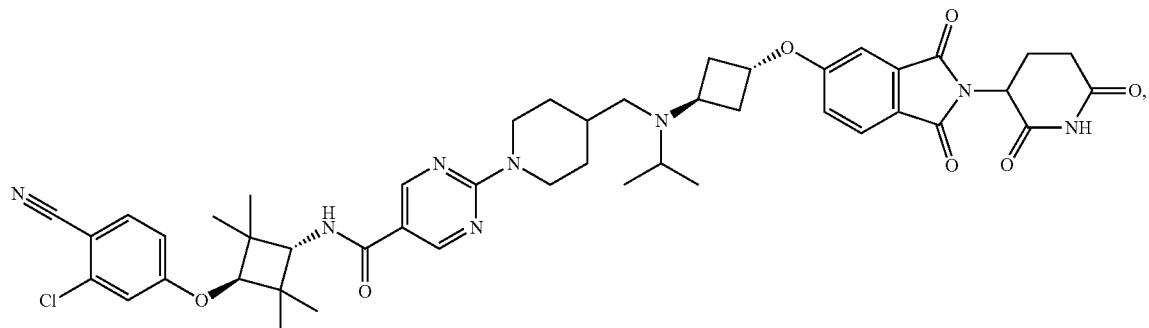

or a pharmaceutically acceptable salt thereof, for use in a method of treating or preventing spinal and bulbar muscular atrophy (SBMA) in a subject in need thereof, wherein the method comprises administering to the subject about 100 mg to about 200 mg of Compound A, or a pharmaceutically acceptable salt thereof.

The present disclosure relates to a use of Compound A,

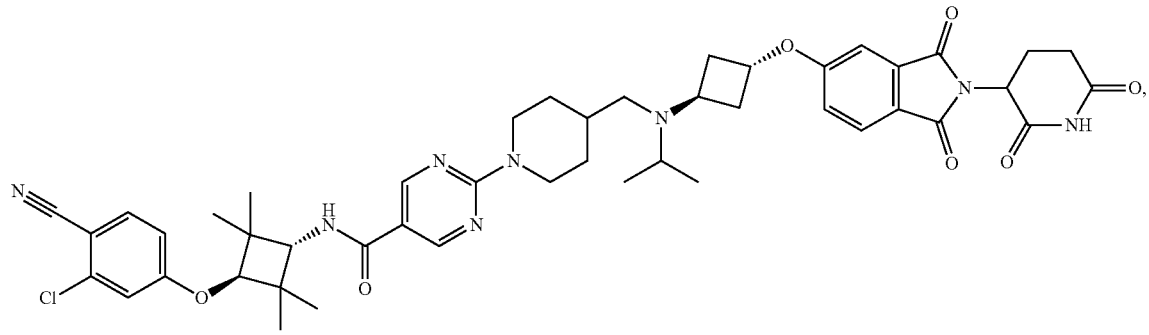 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating or preventing spinal and bulbar muscular atrophy (SBMA), wherein the medicament comprises about 100 mg to about 200 mg of Compound A, or a pharmaceutically acceptable salt thereof, and the medicament is administered to a subject in need thereof.

The present disclosure relates to a method of treating or preventing a symptom of spinal and bulbar muscular atrophy (SBMA) in a subject in need thereof, comprising administering to the subject about 100 mg to about 200 mg of Compound A:

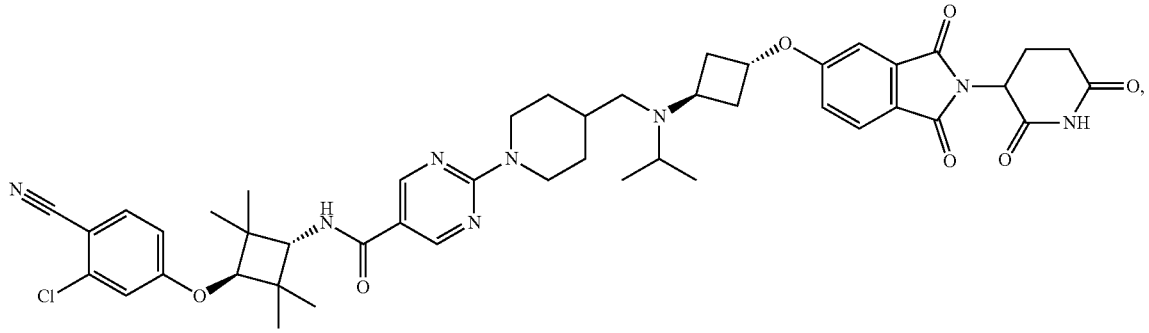 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

The present disclosure relates to Compound A,

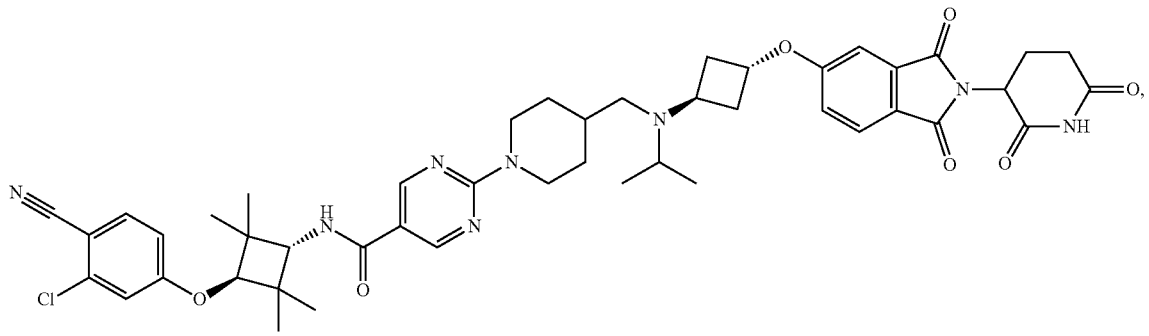 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for use in a method of treating or preventing a symptom of spinal and bulbar muscular atrophy (SBMA) in a subject in need thereof, wherein the method comprises administering to the subject about 100 mg to about 200 mg of Compound A, or a pharmaceutically acceptable salt thereof.

The present disclosure relates to a use of Compound A,

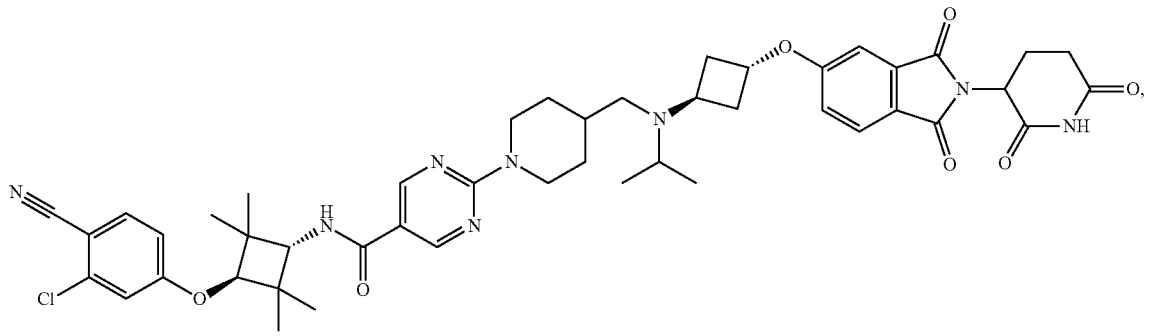 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating or preventing a symptom of spinal and bulbar muscular atrophy (SBMA), wherein the medicament comprises about 100 mg to about 200 mg of Compound A, or a pharmaceutically acceptable salt thereof, and the medicament is administered to a subject in need thereof.

The present disclosure relates to a method of treating or preventing spinal and bulbar muscular atrophy (SBMA) in a subject in need thereof, comprising administering to the subject about 150 mg to about 250 mg of Compound A:

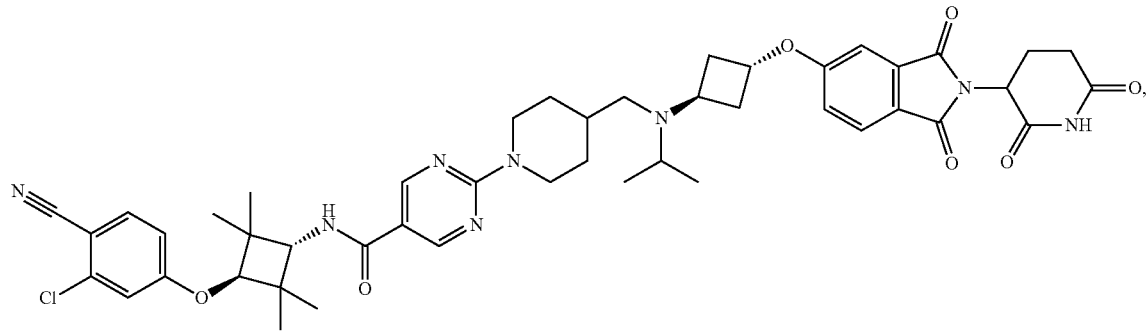 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

The present disclosure relates to Compound A,

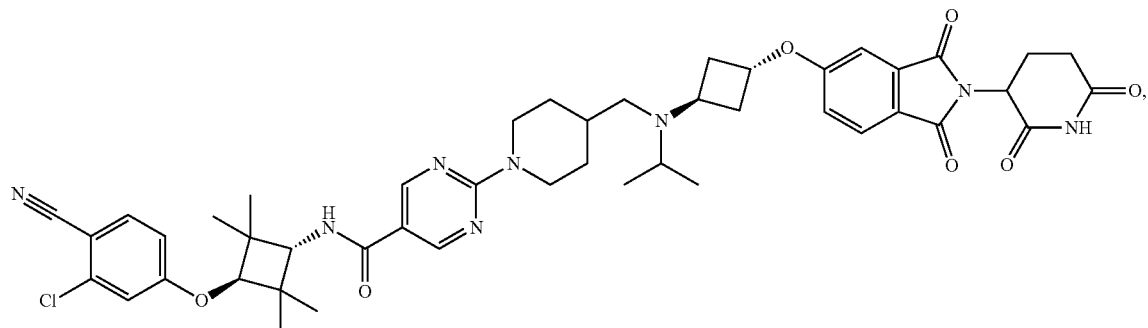

or a pharmaceutically acceptable salt thereof, for use in a method of treating or preventing spinal and bulbar muscular atrophy (SBMA) in a subject in need thereof, wherein the method comprises administering to the subject about 150 mg to about 250 mg of Compound A, or a pharmaceutically acceptable salt thereof.

The present disclosure relates to a use of Compound A,

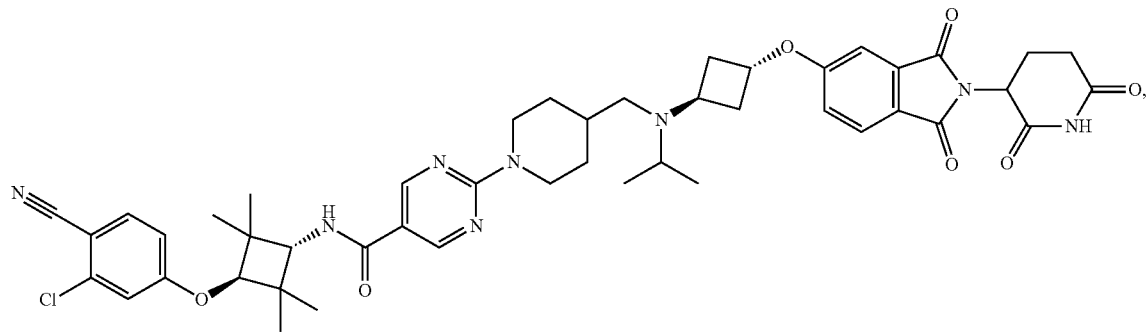 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating or preventing spinal and bulbar muscular atrophy (SBMA), wherein the medicament comprises about 150 mg to about 250 mg of Compound A, or a pharmaceutically acceptable salt thereof, and the medicament is administered to a subject in need thereof.

The present disclosure relates to a method of treating or preventing a symptom of spinal and bulbar muscular atrophy (SBMA) in a subject in need thereof, comprising administering to the subject about 150 mg to about 250 mg of Compound A:

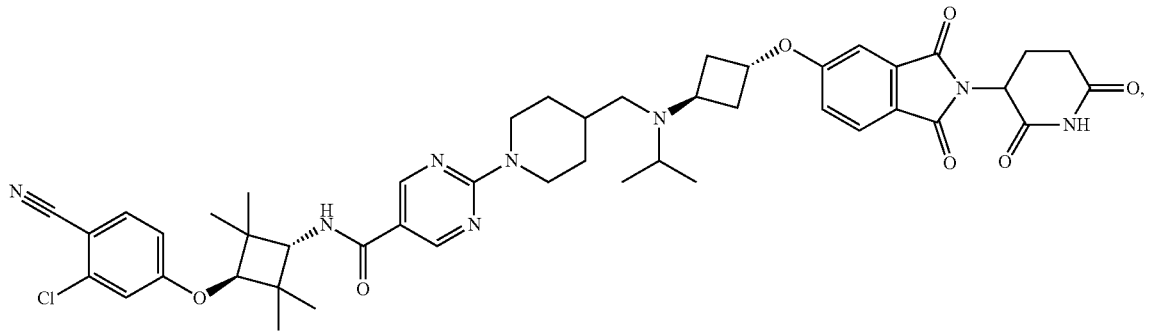 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

The present disclosure relates to Compound A,

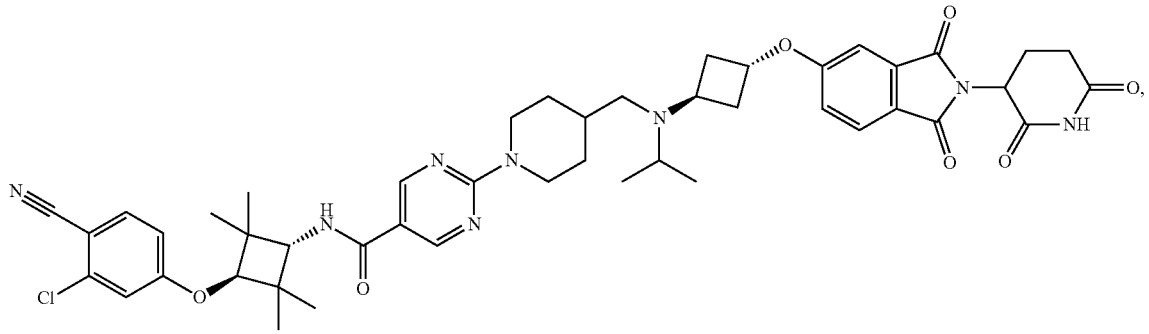 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for use in a method of treating or preventing a symptom of spinal and bulbar muscular atrophy (SBMA) in a subject in need thereof, wherein the method comprises administering to the subject about 150 mg to about 250 mg of Compound A, or a pharmaceutically acceptable salt thereof.

The present disclosure relates to a use of Compound A,

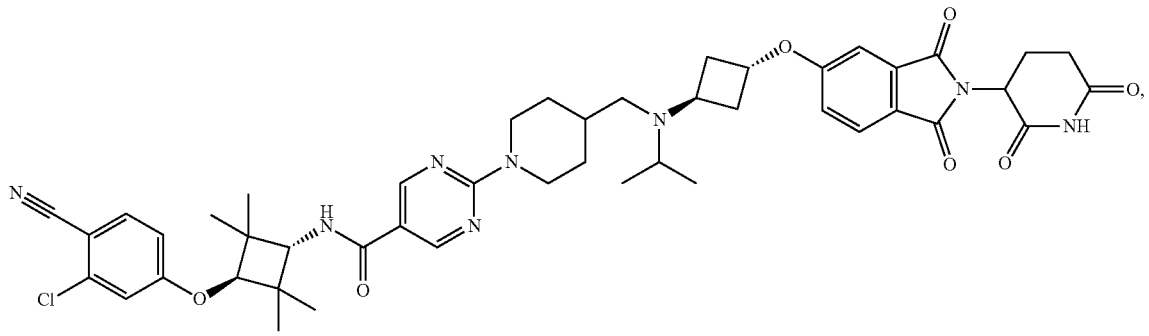 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating or preventing a symptom of spinal and bulbar muscular atrophy (SBMA), wherein the medicament comprises about 150 mg to about 250 mg of Compound A, or a pharmaceutically acceptable salt thereof, and the medicament is administered to a subject in need thereof.

The present disclosure relates to a method of treating or preventing spinal and bulbar muscular atrophy (SBMA) in a subject in need thereof, comprising administering to the subject about 200 mg to about 300 mg of Compound A:

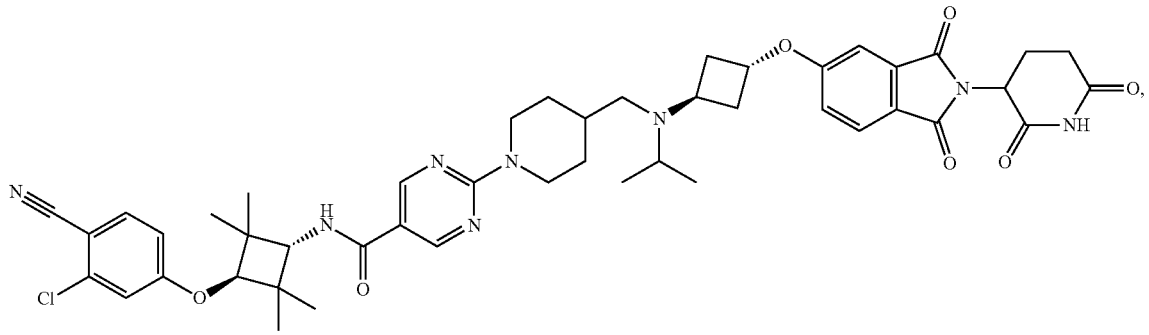 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

The present disclosure relates to Compound A,

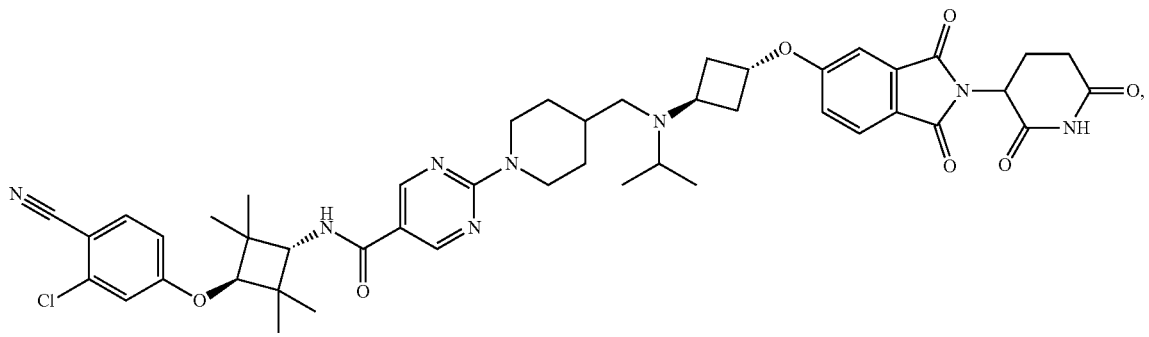 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for use in a method of treating or preventing spinal and bulbar muscular atrophy (SBMA) in a subject in need thereof, wherein the method comprises administering to the subject about 200 mg to about 300 mg of Compound A, or a pharmaceutically acceptable salt thereof.

The present disclosure relates to a use of Compound A,

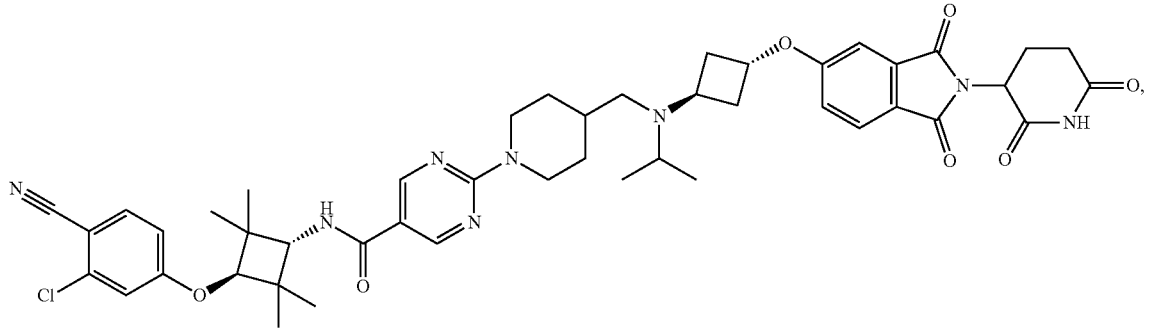 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating or preventing spinal and bulbar muscular atrophy (SBMA), wherein the medicament comprises about 200 mg to about 300 mg of Compound A, or a pharmaceutically acceptable salt thereof, and the medicament is administered to a subject in need thereof.

The present disclosure relates to a method of treating or preventing a symptom of spinal and bulbar muscular atrophy (SBMA) in a subject in need thereof, comprising administering to the subject about 200 mg to about 300 mg of Compound A:

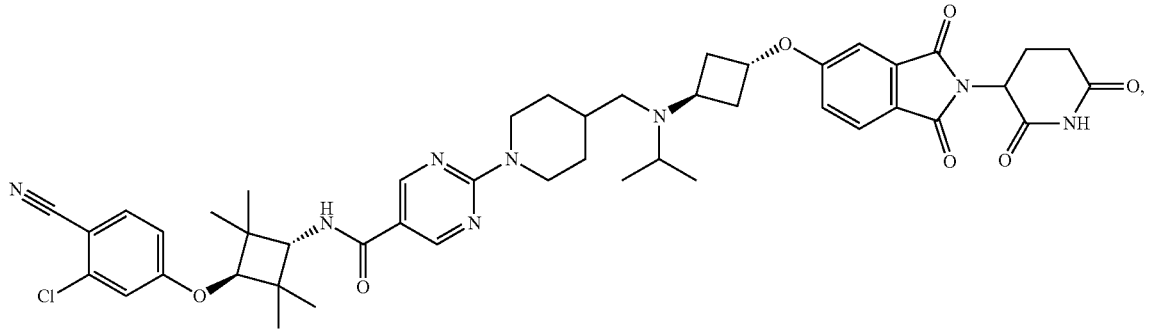 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

The present disclosure relates to Compound A,

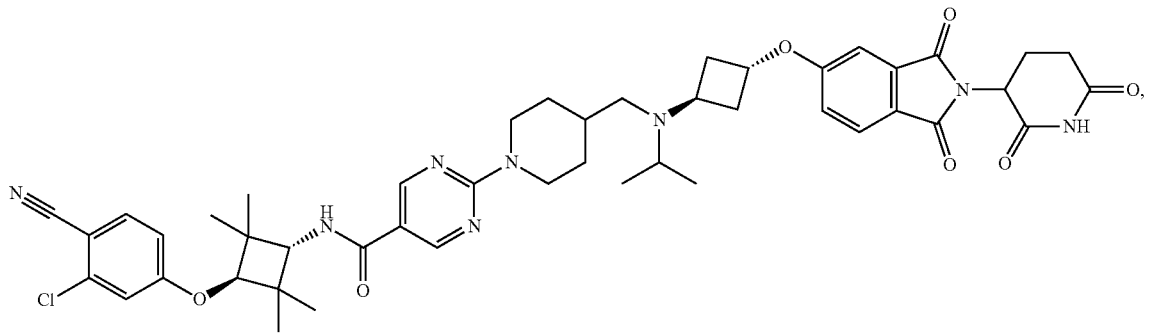 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for use in a method of treating or preventing a symptom of spinal and bulbar muscular atrophy (SBMA) in a subject in need thereof, wherein the method comprises administering to the subject about 200 mg to about 300 mg of Compound A, or a pharmaceutically acceptable salt thereof.

The present disclosure relates to a use of Compound A,

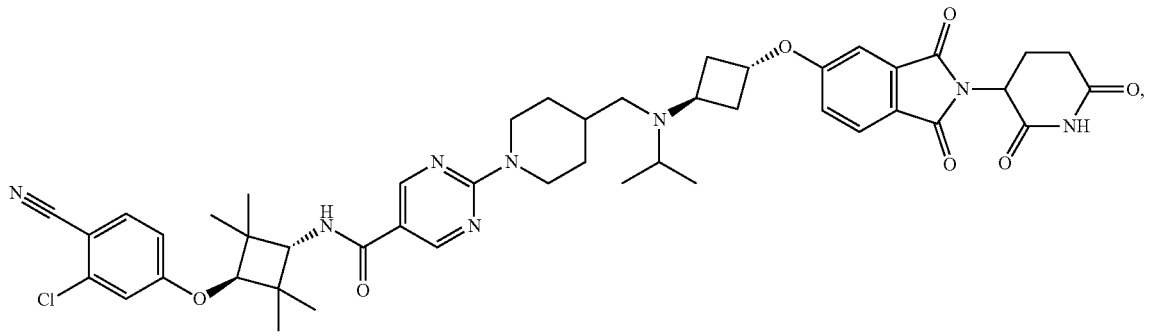 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating or preventing a symptom of spinal and bulbar muscular atrophy (SBMA), wherein the medicament comprises about 200 mg to about 300 mg of Compound A, or a pharmaceutically acceptable salt thereof, and the medicament is administered to a subject in need thereof.

The present disclosure relates to a method of treating or preventing spinal and bulbar muscular atrophy (SBMA) in a subject in need thereof, comprising administering to the subject about 250 mg to about 350 mg of Compound A:

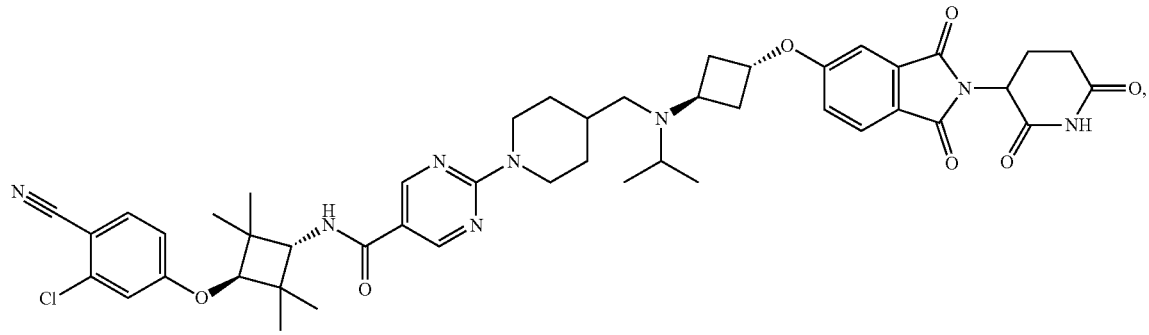 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

The present disclosure relates to Compound A,

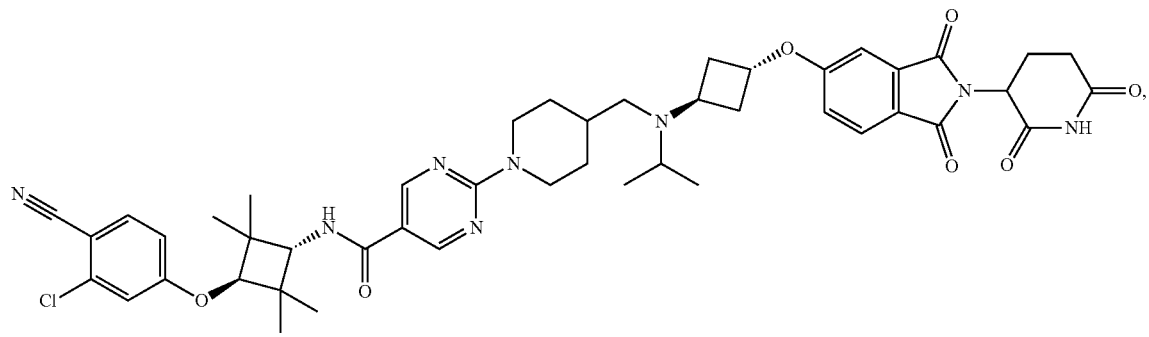 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for use in a method of treating or preventing spinal and bulbar muscular atrophy (SBMA) in a subject in need thereof, wherein the method comprises administering to the subject about 250 mg to about 350 mg of Compound A, or a pharmaceutically acceptable salt thereof.

The present disclosure relates to a use of Compound A,

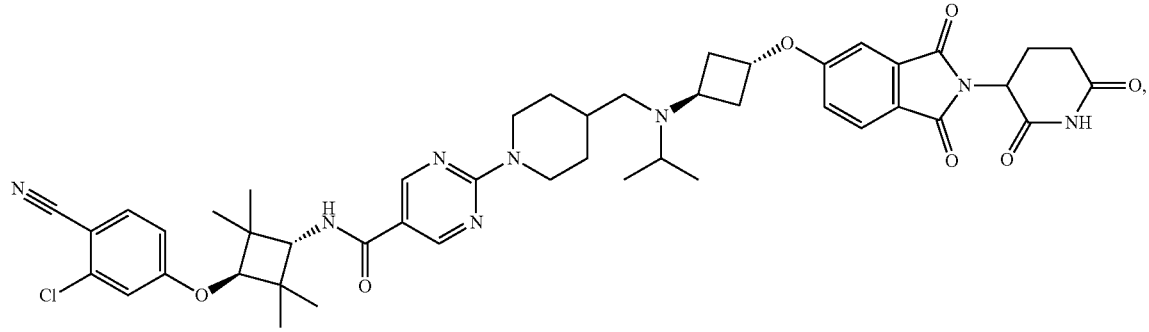 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating or preventing spinal and bulbar muscular atrophy (SBMA), wherein the medicament comprises about 250 mg to about 350 mg of Compound A, or a pharmaceutically acceptable salt thereof, and the medicament is administered to a subject in need thereof.

The present disclosure relates to a method of treating or preventing a symptom of spinal and bulbar muscular atrophy (SBMA) in a subject in need thereof, comprising administering to the subject about 250 mg to about 350 mg of Compound A:

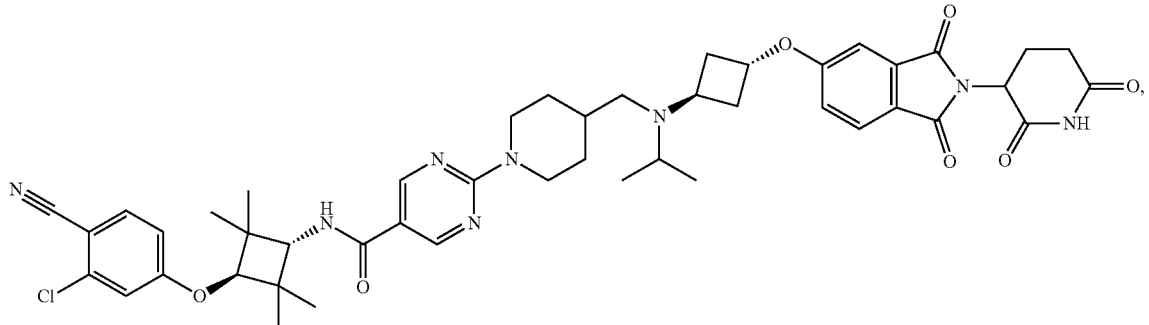

or a pharmaceutically acceptable salt thereof.

The present disclosure relates to Compound A,

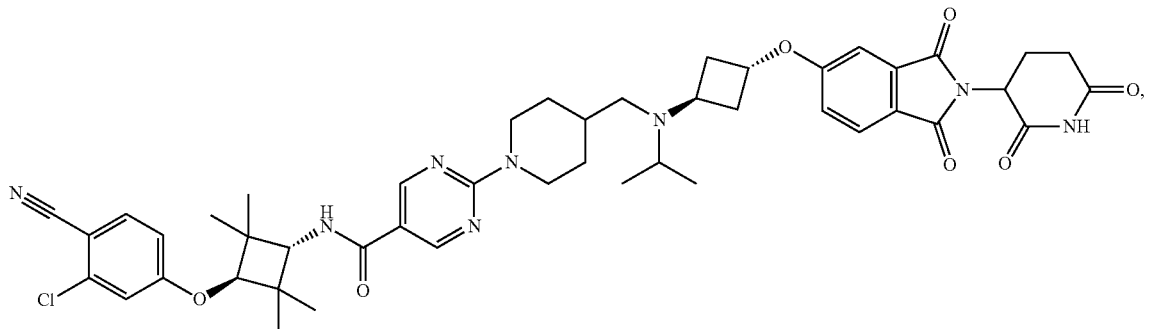 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for use in a method of treating or preventing a symptom of spinal and bulbar muscular atrophy (SBMA) in a subject in need thereof, wherein the method comprises administering to the subject about 250 mg to about 350 mg of Compound A, or a pharmaceutically acceptable salt thereof.

The present disclosure relates to a use of Compound A,

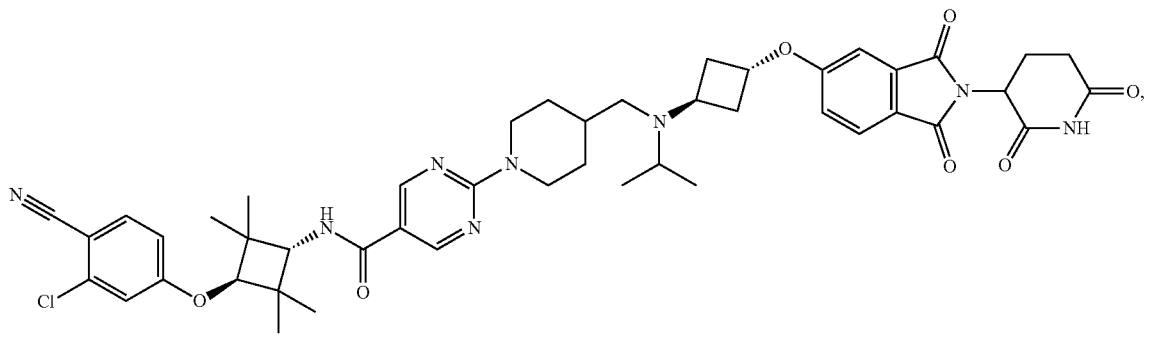 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating or preventing a symptom of spinal and bulbar muscular atrophy (SBMA), wherein the medicament comprises about 250 mg to about 350 mg of Compound A, or a pharmaceutically acceptable salt thereof, and the medicament is administered to a subject in need thereof.

The present disclosure relates to a method of treating or preventing spinal and bulbar muscular atrophy (SBMA) in a subject in need thereof, comprising administering to the subject about 300 mg to about 400 mg of Compound A:

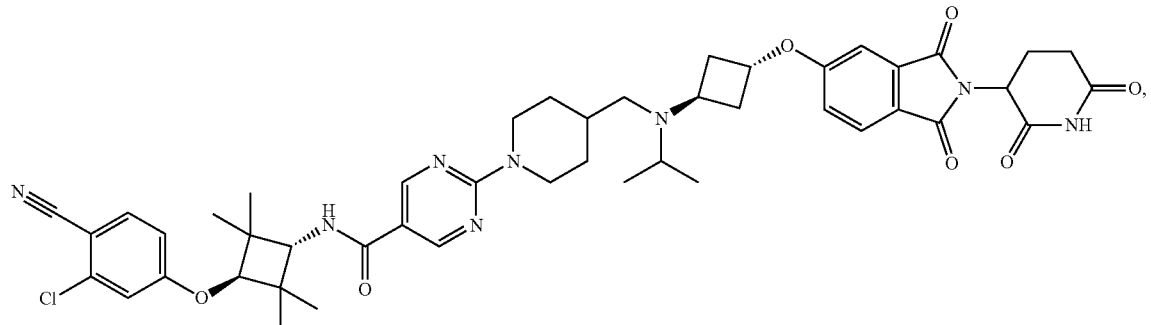

or a pharmaceutically acceptable salt thereof.

The present disclosure relates to Compound A,

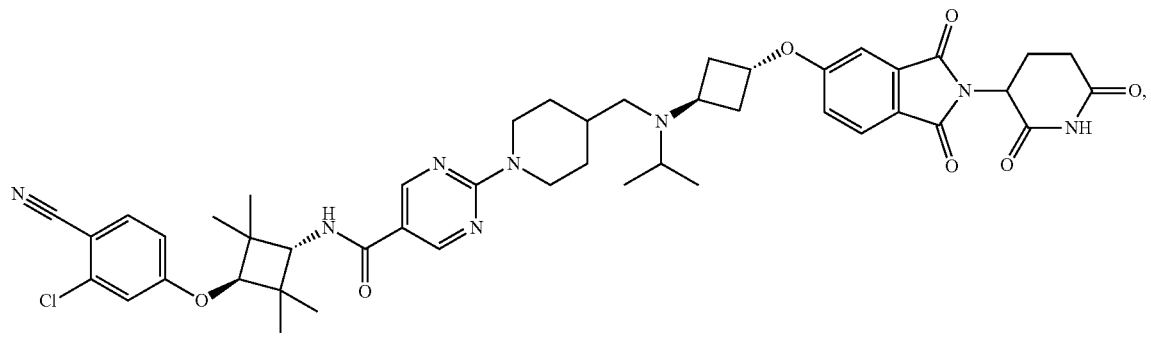 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for use in a method of treating or preventing spinal and bulbar muscular atrophy (SBMA) in a subject in need thereof, wherein the method comprises administering to the subject about 300 mg to about 400 mg of Compound A, or a pharmaceutically acceptable salt thereof.

The present disclosure relates to a use of Compound A,

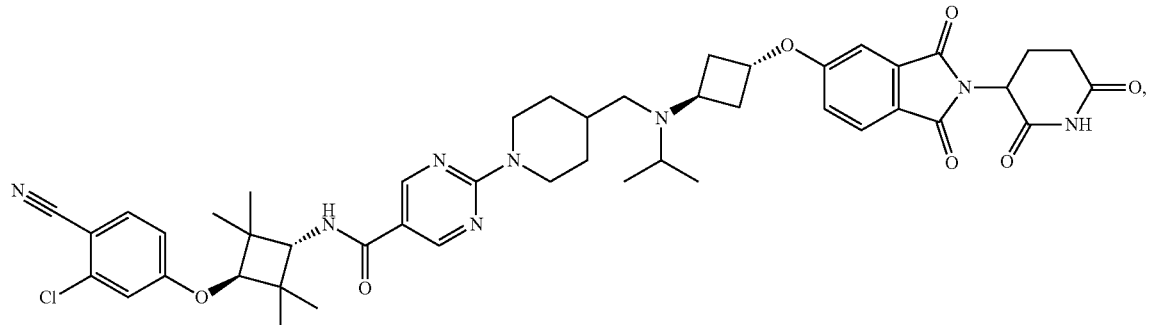

or a pharmaceutically acceptable salt thereof, for the preparation of a medicament for treating or preventing spinal and bulbar muscular atrophy (SBMA), wherein the medicament comprises about 300 mg to about 400 mg of Compound A, or a pharmaceutically acceptable salt thereof, and the medicament is administered to a subject in need thereof.

The present disclosure relates to a method of treating or preventing a symptom of spinal and bulbar muscular atrophy (SBMA) in a subject in need thereof, comprising administering to the subject about 300 mg to about 400 mg of Compound A:

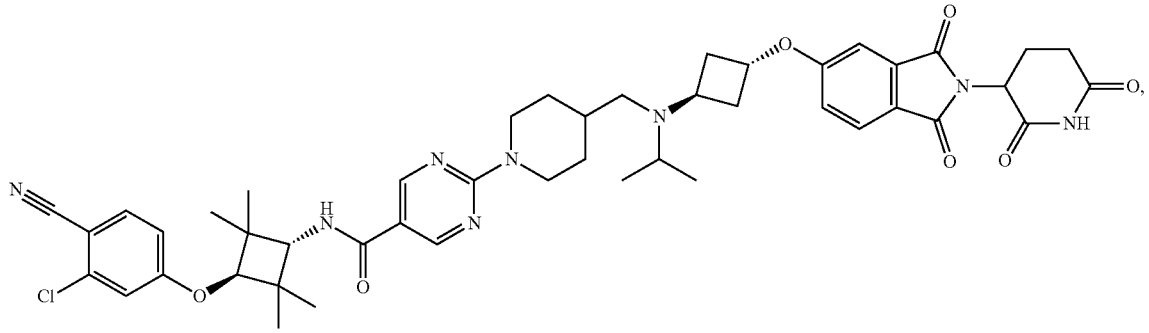 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

The present disclosure relates to Compound A,

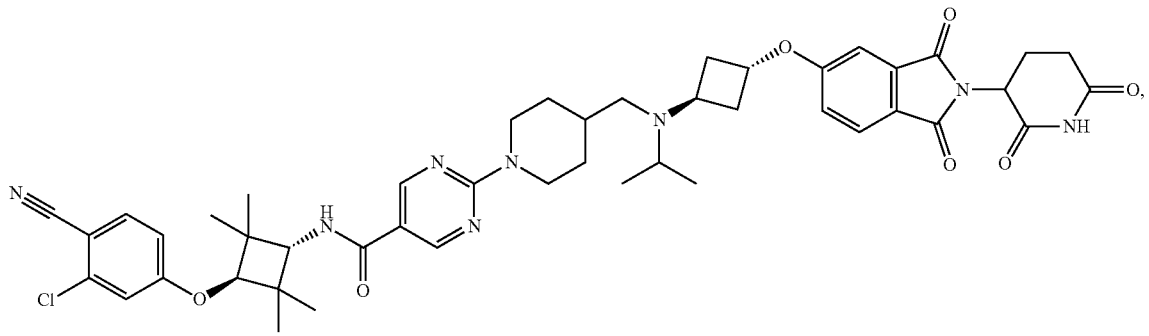 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for use in a method of treating or preventing a symptom of spinal and bulbar muscular atrophy (SBMA) in a subject in need thereof, wherein the method comprises administering to the subject about 300 mg to about 400 mg of Compound A, or a pharmaceutically acceptable salt thereof.

The present disclosure relates to a use of Compound A,

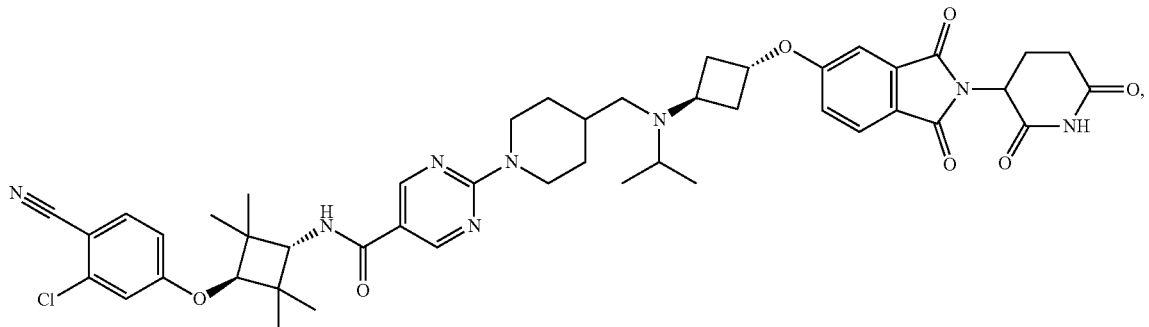

or a pharmaceutically acceptable salt thereof, for the preparation of a medicament for treating or preventing a symptom of spinal and bulbar muscular atrophy (SBMA), wherein the medicament comprises about 300 mg to about 400 mg of Compound A, or a pharmaceutically acceptable salt thereof, and the medicament is administered to a subject in need thereof.

The present disclosure relates to a method of treating or preventing spinal and bulbar muscular atrophy (SBMA) in a subject in need thereof, comprising administering to the subject about 350 mg to about 450 mg of Compound A:

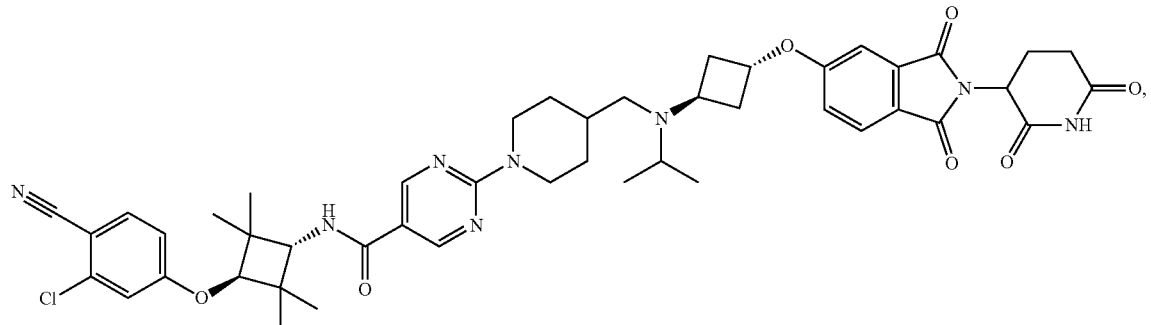

or a pharmaceutically acceptable salt thereof.

The present disclosure relates to Compound A,

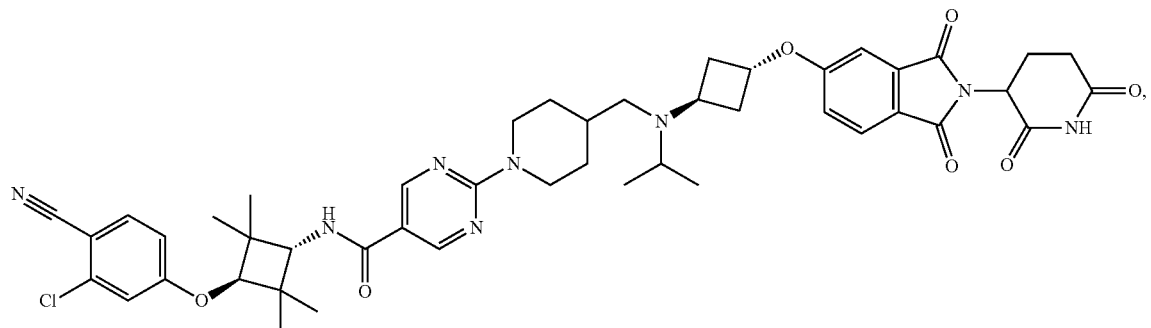

or a pharmaceutically acceptable salt thereof, for use in a method of treating or preventing spinal and bulbar muscular atrophy (SBMA) in a subject in need thereof, wherein the method comprises administering to the subject about 350 mg to about 450 mg of Compound A, or a pharmaceutically acceptable salt thereof.

The present disclosure relates to a use of Compound A,

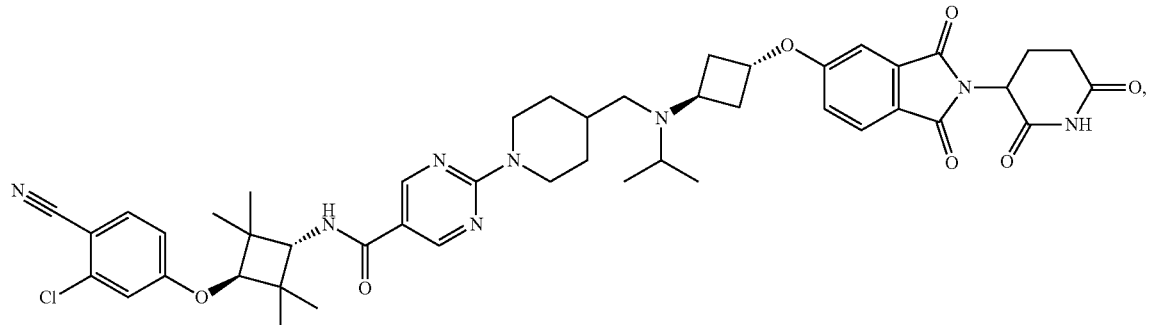

or a pharmaceutically acceptable salt thereof, for the preparation of a medicament for treating or preventing spinal and bulbar muscular atrophy (SBMA), wherein the medicament comprises about 350 mg to about 450 mg of Compound A, or a pharmaceutically acceptable salt thereof, and the medicament is administered to a subject in need thereof.

The present disclosure relates to a method of treating or preventing a symptom of spinal and bulbar muscular atrophy (SBMA) in a subject in need thereof, comprising administering to the subject about 350 mg to about 450 mg of Compound A:

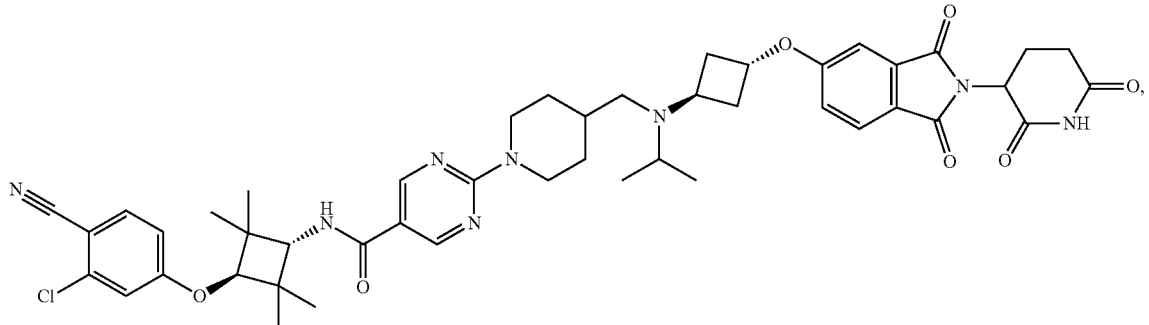

or a pharmaceutically acceptable salt thereof.

The present disclosure relates to Compound A,

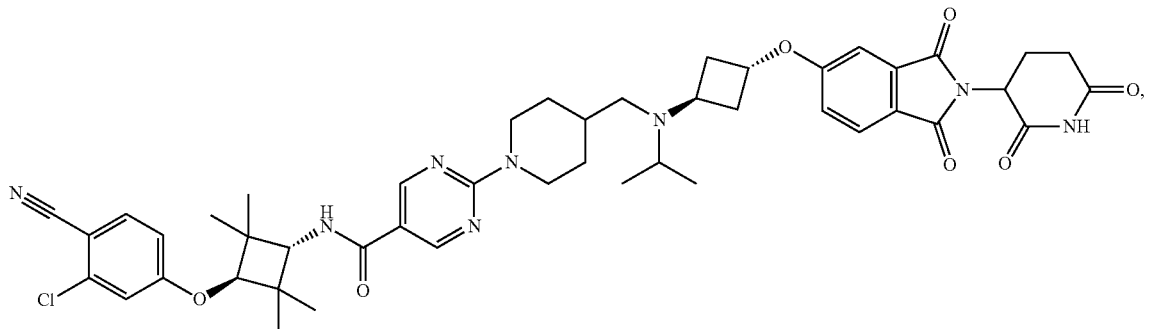 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for use in a method of treating or preventing a symptom of spinal and bulbar muscular atrophy (SBMA) in a subject in need thereof, wherein the method comprises administering to the subject about 350 mg to about 450 mg of Compound A, or a pharmaceutically acceptable salt thereof.

The present disclosure relates to a use of Compound A,

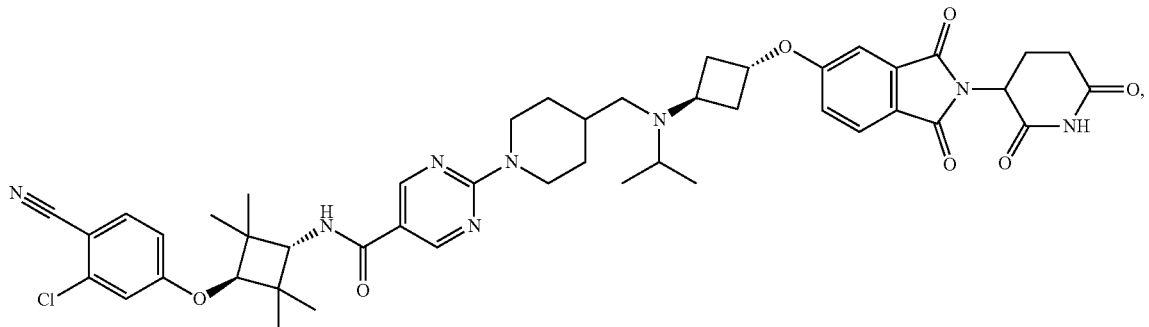

or a pharmaceutically acceptable salt thereof, for the preparation of a medicament for treating or preventing a symptom of spinal and bulbar muscular atrophy (SBMA), wherein the medicament comprises about 350 mg to about 450 mg of Compound A, or a pharmaceutically acceptable salt thereof, and the medicament is administered to a subject in need thereof.

The present disclosure relates to a method of treating or preventing spinal and bulbar muscular atrophy (SBMA) in a subject in need thereof, comprising administering to the subject about 400 mg to about 500 mg of Compound A:

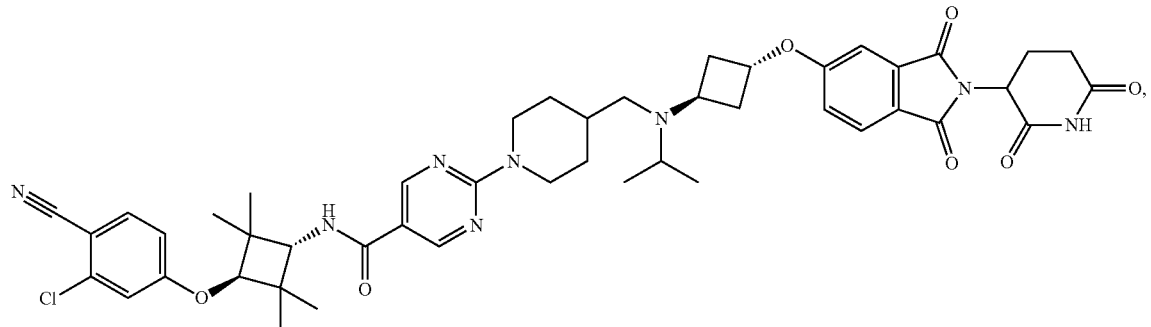

or a pharmaceutically acceptable salt thereof.

The present disclosure relates to Compound A,

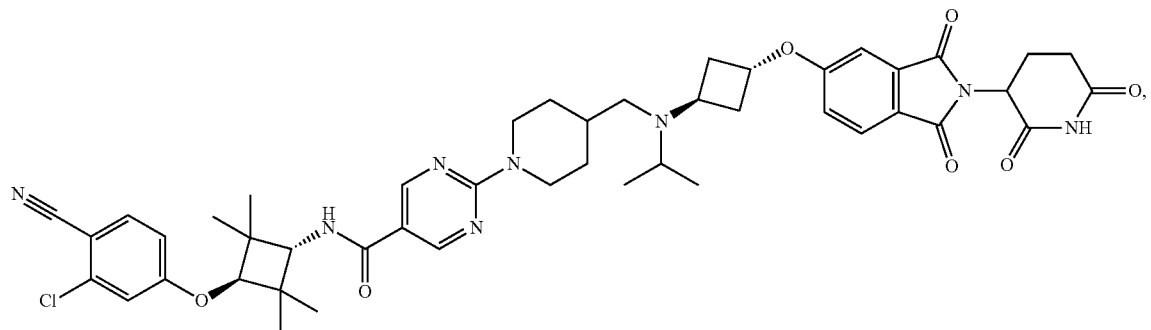

or a pharmaceutically acceptable salt thereof, for use in a method of treating or preventing spinal and bulbar muscular atrophy (SBMA) in a subject in need thereof, wherein the method comprises administering to the subject about 400 mg to about 500 mg of Compound A, or a pharmaceutically acceptable salt thereof.

The present disclosure relates to a use of Compound A,

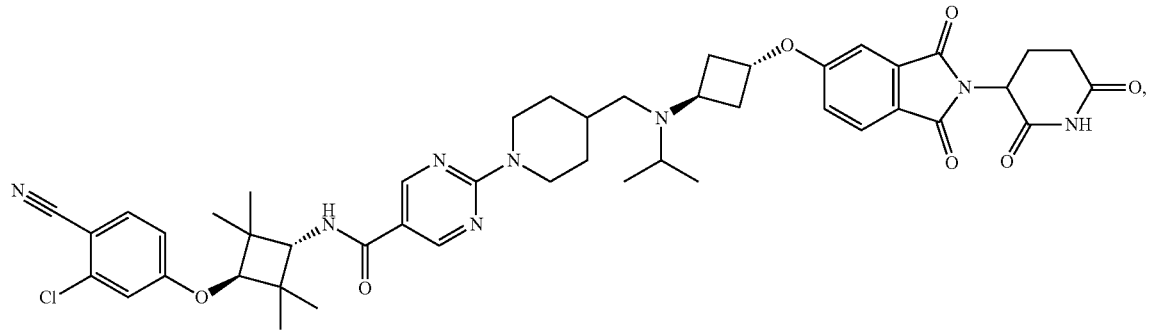 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating or preventing spinal and bulbar muscular atrophy (SBMA), wherein the medicament comprises about 400 mg to about 500 mg of Compound A, or a pharmaceutically acceptable salt thereof, and the medicament is administered to a subject in need thereof.

The present disclosure relates to a method of treating or preventing a symptom of spinal and bulbar muscular atrophy (SBMA) in a subject in need thereof, comprising administering to the subject about 400 mg to about 500 mg of Compound A:

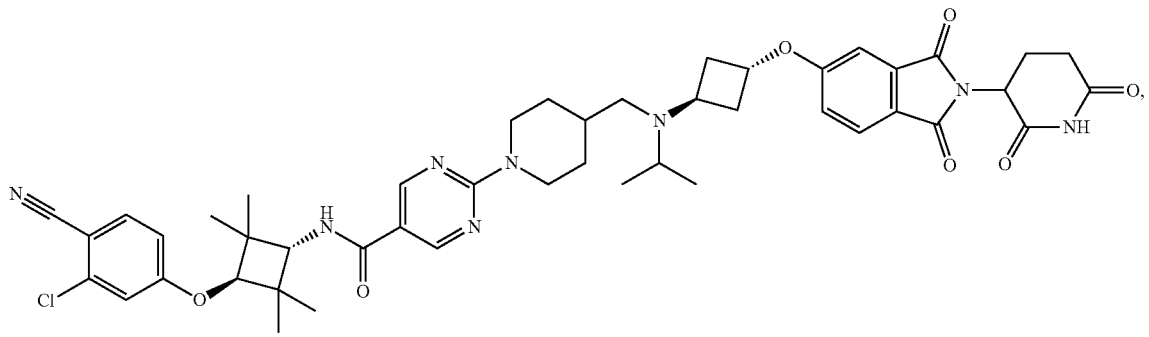 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

The present disclosure relates to Compound A,

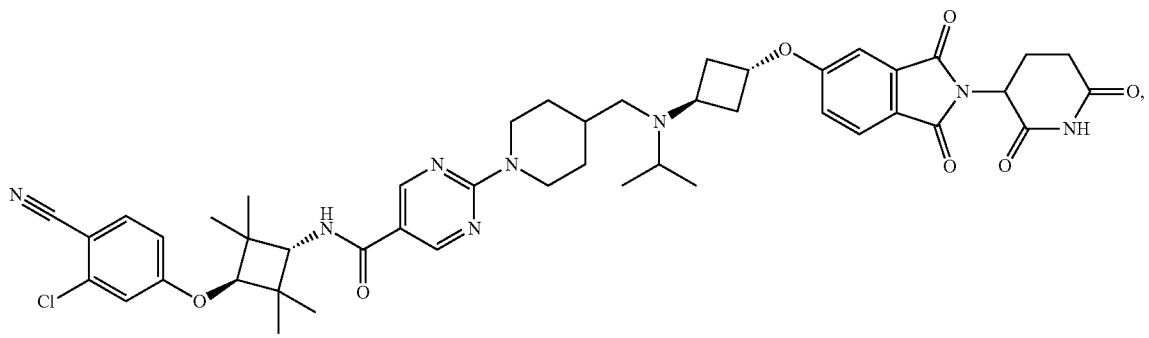 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for use in a method of treating or preventing a symptom of spinal and bulbar muscular atrophy (SBMA) in a subject in need thereof, wherein the method comprises administering to the subject about 400 mg to about 500 mg of Compound A, or a pharmaceutically acceptable salt thereof.

The present disclosure relates to a use of Compound A,

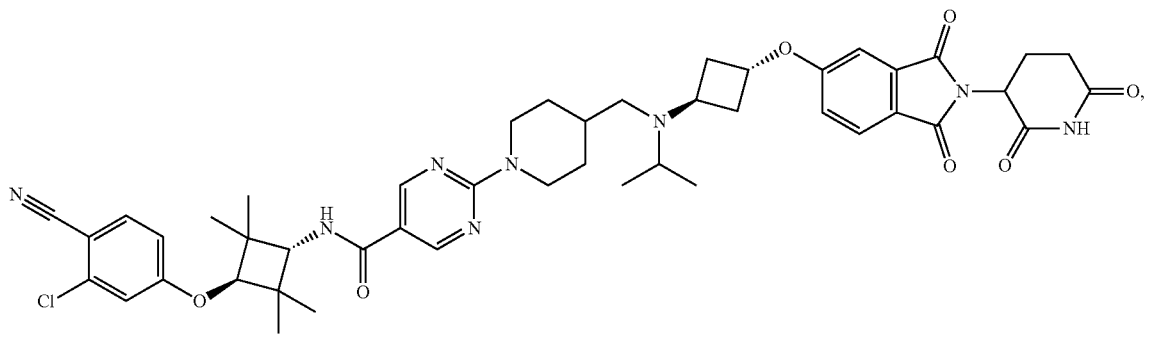 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating or preventing a symptom of spinal and bulbar muscular atrophy (SBMA), wherein the medicament comprises about 400 mg to about 500 mg of Compound A, or a pharmaceutically acceptable salt thereof, and the medicament is administered to a subject in need thereof.

The present disclosure relates to a method of treating or preventing spinal and bulbar muscular atrophy (SBMA) in a subject in need thereof, comprising administering to the subject about 75 mg of Compound A:

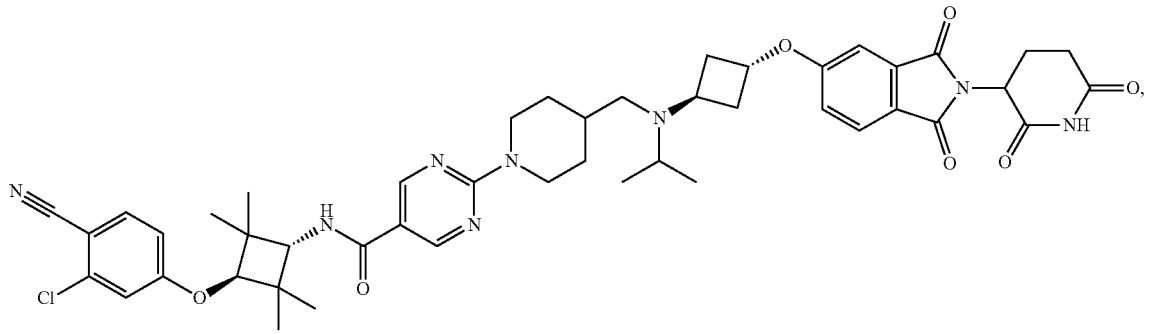 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

The present disclosure relates to Compound A,

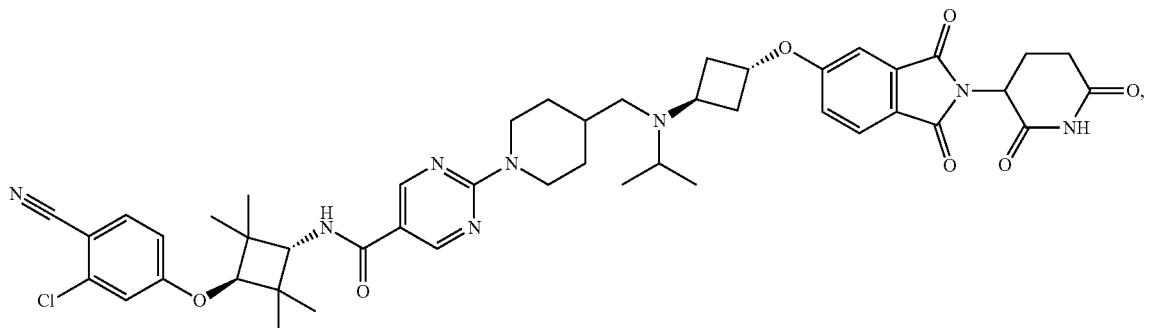

or a pharmaceutically acceptable salt thereof, for use in a method of treating or preventing spinal and bulbar muscular atrophy (SBMA) in a subject in need thereof, wherein the method comprises administering to the subject about 75 mg of Compound A, or a pharmaceutically acceptable salt thereof.

The present disclosure relates to a use of Compound A,

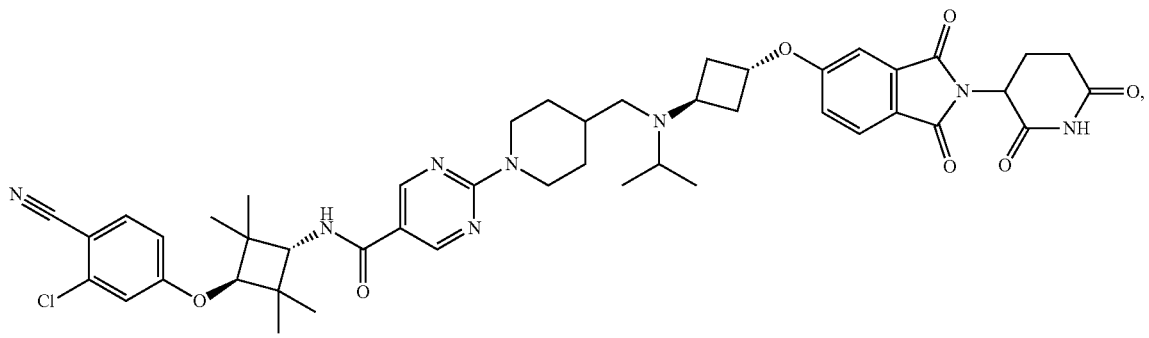 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating or preventing spinal and bulbar muscular atrophy (SBMA), wherein the medicament comprises about 75 mg of Compound A, or a pharmaceutically acceptable salt thereof, and the medicament is administered to a subject in need thereof.

The present disclosure relates to a method of treating or preventing a symptom of spinal and bulbar muscular atrophy (SBMA) in a subject in need thereof, comprising administering to the subject about 75 mg of Compound A:

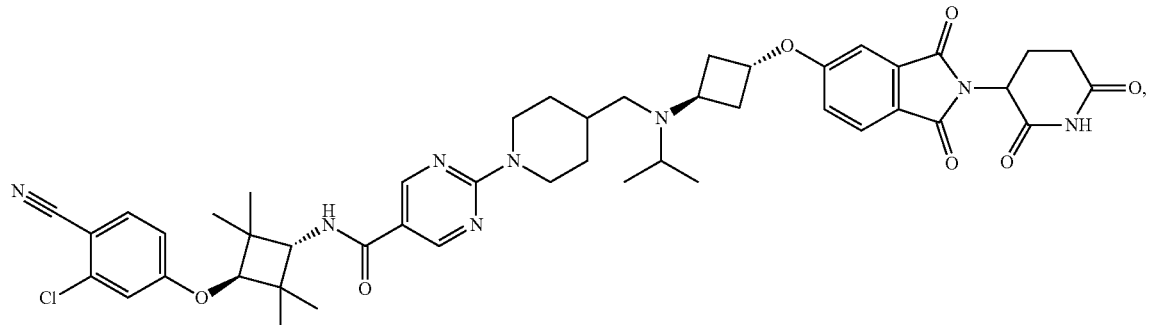

or a pharmaceutically acceptable salt thereof.

The present disclosure relates to Compound A,

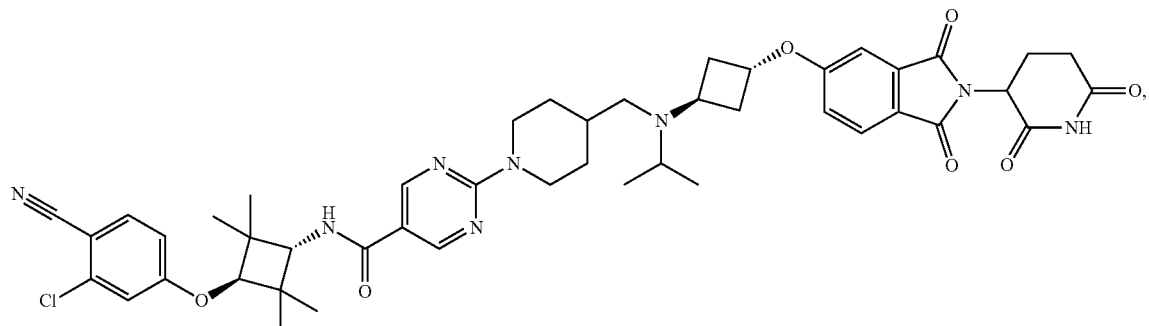

or a pharmaceutically acceptable salt thereof, for use in a method of treating or preventing a symptom of spinal and bulbar muscular atrophy (SBMA) in a subject in need thereof, wherein the method comprises administering to the subject about 75 mg of Compound A, or a pharmaceutically acceptable salt thereof.

The present disclosure relates to a use of Compound A,

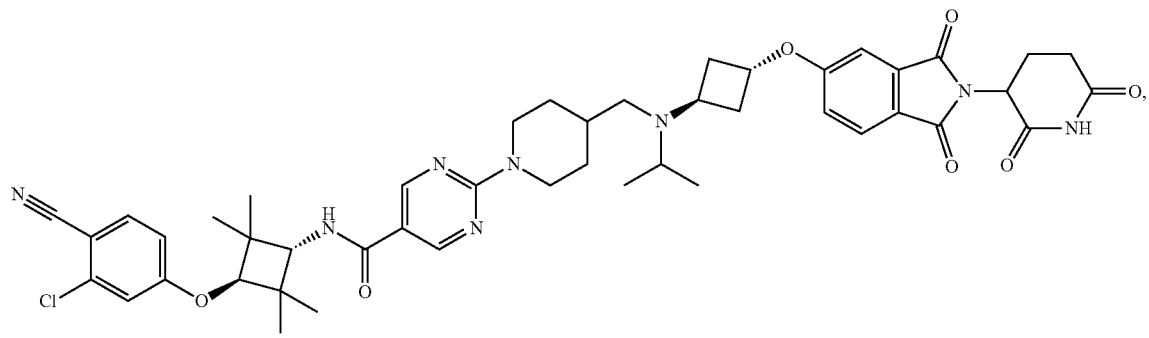 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating or preventing a symptom of spinal and bulbar muscular atrophy (SBMA), wherein the medicament comprises about 75 mg of Compound A, or a pharmaceutically acceptable salt thereof, and the medicament is administered to a subject in need thereof.

In some embodiments, Compound A, or a pharmaceutically acceptable salt thereof, is administered to the subject once a day, twice a day, three times a day, or four times a day.

In some embodiments, Compound A, or a pharmaceutically acceptable salt thereof, is administered to the subject once a day.

In some embodiments, the effective amount of Compound A, or a pharmaceutically acceptable salt thereof, is administered to the subject once every two days.

In some embodiments, the effective amount of Compound A, or a pharmaceutically acceptable salt thereof, is administered to the subject once every three days.

In some embodiments, the effective amount of Compound A, or a pharmaceutically acceptable salt thereof, is administered to the subject once every four days.

In some embodiments, about 1 mg to about 500 mg of Compound A, or a pharmaceutically acceptable salt thereof, is administered to the subject once a day.

In some embodiments, about 1 mg to about 500 mg of Compound A, or a pharmaceutically acceptable salt thereof, is administered to the subject once every two days.

In some embodiments, about 1 mg to about 500 mg of Compound A, or a pharmaceutically acceptable salt thereof, is administered to the subject once every three days.

In some embodiments, about 1 mg to about 500 mg of Compound A, or a pharmaceutically acceptable salt thereof, is administered to the subject once every four days.

In some embodiments, about 1 mg to about 400 mg of Compound A, or a pharmaceutically acceptable salt thereof, is administered to the subject.

In some embodiments, about 5 mg to about 400 mg of Compound A, or a pharmaceutically acceptable salt thereof, is administered to the subject.

In some embodiments, about 10 mg to about 350 mg of Compound A, or a pharmaceutically acceptable salt thereof, is administered to the subject.

In some embodiments, about 15 mg to about 300 mg of Compound A, or a pharmaceutically acceptable salt thereof, is administered to the subject.

In some embodiments, about 20 mg to about 250 mg of Compound A, or a pharmaceutically acceptable salt thereof, is administered to the subject.

In some embodiments, about 25 mg to about 200 mg of Compound A, or a pharmaceutically acceptable salt thereof, is administered to the subject.

In some embodiments, about 30 mg to about 150 mg of Compound A, or a pharmaceutically acceptable salt thereof, is administered to the subject.

In some embodiments, about 35 mg to about 100 mg of Compound A, or a pharmaceutically acceptable salt thereof, is administered to the subject.

In some embodiments, about 10 mg of Compound A, or a pharmaceutically acceptable salt thereof, is administered to the subject.

In some embodiments, about 25 mg of Compound A, or a pharmaceutically acceptable salt thereof, is administered to the subject.

In some embodiments, about 50 mg of Compound A, or a pharmaceutically acceptable salt thereof, is administered to the subject.

In some embodiments, about 75 mg of Compound A, or a pharmaceutically acceptable salt thereof, is administered to the subject.

In some embodiments, about 100 mg of Compound A, or a pharmaceutically acceptable salt thereof, is administered to the subject.

In some embodiments, about 125 mg of Compound A, or a pharmaceutically acceptable salt thereof, is administered to the subject.

In some embodiments, about 150 mg of Compound A, or a pharmaceutically acceptable salt thereof, is administered to the subject.

In some embodiments, about 175 mg of Compound A, or a pharmaceutically acceptable salt thereof, is administered to the subject.

In some embodiments, about 200 mg of Compound A, or a pharmaceutically acceptable salt thereof, is administered to the subject.

In some embodiments, about 225 mg of Compound A, or a pharmaceutically acceptable salt thereof, is administered to the subject.

In some embodiments, about 250 mg of Compound A, or a pharmaceutically acceptable salt thereof, is administered to the subject.

In some embodiments, about 275 mg of Compound A, or a pharmaceutically acceptable salt thereof, is administered to the subject.

In some embodiments, about 300 mg of Compound A, or a pharmaceutically acceptable salt thereof, is administered to the subject.

In some embodiments, about 325 mg of Compound A, or a pharmaceutically acceptable salt thereof, is administered to the subject.

In some embodiments, about 350 mg of Compound A, or a pharmaceutically acceptable salt thereof, is administered to the subject.

In some embodiments, about 375 mg of Compound A, or a pharmaceutically acceptable salt thereof, is administered to the subject.

In some embodiments, about 400 mg of Compound A, or a pharmaceutically acceptable salt thereof, is administered to the subject.

In some embodiments, about 425 mg of Compound A, or a pharmaceutically acceptable salt thereof, is administered to the subject.

In some embodiments, about 450 mg of Compound A, or a pharmaceutically acceptable salt thereof, is administered to the subject.

In some embodiments, about 475 mg of Compound A, or a pharmaceutically acceptable salt thereof, is administered to the subject.

In some embodiments, about 500 mg of Compound A, or a pharmaceutically acceptable salt thereof, is administered to the subject.

In some embodiments, about 200 mg to about 500 mg of Compound A, or a pharmaceutically acceptable salt thereof, is administered to the subject.

In some embodiments, about 200 mg to about 450 mg of Compound A, or a pharmaceutically acceptable salt thereof, is administered to the subject.

In some embodiments, about 200 mg to about 400 mg of Compound A, or a pharmaceutically acceptable salt thereof, is administered to the subject.

In some embodiments, about 200 mg to about 350 mg of Compound A, or a pharmaceutically acceptable salt thereof, is administered to the subject.

In some embodiments, about 200 mg to about 300 mg of Compound A, or a pharmaceutically acceptable salt thereof, is administered to the subject.

In some embodiments, about 200 mg to about 250 mg of Compound A, or a pharmaceutically acceptable salt thereof, is administered to the subject.

In some embodiments, about 250 mg to about 500 mg of Compound A, or a pharmaceutically acceptable salt thereof, is administered to the subject.

In some embodiments, about 250 mg to about 450 mg of Compound A, or a pharmaceutically acceptable salt thereof, is administered to the subject.

In some embodiments, about 250 mg to about 400 mg of Compound A, or a pharmaceutically acceptable salt thereof, is administered to the subject.

In some embodiments, about 250 mg to about 350 mg of Compound A, or a pharmaceutically acceptable salt thereof, is administered to the subject.

In some embodiments, about 250 mg to about 300 mg of Compound A, or a pharmaceutically acceptable salt thereof, is administered to the subject.

In some embodiments, about 300 mg to about 500 mg of Compound A, or a pharmaceutically acceptable salt thereof, is administered to the subject.

In some embodiments, about 300 mg to about 450 mg of Compound A, or a pharmaceutically acceptable salt thereof, is administered to the subject.

In some embodiments, about 300 mg to about 400 mg of Compound A, or a pharmaceutically acceptable salt thereof, is administered to the subject.

In some embodiments, about 300 mg to about 350 mg of Compound A, or a pharmaceutically acceptable salt thereof, is administered to the subject.

In some embodiments, about 350 mg to about 500 mg of Compound A, or a pharmaceutically acceptable salt thereof, is administered to the subject.

In some embodiments, about 350 mg to about 450 mg of Compound A, or a pharmaceutically acceptable salt thereof, is administered to the subject.

In some embodiments, about 350 mg to about 400 mg of Compound A, or a pharmaceutically acceptable salt thereof, is administered to the subject.

In some embodiments, about 400 mg to about 500 mg of Compound A, or a pharmaceutically acceptable salt thereof, is administered to the subject.

In some embodiments, about 400 mg to about 450 mg of Compound A, or a pharmaceutically acceptable salt thereof, is administered to the subject.

In some embodiments, about 450 mg to about 500 mg of Compound A, or a pharmaceutically acceptable salt thereof, is administered to the subject.

In some embodiments, Compound A, or a pharmaceutically acceptable salt thereof, is administered to the subject in one of the following amounts: about 25 mg to about 75 mg, about 30 mg to about 80 mg, about 35 mg to about 85 mg, about 40 mg to about 90 mg, about 45 mg to about 95 mg, about 50 mg to about 100 mg, about 55 mg to about 105 mg, about 60 mg to about 110 mg, about 65 mg to about 115 mg, about 70 mg to about 120 mg, or about 75 mg to about 125 mg.

In some embodiments, Compound A, or a pharmaceutically acceptable salt thereof, is administered to the subject in one of the following amounts: about 30 mg to about 75 mg, about 35 mg to about 80 mg, about 40 mg to about 85 mg, about 45 mg to about 90 mg, about 50 mg to about 95 mg, about 55 mg to about 100 mg, about 60 mg to about 105 mg, about 65 mg to about 110 mg, about 70 mg to about 115 mg, or about 75 mg to about 120 mg.

In some embodiments, Compound A, or a pharmaceutically acceptable salt thereof, is administered to the subject in one of the following amounts: about 35 mg to about 75 mg, about 40 mg to about 80 mg, about 45 mg to about 85 mg, about 50 mg to about 90 mg, about 55 mg to about 95 mg, about 60 mg to about 100 mg, about 65 mg to about 105 mg, about 70 mg to about 110 mg, or about 75 mg to about 110 mg.

In some embodiments, Compound A, or a pharmaceutically acceptable salt thereof, is administered to the subject in one of the following amounts: about 40 mg to about 75 mg, about 45 mg to about 80 mg, about 50 mg to about 85 mg, about 55 mg to about 90 mg, about 60 mg to about 95 mg, about 65 mg to about 100 mg, about 70 mg to about 105 mg, or about 75 mg to about 110 mg.

In some embodiments, Compound A, or a pharmaceutically acceptable salt thereof, is administered to the subject in one of the following amounts: about 45 mg to about 75 mg, about 50 mg to about 80 mg, about 55 mg to about 85 mg, about 60 mg to about 90 mg, about 65 mg to about 95 mg, about 70 mg to about 100 mg, or about 75 mg to about 105 mg.

In some embodiments, Compound A, or a pharmaceutically acceptable salt thereof, is administered to the subject in one of the following amounts: about 50 mg to about 75 mg, about 55 mg to about 80 mg, about 60 mg to about 85 mg, about 65 mg to about 90 mg, about 70 mg to about 95 mg, or about 75 mg to about 100 mg.

In some embodiments, Compound A, or a pharmaceutically acceptable salt thereof, is administered to the subject in one of the following amounts: about 50 mg to about 75 mg, about 55 mg to about 80 mg, about 60 mg to about 85 mg, about 65 mg to about 90 mg, about 70 mg to about 95 mg, or about 75 mg to about 100 mg.

In some embodiments, Compound A, or a pharmaceutically acceptable salt thereof, is administered to the subject in one of the following amounts: about 55 mg to about 75 mg, about 60 mg to about 80 mg, about 65 mg to about 85 mg, about 70 mg to about 90 mg, or about 75 mg to about 95 mg.

In some embodiments, Compound A, or a pharmaceutically acceptable salt thereof, is administered to the subject in one of the following amounts: about 60 mg to about 75 mg, about 65 mg to about 80 mg, about 70 mg to about 85 mg, or about 75 mg to about 90 mg.

In some embodiments, Compound A, or a pharmaceutically acceptable salt thereof, is administered to the subject in one of the following amounts: about 65 mg to about 75 mg, about 70 mg to about 80 mg, or about 75 mg to about 85 mg.

In some embodiments, the subject is in a fed state at the time of administration.

In some embodiments, the subject is in a fasted state at the time of administration.

Dosage and administration are adjusted to provide sufficient levels of the compound of the disclosure or to maintain the desired effect. Factors which may be considered include the severity of the disease state, general health of the subject, age, weight, and gender of the subject, diet, time and frequency of administration, drug combination(s), reaction sensitivities, and tolerance/response to therapy.

In one aspect, the present application relates to a method of treating and/or preventing SBMA comprising administering to a subject in need thereof an effective amount of Compound A, or a pharmaceutically acceptable salt thereof, in combination with one or more additional bioactive agents.

In some embodiments, the one or more additional bioactive agent is leuprorelin or a pharmaceutically acceptable salt thereof. In some embodiments, the one or more additional bioactive agent is leuprorelin acetate.

In some embodiments, Compound A, or a pharmaceutically acceptable salt thereof, and leuprorelin acetate are administered to the subject simultaneously. In some embodiments, Compound A, or a pharmaceutically acceptable salt thereof, and leuprorelin acetate are administered to the subject sequentially.

In some embodiments, Compound A, or a pharmaceutically acceptable salt thereof, and the one or more additional bioactive agents are administered to the subject in temporal proximity.

In some embodiments, Compound A, or a pharmaceutically acceptable salt thereof, and leuprorelin or a pharmaceutically acceptable salt of leuprorelin (e.g., leuprorelin acetate) are administered to the subject in temporal proximity.

In some embodiments, "temporal proximity" means that administration of Compound A, or a pharmaceutically acceptable salt thereof, occurs within a time period before or after the administration of the one or more additional bioactive agents, such that the therapeutic effect of Compound A, or a pharmaceutically acceptable salt thereof, overlaps with the therapeutic effect of the one or more additional bioactive agents. In some embodiments, the therapeutic effect of Compound A, or a pharmaceutically acceptable salt thereof, completely overlaps with the therapeutic effect of the one or more additional bioactive agents. In some embodiments, "temporal proximity" means that administration of Compound A, or a pharmaceutically acceptable salt thereof, occurs within a time period before or after the administration of the one or more additional bioactive agents, such that there is a synergistic effect between Compound A, or a pharmaceutically acceptable salt thereof, and the one or more additional bioactive agents. In some embodiments, the additional bioactive agent is leuprorelin, or a pharmaceutically acceptable salt thereof. In some embodiments, the additional bioactive agent is leuprorelin acetate.

"Temporal proximity" may vary according to various factors, including but not limited to, the age, gender, weight, genetic background, medical condition, disease history, and treatment history of the subject to which the therapeutic agents are to be administered; the disease or condition to be treated or ameliorated; the therapeutic outcome to be achieved; the dosage, dosing frequency, and dosing duration of the therapeutic agents; the pharmacokinetics and pharmacodynamics of the therapeutic agents; and the route(s) through which the therapeutic agents are administered. In some embodiments, "temporal proximity" means within 15 minutes, within 30 minutes, within an hour, within two hours, within four hours, within six hours, within eight hours, within 12 hours, within 18 hours, within 24 hours, within 36 hours, within 2 days, within 3 days, within 4 days, within 5 days, within 6 days, within a week, within 2 weeks, within 3 weeks, within 4 weeks, with 6 weeks, or within 8 weeks. In some embodiments, multiple administration of one therapeutic agent can occur in temporal proximity to a single administration of another therapeutic agent. In some embodiments, temporal proximity may change during a treatment cycle or within a dosing regimen.

Figure 10:
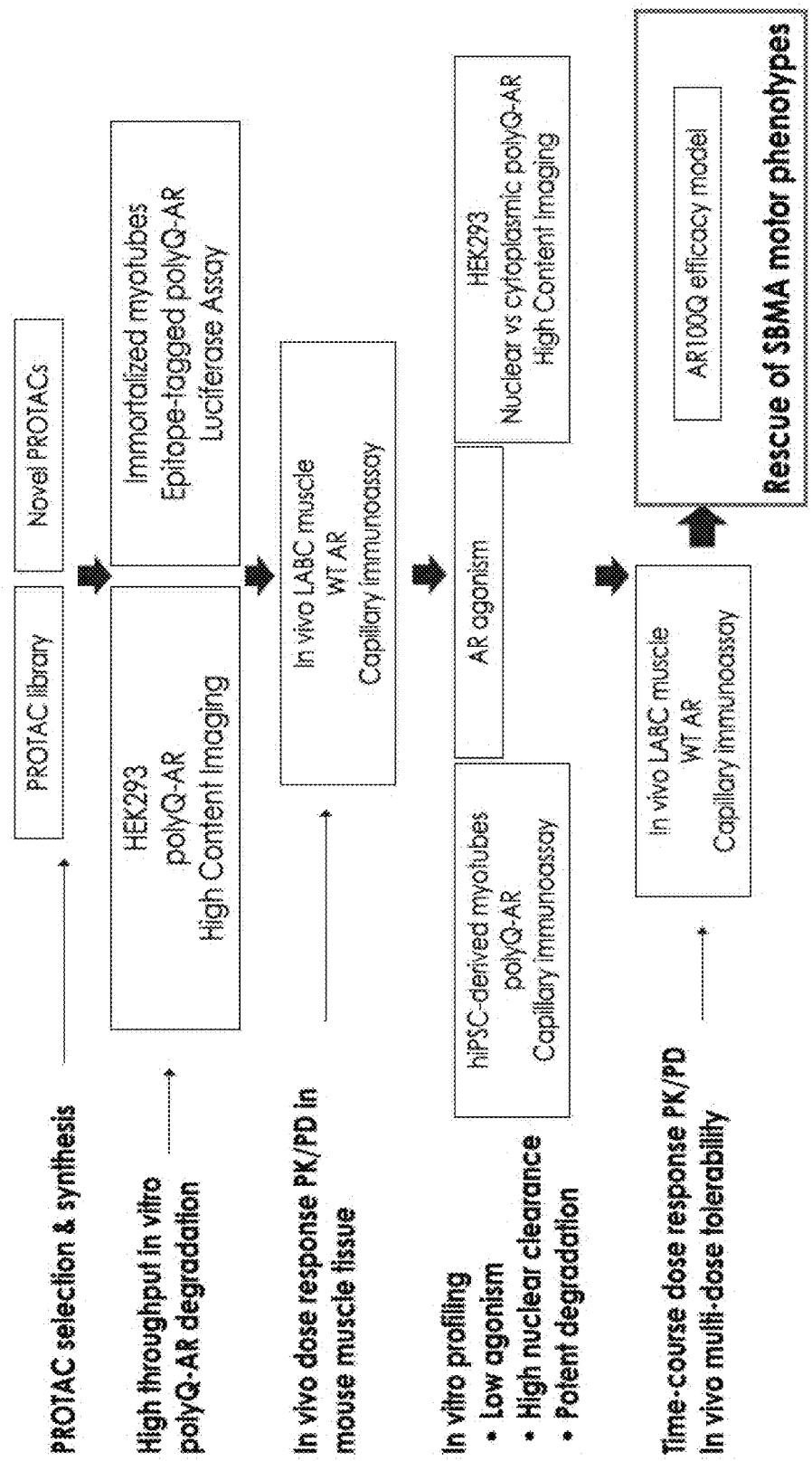
FIG. 10 is a schematic representation illustrating a screening tier that was specifically designed to identify compounds with the desired activity against PolyQ-AR in the cell type (myotubes) and tissue (muscle) that is heavily impacted in SBMA.

Summary of Examples—the Evaluation of AR PROTAC Degraders in a Screening Tier Focused on PolyQ-AR Degradation in Muscle A screening tier was specifically designed to identify compounds with the desired activity against polyQ-AR in the cell type (myotubes) and tissue (muscle) that is heavily impacted in SBMA (FIG. 10). Ultimately, Compound A was discovered to improve phenotypes associated with SBMA in a murine model of disease.

EXAMPLES

The disclosure is further illustrated by the following examples, which are not to be construed as limiting this disclosure in scope or spirit to the specific procedures herein described. It is to be understood that the examples are provided to illustrate certain embodiments and that no limitation to the scope of the disclosure is intended thereby.

It is to be further understood that resort may be had to various other embodiments, modifications, and equivalents thereof which may suggest themselves to those skilled in the art without departing from the spirit of the present disclosure and/or scope of the appended claims.

Example 1—Representative Methods

Animal Dosing and Tissue Harvest.

Using six- to eight-week-old C57Bl/6 male mice, chow and water were provided ad libitum. Compounds were administered by oral gavage at the indicated dose using 5% dimethyl sulfoxide (DMSO), 95% (2% Tween 80, PEG 400) as the vehicle. Mice were euthanized by using Isoflurane inhalation (2-4% induction) followed by decapitation 24 hours post dose unless otherwise indicated. The levator ani/bulbocavernosus (LABC) muscle was dissected and immediately snap frozen and stored at −80° C. prior to analysis. Compound exposure was measured in serum and muscle lysates.

Male mice harboring approximately 73±14 copies of full-length human AR harboring 100 CAG repeats in exon 1 (hAR100Q) ("hAR100Q mice") were used in this study. hAR100Q mice were obtained from mice (C57BL/6J background) expressing heterozygous human normal-length AR100Q (AR100Q+/−) under the control of the cytomegalovirus immediate-early enhancer and the chicken beta-actin (pCAGGS) promoter. These transgenic lines were maintained, and the colony expanded by breeding with C57BL/6J (Jackson Laboratory) wild-type (WT) mice.

A total of 24 hAR100Q and 20 littermate controls were used for this study. Each genotype was divided into two groups of 10 (control vs Compound A) giving a total of four separate groups (WT control, WT Compound A, hAR100Q control, and hAR100Q Compound A). All mice were fed control chow beginning at 4 weeks of age. At 5 weeks of age, treated groups were switched to Compound A-formulated chow and the remaining mice were fed control chow. Body weights were recorded weekly starting at 5 weeks of age.

Genotyping.

Mouse genotypes were determined by PCR of DNA extracted from mouse ear clips. A REDExtract-N-Amp Tissue PCR kit was used to extract mouse-ear DNA. PCR was performed using the following primers: human AR transgene (forward 5'-CTTCTGGCGTGTGACCGGCG (SEQ ID NO: 2), reverse 5'-TGAGCTTGGCT-GAATCTTCC (SEQ ID NO: 3)), and BCl2 control (forward 5'-ATGGCGCAAGCCGGGAGAACA (SEQ ID NO: 4), reverse 5'-CCGGTTCAGGTACTCAGTCAT (SEQ ID NO: 5)).

Chow Formulation.

Compound A was formulated at 100 parts per million (ppm) Compound A in rodent chow (Purina #5015). This dose level (100 ppm) approximates a 15 mg/kg dose for a mouse that weighs 20 g and consumes 3 g of chow per day. For control chow, rodent chow (Purina #5015) was re-pelleted in an identical manner to the Compound A-formulated chow.

4-Paw Grip Strength.

A grip strength apparatus was utilized to measure the force exerted by the forepaws only, or all four paws of mice once per week beginning at 7 weeks of age. The apparatus was placed on a sturdy flat lab bench and the apparatus's grid wire mesh was used for all four paws. Individual mice grasped a wire mesh (all four paws) and were gently pulled by the base of their tail to measure their maximum force exerted to maintain their grip. The grip strength assay was conducted 6 times per mouse, for all four paws.

Treadmill.

A Touchscreen Treadmill was utilized to analyze length of time running at increasing speeds until exhaustion. Individual mice ran on a flat treadmill with a graded acceleration protocol consisting of 10 meters (m)/min. for the first 40 min., with the speed increasing thereafter by increments of 1 m/min. every 10 min. for 30 min., and then finally increasing speed by increments of 1 m/min. every 5 min. until the mice were exhausted. The exhaustion was determined by 5 consecutive seconds or 20 overall seconds of failure to exercise (by staying on shock rods at the start of the treadmill). Treadmill training was performed for 2 days before the first week of testing. The training protocol on day 1 consisted of 5 min. at 8 m/min, while day 2 consisted of 5 min. at 8 m/min. followed by 5 min. at 10 m/min. All testing events had a gradient warm-up period of 1 m/min. to the starting speed of 2 min.

Mouse AR ELISA.

Anti-androgen receptor rabbit polyclonal antibody, clone PG-21 (Millipore; 06-680), was diluted in BupH carbonate-bicarbonate buffer (Thermo; 28382) to a concentration of 2 µg/mL and coated onto 96-well ELISA plates by incubating 50 µL per well overnight at 37° C. Plates were washed 4× with tris-buffered saline (TBS) buffer containing 0.1% Tween-20 (TBS-0.1% T) and blocked with 3% bovine serum albumin in TBS-T for 3 hours at room temperature (200 µL per well). AR peptide standard (Creative Biomart; Cat. No. AR-9788H) and samples were diluted in 1% bovine serum albumin (BSA)/TBS-0.05% T. After the blocking period, plates were washed as above, and 50 µL of standard and samples were added. Plates were incubated overnight at 4° C. with shaking. Following the incubation period, the plates were allowed to acclimate to room temperature with shaking for 1 hour. The detection antibody (anti-AR antibody, clone EPR1535 (abcam; ab194196)), conjugated to horse radish peroxidase (HRP), was diluted 1:15000 in 1% BSA/TBS-0.05% T and co-incubated with the samples by adding 50 µL to each well and shaking for 2 hours at room temperature. Plates were washed as above. Chemiluminescent substrate (ELISABright; Advansta; K-16025) was added to the plates (100 µL per well).

Cell Lines.

Human embryonic kidney cells that constitutively express the tetracycline repressor (T-REx™-293 cells) (Thermo Fisher Scientific—R71007) maintained in Dulbecco's Modified Eagle Medium (DMEM) were supplemented with 10% heat inactivated fetal bovine serum (26050088 Thermo Fisher Scientific), GlutaMAX (35050061 ThermoFisher Scientific), and 1% penicillin/streptomycin (15140122 Thermo Fisher Scientific). AR and polyQ-AR were cloned downstream of a tetracycline operator array and stably integrated into T-REx™-293 cells. AR or polyQ-AR expression was induced with 1 g/ml doxycycline.

Human AR56Q was amplified from a previously constructed plasmid containing polyQ-AR and cloned into pLV-tetOn-luc2-res-turboGFP digested with Age/XhoI using the Gibson® assembly method to create plasmid 46. To construct a puromycin-selectable version, the Gibson® assembly method was used to join the XbaI AR56Q fragment from plasmid 46 to a lentiviral backbone amplified from template-2-px459. The CAG repeat number was verified by Sanger sequencing. Second generation lentivirus was produced by transfection of pSPAX2, pMD2.G, and the AR56Q transfer plasmid Growth media was harvested at 48- and 72-hours post-transfection and cleared and subsequently concentrated by centrifugation. Titers were measured by real-time quantitative reverse transcription polymerase chain reaction.

Cells were maintained in skeletal growth medium (PromoCell #23160). Immortalized myoblasts harboring inducible human androgen receptor with 56 CAG repeats (hAR56Q) were constructed by lentiviral transduction with CMV-rtTA and TetO-AR56Q-T2A-Puromycin (Mamchaoui, K. et al. *Skeletal Muscle* 1, 34 (2011)).

Myotube PolyQ-AR HiBit.

Human myoblasts containing a 56 polyQ expansion androgen receptor (AR) tagged with the HiBit protein were made as previously described (ACS Chem. Biol. 2018, 13, 2, 467-474.) Cells were cultured in skeletal muscle basal media containing supplements (Promocell, #C23060) and 1% Penicillin/Streptomycin (ThermoFisher, #15070063) at 37° C. and 5% $CO_2$ until plating. Prior to cell plating, 384-well plates were coated with 1:100 GelTrex (ThermoFisher, #1413201), diluted in DMEM/F12 (ThermoFisher, #11330032), and incubated at 37° C. for 1-2 hours. The media was then aspirated from the plates using a platewasher prior to plating myoblasts at a density of 8000 cells/well in 45 µL of muscle basal media. The myoblasts were then incubated overnight at 37° C. Following overnight incubation, the media was aspirated from the plates using a platewasher and was replaced with 45 µL of skeletal muscle differentiation media containing included supplements (Promocell, #C23061). Differentiation was allowed to occur for four days at 37° C. prior to treatment with compounds. Prior to treatment, the compounds were diluted using a 1 µL compound transfer into 100 µL of skeletal muscle differentiation media containing 10 µg/mL doxycycline in a 384-well deep well microplate using an Agilent Bravo. This intermediate plate was used to transfer 5 µL of diluted compound into the 45 µL of differentiated myotubes to yield a top concentration of 1 µM with 1 µg/mL of doxycycline for polyQ-AR induction. The myotubes were incubated for 24 hours to allow for induction and compound treatment and AR56Q was quantified using the Hibit (Promega) readout. The plates were removed from the incubator and allowed to come to room temperature for 45 minutes. The cells were then treated with 25 L/well of lytic buffer containing 1:100 lytic substrate and 1:100 LgBit protein and allowed to incubate for 45 minutes including 10 minutes of shaking at 400 RPM. The plates were then read on a plate reader under luminescent settings. Cell viability was measured in parallel on separate plates using alamarBlue™ (ThermoFisher, #A50100). The plates were treated with 5 µL of alamarBlue™ substrate and allowed to incubate for 2 hours at 37° C. The plates were then removed from the incubator and allowed to equilibrate to room temperature for 2 hours prior to reading on a plate reader at 560/590 (Ex/Em). All experiments were performed in technical triplicate and with biological duplicates on separate dates.

Capillary Immunoassay for AR.

Lysates for hiPSC-derived myotubes were prepared in lysis buffer (25 nM HEPES, 50 mM sodium chloride, 1% NP-40, 1% SDS) supplemented with Halt Protease Inhibitor (78437 Thermo Fisher Scientific), Benzonase, and $MgCl_2$ (1 mM final concentration). The lysates were cleared by centrifugation at 4° C. and supernatants were quantified using the BIO-RAD DC protein assay (5000112 BIO-RAD). The AR and protein levels were quantified by an automated capillary immunoassay experiment (ProteinSimple). The AR and Myosin Protein levels were quantified and normalized to total protein.

Mouse endogenous AR, human AR100Q, and high molecular weight hAR100Q from hAR100Q mice were quantified by capillary immunoassay. Tissue lysates were prepared as described above using antibodies to AR and resolved by capillary electrophoresis (ProteinSimple). High molecular weight AR was quantified as the area under the curve (AUC) from 300 to 600 kDa.

HEK293 PolyQ-AR High Content.

The HEK293 PolyQ Androgen Receptor Cell line was kept in culture at 70% confluence. The cells were plated in PDL coated 384 well plates in HEK PolyQ AR complete Medium (DMEM (ThermoFisher Scientific 11965-084), 10% Tet Free FBS (ThermoFisher Scientific A47364-01) and 1% Penn Strep (ThermoFisher Scientific 15140122) at a density of 10K/well (333,333 cells per mL and 30 µL per well). The cells were incubated overnight at 37° C., 5% humidity. The compounds were diluted in 100% DMSO and were diluted 1:3 for 10-point concentration-response curves (CRCs), with the top concentration being 0.06 mM. Next, 2.5 µL of 100% compounds were stamped into 384 well plates using the Bravo liquid handler. Next, 50 µL of HEK PQ Complete media+10 µg/mL doxycycline were added to the 2.5 µL stamp. Next, 3 µL of diluted compound plate plus dox were added to the cell plates. The compound plates were run in triplicate. The final compound concentration was 300 nM in 0.5% DMSO and 1 µg/mL Dox. The plates were incubated overnight at 37° C. The next day, the media was removed from the plates and was replaced with 20 µL 4% paraformaldehyde (PFA) made in 1×PBS). The plates were incubated with PFA for 15 minutes and then washed 3× with PBS. The plates were permeabilized for 15 minutes with 0.5% Triton made in 1×PBS and then blocked with 5% Bovine Serum Albumin (BSA). The plates were incubated with 5% BSA for one hour at room temperature. The BSA was then removed from the plates and replaced with primary Androgen Receptor antibody (D6F11 Cell Signaling 5135S) diluted 1:100 in PBS with 0.1% BSA. The plates were sealed and incubated overnight at 4° C. The next day, the plates were washed 3× with PBS. Next, 20 µL of secondary antibody (Donkey anti rabbit Alexa 647, Invitrogen A31573) diluted 1:1000 in 1×PBS and Hoechst 33352 Dye (ThermoFisher Scientific H3570) diluted 1:500 was added to each well. The plates were incubated for one hour at room temperature in the dark. The plates were finally washed 3× with 1×PBS, and then covered with a black seal to protect from light. The plates were imaged on the CX7 PRO (Thermos Fisher Scientific) using a 20× objective. Two channels, Hoechst 33342 and Alexa 488 were acquired per well including 6 fields per well. The images were analyzed by segmenting the nuclei using the Hoechst positive signal. Then the degradation of AR was measured by determining the average intensity of the AR within the separate nuclear and cytoplasmic compartments.

AR Agonism Assay.

The AR Responsive Luciferase Reporter MDA-MB-453 Stable Cell Line (MDA-MB-453 ARE-luc) was utilized for the AR agonism assay. These cells constitutively express the firefly luciferase reporter gene under the control of the androgen receptor response element. MDA-MB-453 ARE-luc cells were cultured in RPMI media (Thermo Fisher Scientific) supplemented with 5% charcoal-Dextran treated fetal bovine serum and were maintained at 37° C. in a 5% $CO_2$ incubator. On day 0, the cells were seeded in 96-well plates at a density of $5\times10^6$ cells per plate. To prevent serum androgen interference during the AR agonism assay, the cells were cultured in phenol-free RPMI media without FBS. On day 1, the cells were treated with the compounds to establish concentration-response curves (CRCs). The compounds were administered at a top concentration of 300 nM with half-log dilutions. The synthetic AR agonist R1881 served as a positive control, with a top concentration of 30 nM and half-log dilutions. E3 ligase inhibitor pomalidomide was included in each well alongside the compounds at a concentration tenfold higher than that of the treated compounds. On day 2, the culture medium was removed, and luminescence data were obtained using the Bright Glo Assay (Promega, Catalog No. E2620) with 50 µL of Bright Glo buffer per well. Luminescence signals were recorded using a plate reader, and the agonism effect was calculated as a percentage using the formula: Agonism effect (%)=(Luminescence signal of compound/Maximum signal of R1881 at 30 nM)*100.

Myotube High Content.

On day 0, immortalized myoblasts with inducible polyQ-AR (described above in "Cell lines") cells were seeded onto Geltrex-coated 96-well plates at a density of $4\times10^6$ cells per plate in myoblast basal media (Promocell C-23060) supplemented with 1% penicillin-streptomycin (Pen Strep) antibiotics. The plates were then incubated overnight at 37° C. in a 5% $CO_2$ environment. Upon reaching 100% confluency (Day 1), the myoblast media were aspirated and replaced with myotube differentiation media (Promocell C-23061). The cells were cultured in this differentiation media for 6 days, with media changes occurring every three days.

On the sixth day of differentiation, the compounds and doxycycline (1 g/ml) diluted in 100% dimethyl sulfoxide (DMSO) were added to the myotubes. The plate was then incubated for 24 hours at 37° C. in an incubator. On the following day (Day 7), the culture media was removed from the plates and replaced with 50 µL of 4% paraformaldehyde (PFA) prepared in 1× phosphate-buffered saline (PBS). The plates were incubated with PFA for 15 minutes, followed by three washes with PBS. Subsequently, the myotubes were permeabilized for 15 minutes using 0.5% Triton X-100 in 1×PBS and then blocked with 5% Bovine Serum Albumin (BSA) (Thermofisher, #37520) for one hour at room temperature. After blocking, the plates were incubated overnight at 4° C. with primary antibodies: a 1:100 diluted Androgen Receptor antibody (D6F11 Cell Signaling 5135S) and a 1:200 diluted Desmin antibody (Thermofisher, MA1-22150) in PBS containing 0.1% BSA. The following day, the plates were washed three times with PBS and then incubated for one hour at room temperature in the dark with secondary antibodies: Goat anti-Mouse 647 (A21236) for Desmin and Goat anti-Rabbit Alexa 488 for AR (A11034), both diluted at 1:1000 in 1×PBS. Additionally, Hoechst 33342 (ThermoFisher Scientific H3570) were diluted at 1:500 and added to each well. The plates were then washed three times with 1×PBS, sealed with a black cover to protect from light and, imaged using a CX7 PRO microscope equipped with a 20× objective. Three channels, Hoechst 33342 and Alexa 488 and 647, were acquired per well, including six fields per well. Image analysis involved segmentation of nuclei using Hoechst-positive signals and selection of myotubes using Desmin-positive areas. Degradation was quantified by determining the average intensity of AR within separate nuclear and cytoplasmic compartments in Desmin positive area (myotubes).

Myotube Differentiation.

Control and SBMA hiPSCs were differentiated into myotubes as previously described (Caron, L. et al. 2016, STEM CELLS Transl. Med. 5, 1145-1161) using the skeletal muscle differentiation kit (Amsbio). hiPSCs were dissociated to single cells using Accutase and plated on Geltrex-coated 10 cm culture plates at a density of 200,000 cells per plate with SBMA hiPSCs in skeletal muscle induction media (SKM01, AMSBIO). Media changes were performed every second day until cells were confluent (~7 days). The resulting myogenic precursor cells were then dissociated to single cells using Accutase and replated on Matrigel-coated 24-well tissue culture plate with 500 μL of cells at 35,000 cells per mL in skeletal myoblast media (SKM02, AMSBIO). Half media changes were performed every second day until myoblasts reached confluence (~7 days). The media was then switched to myotube medium (SKM03, ASMBIO). Media changes every second day until myotube formation was confirmed by microscopy. Myotubes were treated on day 20 of differentiation (6 days' worth of SKM03 media) with compounds diluted in DMSO for a final DMSO concentration of 0.01% in SKM03 media. The cells were lysed 24 hours later in Pierce RIPA buffer (Cat. No. 89900, ThermoFisher) supplemented with 1× Halt protease inhibitor cocktail (Cat. No. 87786, ThermoFisher), 1 mM $MgCl_2$, and 1 μL Benzonase Nuclease. AR protein was measured by capillary electrophoresis.

Figure 2A:
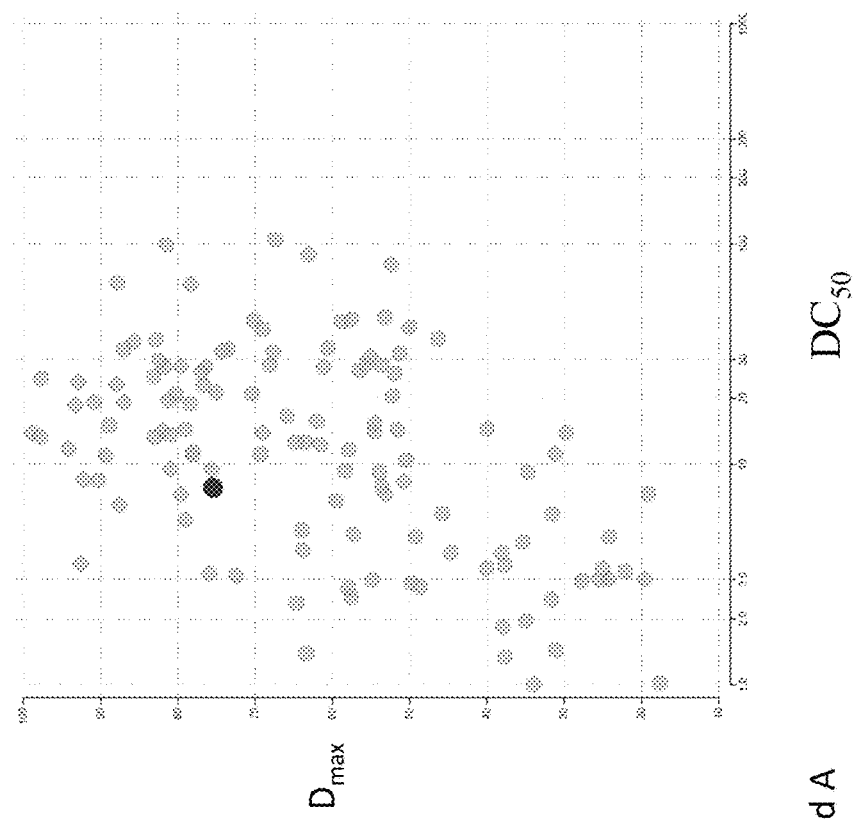
FIG. 2A is a scatterplot showing the potency of various compounds evaluated in myotubes derived from a control myoblast cell line engineered to express polyQ-AR tagged with a HiBiT epitope. Myotubes were treated with a compound for 24 hours and PolyQ-AR levels were measured by Nano-Glo HiBiT Lytic Detection kit. Each dot represents a compound. Compound A is indicated for reference.
Figure 2B:
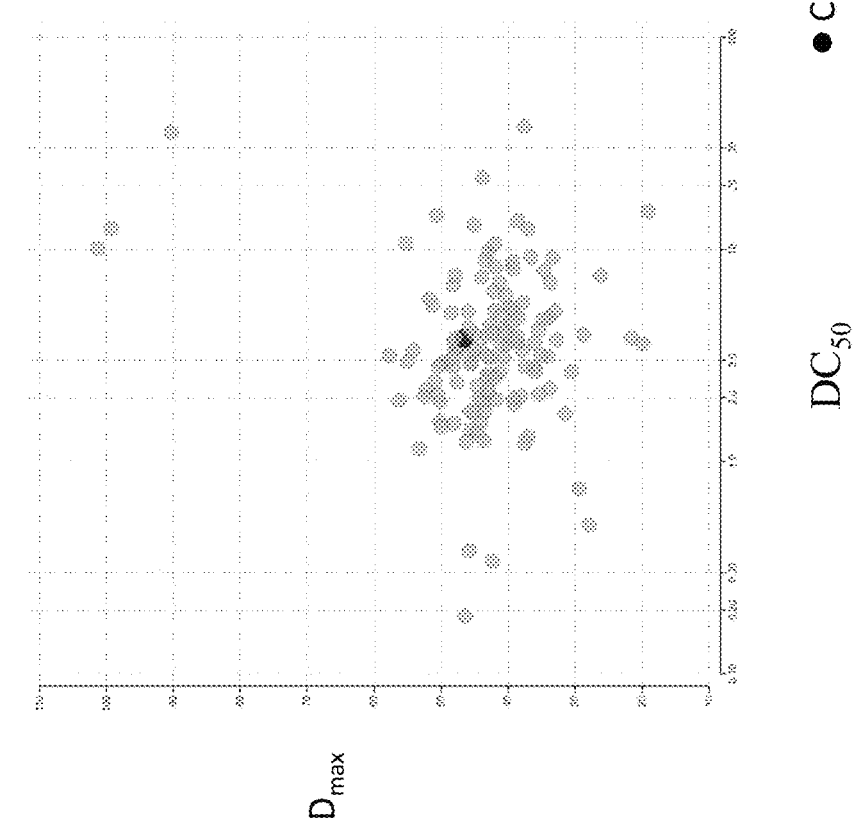
FIG. 2B is a scatterplot showing the potency of various compounds evaluated in HEK293 cells expressing polyQ-AR. Cells were treated with a compound for 24 hours and AR protein was detected by high content imaging. Each dot represents a compound. Compound A is indicated for reference.
Figures 2C, 2D:
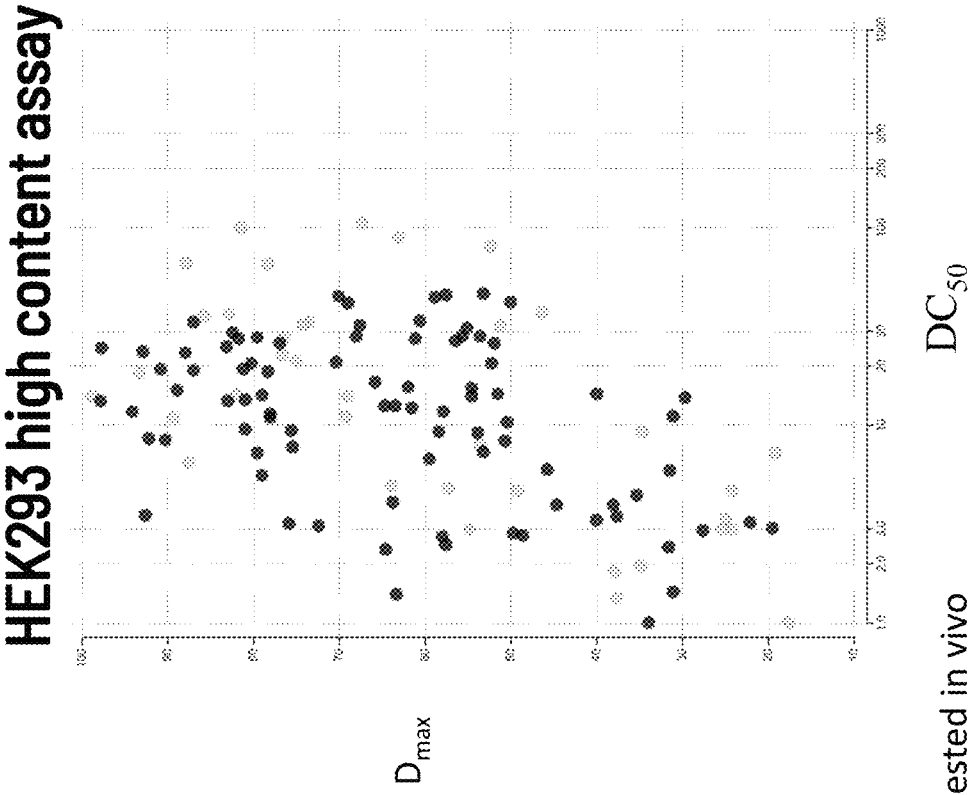
FIG. 2C is the same scatterplot shown in FIG. 2A except that all compounds tested in vivo are indicated for reference.
FIG. 2D is the same scatterplot shown in FIG. 2B except that all compounds tested in vivo are indicated for reference.

Example 2—Identification of a Compound for the Treatment of SBMA 132 compounds with potent activity in VCaP cells ($DC_{50}$ 0.032-2.5 nM; FIG. 1) were evaluated in two orthogonal in vitro polyQ-AR degradation assays. Degradation of HiBit-tagged polyQ-AR was measured in human myotubes using Nano-Glo HiBit Lytic detection (FIG. 2A) and degradation of untagged polyQ-AR was evaluated by high content imaging in HEK293 cells (FIG. 2B). As shown in FIGS. 2A & 2B, multiple compounds demonstrated similar potency to Compound A. 95 of the 132 compounds were selected for in vivo screening based on the in vitro profile ($DC_{50}/D_{max}$) across AR and polyQ-AR assays (FIGS. 2C and 2D).

Figure 3:
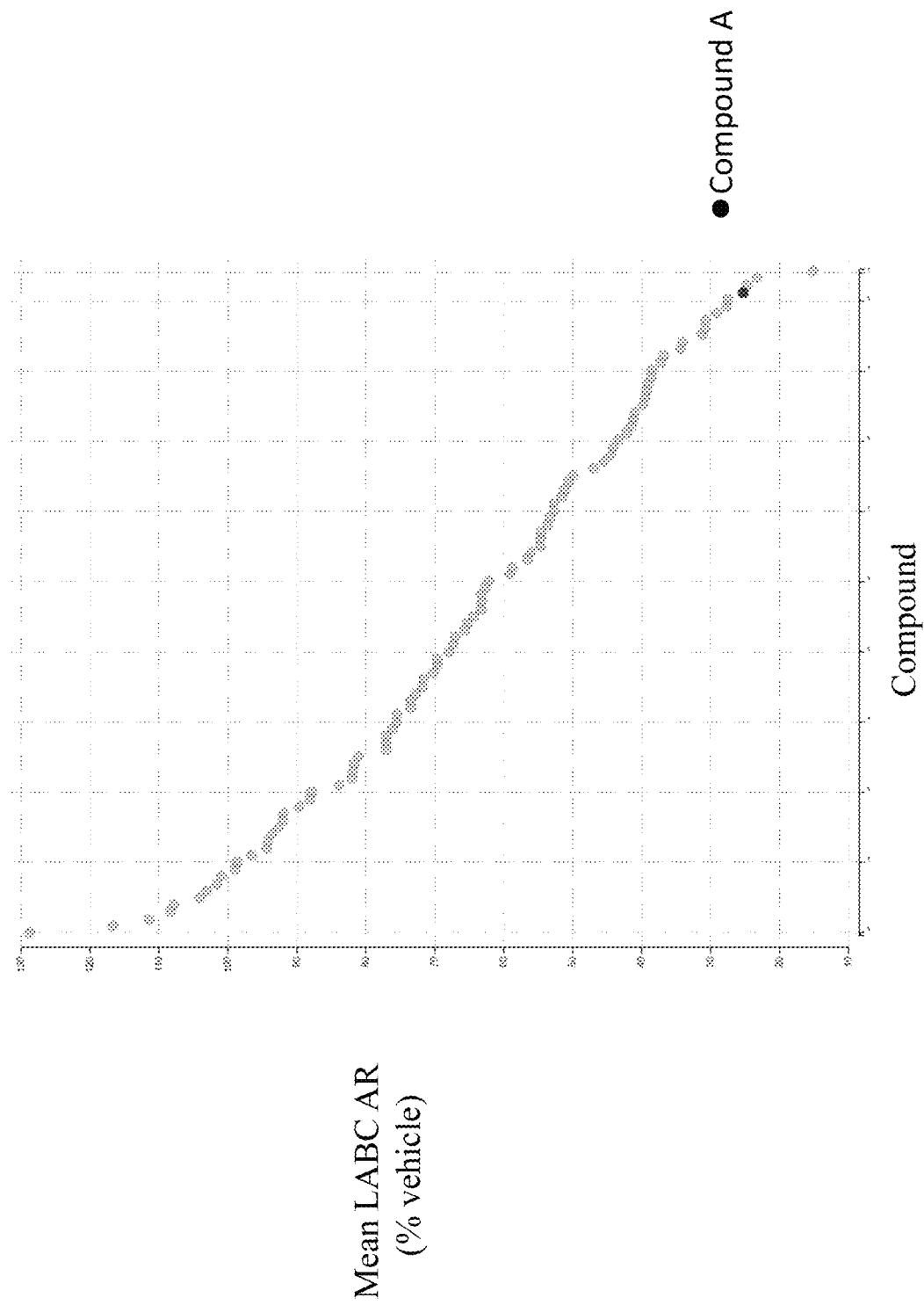
FIG. 3 is a scatterplot showing the mean AR degradation in LABC muscle from male C57B1/6 mice (n=5) dosed PO with 30 mg/kg of various compounds. LABC muscles were harvested 24 hours post dose. AR protein was measured in LABC lysates by ELISA and reported as a percentage of LABC in mice dosed with vehicle only. Each dot represents a compound. Compound A is indicated for reference.

In vivo degradation of endogenous AR was evaluated for 95 compounds in murine levator ani/bulbocavernosus (LABC) muscle using a 30 mg/kg PO dose (see Example 1). The observed AR degradation for these 95 compounds ranged from 0-85% of AR in mouse LABC. 77 of the 95 compounds evaluated failed to induce greater than 50% AR degradation in muscle (FIG. 3). These results illustrate a lack of correlation between in vitro $DC_{50}/D_{max}$ across multiple assays and the in vivo AR degradation observed in muscle (Table 1).

Twenty compounds were selected for further in vivo and in vitro characterization. In vivo potency was evaluated across multiple dose levels to establish a PK/PD relationship between exposure and AR degradation in LABC muscle. Compounds that demonstrated potent dose response PK/PD, i.e., higher doses of the compound induced more AR degradation, were evaluated for subacute adverse events. Specifically, compounds that induced weight loss after up to 7 days of dosing (30 mg/kg PO) were disqualified. Additional compounds were removed from consideration due to unfavorable in vitro ADMET activity (Compound C: 50% hepatocyte toxicity at 1 μM; Compound D: hERG inhibition <10 μM) or poor oral bioavailability (Compound E) in non-human primates. This left only Compound A and Compound B as suitable in vivo candidates among the screened compounds.

Figure 4A:
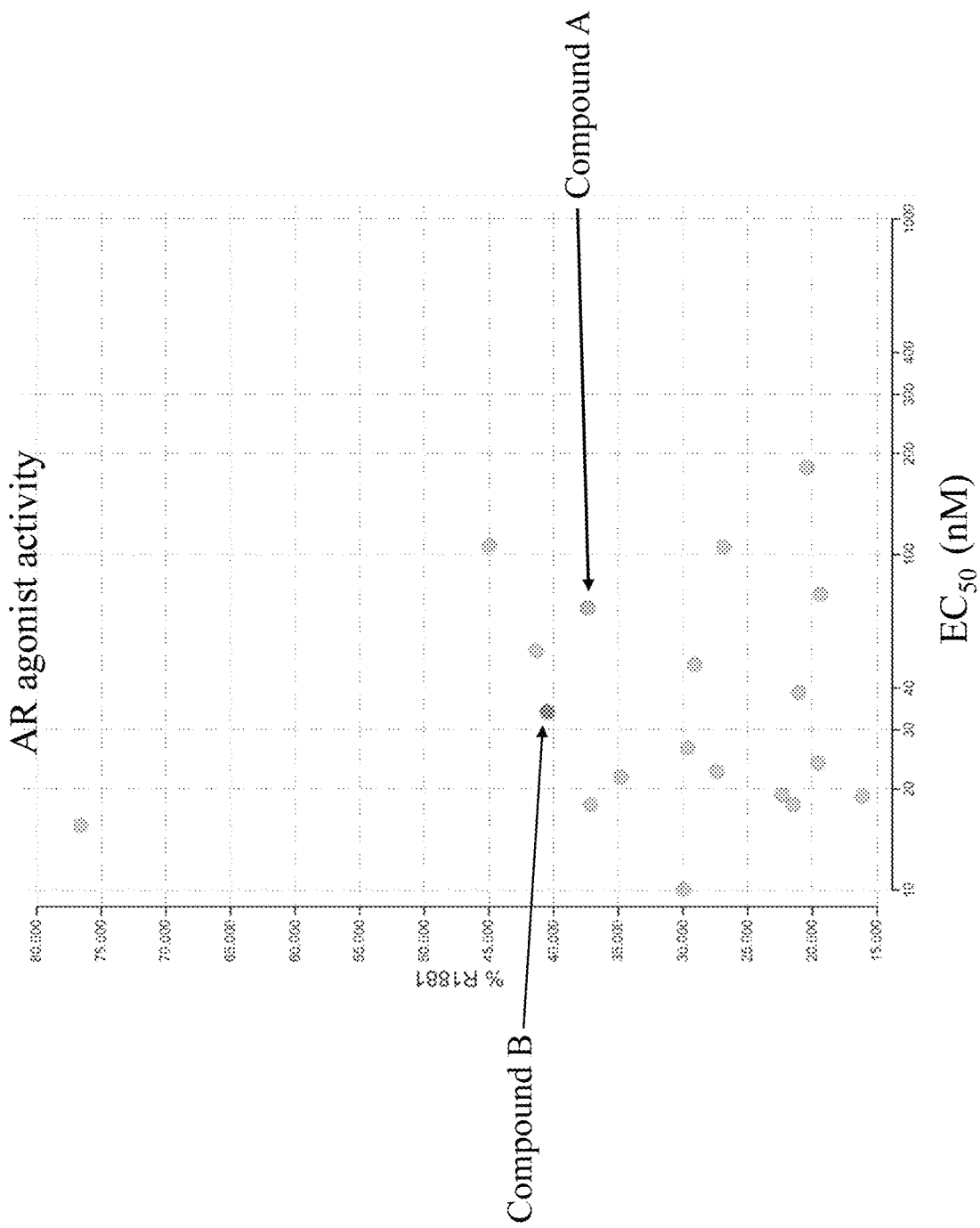
FIG. 4A is a scatterplot showing AR agonist activity measured in MDA-MB-453 cells engineered with an AR luciferase reporter for various compounds in the presence of pomalidomide to block binding to CRBN and subsequent degradation. The maximum agonist activity is reported as a percentage of the agonist activity of R1881 and plotted against the $EC_{50}$. Each dot represents a compound. Compound A and Compound B are indicated for reference.
Figure 4B:
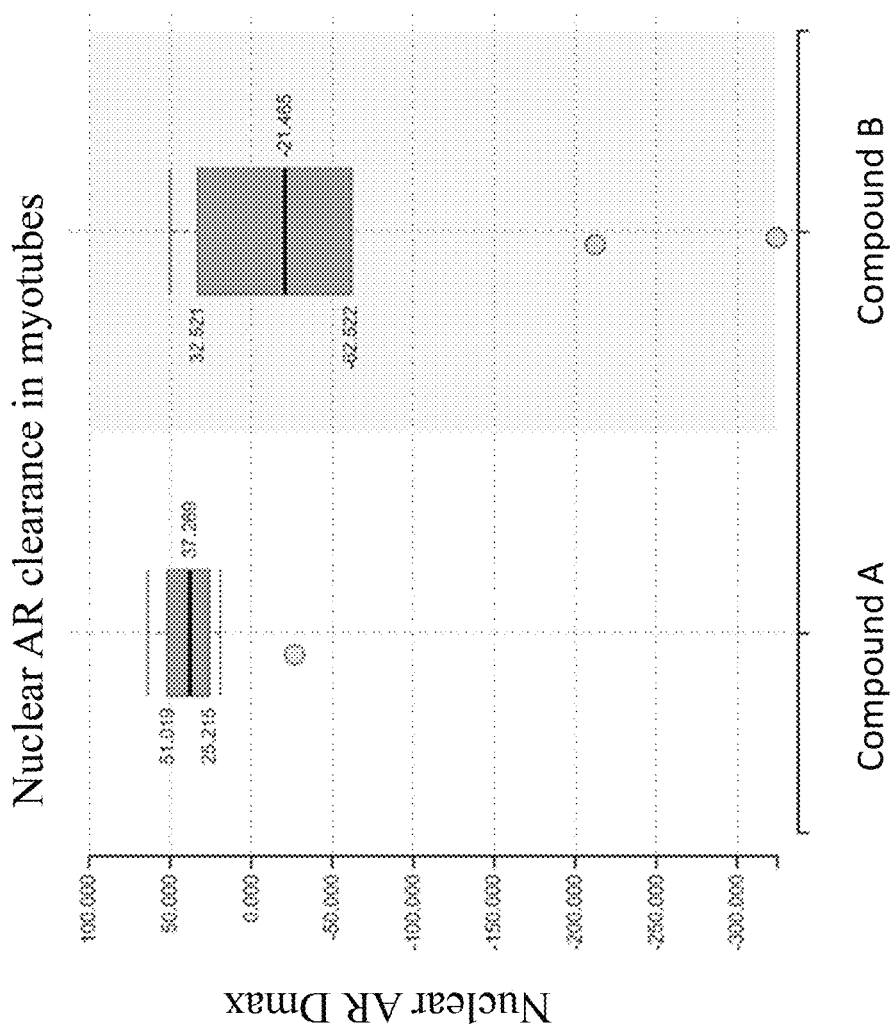
FIG. 4B shows the $D_{max}$ for polyQ-AR in the myotube nuclei measured after 24 hours of treatment with Compound A (left column) and Compound B (right column).
Figure 4C:
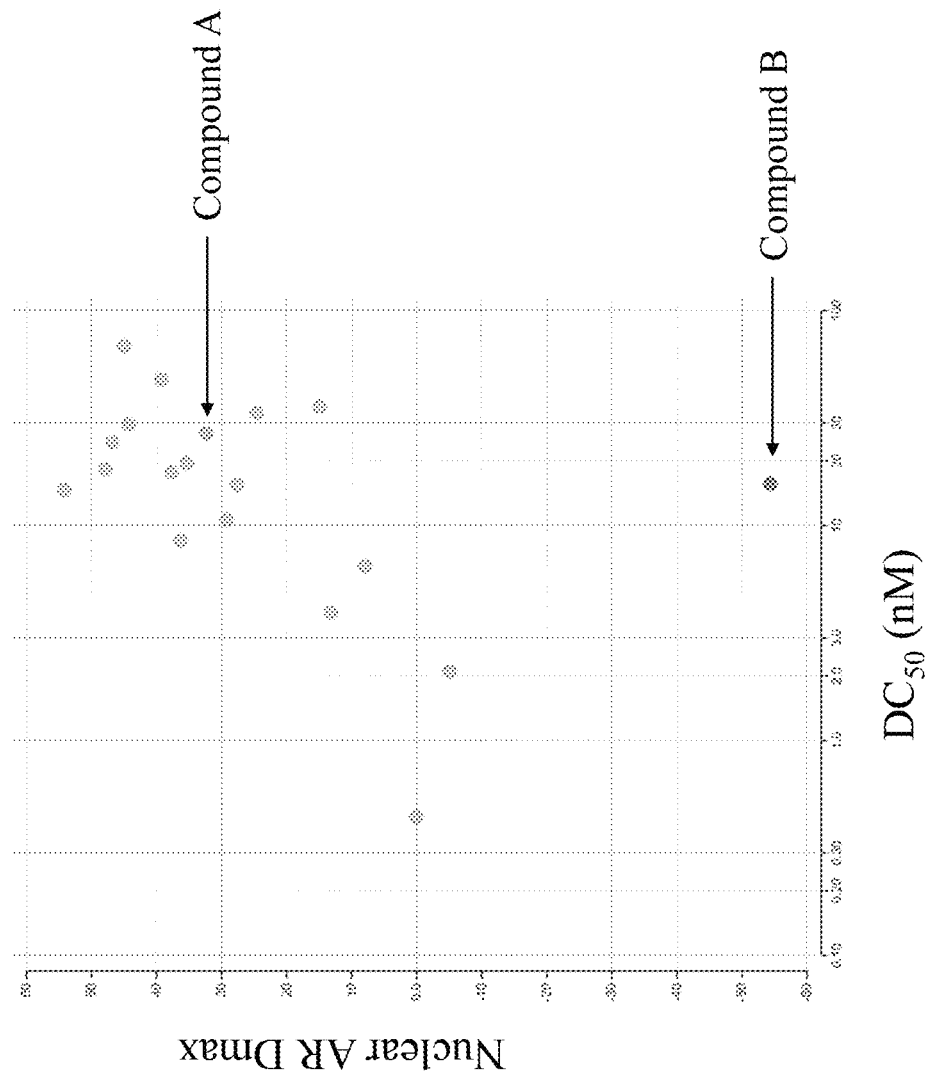
FIG. 4C is a scatterplot showing the $D_{max}$ for polyQ-AR in myotube nuclei plotted against the $DC_{50}$ for AR in myotube nuclei after 24 hours of treatment with various compounds. Each dot represents a compound. Compound A and Compound B are indicated for reference.

Chronic and progressive symptoms of SBMA are driven by the androgen dependent toxicity of polyQ-AR. Without being bound by theory, an ideal compound for the treatment of SBMA would have minimal AR agonist activity (e.g., would not induce androgen dependent AR activity) and it would prevent AR translocation to the nucleus by mediating its degradation. To separate a compound's AR agonist activity from its AR degradation, the agonism was evaluated in the presence of pomalidomide to block the ability of the compound to bind to CRBN using MDA-MB-453 cells engineered with an AR luciferase reporter gene (see Example 1). The $EC_{50}$ of Compound A and Compound B was 69 nM and 37 nM, respectively (FIG. 4A). At $E_{max}$, the agonism activity relative to R1881 was slightly less for Compound A (<40%) than Compound B (>40%) (FIG. 4A). AR in the nuclear compartment was measured in the presence of compound by high content imaging in myotubes that overexpress polyQ-AR (see Example 1). The mean $D_{max}$ achieved by Compound A in myotube nuclei was approximately 40%. In contrast, the mean $D_{max}$ for Compound B was highly variable and, on average, indicated an increase in nuclear polyQ-AR relative to DMSO control cells (FIGS. 4B & 4C). Thus, while Compound B reduced the total polyQ-AR signal in myotubes (data not shown), the AR available to mediate transcription in the nucleus was greater than in cells treated with Compound A.

Human induced pluripotent stems cells (hiPSCs) from SBMA patients can be used to generate myotubes in vitro (Caron, L. et al. 2016, Stem Cells Transl. Med. 5, 1145-1161). This provides a human cell model relevant to SBMA. To confirm the pharmacology of Compound A in disease relevant cells in the correct genetic background, myotubes were derived from two independent SBMA patient hiPSCs and treated with Compound A.

A decrease in polyQ-AR in SBMA hiPSC-myotubes was observed in a concentration-dependent manner with Com-

TABLE 1

Correlation matrix between $DC_{50}$ and $D_{max}$ from AR degradation assays in VCaP (AR), HEK293 (polyQ-AR), and myotubes (polyQ-AR) and the degradation observed in C57Bl/6 mice in the LABC muscle using a 30 mg/kg dose of compound.

Figure 5B:
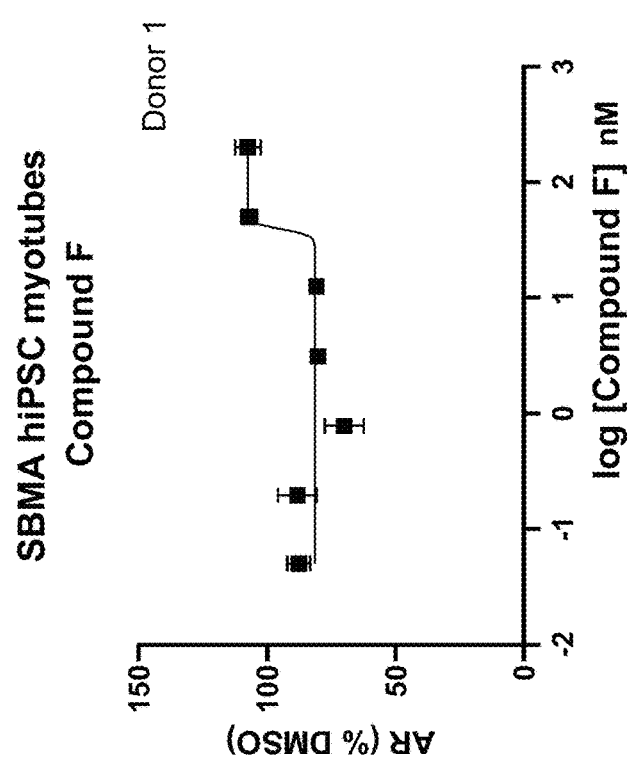
FIG. 5B is a dose-response curve showing polyQ-AR concentration in DMSO treated cells and plotted against the concentration an E3-inactive compound (Compound F) in a SBMA patient-derived hiPSC line differentiated into myotubes. PolyQ-AR protein was detected by capillary immunoassay, normalized to total protein and the mean polyQ-AR concentration in DMSO treated cells, and plotted against the concentration. Curve fitting, $DC_{50}$, and $D_{max}$ calculations were performed constraining the top to 100% in GraphPad Prism.
Figure 5A:
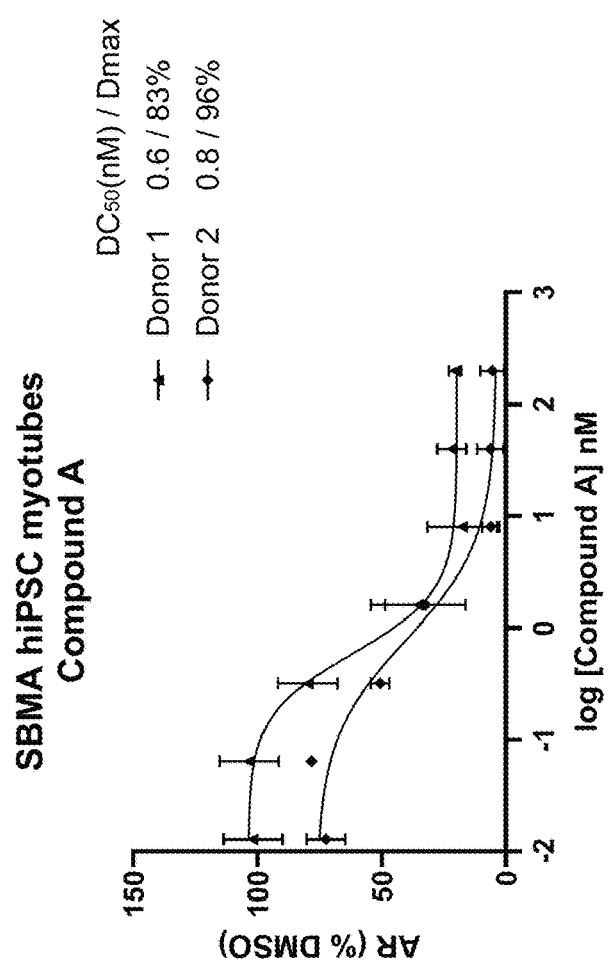
FIG. 5A is a dose-response curve showing mean polyQ-AR concentration in DMSO treated cells plotted against Compound A concentration in SBMA patient-derived hiPSC lines differentiated into myotubes. PolyQ-AR protein was detected by capillary immunoassay, normalized to total protein and the mean polyQ-AR concentration in DMSO treated cells, and plotted against Compound A concentration. Curve fitting, $DC_{50}$, and $D_{max}$ calculations were performed constraining the top to 100% in GraphPad Prism.

|  | Myotube $D_{max}$ | Myotube $DC_{50}$ | HEK293 $D_{max}$ | HEK293 $DC_{50}$ | VCaP $DC_{50}$ | VCaP $D_{max}$ | LABC AR degradation |
|---|---|---|---|---|---|---|---|
| Myotube $D_{max}$ | — | 0.22 | 0.34 | −0.23 | −0.22 | 0.41 | −0.09 |
| Myotube $DC_{50}$ | 0.22 | — | −0.17 | 0.05 | 0.15 | −0.06 | 0.16 |
| HEK293 $D_{max}$ | 0.34 | −0.17 | — | 0.29 | −0.12 | 0.54 | −0.32 |
| HEK293 $DC_{50}$ | −0.23 | 0.05 | 0.29 | — | 0.22 | −0.55 | −0.02 |
| VCaP $DC_{50}$ | −0.22 | 0.15 | −0.12 | 0.22 | — | −0.32 | 0.01 |
| VCaP $D_{max}$ | 0.41 | −0.06 | 0.54 | −0.55 | −0.32 | — | −0.09 |
| LABC AR degradation | −0.09 | 0.16 | −0.32 | −0.02 | 0.01 | −0.09 | — | pound A with a $DC_{50}$ and $D_{max}$ of 0.6-0.8 and 83-96%, respectively, between the two donor hiPSC lines (FIG. 5A). Compound F, an E3-inactive version of Compound A, did not induce polyQ-AR degradation (FIG. 5B). Thus, Compound A induces degradation of polyQ-AR in disease relevant cells from SBMA patients in a CRBN-dependent manner.

Example 3—Efficacy of Compound a in a Murine Model of SBMA

In the murine model of SBMA used here (hereafter referred to as hAR100Q mice), which also expresses endogenous mouse AR, approximately 73±14 copies of full-length human AR with 100 CAG repeats (hAR100Q) are driven by the pCAGGS promoter (Chivet, M. et al. 2020, Cells 9, 325). Heterologous expression of hAR100Q results in muscle atrophy, motor deficits, and premature death (Chivet, M. et al. 2020, Cells 9, 325). Symptom onset starts as early as 8 weeks of age and get progressively worse until week 13-14, at which time mice are euthanized because of extreme immobility. In this study, male hAR100Q mice and littermate controls (10 mice in each group) were fed vehicle chow or Compound A-formulated chow at an approximate dose of 15 mg/kg. In-diet dosing was used in lieu of PO dosing due to the fragile nature of this disease model. Compound A-formulated chow was introduced at 5 weeks of age. In addition to weekly weight measurements, mice were evaluated using behavioral assays, including weekly grip strength measurements and forced treadmill tests at 11 weeks of age.

Figure 6A:
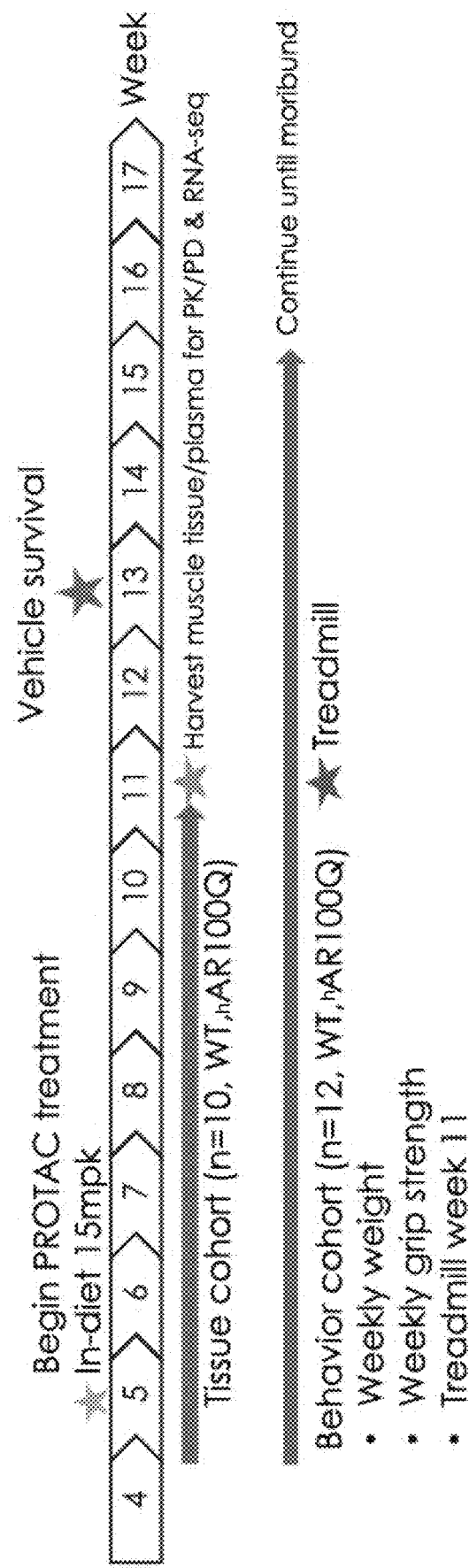
FIG. 6A is a schematic representation of the hAR100Q study, which was aimed at evaluating muscle function and polyQ-AR degradation in a murine model of SBMA.
Figure 6B:
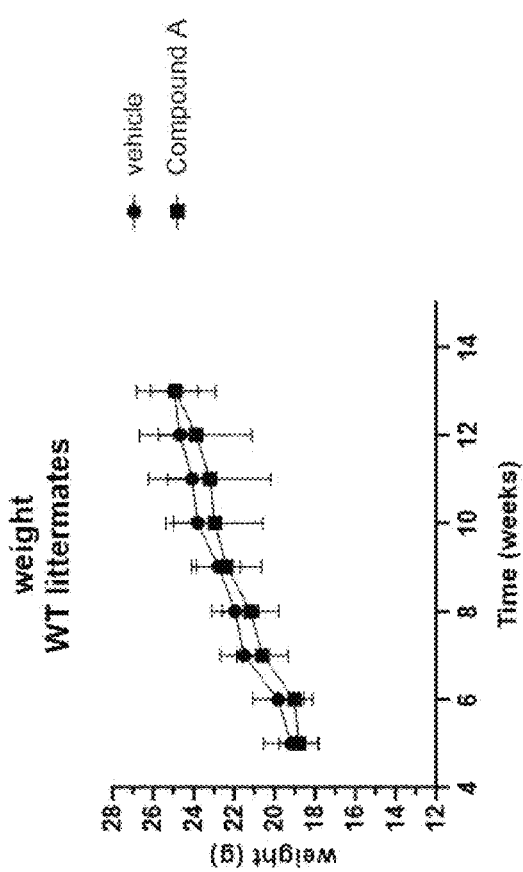
FIG. 6B shows body weight over time for male hAR100Q mice that were fed vehicle or Compound A-formulated chow starting at 5-weeks of age. Body weight was measured weekly. A two-way ANOVA or mixed effects model followed by Sidac's multiple comparison correction was used to compare body weights in WT littermates and hAR100Q mice, respectively. A mixed effects model was used to account for missing data due to hAR100Q mice that died prior to 13 weeks of age (****$p<0.0001$).
Figure 6C:
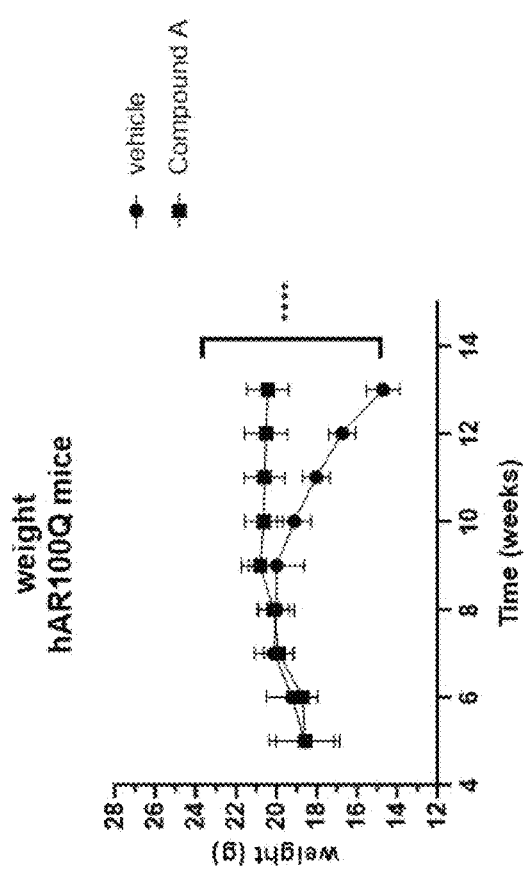
FIG. 6C shows body weight over time for male WT mice that were fed vehicle or Compound A-formulated chow starting at 5-weeks of age. Body weight was measured weekly. A two-way ANOVA or mixed effects model followed by Sidac's multiple comparison correction was used to compare body weights in WT littermates and hAR100Q mice, respectively. A mixed effects model was used to account for missing data due to hAR100Q mice that died prior to 13 weeks of age (****$p<0.0001$).
Figure 7C:
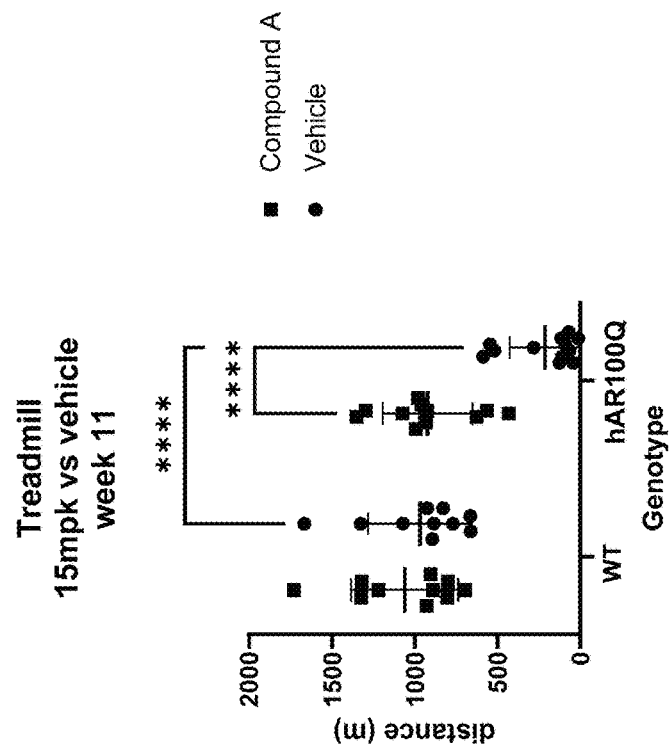
FIG. 7C shows muscle endurance measured by forced treadmill performance at 11-weeks of age in WT and hAR100Q mice administered Compound A (15 mg/kg) or vehicle. A two-way ANOVA (treatment×genotype) was used to evaluate statistical differences between groups (****$p<0.0001$).
Figure 7A:
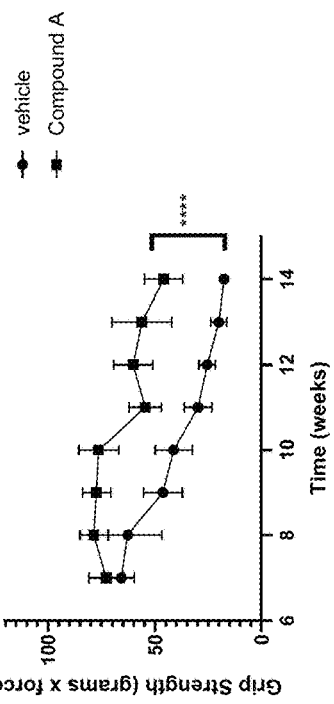
FIG. 7A shows all paw grip strength measured weekly starting at 7-weeks of age for hAR100Q male mice fed vehicle or Compound A-formulated chow starting at 5-weeks of age. A two-way ANOVA or mixed effects model (treatment×time) followed by Sidac's multiple comparison correction was used to compare grip strength in WT littermates and hAR100Q mice, respectively. A mixed effects model was used to account for missing data due to hAR100Q mice that died prior to 13 weeks of age. A two-way ANOVA (treatment×genotype) was used to evaluate statistical differences between groups (****$p<0.0001$).
Figure 7B:
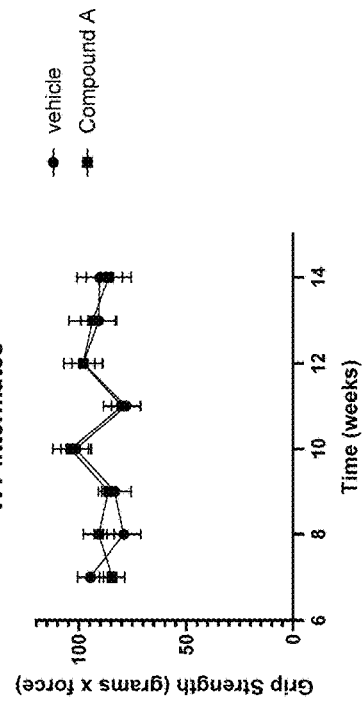
FIG. 7B shows all paw grip strength measured weekly starting at 7-weeks of age for male littermate control mice fed vehicle or Compound A-formulated chow starting at 5-weeks of age. A two-way ANOVA or mixed effects model (treatment×time) followed by Sidac's multiple comparison correction was used to compare grip strength in WT littermates and hAR100Q mice, respectively. A mixed effects model was used to account for missing data due to hAR100Q mice that died prior to 13 weeks of age. A two-way ANOVA (treatment×genotype) was used to evaluate statistical differences between groups (****$p<0.0001$).

Compound A-formulated chow rescued weight loss over time in hAR100Q mice compared to vehicle fed hAR100Q mice (FIG. 6B) but had no impact on WT littermates (FIG. 6C). Grip strength in hAR100Q mice declines every week starting at week 9. Compound A delayed the decline and magnitude of grip strength decline (FIG. 7A). Grip strength was similar between vehicle and Compound A treated WT littermates for the duration of the study (FIG. 7B). Muscle endurance was tested at week 11 by forced treadmill test. The distance travelled on the treadmill was significantly reduced in hAR100Q mice compared to WT littermates (FIG. 7C). hAR100Q mice fed Compound A-formulated chow, however, performed as well as WT littermates. No differences were observed between WT littermates that were fed vehicle versus Compound A chow (FIG. 7C).

A parallel cohort of hAR100Q mice was maintained in order to evaluate AR degradation at the 11-week timepoint. hAR100Q mice in this tissue cohort were fed chow identical to the mice that underwent muscle strength and endurance tests and were euthanized at 11-weeks of age.

Figure 8B:
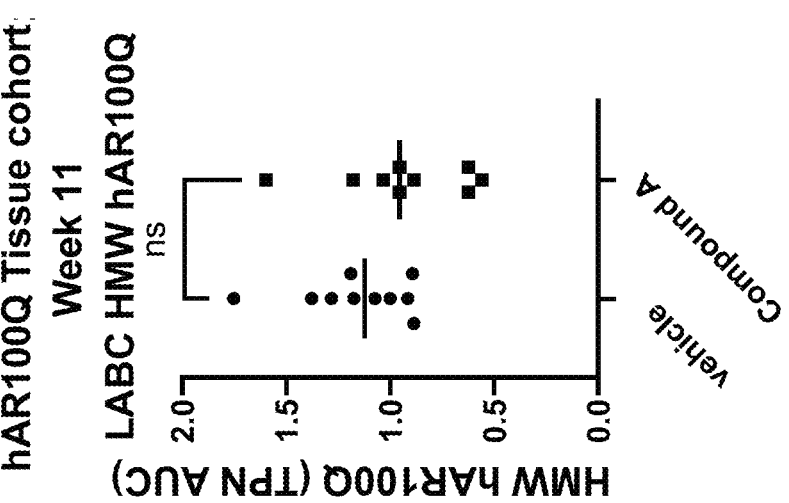
FIG. 8A is a series of capillary Western Blot experiments showing that Compound A induced degradation of AR and polyQ-AR (hAR100Q), but not high molecular weight polyQ-AR (HMW hAR100Q), in the LABC muscle of a murine model of SBMA. Compound A induced degradation of WT AR in the LABC of a murine model of SBMA, resulting in a 77% reduction vs. vehicle (FIG. 8B). Compound A induced degradation of polyQ-AR (hAR100Q) in the LABC of a murine model of SBMA, resulting in a 70% reduction vs. vehicle (FIG. 8C). Compound A did not induce degradation of high molecular weight polyQ-AR (HMW hAR100Q) in the LABC of a murine model of SBMA (FIG. 8D).
FIG. 8E is a series of capillary Western Blot experiments showing that Compound A induces degradation of polyQ-AR (hAR100Q) in the quadriceps of transgenic AR100Q mice (* indicates that the sample did not load properly, thus it was excluded from analysis). Compound A induced degradation of WT AR in the quadriceps muscle of a murine model of SBMA, resulting in a 65% reduction vs. vehicle (FIG. 8F). Compound A induced the degradation of polyQ-AR (hAR100Q) in the quadriceps of AR100Q mice, resulting in a 43% reduction (FIG. 8G). The reduction of high molecular weight polyQ-AR (HMW hAR100Q) trended toward a reduction (FIG. 8H).
Figure 8C:
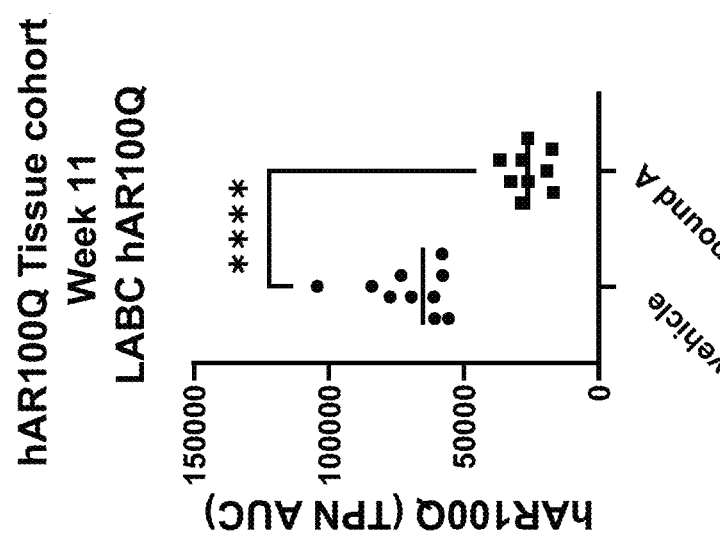
Figure 8D:
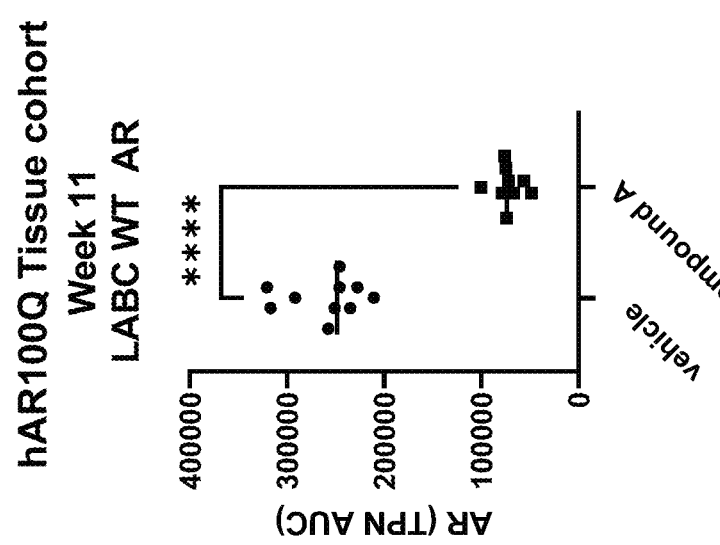
Figure 8F:
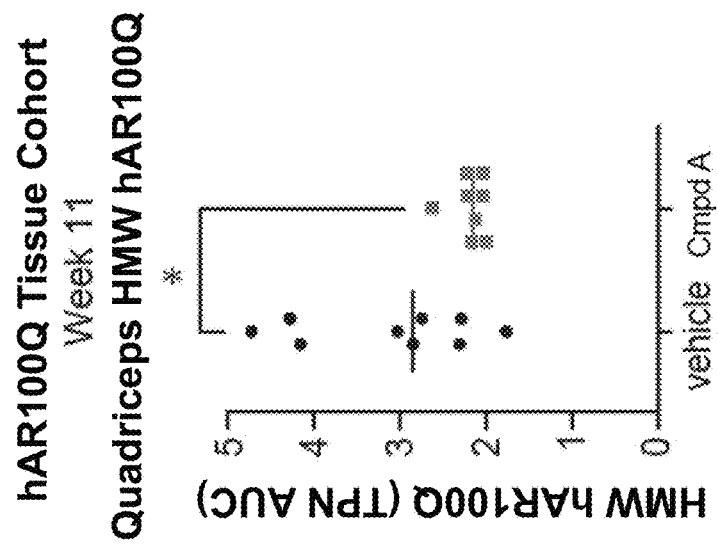
Figure 8G:
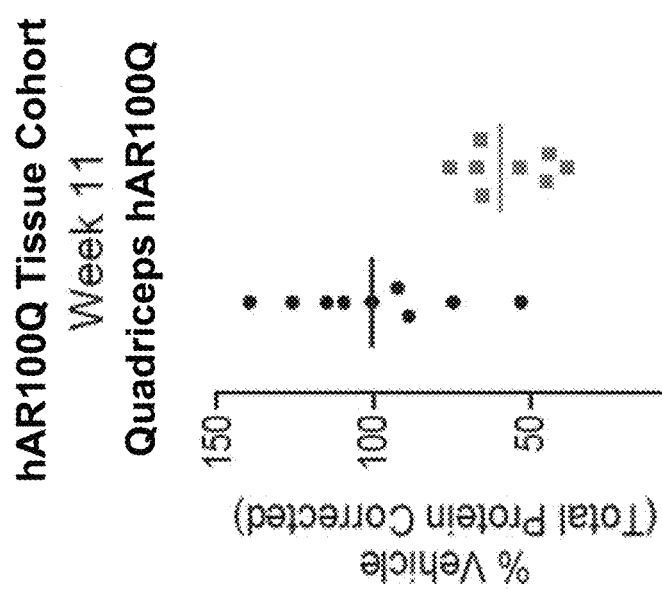
Figure 8H:
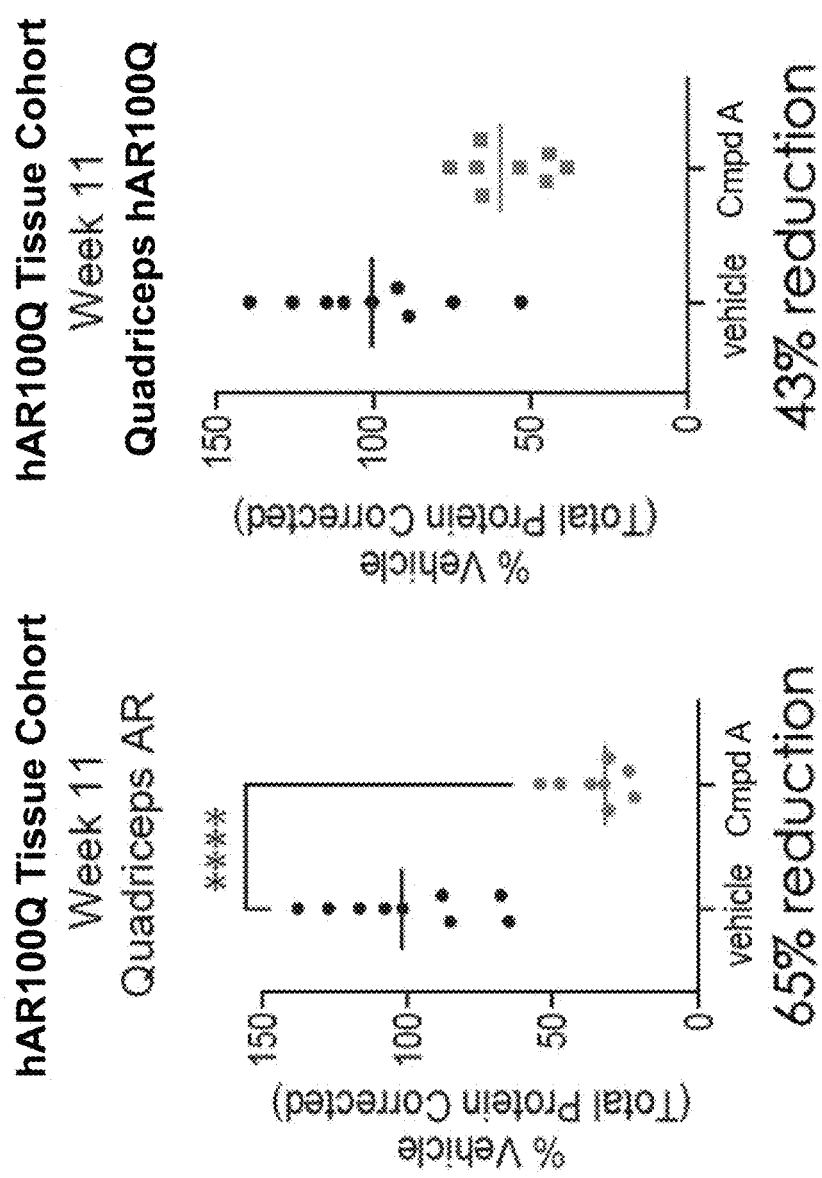

Endogenous mouse AR and monomeric hAR100Q were reduced by 77% and 70%, respectively (FIGS. 8A, 8B, 8C). Reductions in aggregated hAR100Q did not reach significance. (FIG. 8A, 8D).

Compound A induces degradation of polyQ-AR in the quadriceps of AR100Q mice.

40-60% of AR/polyQ-AR was degraded in the quadriceps muscle

Figure 9:
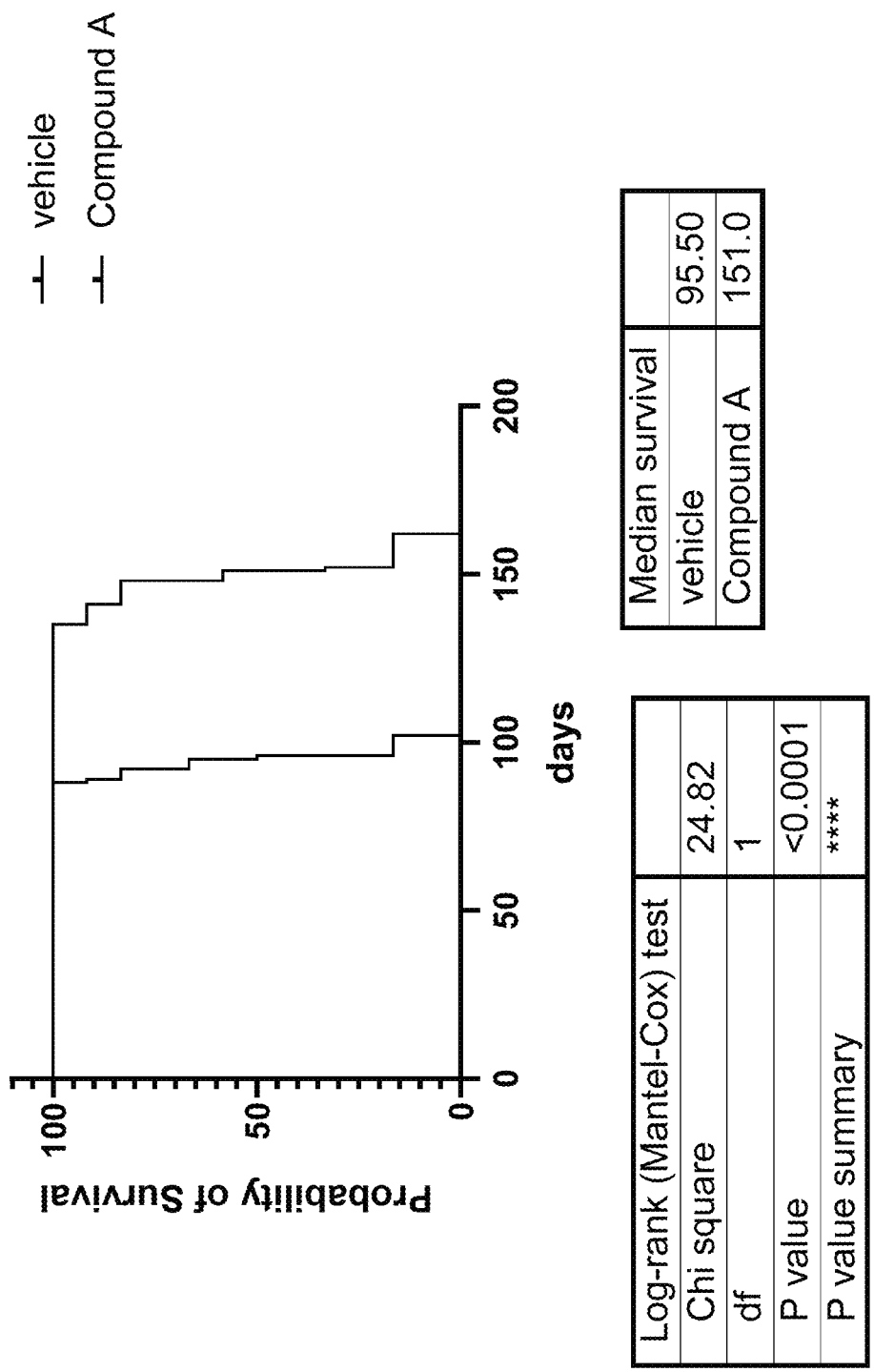
FIG. 9 is a Kaplan-Meier plot showing survival rates for hAR100Q male mice provided vehicle or Compound A-formulated chow starting at 5 weeks of age. Survival was defined as the length of time from birth to euthanasia. Mice were euthanized when deemed to be moribund. Differences in survival we evaluated by Kaplan-Meier estimation and compared using a log-rank test.

Reduction in the high molecular weight species were highly variable, but trended towards a reduction. See FIGS. 8E, 8F, 8G, and 8H for results.

hAR100Q mice fed with Compound A-formulated chow had an increased median lifespan of 151 days compared to 96 days for vehicle fed hAR100Q (FIG. 9). Lifespan was considered the number of days from birth to the date of euthanasia. hAR100Q mice in this study were euthanized when deemed to be moribund. Without being bound by theory, these data confirm that polyQ-AR degradation mediated by Compound A is a potential treatment of SBMA.

Figure 11:
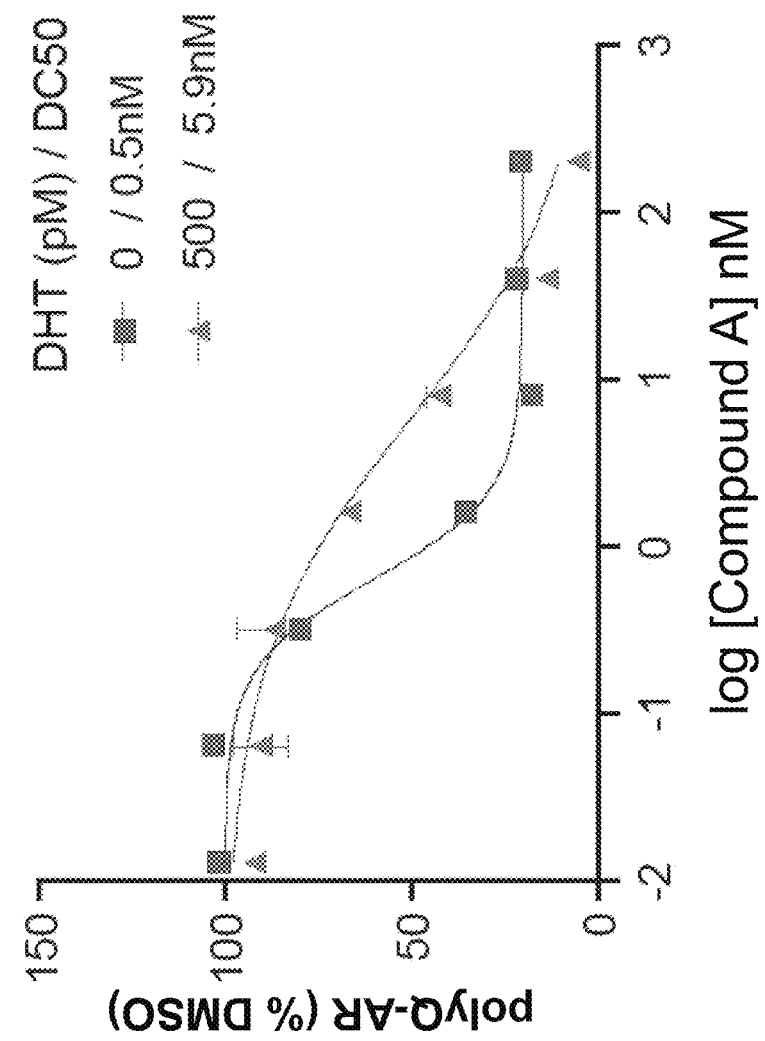
FIG. 11 is a representative dose response curve showing mean AR concentration in DMSO treated cells plotted against Compound A concentration in SBMA patient-derived hiPSC lines differentiated into myotubes. The experiment was performed in the presence of physiologically relevant concentrations of the androgen dihydrotestosterone (DHT) and Compound A was demonstrated to induce degradation under these conditions.

Example 4—Compound a Induces AR Degradation in the Presence of Physiologically Relevant Concentrations of Androgens SBMA subjects have normal levels of androgens compared healthy individuals. (Lancet Neurol. 2011 February; 10(2):140-7. doi: 10.1016/S1474-4422(10)70321-5. Epub 2011 January 6. PMID: 21216197; PMCID: PMC3056353.) In order to mimic the in vivo conditions of SBMA human subjects, experiments were conducted where androgens (e.g., dihydrotestosterone (DHT)) competed with Compound A for AR binding. (FIG. 11). With DHT present at 500 pM, Compound A has a $DC_{50}$ of 5.9 nM in hiPSC myotubes. Without any DHT present (0 pM), the $DC_{50}$ of Compound A improves to 0.5 nM. These results show that the presence of native androgens shifts the pharmacology, but that Compound A still degrades the target protein in hiPSC myotubes.

Example 5—Global Proteomics in SBMA hiPSC-Myotubes Indicates a Single Neosubstrate: PDE6D An analysis of global proteomics in hiSPC-myotubes shows that Compound A has specificity for AR. Compound A degrades polyQ-AR whereas an E3-inactive compound (Compound F) does not degrade AR compared to control. (FIG. 12A). Out of the ~7,600 proteins detected, only one neosubstrate (off-target substrate) was identified in myotubes for Compound A (PDE6D, FIG. 12B). ~50% reduction of PDE6D was confirmed by Western blot analysis (data not shown). PDE6D was not a neosubstrate of Compound F, which is a modified version of Compound A that does not bind the CRBN E3 Ubiquitin Ligase. (FIG. 12C).

Example 6—PK/PD in Mouse Muscle

Compound A degrades AR in muscle tissue (FIGS. 13A and 13B).

Free fraction of Compound A in mouse is low (plasma=0.44%).

About 10 mg/kg achieves AR degradation of ~50%.

AR returns to basal levels in about 48-72 hours in LABC muscle. (FIG. 13C).

EQUIVALENTS

While the present invention has been described in conjunction with the specific embodiments set forth above, many alternatives, modifications and other variations thereof will be apparent to those of ordinary skill in the art. All such alternatives, modifications and variations are intended to fall within the spirit and scope of the present invention.

ENUMERATED EMBODIMENTS

The aspects of the present disclosure are further described with references to the following numbered embodiments:
1. A method of treating spinal and bulbar muscular atrophy (SBMA) in a subject in need thereof, comprising administering to the subject an effective amount of Compound A:

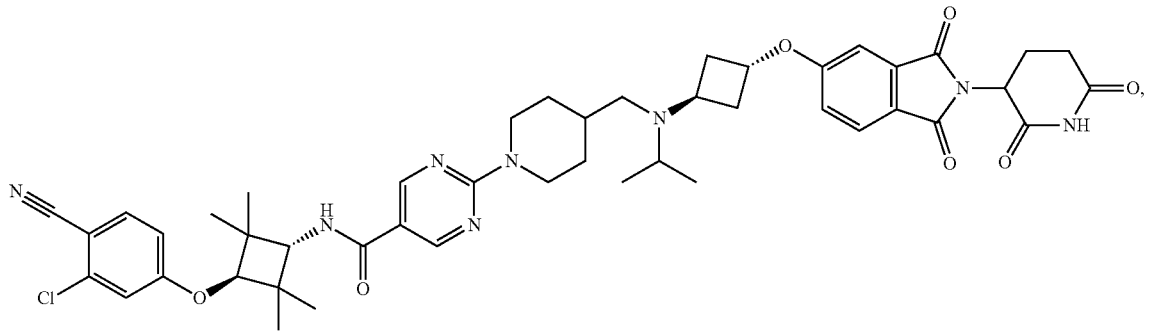 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.
2. Compound A,

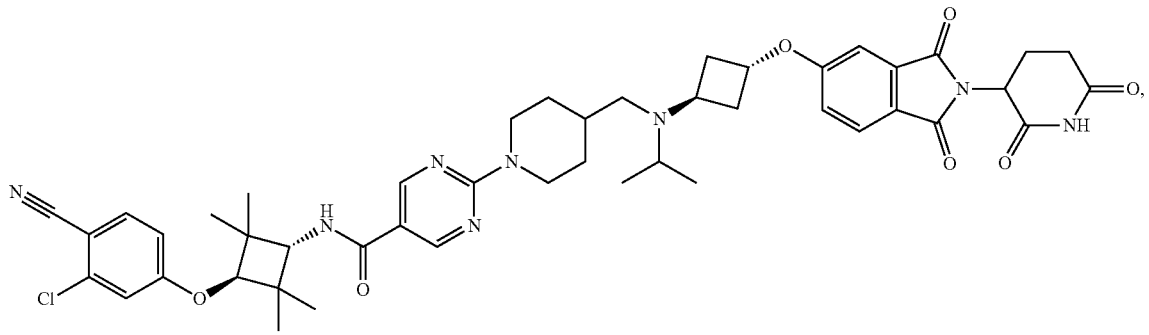 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for use in a method of treating spinal and bulbar muscular atrophy (SBMA) in a subject in need thereof, wherein the method comprises administering to the subject an effective amount of Compound A, or a pharmaceutically acceptable salt thereof.
3. Use of Compound A,

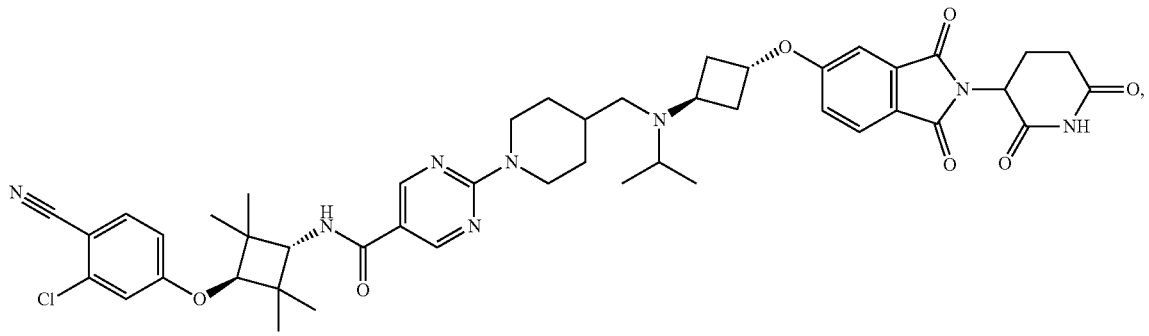 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating spinal and bulbar muscular atrophy (SBMA), wherein the medicament comprises an effective amount of Compound A, or a pharmaceutically acceptable salt thereof, and the medicament is administered to a subject in need thereof.

4. A method of treating spinal and bulbar muscular atrophy (SBMA) in a subject in need thereof, comprising administering to the subject about 1 mg to about 500 mg of Compound A:

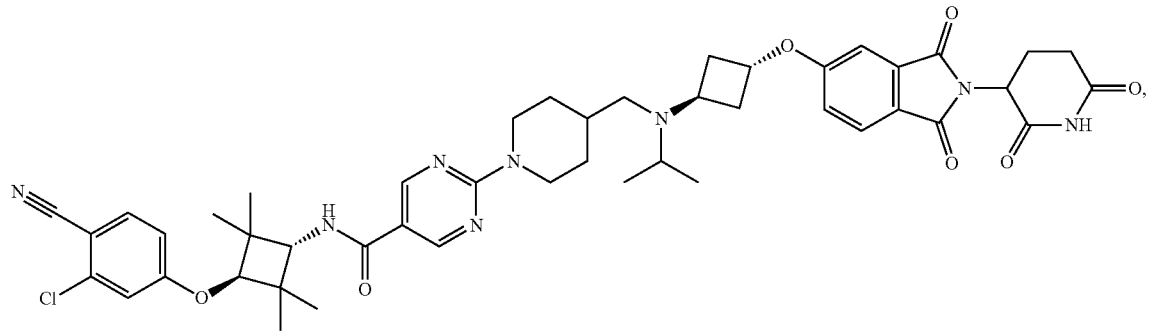 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

5. Compound A,

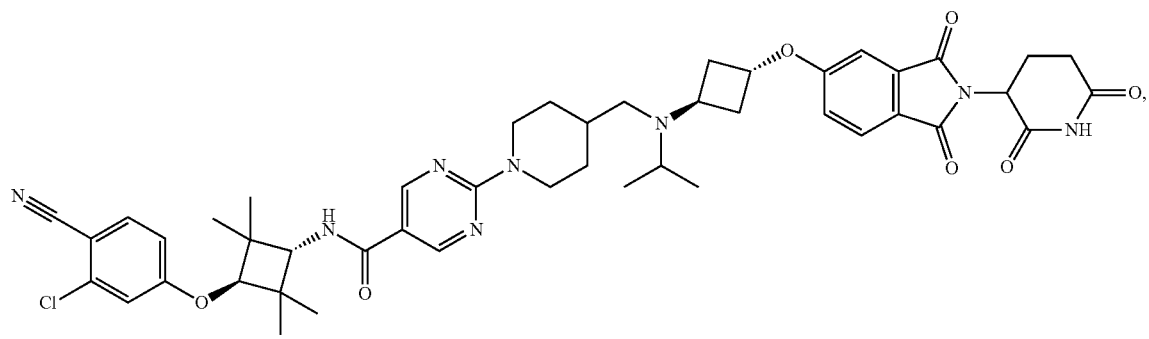 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for use in a method of treating spinal and bulbar muscular atrophy (SBMA) in a subject in need thereof, wherein the method comprises administering to the subject about 1 mg to about 500 mg of Compound A, or a pharmaceutically acceptable salt thereof.

6. Use of Compound A,

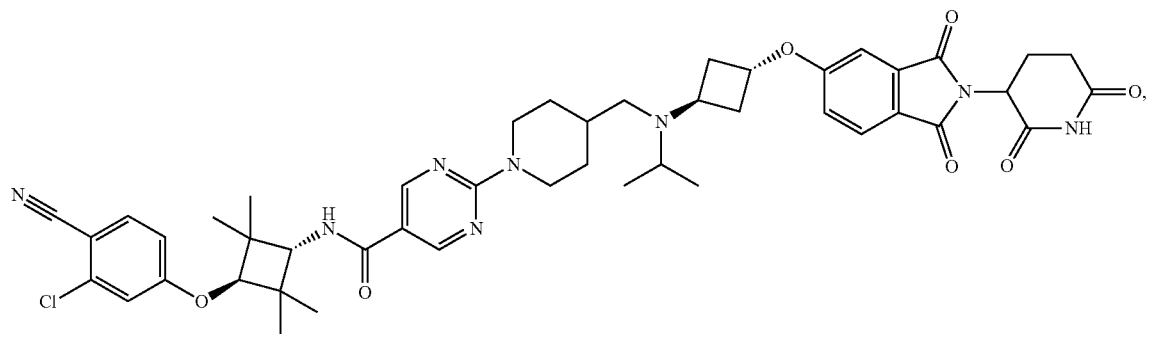 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating spinal and bulbar muscular atrophy (SBMA), wherein the medicament comprises about 1 mg to about 500 mg of Compound A, or a pharmaceutically acceptable salt thereof, and the medicament is administered to a subject in need thereof.

7. A method of treating a symptom of spinal and bulbar muscular atrophy (SBMA) in a subject in need thereof, comprising administering to the subject an effective amount of Compound A:

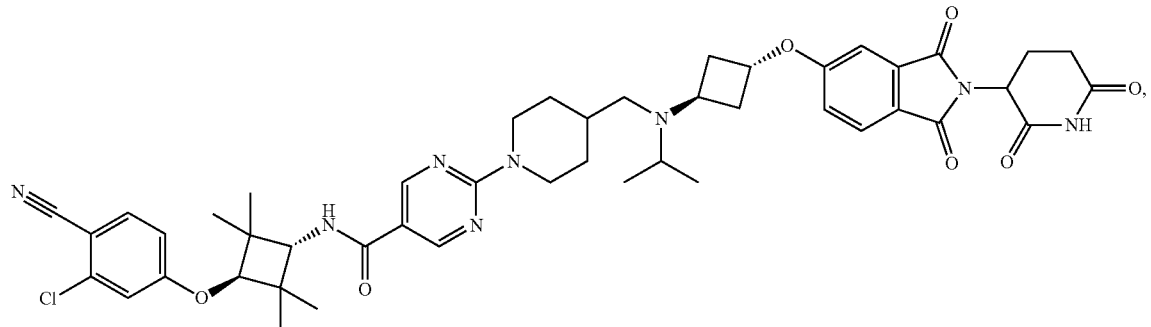

or a pharmaceutically acceptable salt thereof.

8. Compound A,

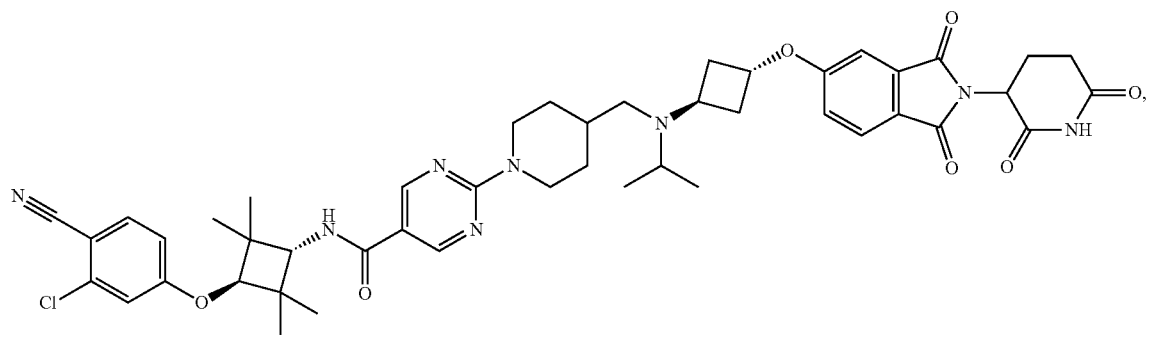 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for use in a method of treating a symptom of spinal and bulbar muscular atrophy (SBMA) in a subject in need thereof, wherein the method comprises administering to the subject an effective amount of Compound A, or a pharmaceutically acceptable salt thereof.

9. Use of Compound A,

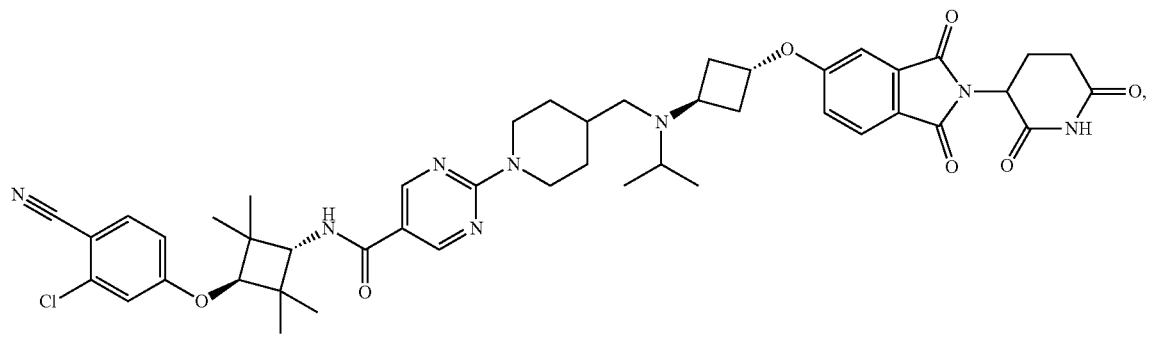 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating a symptom of spinal and bulbar muscular atrophy (SBMA), wherein the medicament comprises an effective amount of Compound A, or a pharmaceutically acceptable salt thereof, and the medicament is administered to a subject in need thereof.

10. A method of treating a symptom of spinal and bulbar muscular atrophy (SBMA) in a subject in need thereof, comprising administering to the subject about 1 mg to about 500 mg of Compound A:

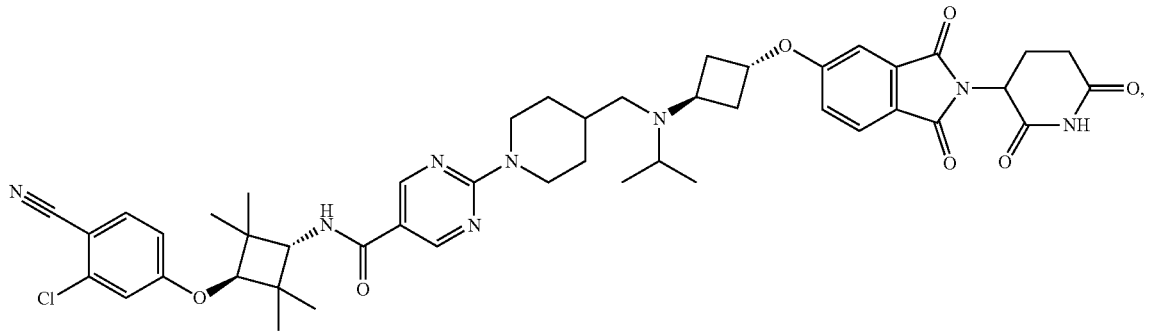 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

11. Compound A,

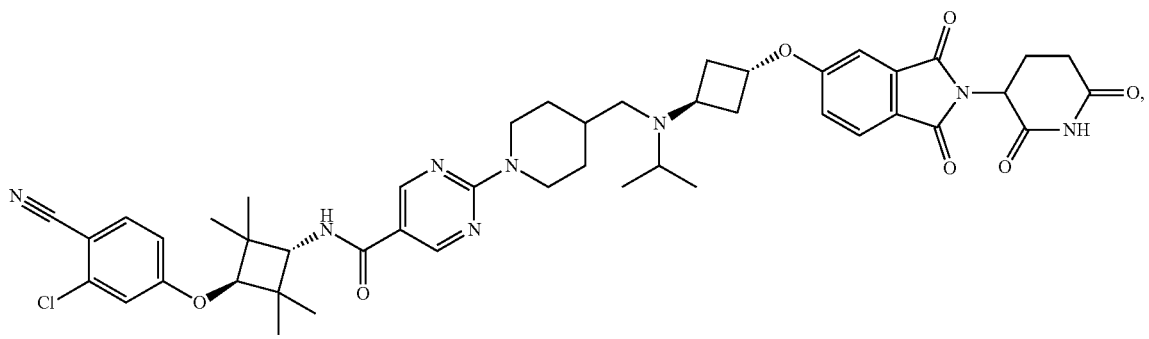 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for use in a method of treating a symptom of spinal and bulbar muscular atrophy (SBMA) in a subject in need thereof, wherein the method comprises administering to the subject about 1 mg to about 500 mg of Compound A, or a pharmaceutically acceptable salt thereof.

12. Use of Compound A,

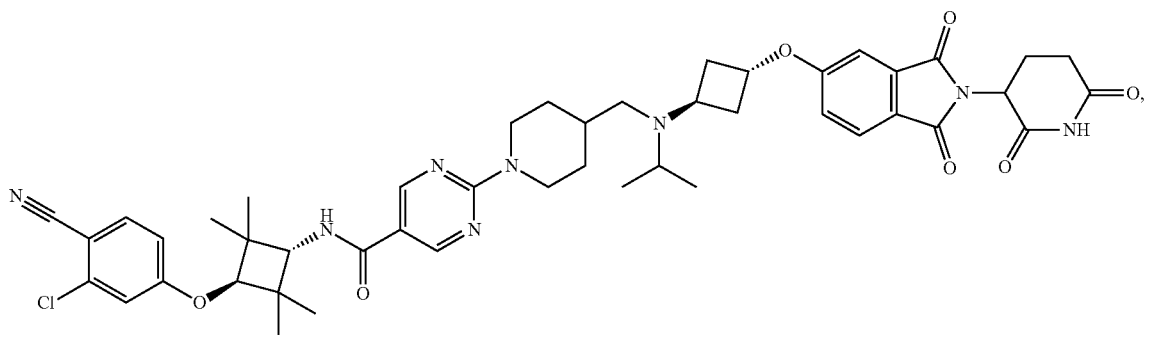 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating a symptom of spinal and bulbar muscular atrophy (SBMA), wherein the medicament comprises about 1 mg to about 500 mg of Compound A, or a pharmaceutically acceptable salt thereof, and the medicament is administered to a subject in need thereof.

13. A method of treating or preventing spinal and bulbar muscular atrophy (SBMA) in a subject in need thereof, comprising administering to the subject about 1 mg to about 500 mg of Compound A:

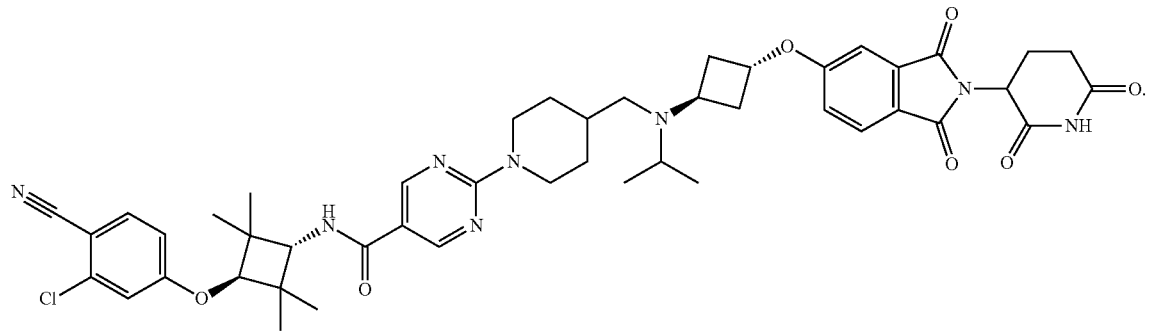 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

14. Compound A,

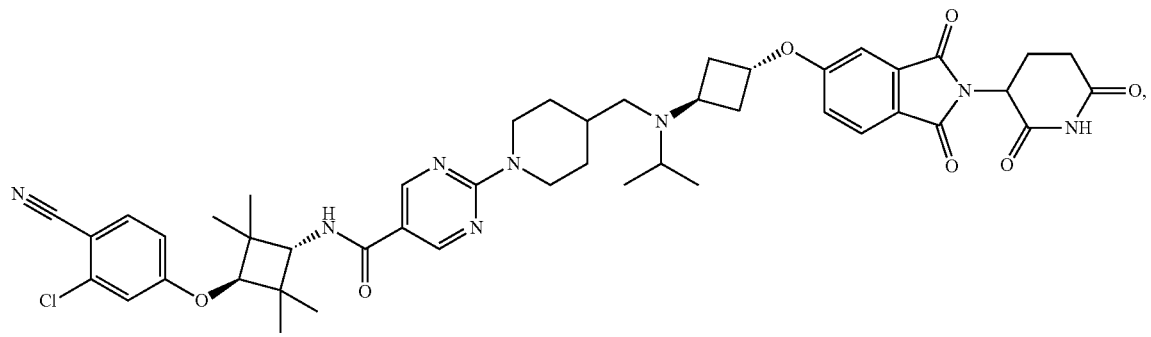 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for use in a method of treating or preventing spinal and bulbar muscular atrophy (SBMA) in a subject in need thereof, wherein the method comprises administering to the subject about 1 mg to about 500 mg of Compound A, or a pharmaceutically acceptable salt thereof.

15. Use of Compound A,

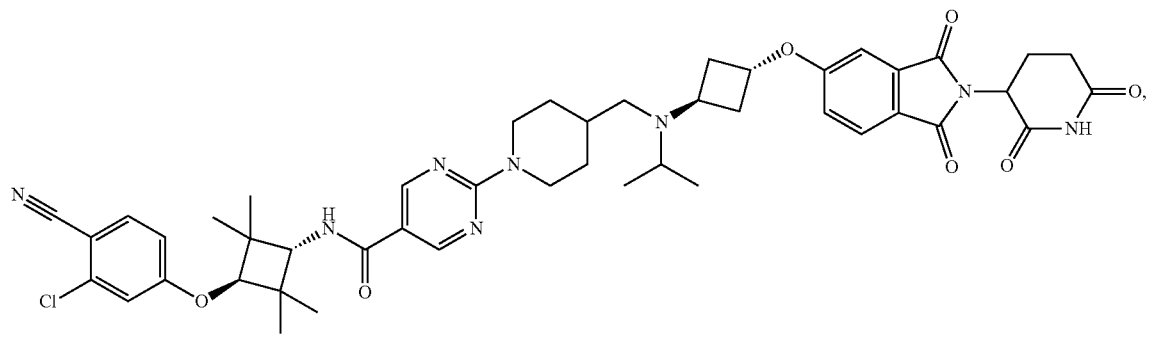 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating or preventing spinal and bulbar muscular atrophy (SBMA), wherein the medicament comprises about 1 mg to about 500 mg of Compound A, or a pharmaceutically acceptable salt thereof, and the medicament is administered to a subject in need thereof.

16. A method of treating or preventing a symptom of spinal and bulbar muscular atrophy (SBMA) in a subject in need thereof, comprising administering to the subject about 1 mg to about 500 mg of Compound A:

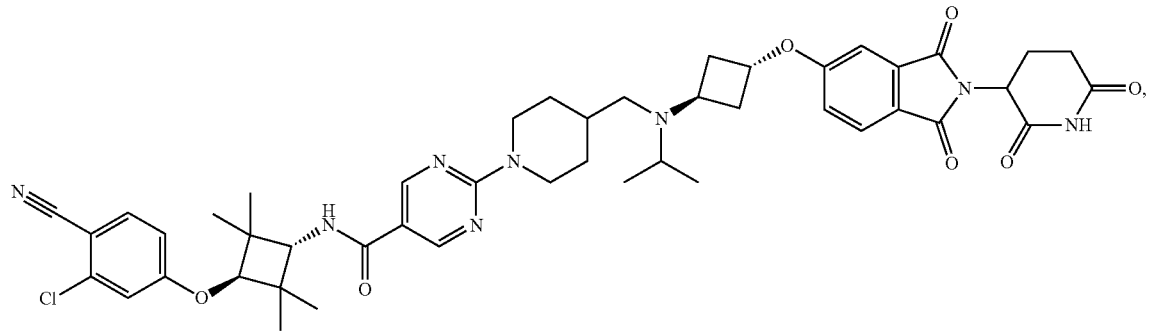 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

17. Compound A,

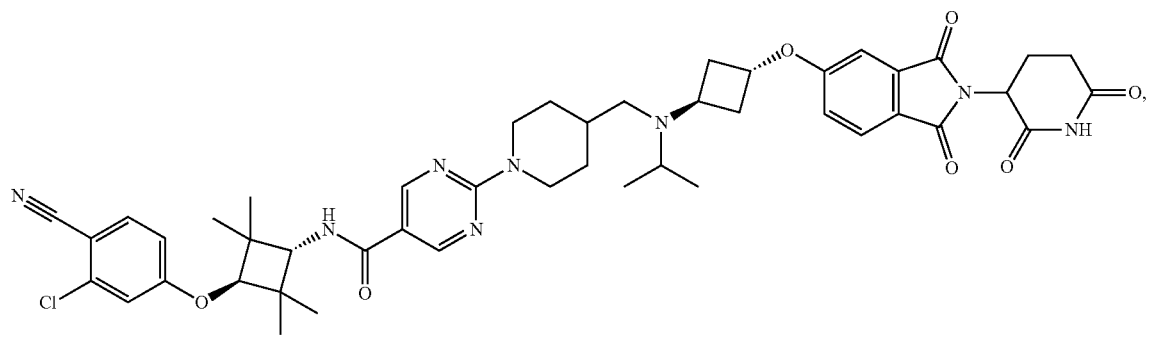 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for use in a method of treating or preventing a symptom of spinal and bulbar muscular atrophy (SBMA) in a subject in need thereof, wherein the method comprises administering to the subject about 1 mg to about 500 mg of Compound A, or a pharmaceutically acceptable salt thereof.

18. Use of Compound A,

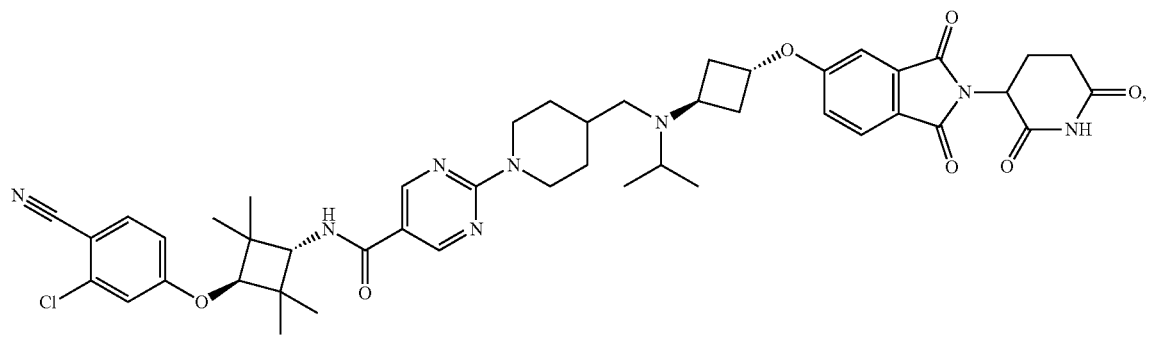 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof, for the preparation of a medicament for treating or preventing a symptom of spinal and bulbar muscular atrophy (SBMA), wherein the medicament comprises about 1 mg to about 500 mg of Compound A, or a pharmaceutically acceptable salt thereof, and the medicament is administered to a subject in need thereof.

19. The method, compound, or use of any one of Embodiments 7-12 or 16-18, wherein the symptom of SBMA is fatigue, muscle cramps, weakness in the limbs, difficulty in chewing, difficulty in swallowing, difficulty speaking, diminished deep tendon reflexes, lack of pathological reflexes, diminished vibration sensation in legs, erectile dysfunction, reduced fertility, gynecomastia, testicular atrophy, glucose resistance, hyperlipidemia, fatty liver disease, or a combination thereof.

20. The method, compound, or use of any one of Embodiments 1-19, wherein Compound A, or a pharmaceutically acceptable salt thereof, is administered to the subject orally.

21. The method, compound, or use of any one of Embodiments 1-20, wherein Compound A, or a pharmaceutically acceptable salt thereof, is administered to the subject orally in the form a tablet.

22. The method, compound, or use of any one of Embodiments 1-20, wherein Compound A, or a pharmaceutically acceptable salt thereof, is administered to the subject orally as a solution.

23. The method, compound, or use of any one of Embodiments 1-22, wherein about 5 mg to about 500 mg of Compound A, or a pharmaceutically acceptable salt thereof, is administered to the subject.

24. The method, compound, or use of any one of Embodiments 1-22, wherein about 50 mg to about 500 mg of Compound A, or a pharmaceutically acceptable salt thereof, is administered to the subject.

25. The method, compound, or use of any one of Embodiments 1-22, wherein about 5 mg to about 400 mg of Compound A, or a pharmaceutically acceptable salt thereof, is administered to the subject.

26. The method, compound, or use of any one of Embodiments 1-22, wherein about 10 mg to about 350 mg of Compound A, or a pharmaceutically acceptable salt thereof, is administered to the subject.

27. The method, compound, or use of any one of Embodiments 1-22, wherein about 15 mg to about 300 mg of Compound A, or a pharmaceutically acceptable salt thereof, is administered to the subject.

28. The method, compound, or use of any one of Embodiments 1-22, wherein about 20 mg to about 250 mg of Compound A, or a pharmaceutically acceptable salt thereof, is administered to the subject.

29. The method, compound, or use of any one of Embodiments 1-22, wherein about 25 mg to about 200 mg of Compound A, or a pharmaceutically acceptable salt thereof, is administered to the subject.

30. The method, compound, or use of any one of Embodiments 1-22, wherein about 30 mg to about 150 mg of Compound A, or a pharmaceutically acceptable salt thereof, is administered to the subject.

31. The method, compound, or use of any one of Embodiments 1-22, wherein about 25 mg of Compound A, or a pharmaceutically acceptable salt thereof, is administered to the subject.

32. The method, compound, or use of any one of Embodiments 1-22, wherein about 50 mg of Compound A, or a pharmaceutically acceptable salt thereof, is administered to the subject.

33. The method, compound, or use of any one of Embodiments 1-22, wherein about 75 mg of Compound A, or a pharmaceutically acceptable salt thereof, is administered to the subject.

34. The method, compound, or use of any one of Embodiments 1-22, wherein about 100 mg of Compound A, or a pharmaceutically acceptable salt thereof, is administered to the subject.

35. The method, compound, or use of any one of Embodiments 1-22, wherein about 125 mg of Compound A, or a pharmaceutically acceptable salt thereof, is administered to the subject.

36. The method, compound, or use of any one of Embodiments 1-22, wherein about 150 mg of Compound A, or a pharmaceutically acceptable salt thereof, is administered to the subject.

37. The method, compound, or use of any one of Embodiments 1-22, wherein about 175 mg of Compound A, or a pharmaceutically acceptable salt thereof, is administered to the subject.

38. The method, compound, or use of any one of Embodiments 1-22, wherein about 200 mg of Compound A, or a pharmaceutically acceptable salt thereof, is administered to the subject.

39. The method, compound, or use of any one of Embodiments 1-22, wherein Compound A, or a pharmaceutically acceptable salt thereof, is administered to the subject in one of the following amounts: about 25 mg to about 75 mg, about 30 mg to about 80 mg, about 35 mg to about 85 mg, about 40 mg to about 90 mg, about 45 mg to about 95 mg, about 50 mg to about 100 mg, about 55 mg to about 105 mg, about 60 mg to about 110 mg, about 65 mg to about 115 mg, about 70 mg to about 120 mg, or about 75 mg to about 125 mg.

40. The method, compound, or use of any one of Embodiments 1-22, wherein Compound A, or a pharmaceutically acceptable salt thereof, is administered to the subject in one of the following amounts: about 30 mg to about 75 mg, about 35 mg to about 80 mg, about 40 mg to about 85 mg, about 45 mg to about 90 mg, about 50 mg to about 95 mg, about 55 mg to about 100 mg, about 60 mg to about 105 mg, about 65 mg to about 110 mg, about 70 mg to about 115 mg, or about 75 mg to about 120 mg.

41. The method, compound, or use of any one of Embodiments 1-22, wherein Compound A, or a pharmaceutically acceptable salt thereof, is administered to the subject in one of the following amounts: about 35 mg to about 75 mg, about 40 mg to about 80 mg, about 45 mg to about 85 mg, about 50 mg to about 90 mg, about 55 mg to about 95 mg, about 60 mg to about 100 mg, about 65 mg to about 105 mg, about 70 mg to about 110 mg, or about 75 mg to about 110 mg.

42. The method, compound, or use of any one of Embodiments 1-22, wherein Compound A, or a pharmaceutically acceptable salt thereof, is administered to the subject in one of the following amounts: about 40 mg to about 75 mg, about 45 mg to about 80 mg, about 50 mg to about 85 mg, about 55 mg to about 90 mg, about 60 mg to about 95 mg, about 65 mg to about 100 mg, about 70 mg to about 105 mg, or about 75 mg to about 110 mg.

43. The method, compound, or use of any one of Embodiments 1-22, wherein Compound A, or a pharmaceutically acceptable salt thereof, is administered to the subject in one of the following amounts: about 45 mg to about 75 mg, about 50 mg to about 80 mg, about 55 mg to about 85 mg, about 60 mg to about 90 mg, about 65 mg to about 95 mg, about 70 mg to about 100 mg, or about 75 mg to about 105 mg.

44. The method, compound, or use of any one of Embodiments 1-22, wherein Compound A, or a pharmaceutically acceptable salt thereof, is administered to the subject in one of the following amounts: about 50 mg to about 75 mg, about 55 mg to about 80 mg, about 60 mg to about 85 mg, about 65 mg to about 90 mg, about 70 mg to about 95 mg, or about 75 mg to about 100 mg.

45. The method, compound, or use of any one of Embodiments 1-22, wherein Compound A, or a pharmaceutically acceptable salt thereof, is administered to the subject in one of the following amounts: about 50 mg to about 75 mg, about 55 mg to about 80 mg, about 60 mg to about 85 mg, about 65 mg to about 90 mg, about 70 mg to about 95 mg, or about 75 mg to about 100 mg.

46. The method, compound, or use of any one of Embodiments 1-22, wherein Compound A, or a pharmaceutically acceptable salt thereof, is administered to the subject in one of the following amounts: about 55 mg to about 75 mg, about 60 mg to about 80 mg, about 65 mg to about 85 mg, about 70 mg to about 90 mg, or about 75 mg to about 95 mg.

47. The method, compound, or use of any one of Embodiments 1-22, wherein Compound A, or a pharmaceutically acceptable salt thereof, is administered to the subject in one of the following amounts: about 60 mg to about 75 mg, about 65 mg to about 80 mg, about 70 mg to about 85 mg, or about 75 mg to about 90 mg.

48. The method, compound, or use of any one of Embodiments 1-22, wherein Compound A, or a pharmaceutically acceptable salt thereof, is administered to the subject in one of the following amounts: about 65 mg to about 75 mg, about 70 mg to about 80 mg, or about 75 mg to about 85 mg.

49. The method, compound, or use of any one of Embodiments 1-22, wherein Compound A, or a pharmaceutically acceptable salt thereof, is administered to the subject in one of the following amounts: about 200 mg to about 500 mg, about 200 mg to about 450 mg, about 200 mg to about 400 mg, about 200 mg to about 350 mg, about 200 mg to about 300 mg, or about 200 mg to about 250 mg.

50. The method, compound, or use of any one of Embodiments 1-22, wherein Compound A, or a pharmaceutically acceptable salt thereof, is administered to the subject in one of the following amounts: about 250 mg to about 500 mg, about 250 mg to about 450 mg, about 250 mg to about 400 mg, about 250 mg to about 350 mg, or about 250 mg to about 300 mg.

51. The method, compound, or use of any one of Embodiments 1-22, wherein Compound A, or a pharmaceutically acceptable salt thereof, is administered to the subject in one of the following amounts: about 300 mg to about 500 mg, about 300 mg to about 450 mg, about 300 mg to about 400 mg, or 300 mg to about 350 mg.

52. The method, compound, or use of any one of Embodiments 1-22, wherein Compound A, or a pharmaceutically acceptable salt thereof, is administered to the subject in one of the following amounts: about 350 mg to about 500 mg, about 350 mg to about 450 mg, about 350 mg to about 400 mg, about 400 mg to about 500 mg, about 400 mg to about 450 mg, or about 450 mg to about 500 mg.

53. The method, compound, or use of any one of Embodiments 1-52, wherein Compound A, or a pharmaceutically acceptable salt thereof, is administered to the subject once a day, once every two days, once every three days, or once every four days.

54. The method, compound, or use of any one of Embodiments 1-53, wherein Compound A, or a pharmaceutically acceptable salt thereof, is administered to the subject once a day.

55. The method, compound, or use of any one of Embodiments 1-54, wherein the subject is in a fed state at the time of administration.

56. The method, compound, or use of any one of Embodiments 1-54, wherein the subject is in a fasted state at the time of administration.

What is claimed is:

1. A method of treating spinal and bulbar muscular atrophy (SBMA) in a subject in need thereof, comprising administering to the subject an effective amount of Compound A:

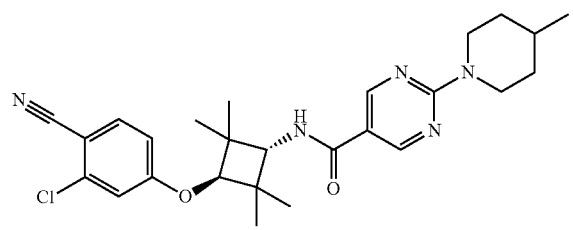

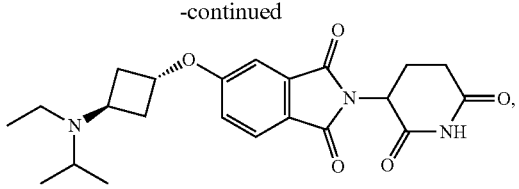

or a pharmaceutically acceptable salt thereof.

2. The method of claim 1, wherein Compound A, or a pharmaceutically acceptable salt thereof, is administered to the subject orally.

3. The method of claim 1, wherein Compound A, or a pharmaceutically acceptable salt thereof, is administered to the subject once a day, once every two days, once every three days, or once every four days.

4. A method of treating spinal and bulbar muscular atrophy (SBMA) in a subject in need thereof, comprising administering to the subject about 1 mg to about 500 mg of Compound A:

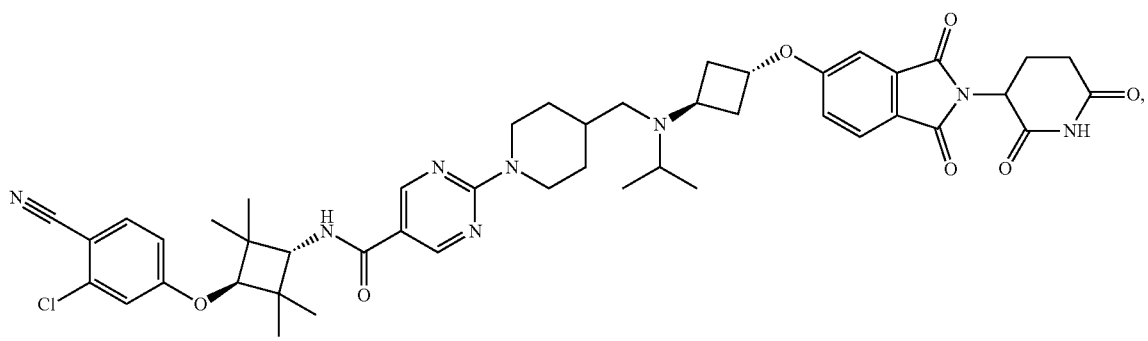 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

5. The method of claim 4, wherein Compound A, or a pharmaceutically acceptable salt thereof, is administered to the subject orally.

6. The method of claim 4, wherein about 5 mg to about 400 mg of Compound A, or a pharmaceutically acceptable salt thereof, is administered to the subject.

7. The method of claim 4, wherein about 10 mg to about 350 mg of Compound A, or a pharmaceutically acceptable salt thereof, is administered to the subject.

8. The method of claim 4, wherein about 15 mg to about 300 mg of Compound A, or a pharmaceutically acceptable salt thereof, is administered to the subject.

9. The method of claim 4, wherein about 20 mg to about 250 mg of Compound A, or a pharmaceutically acceptable salt thereof, is administered to the subject.

10. The method of claim 4, wherein about 25 mg to about 200 mg of Compound A, or a pharmaceutically acceptable salt thereof, is administered to the subject.

11. The method of claim 4, wherein about 75 mg of Compound A, or a pharmaceutically acceptable salt thereof, is administered to the subject.

12. The method of claim 4, wherein Compound A, or a pharmaceutically acceptable salt thereof, is administered to the subject in one of the following amounts: about 25 mg to about 75 mg, about 30 mg to about 80 mg, about 35 mg to about 85 mg, about 40 mg to about 90 mg, about 45 mg to about 95 mg, about 50 mg to about 100 mg, about 55 mg to about 105 mg, about 60 mg to about 110 mg, about 65 mg to about 115 mg, about 70 mg to about 120 mg, or about 75 mg to about 125 mg.

13. The method of claim 4, wherein Compound A, or a pharmaceutically acceptable salt thereof, is administered to the subject in one of the following amounts: about 200 mg to about 500 mg, about 200 mg to about 450 mg, about 200 mg to about 400 mg, about 200 mg to about 350 mg, about 200 mg to about 300 mg, or about 200 mg to about 250 mg.

14. The method of claim 4, wherein Compound A, or a pharmaceutically acceptable salt thereof, is administered to the subject once a day, once every two days, once every three days, or once every four days.

15. A method of treating a symptom of spinal and bulbar muscular atrophy (SBMA) in a subject in need thereof, comprising administering to the subject an effective amount of Compound A:

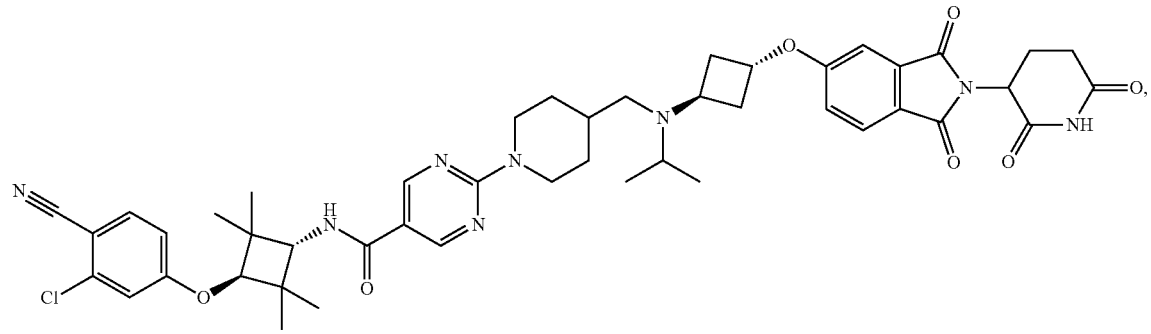 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

16. The method of claim 15, wherein the symptom of SBMA is fatigue, muscle cramps, weakness in the limbs, difficulty in chewing, difficulty in swallowing, difficulty speaking, diminished deep tendon reflexes, lack of pathological reflexes, diminished vibration sensation in legs, erectile dysfunction, reduced fertility, gynecomastia, testicular atrophy, glucose resistance, hyperlipidemia, fatty liver disease, or a combination thereof.

17. The method of claim 15, wherein Compound A, or a pharmaceutically acceptable salt thereof, is administered to the subject orally.

18. The method of claim 15, wherein Compound A, or a pharmaceutically acceptable salt thereof, is administered to the subject once a day, once every two days, once every three days, or once every four days.

19. A method of treating a symptom of spinal and bulbar muscular atrophy (SBMA) in a subject in need thereof, comprising administering to the subject about 1 mg to about 500 mg of Compound A:

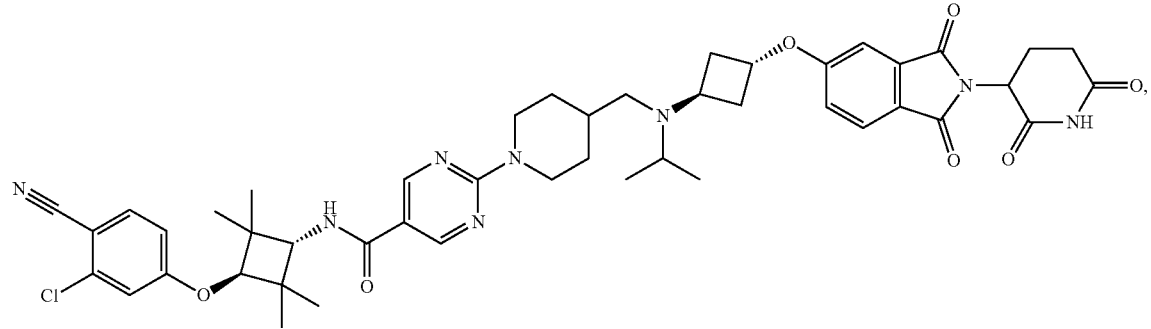 [SMILES: CC(C)N(CC1CCN(c2ncc(C(=O)N[C@H]3C(C)(C)[C@H](Oc4ccc(C#N)c(Cl)c4)C3(C)C)cn2)CC1)[C@H]1C[C@H](Oc2ccc3c(c2)C(=O)N(C2CCC(=O)NC2=O)C3=O)C1]

or a pharmaceutically acceptable salt thereof.

20. The method of claim 19, wherein the symptom of SBMA is fatigue, muscle cramps, weakness in the limbs, difficulty in chewing, difficulty in swallowing, difficulty speaking, diminished deep tendon reflexes, lack of pathological reflexes, diminished vibration sensation in legs, erectile dysfunction, reduced fertility, gynecomastia, testicular atrophy, glucose resistance, hyperlipidemia, fatty liver disease, or a combination thereof.

21. The method of claim 19, wherein Compound A, or a pharmaceutically acceptable salt thereof, is administered to the subject orally.

22. The method of claim 19, wherein about 5 mg to about 400 mg of Compound A, or a pharmaceutically acceptable salt thereof, is administered to the subject.

23. The method of claim 19, wherein about 10 mg to about 350 mg of Compound A, or a pharmaceutically acceptable salt thereof, is administered to the subject.

24. The method of claim 19, wherein about 15 mg to about 300 mg of Compound A, or a pharmaceutically acceptable salt thereof, is administered to the subject.

25. The method of claim 19, wherein about 20 mg to about 250 mg of Compound A, or a pharmaceutically acceptable salt thereof, is administered to the subject.

26. The method of claim 19, wherein about 25 mg to about 200 mg of Compound A, or a pharmaceutically acceptable salt thereof, is administered to the subject.

27. The method of claim 19, wherein about 75 mg of Compound A, or a pharmaceutically acceptable salt thereof, is administered to the subject.

28. The method of claim 19, wherein Compound A, or a pharmaceutically acceptable salt thereof, is administered to the subject in one of the following amounts: about 25 mg to about 75 mg, about 30 mg to about 80 mg, about 35 mg to about 85 mg, about 40 mg to about 90 mg, about 45 mg to about 95 mg, about 50 mg to about 100 mg, about 55 mg to about 105 mg, about 60 mg to about 110 mg, about 65 mg to about 115 mg, about 70 mg to about 120 mg, or about 75 mg to about 125 mg.

29. The method of claim 19, wherein Compound A, or a pharmaceutically acceptable salt thereof, is administered to the subject in one of the following amounts: about 200 mg to about 500 mg, about 200 mg to about 450 mg, about 200 mg to about 400 mg, about 200 mg to about 350 mg, about 200 mg to about 300 mg, or about 200 mg to about 250 mg.

30. The method of claim 19, wherein Compound A, or a pharmaceutically acceptable salt thereof, is administered to the subject once a day, once every two days, once every three days, or once every four days.

\* \* \* \* \*